(12) United States Patent
Gasper et al.

(10) Patent No.: US 10,683,061 B2
(45) Date of Patent: Jun. 16, 2020

(54) SURF WAKE SYSTEM FOR A WATERCRAFT

(71) Applicant: Malibu Boats, LLC, Merced, CA (US)

(72) Inventors: Daniel Lee Gasper, Atwater, CA (US); Adam Andrew McCall, Greenback, TN (US); Timothy Michael Lopes, Merced, CA (US); Bryan Walter Munday, Merced, CA (US); Wayne Richard Wilson, Knoxville, TN (US); Rachael Marie Green, Loudon, TN (US)

(73) Assignee: Malibu Boats, LLC, Merced, CA (US)

( * ) Notice: Subject to any disclaimer, the term of this patent is extended or adjusted under 35 U.S.C. 154(b) by 0 days.

(21) Appl. No.: 15/915,431

(22) Filed: Mar. 8, 2018

(65) Prior Publication Data

US 2018/0297667 A1   Oct. 18, 2018

Related U.S. Application Data

(63) Continuation of application No. 15/133,157, filed on Apr. 19, 2016, now Pat. No. 9,914,504, which is a
(Continued)

(51) Int. Cl.
*B63B 1/22* (2006.01)
*B63B 1/28* (2006.01)
(Continued)

(52) U.S. Cl.
CPC ............ *B63B 1/286* (2013.01); *B63B 1/32* (2013.01); *B63B 13/00* (2013.01); *B63B 32/70* (2020.02);
(Continued)

(58) Field of Classification Search
CPC .. B63B 1/20; B63B 1/22; B63B 1/286; B63B 1/32; B63B 35/73; B63B 35/85;
(Continued)

(56) References Cited

U.S. PATENT DOCUMENTS

| 667,482 | A | 2/1901 | Albarda |
| 704,729 | A | 7/1902 | Zerbe |

(Continued)

FOREIGN PATENT DOCUMENTS

| CA | 2271332 | 2/2000 |
| CN | 2597328 | 1/2004 |

(Continued)

OTHER PUBLICATIONS

US 2014/0137787 U.S. Appl. No. 14/075,978 including its prosecution history, May 22, 2014, Gasper et al.
(Continued)

*Primary Examiner* — Daniel V Venne
(74) *Attorney, Agent, or Firm* — Knobbe, Martens Olson & Bear, LLP

(57) ABSTRACT

An adjustable surf wake system enhances a wake formed by a watercraft travelling through water. The system may include a flap for deflecting water traveling past the stern of the watercraft, and/or a positioner operably connected to the flap for positioning the flap relative to a longitudinal axis of the watercraft between a neutral position and an outward position. Positioning a port flap in its extended position enhances a starboard surf wake, and positioning the starboard flap in its extended position enhances a port surf wake. A wake modifying system for modifying a wake produced by a watercraft traveling through water may include a rudder pivotally mounted to the watercraft for steering the watercraft, a fin pivotally mounted to the watercraft substantially along a centerline of the watercraft and forward the rudder, wherein the fin pivots about an upright axis to modify the wake produced by the watercraft traveling through the water, an actuator mounted within the watercraft and operably coupled to the fin for pivoting the fin relative to the centerline, and a controller mounted on the watercraft allowing an operator to control the actuator and selectively pivot the fin to a desired angle θd relative to the centerline.

30 Claims, 50 Drawing Sheets

Related U.S. Application Data continuation of application No. 14/082,086, filed on Nov. 15, 2013, now Pat. No. 9,580,147, which is a continuation-in-part of application No. 14/075,978, filed on Nov. 8, 2013, which is a continuation-in-part of application No. 14/026,983, filed on Sep. 13, 2013, now Pat. No. 9,315,236, which is a continuation of application No. 13/830,356, filed on Mar. 14, 2013, now Pat. No. 8,578,873, which is a continuation of application No. 13/830,274, filed on Mar. 14, 2013, now Pat. No. 8,534,214, which is a continuation-in-part of application No. PCT/US2012/055788, filed on Sep. 17, 2012, which is a continuation of application No. PCT/US2012/055788, filed on Sep. 17, 2012, which is a continuation-in-part of application No. 13/545,969, filed on Jul. 12, 2012, now Pat. No. 9,260,161.

(60) Provisional application No. 61/559,069, filed on Nov. 12, 2011, provisional application No. 61/535,438, filed on Sep. 16, 2011.

(51) Int. Cl.
  *B63B 1/32* (2006.01)
  *B63B 39/06* (2006.01)
  *B63B 32/70* (2020.01)
  *B63B 13/00* (2006.01)
  *B63H 25/06* (2006.01)
  *G08B 21/08* (2006.01)
  *B63H 25/38* (2006.01)
  *G08G 3/00* (2006.01)
  *B63B 34/70* (2020.01)

(52) U.S. Cl.
  CPC ........... *B63B 39/061* (2013.01); *B63H 25/06* (2013.01); *B63H 25/38* (2013.01); *G08B 21/084* (2013.01); *G08G 3/00* (2013.01); *B63B 34/70* (2020.02); *Y02T 70/12* (2013.01)

(58) Field of Classification Search
  CPC . B63B 2035/855; B63B 39/061; B63B 13/00; B63B 25/06; B63B 21/084
  USPC .......... 114/271, 274–282, 284, 285
  See application file for complete search history.

(56) References Cited

U.S. PATENT DOCUMENTS

| | | |
|---|---|---|
| 1,196,682 A | 8/1916 | Harriss |
| 1,264,320 A | 4/1918 | Metzler |
| 2,081,868 A | 5/1937 | Hampden |
| 2,199,333 A | 4/1940 | Dunklin |
| 2,663,276 A | 12/1953 | Ouellet |
| 2,807,228 A | 9/1957 | Vandre |
| 2,832,304 A | 4/1958 | Elyosius et al. |
| 2,890,673 A | 6/1959 | Chadwick, Jr. |
| 2,994,290 A | 8/1961 | Merchant, Sr. |
| 2,998,791 A | 9/1961 | Light |
| 3,046,928 A | 7/1962 | Sherrill |
| 3,062,167 A | 11/1962 | Bennett |
| 3,079,885 A | 3/1963 | Cooke |
| 3,094,960 A | 6/1963 | Lang |
| 3,106,178 A | 10/1963 | Cale |
| 3,111,103 A | 11/1963 | Bennett |
| 3,159,134 A | 12/1964 | Winnen |
| 3,200,782 A | 8/1965 | Walden et al. |
| 3,247,820 A | 4/1966 | White |
| 3,259,097 A | 7/1966 | Veldhuizen et al. |
| 3,294,052 A | 12/1966 | Jones |
| 3,327,671 A | 6/1967 | Comins |
| 3,372,663 A | 3/1968 | Bue |
| 3,391,667 A | 7/1968 | Bue |
| 3,399,643 A | 9/1968 | Bennett |
| 3,456,610 A | 7/1969 | Beals |
| 3,577,948 A | 5/1971 | Frey |
| 3,628,484 A | 12/1971 | Banner |
| 3,628,486 A | 12/1971 | Bennett |
| 3,628,487 A | 12/1971 | Bennett |
| 3,650,310 A | 3/1972 | Childress |
| 3,670,685 A | 6/1972 | Milessa |
| 3,695,204 A | 10/1972 | Bennett |
| 3,698,343 A | 10/1972 | Boome |
| 3,760,759 A | 9/1973 | Lang |
| 3,763,812 A | 10/1973 | Rowe |
| 3,982,493 A | 9/1976 | Cronin |
| 4,178,871 A | 12/1979 | Hirsch |
| 4,232,626 A | 11/1980 | Kern |
| 4,237,808 A | 12/1980 | Doerffer |
| 4,261,278 A | 4/1981 | Gaudin |
| 4,434,738 A | 3/1984 | Barkemeyer |
| 4,577,580 A | 3/1986 | Diffely, Sr. |
| 4,597,742 A | 7/1986 | Finkl |
| 4,644,893 A | 2/1987 | Zepp |
| 4,718,872 A | 1/1988 | Olson et al. |
| 4,763,219 A | 8/1988 | Nakamura |
| 4,776,295 A | 10/1988 | Kline et al. |
| 4,854,259 A | 8/1989 | Cluett |
| 4,895,093 A | 1/1990 | Dalsbo |
| 4,910,419 A | 3/1990 | Hayashi et al. |
| 4,915,048 A | 4/1990 | Stanford |
| 4,967,682 A | 11/1990 | O'Donnell |
| 5,041,040 A | 8/1991 | Jones et al. |
| 5,058,520 A | 10/1991 | Fahrney |
| 5,113,780 A | 5/1992 | Bennett et al. |
| 5,142,473 A | 8/1992 | Davis |
| 5,193,478 A | 3/1993 | Mardikian |
| 5,224,436 A | 7/1993 | Stricker |
| 5,235,926 A | 8/1993 | Jones |
| 5,263,432 A | 11/1993 | Davis |
| 5,315,951 A | 5/1994 | Finkl |
| 5,359,956 A | 11/1994 | Lee |
| 5,377,610 A | 1/1995 | Goebel |
| 5,385,110 A | 1/1995 | Bennet et al. |
| 5,445,100 A | 8/1995 | Finkl |
| 5,474,012 A | 12/1995 | Yamada et al. |
| 5,474,013 A | 12/1995 | Wittmaier |
| 5,549,071 A | 8/1996 | Pigeon et al. |
| 5,572,944 A | 11/1996 | Slikkers et al. |
| 5,628,272 A | 5/1997 | Thomas |
| 5,664,910 A | 9/1997 | Lochtefeld et al. |
| 5,694,337 A * | 12/1997 | Macken ............... B63B 49/00 242/904 |
| 5,787,835 A | 8/1998 | Remnant |
| 5,860,384 A | 1/1999 | Castillo |
| 5,860,766 A | 1/1999 | Lochtefeld et al. |
| 5,881,666 A | 3/1999 | Crews, Jr. |
| 5,911,190 A | 6/1999 | Lochtefeld et al. |
| 6,006,689 A | 12/1999 | Olofsson |
| 6,012,408 A | 1/2000 | Castillo |
| 6,026,759 A | 2/2000 | Hazelett et al. |
| 6,044,788 A * | 4/2000 | Larson ............... B63B 35/73 114/125 |
| 6,047,657 A | 4/2000 | Cox |
| 6,105,527 A | 8/2000 | Lochtefeld et al. |
| 6,138,601 A | 10/2000 | Anderson et al. |
| 6,148,756 A | 11/2000 | Pavlov et al. |
| 6,158,375 A | 12/2000 | Stuart, Jr. |
| 6,167,830 B1 | 1/2001 | Pilger |
| 6,213,044 B1 | 4/2001 | Rodgers et al. |
| 6,234,099 B1 | 5/2001 | Jessen et al. |
| 6,354,237 B1 | 3/2002 | Gaynor et al. |
| 6,415,729 B1 | 7/2002 | Nedderman, Jr. et al. |
| 6,427,616 B1 | 8/2002 | Hagen |
| 6,520,104 B1 | 2/2003 | Svensson |
| 6,523,489 B2 | 2/2003 | Simard et al. |
| 6,523,490 B1 | 2/2003 | Watkins |
| 6,603,402 B2 | 8/2003 | Lentine et al. |
| 6,606,959 B1 | 8/2003 | Shen |
| 6,745,715 B1 | 6/2004 | Shen et al. |
| 6,782,839 B1 | 8/2004 | Nozaki |

(56) References Cited

U.S. PATENT DOCUMENTS

| | | | |
|---|---|---|---|
| 6,827,031 B2 | 12/2004 | Aoyama | |
| 6,874,441 B2 | 4/2005 | Pigeon | |
| 6,923,136 B1 | 8/2005 | D'Alessandro | |
| 6,935,263 B1 | 8/2005 | Bandyopadhyay | |
| 6,941,884 B2 | 9/2005 | Moore | |
| 6,953,002 B2 | 10/2005 | Jessen et al. | |
| 7,004,097 B2 | 2/2006 | Zeromski | |
| 7,007,621 B1 | 3/2006 | Bootes | |
| 7,018,252 B2 | 3/2006 | Simard et al. | |
| 7,063,031 B2 * | 6/2006 | Earl, Jr. | B63B 1/28 114/162 |
| 7,140,318 B1 | 11/2006 | Gasper | |
| 7,174,843 B1 | 2/2007 | Tossavainen | |
| 7,188,581 B1 | 3/2007 | Davis et al. | |
| 7,201,111 B1 | 4/2007 | Burkett | |
| 7,210,422 B1 | 5/2007 | Hickok et al. | |
| 7,216,601 B1 | 5/2007 | Mann | |
| 7,246,565 B2 | 7/2007 | Snook et al. | |
| 7,252,047 B1 | 8/2007 | Baucom, Jr. | |
| 7,252,074 B2 | 8/2007 | Chapman et al. | |
| 7,311,058 B1 | 12/2007 | Brooks et al. | |
| 7,318,389 B2 | 1/2008 | Boning | |
| 7,380,514 B2 | 6/2008 | Loui et al. | |
| 7,381,108 B1 | 6/2008 | Salmon | |
| 7,434,531 B1 * | 10/2008 | Zsido | B63B 35/85 114/284 |
| 7,467,596 B2 | 12/2008 | Salmon | |
| 7,497,748 B2 | 3/2009 | Salmon | |
| 7,617,026 B2 | 11/2009 | Gee et al. | |
| 7,641,525 B2 | 1/2010 | Morvillo | |
| 7,707,956 B2 | 5/2010 | Moore | |
| 7,780,490 B2 | 8/2010 | Lundgren | |
| 7,905,193 B2 | 3/2011 | Beamer | |
| 7,958,837 B1 | 6/2011 | Fraleigh | |
| 8,096,255 B2 | 1/2012 | Morand et al. | |
| 8,100,079 B2 | 1/2012 | Buzzi | |
| 8,191,493 B2 | 6/2012 | Baywol | |
| 8,201,514 B2 | 6/2012 | Coles | |
| 8,216,007 B2 | 7/2012 | Moore | |
| 8,251,006 B2 | 8/2012 | Kalil | |
| 8,261,682 B1 | 9/2012 | DeVito | |
| 8,327,790 B2 | 12/2012 | Snow | |
| 8,336,477 B2 | 12/2012 | Walker | |
| 8,387,551 B2 | 3/2013 | Muller | |
| 8,465,333 B2 | 6/2013 | Sells | |
| 8,468,964 B2 | 6/2013 | Hoberman et al. | |
| 8,480,445 B2 | 7/2013 | Morvillo | |
| 8,522,706 B2 | 9/2013 | Larson et al. | |
| 8,534,214 B1 | 9/2013 | Gasper | |
| 8,539,897 B1 | 9/2013 | Gasper et al. | |
| 8,578,873 B2 | 11/2013 | Gasper et al. | |
| 8,622,012 B2 | 1/2014 | Olofsson | |
| 8,631,753 B2 | 1/2014 | Morvillo | |
| 8,739,723 B1 | 6/2014 | Murphy | |
| 8,798,825 B1 | 8/2014 | Hartman | |
| 8,833,286 B1 | 9/2014 | Sheedy et al. | |
| 8,967,070 B2 | 3/2015 | Kalil | |
| 8,968,043 B1 | 3/2015 | Murphy | |
| 9,150,289 B1 | 10/2015 | Brendel | |
| 9,156,372 B1 | 10/2015 | Guglielmo et al. | |
| 9,199,695 B2 | 12/2015 | Gasper et al. | |
| 9,254,896 B2 | 2/2016 | Bertalan et al. | |
| 9,260,161 B2 | 2/2016 | Gasper et al. | |
| 9,272,762 B1 | 3/2016 | Murphy | |
| 9,315,235 B1 | 4/2016 | Wood | |
| 9,315,236 B2 | 4/2016 | Gasper | |
| 9,334,022 B2 | 5/2016 | Gasper et al. | |
| 9,540,074 B1 | 1/2017 | Pigeon | |
| 9,573,655 B1 | 2/2017 | Pigeon | |
| 9,580,147 B2 | 2/2017 | Gasper et al. | |
| 9,592,890 B2 | 3/2017 | Christensen et al. | |
| D783,021 S | 4/2017 | Peel | |
| 9,669,903 B2 | 6/2017 | Gasper et al. | |
| 9,694,873 B2 | 7/2017 | Gasper et al. | |
| 9,891,620 B2 | 2/2018 | Green et al. | |
| 9,914,504 B2 | 3/2018 | Gasper et al. | |
| 2004/0261684 A1 | 12/2004 | Pigeon | |
| 2005/0124234 A1 | 7/2005 | Sells et al. | |
| 2005/0155540 A1 | 7/2005 | Moore | |
| 2006/0054067 A1 | 3/2006 | Hoberman et al. | |
| 2006/0217011 A1 | 9/2006 | Morvillo | |
| 2007/0078575 A1 | 4/2007 | Wilson et al. | |
| 2007/0125287 A1 | 6/2007 | Walker | |
| 2007/0137550 A1 | 6/2007 | Davis et al. | |
| 2007/0202757 A1 | 8/2007 | Moore | |
| 2008/0257245 A1 | 10/2008 | Stella | |
| 2008/0271660 A1 | 11/2008 | Zsido et al. | |
| 2008/0281478 A1 | 11/2008 | Gee et al. | |
| 2009/0165694 A1 | 7/2009 | Beamer | |
| 2010/0101475 A1 | 4/2010 | Mueller | |
| 2010/0121493 A1 * | 5/2010 | Christensen | B63B 35/816 700/275 |
| 2010/0251952 A1 | 10/2010 | Baywol | |
| 2011/0017115 A1 | 1/2011 | Olofsson | |
| 2011/0126751 A1 | 6/2011 | Muller | |
| 2011/0320072 A1 | 12/2011 | Morvillo | |
| 2012/0079977 A1 | 4/2012 | Gai | |
| 2013/0000542 A1 | 1/2013 | Muller | |
| 2013/0145978 A1 | 6/2013 | Viviani et al. | |
| 2014/0026799 A1 | 1/2014 | Kalil | |
| 2015/0066249 A1 | 3/2015 | Bieback et al. | |

FOREIGN PATENT DOCUMENTS

| | | |
|---|---|---|
| DE | 26 34 573 | 2/1978 |
| DE | 101 59 040 | 9/2002 |
| EP | 1 435 325 | 7/2004 |
| EP | 1 058 645 | 10/2004 |
| FR | 2 556 312 | 6/1985 |
| GB | 332315 | 7/1930 |
| NR | 86945 | 2/1956 |
| SU | 975490 | 11/1982 |
| WO | WO 93/00258 | 1/1993 |
| WO | WO 96/20105 | 7/1996 |
| WO | WO 99/55577 | 11/1999 |
| WO | WO 2005/118384 | 12/2005 |
| WO | WO 2006/058232 | 6/2006 |
| WO | WO 2007/072185 | 6/2007 |
| WO | WO 2009/113923 | 9/2009 |
| WO | WO 2011/099931 | 8/2011 |
| WO | WO 2013/040576 | 3/2013 |
| WO | WO 2013/071148 | 5/2013 |

OTHER PUBLICATIONS

Ex Parte Reexamination of U.S. Pat. No. 9,260,161, (Control No. 90/013,819), filed Sep. 26, 2016, Gasper et al.
US 2017/0369126 U.S. Appl. No. 15/612,663 including its prosecution history, Dec. 28, 2017, Gasper et al.
MasterCraft Surf Tab—Screenshots taken from video uploaded on May 26, 2010 at http://www.youtube.com/watch?v=b1Q_MLR031M.
Tige Convex VX—Screenshots taken from video uploaded on Oct. 10, 2012 at http://www.youtube.com/watch?v=jx5QXC-dU9w.
Centurion Wake Plate—Website dated Aug. 27, 2011—http://www.centurionboats.com/features-and-options/adjustable-wake-plate.html.
Nautique Surf System—Released Jan. 3, 2013—Website printout from http://www.nautique.com/models/nautique-surf-system.
Letter from Edmund J. Haughey of Fitzpatrick, Cella, Harper & Scinto, dated Feb. 3, 2016.
"Debut of new Sanger Surf Series," Wake World forum having postings between Oct. 4, 2008 and Feb. 9, 2009, webpage archive of http://www.wakeworld.com/forum/showthread.php?t=632602 dated May 30, 2012, 171 pages.
Screenshots taken from video titled "Surf Sanger," uploaded on Apr. 30, 2008 at https://www.youtube.com/watch?v=WcVIZZ7QZus.
Email from Edmund J. Haughey of of Fitzpatrick, Cella, Harper & Scinto, dated Feb. 11, 2016.
Humphree Operator's Manual, dated 2009.
Humphree Installation Manual, dated 2009.

(56) References Cited

OTHER PUBLICATIONS

"Malibu Makes Boating Easier and More Fun With MaliView," dated Sep. 4, 2008.
Ski Locker—Trim the Waves to Suit Your Personality, Trailer Boats (as reprinted at http://www.switchbladewake.com/switchblade.pdf), Jul. 2005.
International Search Report dated Dec. 6, 2012 for PCT/US2012/055788.
International Search Report dated Jan. 25, 2013 for PCT/US2012/064504.
Malibu's First Amended Complaint: Infringement of U.S. Pat. Nos. 8,539,897; 8,534,214; and 8,578,873, filed on Dec. 13, 2013 in *Malibu Boats, LLC* v. *Nautique Boat Co.*, Case No. 3:13-cv-00656, in the United States District Court for the Eastern District of Tennessee.
Malibu's Opening Brief on Its Motion for a Preliminary Injunction, filed on Nov. 14, 2013, in *Malibu Boats, LLC* v. *Nautique Boat Co.*, Case No. 3:13-cv-00656, in the United States District Court for the Eastern District of Tennessee.
Nautique's Opposition to Malibu's Motion for a Preliminary Injunction, filed on Dec. 16, 2013 in *Malibu Boats, LLC* v. *Nautique Boat Co.*, Case No. 3:13-cv-00656, in the United States District Court for the Eastern District of Tennessee.
Malibu's Reply Brief on its Motion for Preliminary Injunction, filed Dec. 23, 2013 in *Malibu Boats, LLC* v. *Nautique Boat Co.*, Case No. 3:13-cv-00656, in the United States District Court for the Eastern District of Tennessee.
Volvo Penta—QL Boat Trim System Brochure—the Declaration of David Kennedy alleges that this brochure became publicly available prior to 2010.
Volvo Penta—QL Boat Trim System User & Installation Instructions—the Declaration of David Kennedy alleges that these instructions became publicly available prior to 2010.
Declaration of David Kennedy, dated Dec. 13, 2013, in *Malibu Boats, LLC* v. *Nautique Boat Co.*, Case No. 3:13-cv-00656, in the United States District Court for the Eastern District of Tennessee.
Declaration of Kevin C. Breen in Support of Malibu's Motion for Preliminary Injunction, dated Nov. 12, 2013, in *Malibu Boats, LLC* v. *Nautique Boat Co.*, Case No. 3:13-cv-00656, in the United States District Court for the Eastern District of Tennessee.
Declaration of Elliot L Stern, Ph.D., P.E. Regarding Non-Infringement and Invalidity of U.S. Pat. No. 8,539,897, dated Dec. 16, 2013, in *Malibu Boats, LLC* v. *Nautique Boat Co.*, Case No. 3:13-cv-00656, in the United States District Court for the Eastern District of Tennessee.
Supplemental Declaration of Kevin C. Breen in Support of Malibu's Motion for Preliminary Injunction, dated Dec. 23, 2013, in *Malibu Boats, LLC* v. *Nautique Boat Co.*, Case No. 3:13-cv-00656, in the United States District Court for the Eastern District of Tennessee.
Declaration of Richard D. Hepburn, Regarding Claim Construction, Non-Infringement, and Invalidity, dated Dec. 16, 2013, in *Malibu Boats, LLC* v. *Nautique Boat Co.*, Case No. 3:13-cv-00656, in the United States District Court for the Eastern District of Tennessee.
Declaration of Greg Meloon in Support of Opposition to Motion for Preliminary Injunction, dated Dec. 14, 2013, in in *Malibu Boats, LLC* v. *Nautique Boat Co.*, Case No. 3:13-cv-00656, in the United States District Court for the Eastern District of Tennessee.
Memorandum Opinion and Order Denying Malibu's Motion for Preliminary Injunction, filed Feb. 4, 2014 in *Malibu Boats, LLC* v. *Nautique Boat Co.*, Case No. 3:13-cv-00656, in the United States District Court for the Eastern District of Tennessee.
Defendant's Responses to Plaintiff's First Set of Interrogatories, dated Feb. 26, 2014 in *Malibu Boats, LLC* v. *Nautique Boat Co.*, Case No. 3:13-cv-00656, in the United States District Court for the Eastern District of Tennessee.
Defendant's First Supplemental Responses to Plaintiff's First Set of Interrogatories (Nos. 12), dated Apr. 18, 2014, in *Malibu Boats, LLC* v. *Nautique Boat Co.*, Case No. 3:13-cv-00656, in the United States District Court for the Eastern District of Tennessee.

Malibu's Opening Brief in Support of its Motion for Summary Judgment of Infringement [Redacted Public Version], filed Jun. 26, 2014 in *Malibu Boats, LLC* v. *Nautique Boat Co.*, Case No. 3:13-cv-00656, in the United States District Court for the Eastern District of Tennessee.
Exhibit 7 to Declaration of Mark Lezama in Support of Malibu's Motion for Summary Judgment of Infringement [Redacted Public Version], filed Jun. 17, 2014 in *Malibu Boats, LLC* v. *Nautique Boat Co.*, Case No. 3:13-cv-00656, in the United States District Court for the Eastern District of Tennessee.
Malibu's Statement of Undisputed Facts in Support of Its Motion for Summary Judgment of Infringement, filed Jun. 17, 2014 in *Malibu Boats, LLC* v. *Nautique Boat Co.*, Case No. 3:13-cv-00656, in the United States District Court for the Eastern District of Tennessee.
Declaration of Kevin C. Breen in Support of Malibu's Motion for Summary Judgment of Infringement [Redacted Public Version], filed Jun. 26, 2014 in *Malibu Boats, LLC* v. *Nautique Boat Co.*, Case No. 3:13-cv-00656, in the United States District Court for the Eastern District of Tennessee.
Nautique's Motion for Claim Term Interpretation of U.S. Pat. No. 8,539,897, filed Aug. 26, 2014 in *Malibu Boats, LLC* v. *Nautique Boat Co.*, Case No. 3:13-cv-00656, in the United States District Court for the Eastern District of Tennessee.
Nautique's Motion for Claim Term Interpretation of U.S. Pat. No. 8,5378,873, filed Aug. 26, 2014 in *Malibu Boats, LLC* v. *Nautique Boat Co.*, Case No. 3:13-cv-00656, in the United States District Court for the Eastern District of Tennessee.
Nautique's Motion for Claim Term Interpretation of U.S. Pat. No. 8,534,214, filed Aug. 26, 2014 in *Malibu Boats, LLC* v. *Nautique Boat Co.*, Case No. 3:13-cv-00656, in the United States District Court for the Eastern District of Tennessee.
Nautique's Opposition to Malibu's Motion for Partial Summary Judgement, filed Aug. 29, 2014 in *Malibu Boats, LLC* v. *Nautique Boat Co.*, Case No. 3:13-cv-00656, in the United States District Court for the Eastern District of Tennessee.
Malibu's Response to Nautique's Second set of Interrogatories (No. 9), dated Apr. 21, 2014 in *Malibu Boats, LLC* v. *Nautique Boat Co.*, Case No. 3:13-cv-00656, in the United States District Court for the Eastern District of Tennessee.
Malibu's Supplemental Response to Nautique's Interrogatories 2, 3, 7, and 8 with Exhibit 1, dated Sep. 4, 2014 in *Malibu Boats, LLC* v. *Nautique Boat Co.*, Case No. 3:13-cv-00656, in the United States District Court for the Eastern District of Tennessee.
Malibu's Supplemental Response to Nautique's Interrogatories 1 and 6, dated Nov. 13, 2014 in *Malibu Boats, LLC* v. *Nautique Boat Co.*, Case No. 3:13-cv-00656, in the United States District Court for the Eastern District of Tennessee.
Malibu's Opening Brief on its Motion for Summary Judgment of No Invalidity Based on Svensson and Accompanying Declarations From Mark Lezama and Kevin Breen, filed Sep. 12, 2014 in *Malibu Boats, LLC* v. *Nautique Boat Co.*, Case No. 3:13-cv-00656, in the United States District Court for the Eastern District of Tennessee.
Nautique's Corrected Motion for Summary Judgment of Invalidity, filed Sep. 12, 2014 in *Malibu Boats, LLC* v. *Nautique Boat Co.*, Case No. 3:13-cv-00656, in the United States District Court for the Eastern District of Tennessee.
Nautique's Motion for Summary Judgment of Non-Infringement, filed Sep. 12, 2014 in *Malibu Boats, LLC* v. *Nautique Boat Co.*, Case No. 3:13-cv-00656, in the United States District Court for the Eastern District of Tennessee.
Malibu's Reply Brief on its Motion for Summary Judgement of Infringement [Redacted Version], filed Sep. 15, 2014 in *Malibu Boats, LLC* v. *Nautique Boat Co.*, Case No. 3:13-cv-00656, in the United States District Court for the Eastern District of Tennessee.
Malibu's Opposition to Nautique's Motion for Claim Interpretation of U.S. Pat. No. 8,539,897, filed Sep. 19, 2014 in *Malibu Boats, LLC* v. *Nautique Boat Co.*, Case No. 3:13-cv-00656, in the United States District Court for the Eastern District of Tennessee.
Malibu's Opposition to Nautique's Motion for Claim Interpretation of U.S. Pat. No. 8,534,214, filed Sep. 19, 2014 in *Malibu Boats, LLC* v. *Nautique Boat Co.*, Case No. 3:13-cv-00656, in the United States District Court for the Eastern District of Tennessee.

(56) References Cited

OTHER PUBLICATIONS

Malibu's Opposition to Nautique's Motion for Claim Interpretation of U.S. Pat. No. 8,578,873, filed Sep. 19, 2014 in *Malibu Boats, LLC* v. *Nautique Boat Co.*, Case No. 3:13-cv-00656, in the United States District Court for the Eastern District of Tennessee.
Nautique's Reply to Opposition to Motion for Claim Interpretation of U.S. Pat. No. 8,539,897, filed Sep. 29, 2014 in *Malibu Boats, LLC* v. *Nautique Boat Co.*, Case No. 3:13-cv-00656, in the United States District Court for the Eastern District of Tennessee.
Nautique's Reply to Opposition to Motion for Claim term Interpretation of U.S. Pat. No. 8,534,214, filed Sep. 29, 2014 in *Malibu Boats, LLC* v. *Nautique Boat Co.*, Case No. 3:13-cv-00656, in the United States District Court for the Eastern District of Tennessee.
Nautique's Reply to Opposition to Motion for Claim Interpretation of U.S. Pat. No. 8,578,873, filed Sep. 29, 2014 in *Malibu Boats, LLC* v. *Nautique Boat Co.*, Case No. 3:13-cv-00656, in the United States District Court for the Eastern District of Tennessee.
Nautique's Opposition to Malibu's Motion for Summary Judgment of No Invalidity Based on Svensson, filed Oct. 6, 2014 in *Malibu Boats, LLC* v. *Nautique Boat Co.*, Case No. 3:13-cv-00656, in the United States District Court for the Eastern District of Tennessee.
Malibu's Opposition to Nautique's Corrected Motion for Summary Judgment of Invalidity [Redacted Public Version], Filed Oct. 8, 2014 in *Malibu Boats, LLC* v. *Nautique Boat Co.*, Case No. 3:13-cv-00656, in the United States District Court for the Eastern District of Tennessee.
Malibu's Opposition to Nautique's Motion for Summary Judgment of Non-Infringement [Redacted Public Version], filed Oct. 8, 2014 in *Malibu Boats, LLC* v. *Nautique Boat Co.*, Case No. 3:13-cv-00656, in the United States District Court for the Eastern District of Tennessee.
Declaration of Kevin Breen in Support of Malibu's Opposition to Nautique's Corrected Motion for Summary Judgment of Invalidity, filed Oct. 6, 2014 in *Malibu Boats, LLC* v. *Nautique Boat Co.*, Case No. 3:13-cv-00656, in the United States District Court for the Eastern District of Tennessee.
Declaration of Kevin Breen in Support of Malibu's Opposition to Nautique's Motion for Summary Judgment of Non-Infringement, filed Oct. 6, 2014 in *Malibu Boats, LLC* v. *Nautique Boat Co.*, Case No. 3:13-cv-00656, in the United States District Court for the Eastern District of Tennessee.
Nautique's Reply in Support of its Motion for Summary Judgment of Invalidity [Redacted Public Version], filed Oct. 17, 2014 in *Malibu Boats, LLC* v. *Nautique Boat Co.*, Case No. 3:13-cv-00656, in the United States District Court for the Eastern District of Tennessee.
Malibu's Reply Brief on its Motion for Summary Judgment of No Invalidity Based on Svensson, filed Oct. 17, 2014 in *Malibu Boats, LLC* v. *Nautique Boat Co.*, Case No. 3:13-cv-00656, in the United States District Court for the Eastern District of Tennessee.
Nautique's Reply to Opposition to Motion for Summary Judgment of Non-Infringment [Redacted Version], filed Oct. 17, 2014 in *Malibu Boats, LLC* v. *Nautique Boat Co.*, Case No. 3:13-cv-00656, in the United States District Court for the Eastern District of Tennessee.
Nautique's Supplemental Brief in Support of Pending Motions [Redacted Version], filed Dec. 9, 2014 in *Malibu Boats, LLC* v. *Nautique Boat Co.*, Case No. 3:13-cv-00656, in the United States District Court for the Eastern District of Tennessee.
Malibu's Response to Nautique's Supplemental Brief, filed Dec. 22, 2014 in *Malibu Boats, LLC* v. *Nautique Boat Co.*, Case No. 3:13-cv-00656, in the United States District Court for the Eastern District of Tennessee.
Transcript of Preliminary Injunction Hearing on Jan. 6, 2014.
Transcript of Motion Hearing on Dec. 16, 2014.
Malibu's slides presented during hearing on Dec. 16, 2014.
Nautique's slides presented during hearing on Dec. 16, 2014.
Malibu's Daubert Motion to Exclude Opinions on Inherency, filed Dec. 26, 2014 in *Malibu Boats, LLC* v. *Nautique Boat Co.*, Case No. 3:13-cv-00656, in *Malibu Boats, LLC* v. *Nautique Boat Co.*, Case No. 3:13-cv-00656, in the United States District Court for the Eastern District of Tennessee.
Defendant's Opposition to Plaintiff's Daubert Motion to Exclude Opinions on Inherency, filed Jan. 12, 2015 in *Malibu Boats, LLC* v. *Nautique Boat Co.*, Case No. 3:13-cv-00656, in the United States District Court for the Eastern District of Tennessee.
Malibu's Reply Brief on its Daubert Motion to Exclude Opinions on Inherency, filed Jan. 19, 2015 in *Malibu Boats, LLC* v. *Nautique Boat Co.*, Case No. 3:13-cv-00656, in the United States District Court for the Eastern District of Tennessee.
Memorandum and Order for Daubert Motion, dated Jan. 26, 2015 in *Malibu Boats, LLC* v. *Nautique Boat Co.*, Case No. 3:13-cv-00656, in the United States District Court for the Eastern District of Tennessee.
Expert Report of Kevin Breen [Redacted Version] (pp. 1-434), dated Nov. 21, 2014 in *Malibu Boats, LLC* v. *Nautique Boat Co.*, Case No. 3:13-cv-00656, in the United States District Court for the Eastern District of Tennessee.
Expert Report of Kevin Breen [Redacted Version] (pp. 435-654), dated Nov. 21, 2014 in *Malibu Boats, LLC* v. *Nautique Boat Co.*, Case No. 3:13-cv-00656, in the United States District Court for the Eastern District of Tennessee.
Rebuttal Expert Report of Kevin Breen [Redacted Version], dated Dec. 12, 2014 in *Malibu Boats, LLC* v. *Nautique Boat Co.*, Case No. 3:13-cv-00656, in the United States District Court for the Eastern District of Tennessee.
Expert Report of Robert Taylor (pp. 1-444), dated Nov. 21, 2014 in *Malibu Boats, LLC* v. *Nautique Boat Co.*, Case No. 3:13-cv-00656, in the United States District Court for the Eastern District of Tennessee.
Expert Report of Robert Taylor (pp. 445-914), dated Nov. 21, 2014 in *Malibu Boats, LLC* v. *Nautique Boat Co.*, Case No. 3:13-cv-00656, in the United States District Court for the Eastern District of Tennessee.
Expert Supplemental Report of Robert Taylor, dated Dec. 5, 2014 in *Malibu Boats, LLC* v. *Nautique Boat Co.*, Case No. 3:13-cv-00656, in the United States District Court for the Eastern District of Tennessee.
Transcript of Deposition of Kevin C. Breen [Redacted Version], dated Dec. 18, 2014 in *Malibu Boats, LLC* v. *Nautique Boat Co.*, Case No. 3:13-cv-00656, in the United States District Court for the Eastern District of Tennessee.
Transcript of Deposition of Daniel Gasper [Redacted Version], dated Oct. 8, 2014 in *Malibu Boats, LLC* v. *Nautique Boat Co.*, Case No. 3:13-cv-00656, in the United States District Court for the Eastern District of Tennessee.
Transcript of Deposition of Adam Andrew McCall [Redacted Version], dated Dec. 3, 2014 in *Malibu Boats, LLC* v. *Nautique Boat Co.*, Case No. 3:13-cv-00656, in the United States District Court for the Eastern District of Tennessee.
Transcript of Deposition of Jack Springer [Redacted Version], dated Nov. 13, 2014 in *Malibu Boats, LLC* v. *Nautique Boat Co.*, Case No. 3:13-cv-00656, in the United States District Court for the Eastern District of Tennessee.
Transcript of 30(b)(6) Deposition of Jack Springer [Redacted Version], dated Nov. 14, 2014 in *Malibu Boats, LLC* v. *Nautique Boat Co.*, Case No. 3:13-cv-00656, in the United States District Court for the Eastern District of Tennessee.
Transcript of Deposition of Wayne Wilson [Redacted Version], dated Nov. 12, 2014 in *Malibu Boats, LLC* v. *Nautique Boat Co.*, Case No. 3:13-cv-00656, in the United States District Court for the Eastern District of Tennessee.
Transcript of Deposition of Scott Davenport [Redacted Version], dated Dec. 3, 2014 in *Malibu Boats, LLC* v. *Nautique Boat Co.*, Case No. 3:13-cv-00656, in the United States District Court for the Eastern District of Tennessee.
Transcript of Deposition of Robert Taylor, dated Jan. 7, 2015 in *Malibu Boats, LLC* v. *Nautique Boat Co.*, Case No. 3:13-cv-00656, in the United States District Court for the Eastern District of Tennessee.

(56) References Cited

OTHER PUBLICATIONS

Memorandum and Order, dated Jan. 28, 2015 in *Malibu Boats, LLC v. Nautique Boat Co.*, Case No. 3:13-cv-00656, in *Malibu Boats, LLC v. Nautique Boat Co.*, Case No. 3:13-cv-00656, in the United States District Court for the Eastern District of Tennessee.
Malibu's Opposition to Nautique's Motion to Reconsider the Court's Denial of Stay Pending Inter Partes Review in Light of Patent and Appeal Board's Ruling, filed Dec. 15, 2014 in in *Malibu Boats, LLC v. Nautique Boat Co.*, Case No. 3:13-cv-00656, in the United States District Court for the Eastern District of Tennessee.
Petition for Inter Partes Review of U.S. Pat. No. 8,539,897 (IPR2014-01045), filed Jun. 27, 2014.
Corrected Petition for Inter Partes Review of U.S. Pat. No. 8,539,897 (IPR2014-01045), filed Jul. 9, 2014.
Patent Owner Malibu Boats' Preliminary Response to Nautique's Petition for Inter Partes Review of U.S. Pat. No. 8,539,897 (IPR2014-01045), filed Sep. 26, 2014.
Decision of Institution of Inter Partes Review of U.S. Pat. No. 8,539,897 (IPR2014-01045), dated Nov. 26, 2014.
Petitioner's Request for Rehearing, dated Dec. 5, 2014 in Inter Partes Review of U.S. Pat. No. 8,539,897 (IPR2014-01045).
Order Denying Petitioner's Request for Rehearing, dated Dec. 23, 2014 in Inter Partes Review of U.S. Pat. No. 8,539,897 (IPR2014-01045).
Expert Declaration of Robert K. Taylor, dated Jun. 25, 2014 in Inter Partes Review of U.S. Pat. No. 8,539,897 (IPR2014-01045).
Malibu's Complaint for Patent Infringement, filed Jun. 29, 2015 in *Malibu Boats, LLC v. MasterCraft Boat Company, LLC*, Case No. 3:15-cv-00276 in the Eastern District of Tennessee.
MasterCraft's Answer, Affirmative Defenses, and Counterclaims, filed Aug. 5, 2015 in *Malibu Boats, LLC v. MasterCraft Boat Company, LLC*, Case No. 3:15-cv-00276 in the Eastern District of Tennessee.
MasterCraft's Opening Brief in Support of Its Motion for Summary Judgment of Noninfringement, filed Aug. 13, 2015, in *Malibu Boats, LLC v. MasterCraft Boat Company, LLC*, Case No. 3:15-cv-00276 in the Eastern District of Tennessee.
MasterCraft's Statement of Material Facts in Support of its Motion for Summary Judgment of Noninfringement, filed Aug. 13, 2015 in *Malibu Boats, LLC v. MasterCraft Boat Company, LLC*, Case No. 3:15-cv-00276 in the Eastern District of Tennessee.
Declaration of Michael D. Myers in Support of MasterCraft's Motion for Summary Judgment of Noninfringement, filed Aug. 13, 2015 in *Malibu Boats, LLC v. MasterCraft Boat Company, LLC*, Case No. 3:15-cv-00276 in the Eastern District of Tennessee.
Malibu's Answer to Counterclaim, filed Aug. 26, 2015 in *Malibu Boats, LLC v. MasterCraft Boat Company, LLC*, Case No. 3:15-cv-00276 in the Eastern District of Tennessee.
Malibu's Opposition to MasterCraft's Motion for Summary Judgment of Noninfringement, filed Sep. 3, 2015, in *Malibu Boats, LLC v. MasterCraft Boat Company, LLC*, Case No. 3:15-cv-00276 in the Eastern District of Tennessee.
Malibu's Response to MasterCraft's Statement of Material Facts in Support of MasterCraft's Motion for Summary Judgment of Noninfringement; Malibu's Statement of Additional Material Facts in Opposition to Mastercraft's Motion for Summary Judgment, filed Sep. 3, 2015 in *Malibu Boats, LLC v. MasterCraft Boat Company, LLC*, Case No. 3:15-cv-00276 in the Eastern District of Tennessee.
Mastercraft's Reply in Support of its Motion for Summary Judgment of Noninfringement, filed Sep. 14, 2015 in *Malibu Boats, LLC v. MasterCraft Boat Company, LLC*, Case No. 3:15-cv-00276 in the Eastern District of Tennessee.
MasterCraft's Reply to Malibu's Response to the Statement of Material Facts in Support of MasterCraft's Motion for Summary Judgment of Noninfringement, filed Sep. 14, 2015 in *Malibu Boats, LLC v. MasterCraft Boat Company, LLC*, Case No. 3:15-cv-00276 in the Eastern District of Tennessee.

Malibu's Surreply to MasterCraft's Motion for Summary Judgment of Noninfringement, filed Sep. 23, 2015 in *Malibu Boats, LLC v. MasterCraft Boat Company, LLC*, Case No. 3:15-cv-00276 in the Eastern District of Tennessee.
Memorandum and Order Denying Motion for Summary Judgment, entered Feb. 11, 2016 in *Malibu Boats, LLC v. MasterCraft Boat Company, LLC*, Case No. 3:15-cv-00276 in the Eastern District of Tennessee.
MasterCraft's Opening Brief in Support of its Motion to Stay, filed May 20, 2016 in *Malibu Boats, LLC v. MasterCraft Boat Company, LLC*, Case No. 3:15-cv-00276 in the Eastern District of Tennessee.
Malibu's Opposition to MasterCraft's Motion to Stay, filed Jun. 6, 2016, in *Malibu Boats, LLC v. MasterCraft Boat Company, LLC*, Case No. 3:15-cv-00276 in the Eastern District of Tennessee.
MasterCraft's Reply in Support of its Motion to Stay, filed Jun. 10, 2016 in *Malibu Boats, LLC v. MasterCraft Boat Company, LLC*, Case No. 3:15-cv-00276 in the Eastern District of Tennessee.
Malibu's Surreply to MasterCraft's Motion to Stay, filed Jun. 15, 2016 in *Malibu Boats, LLC v. MasterCraft Boat Company, LLC*, Case No. 3:15-cv-00276 in the Eastern District of Tennessee.
Malibu's Disclosure of Asserted Claims and Infringement Contentions, dated Mar. 28, 2016 in *Malibu Boats, LLC v. MasterCraft Boat Company, LLC*, Case No. 3:15-cv-00276 in the Eastern District of Tennessee.
MasterCraft's Invalidity Contentions (With Exhibits), dated May 12, 2016 in *Malibu Boats, LLC v. MasterCraft Boat Company, LLC*, Case No. 3:15-cv-00276 in the Eastern District of Tennessee.
Malibu's Preliminary Claim Constructions, dated Jun. 16, 2016 in *Malibu Boats, LLC v. MasterCraft Boat Company, LLC*, Case No. 3:15-cv-00276 in the Eastern District of Tennessee.
Mastercraft's Preliminary Claim Constructions, dated Jun. 16, 2016 in *Malibu Boats, LLC v. MasterCraft Boat Company, LLC*, Case No. 3:15-cv-00276 in the Eastern District of Tennessee.
Mastercraft's Opening Brief in Support of its Contingent Motion to Extend Claim Construction Deadlines, filed Jul. 5, 2016 in *Malibu Boats, LLC v. MasterCraft Boat Company, LLC*, Case No. 3:15-cv-00276 in the Eastern District of Tennessee.
Malibu's Responses to MasterCraft's Interrogatory Nos. 13 and 14, dated May 2, 2016 in *Malibu Boats, LLC v. MasterCraft Boat Company, LLC*, Case No. 3:15-cv-00276 in the Eastern District of Tennessee.
Plaintiff Malibu Boats, LLC's Third Supplemental Objections and Responses to Defendant MasterCraft's Revised Interrogatory Nos. 4-6, dated Aug. 30, 2016 in *Malibu Boats, LLC v. MasterCraft Boat Company, LLC*, Case No. 3:15-cv-00276 in the Eastern District of Tennessee.
Joint Claim Construction and Prehearing Statement, filed Sep. 6, 2016 in *Malibu Boats, LLC v. MasterCraft Boat Company, LLC*, Case No. 3:15-cv-00276 in the Eastern District of Tennessee.
Memorandum and Order Denying Motion to Stay, dated Sep. 13, 2016 in *Malibu Boats, LLC v. MasterCraft Boat Company, LLC*, Case No. 3:15-cv-00276 in the Eastern District of Tennessee.
Amended Claim Construction and Prehearing Statement, filed Oct. 18, 2016 in *Malibu Boats, LLC v. MasterCraft Boat Company, LLC*, Case No. 3:15-cv-00276 in the Eastern District of Tennessee.
Plaintiff Malibu Boats, LLC's Opening Claim Construction Brief and Declaration, filed Oct. 21, 2016 in *Malibu Boats, LLC v. MasterCraft Boat Company, LLC*, Case No. 3:15-cv-00276 in the Eastern District of Tennessee.
MasterCraft's Responsive Claim Construction Brief and Declaration, filed Nov. 4, 2016 in *Malibu Boats, LLC v. MasterCraft Boat Company, LLC*, Case No. 3:15-cv-00276 in the Eastern District of Tennessee.
Plaintiff Malibu Boats, LLC's Claim Construction Reply Brief, filed Nov. 11, 2016 in *Malibu Boats, LLC v. MasterCraft Boat Company, LLC*, Case No. 3:15-cv-00276 in the Eastern District of Tennessee.
MasterCraft's Claim Construction Surreply Brief, filed Nov. 16, 2016 in *Malibu Boats, LLC v. MasterCraft Boat Company, LLC*, Case No. 3:15-cv-00276 in the Eastern District of Tennessee.
Malibu's Supplemental Brief on Claim Construction, filed Nov. 30, 2016 in *Malibu Boats, LLC v. MasterCraft Boat Company, LLC*, Case No. 3:15-cv-00276 in the Eastern District of Tennessee.

(56) References Cited

OTHER PUBLICATIONS

MasterCraft's Opening Brief in Support of its Renewed Motion for Summary Judgment of Noninfringement (Public Version), filed Dec. 2, 2016 in *Malibu Boats, LLC* v. *MasterCraft Boat Company, LLC*, Case No. 3:15-cv-00276 in the Eastern District of Tennessee.
MasterCraft's Statement of Material Facts in Support of its Renewed Motion for Summary Judgment of Noninfringement, filed Dec. 2, 2016 in *Malibu Boats, LLC* v. *MasterCraft Boat Company, LLC*, Case No. 3:15-cv-00276 in the Eastern District of Tennessee.
Declaration of Michael D. Myers in Support of MasterCraft's Renewed Motion for Summary Judgment of Noninfringement, filed Dec. 2, 2016 in *Malibu Boats, LLC* v. *MasterCraft Boat Company, LLC*, Case No. 3:15-cv-00276 in the Eastern District of Tennessee.
Declaration of Edmund J. Haughey in Support of MasterCraft's Renewed Motion for Summary Judgment of Noninfringement, filed Dec. 2, 2016 in *Malibu Boats, LLC* v. *MasterCraft Boat Company, LLC*, Case No. 3:15-cv-00276 in the Eastern District of Tennessee.
MasterCraft's Response to Malibu's Supplemental Claim Construction Brief, filed Dec. 5, 2016 in *Malibu Boats, LLC* v. *MasterCraft Boat Company, LLC*, Case No. 3:15-cv-00276 in the Eastern District of Tennessee.
Transcript of Deposition of Daniel Gasper (Redacted), Sep. 16, 2016, in *Malibu Boats, LLC* v. *MasterCraft Boat Company, LLC*, Case No. 3:15-cv-00276 in the Eastern District of Tennessee.
Transcript of Deposition of Adam McCall (Redacted), Aug. 16, 2016, in *Malibu Boats, LLC* v. *MasterCraft Boat Company, LLC*, Case No. 3:15-cv-00276 in the Eastern District of Tennessee.
Transcript of Deposition of Jeffery Hallstrom (Redacted), Aug. 12, 2016, in *Malibu Boats, LLC* v. *MasterCraft Boat Company, LLC*, Case No. 3:15-cv-00276 in the Eastern District of Tennessee.
Malibu's Opposition to MasterCraft's Renewed Motion for Summary Judgment of Noninfringement, filed Dec. 23, 2016 in *Malibu Boats, LLC* v. *MasterCraft Boat Company, LLC*, Case No. 3:15-cv-00276 in the Eastern District of Tennessee.
Malibu's Response to MasterCraft's Statement of Material Facts in Support of its Renewed Motion for Summary Judgment of Noninfringement, filed Dec. 23, 2016 in *Malibu Boats, LLC* v. *MasterCraft Boat Company, LLC*, Case No. 3:15-cv-00276 in the Eastern District of Tennessee.
Declaration of David S. Almeling in Support of Malibu's Opposition to MasterCraft's Renewed Motion for Summary Judgment of Noninfringement with Exhibits, filed Dec. 23, 2016 in *Malibu Boats, LLC* v. *MasterCraft Boat Company, LLC*, Case No. 3:15-cv-00276 in the Eastern District of Tennessee.
Declaration of Kevin Breen in Support of Malibu's Opposition to MasterCraft's Renewed Motion for Summary Judgment of Noninfringement with Exhibits, filed Dec. 23, 2016 in *Malibu Boats, LLC* v. *MasterCraft Boat Company, LLC*, Case No. 3:15-cv-00276 in the Eastern District of Tennessee.
MasterCraft's Supplemental Claim Construction Brief and Exhibits, filed Dec. 27, 2016 in *Malibu Boats, LLC* v. *MasterCraft Boat Company, LLC*, Case No. 3:15-cv-00276 in the Eastern District of Tennessee.
MasterCraft's Reply in Support of its Renewed Motion for Summary Judgment of Noninfringement, filed Jan. 3, 2017 in *Malibu Boats, LLC* v. *MasterCraft Boat Company, LLC*, Case No. 3:15-cv-00276 in the Eastern District of Tennessee.
MasterCraft's Reply to Malibu's Response to the Statement of Material Facts in Support of MasterCraft's Renewed Motion for Summary Judgment of Noninfringement, filed Jan. 3, 2017 in *Malibu Boats, LLC* v. *MasterCraft Boat Company, LLC*, Case No. 3:15-cv-00276 in the Eastern District of Tennessee.
Supplemental Declaration of Edmund J. Haughey in Support of MasterCraft's Renewed Motion for Summary Judgment of Noninfringement, filed Jan. 3, 2017 in *Malibu Boats, LLC* v. *MasterCraft Boat Company, LLC*, Case No. 3:15-cv-00276 in the Eastern District of Tennessee.
Malibu's Response to MasterCraft's Supplemental Claim Construction Brief, filed Jan. 3, 2017 in *Malibu Boats, LLC* v. *MasterCraft Boat Company, LLC*, Case No. 3:15-cv-00276 in the Eastern District of Tennessee.
Report and Recommendation From Magistrate Judge, filed Feb. 24, 2017 in *Malibu Boats, LLC* v. *MasterCraft Boat Company, LLC*, Case No. 3:15-cv-00276 in the Eastern District of Tennessee.
Mastercraft's Objections to the Report and Recommendation on Claim Construction, filed Mar. 10, 2017 in *Malibu Boats, LLC* v. *MasterCraft Boat Company, LLC*, Case No. 3:15-cv-00276 in the Eastern District of Tennessee.
Notice of Filing and Exhibit 7 to the Declaration of Edmund Haughey in Support of MasterCraft's Renewed Motion for Summary Judgment of Non-Infringement, filed Mar. 21, 2017 in *Malibu Boats, LLC* v. *MasterCraft Boat Company, LLC*, Case No. 3:15-cv-00276 in the Eastern District of Tennessee.
Transcript of Deposition of David Williams (Redacted), Mar. 23, 2017, in *Malibu Boats, LLC* v. *MasterCraft Boat Company, LLC*, Case No. 3:15-cv-00276 in the Eastern District of Tennessee.
Malibu's Response to MasterCraft's Objections to the Report and Recommendation of Claim Construction, filed Mar. 24, 2017 in *Malibu Boats, LLC* v. *MasterCraft Boat Company, LLC*, Case No. 3:15-cv-00276 in the Eastern District of Tennessee.
Transcript of Hearing dated Dec. 16, 2016, in *Malibu Boats, LLC* v. *MasterCraft Boat Company, LLC*, Case No. 3:15-cv-00276 in the Eastern District of Tennessee.
Expert Report of Kevin Breen Concerning Infringement of U.S. Pat. No. 8,578,873, dated Jan. 13, 2017, in *Malibu Boats, LLC* v. *MasterCraft Boat Company, LLC*, Case No. 3:15-cv-00276 in the Eastern District of Tennessee.
Expert Rebuttal Report of Kevin Breen Concerning the Validity of U.S. Pat. No. 8,578,873, dated Feb. 13, 2017, in *Malibu Boats, LLC* v. *MasterCraft Boat Company, LLC*, Case No. 3:15-cv-00276 in the Eastern District of Tennessee.
Supplemental Expert Report of Kevin Breen Concerning Infringement of U.S. Pat. No. 8,578,873, dated Feb. 27, 2017, in *Malibu Boats, LLC* v. *MasterCraft Boat Company, LLC*, Case No. 3:15-cv-00276 in the Eastern District of Tennessee.
Expert Report of Robert K. Taylor, P.E. on the Invalidity of U.S. Pat. No. 8,578,873, dated Jan. 13, 2017, in *Malibu Boats, LLC* v. *MasterCraft Boat Company, LLC*, Case No. 3:15-cv-00276 in the Eastern District of Tennessee.
Rebuttal Expert Report of Robert K. Taylor, P.E. (Part 1 of 2), dated Feb. 13, 2017, in *Malibu Boats, LLC* v. *MasterCraft Boat Company, LLC*, Case No. 3:15-cv-00276 in the Eastern District of Tennessee.
Rebuttal Expert Report of Robert K. Taylor, P.E. (Part 2 of 2), dated Feb. 13, 2017, in *Malibu Boats, LLC* v. *MasterCraft Boat Company, LLC*, Case No. 3:15-cv-00276 in the Eastern District of Tennessee.
Transcript of Deposition of Kevin Breen [Redacted] (Part 1 of 2), dated Mar. 9, 2017, in *Malibu Boats, LLC* v. *MasterCraft Boat Company, LLC*, Case No. 3:15-cv-00276 in the Eastern District of Tennessee.
Transcript of Deposition of Kevin Breen [Redacted] (Part 2 of 2), dated Mar. 9, 2017, in *Malibu Boats, LLC* v. *MasterCraft Boat Company, LLC*, Case No. 3:15-cv-00276 in the Eastern District of Tennessee.
Transcript of Deposition of Scott Davenport [Redacted], dated Jan. 18, 2017, in *Malibu Boats, LLC* v. *MasterCraft Boat Company, LLC*, Case No. 3:15-cv-00276 in the Eastern District of Tennessee.
Transcript of 30(b)(6) Deposition of Scott Davenport [Redacted], dated Jan. 18, 2017, in *Malibu Boats, LLC* v. *MasterCraft Boat Company, LLC*, Case No. 3:15-cv-00276 in the Eastern District of Tennessee.
Transcript of Deposition of Terry D. McNew [Redacted], dated Jan. 6, 2017, in *Malibu Boats, LLC* v. *MasterCraft Boat Company, LLC*, Case No. 3:15-cv-00276 in the Eastern District of Tennessee.
Transcript of 30(b)(6) Deposition of Terry D. McNew [Redacted] dated Jan. 6, 2017, in *Malibu Boats, LLC* v. *MasterCraft Boat Company, LLC*, Case No. 3:15-cv-00276 in the Eastern District of Tennessee.
Transcript of Deposition of Michael D. Myers [Redacted], dated Dec. 7, 2016, in *Malibu Boats, LLC* v. *MasterCraft Boat Company, LLC*, Case No. 3:15-cv-00276 in the Eastern District of Tennessee.

(56) References Cited

OTHER PUBLICATIONS

Transcript of 30(b)(6) Deposition of Michael D. Myers [Redacted], dated Dec. 7, 2016, in *Malibu Boats, LLC v. MasterCraft Boat Company, LLC*, Case No. 3:15-cv-00276 in the Eastern District of Tennessee.
Transcript of Deposition of Tomothy M. Oxley [Redacted], dated Nov. 18, 2016, in *Malibu Boats, LLC v. MasterCraft Boat Company, LLC*, Case No. 3:15-cv-00276 in the Eastern District of Tennessee.
Transcript of 30(b)(6) Deposition of Tomothy M. Oxley [Redacted], dated Nov. 18, 2016, in *Malibu Boats, LLC v. MasterCraft Boat Company, LLC*, Case No. 3:15-cv-00276 in the Eastern District of Tennessee.
Transcript of Deposition of Springer [Redacted], dated Jan. 26, 2017, in *Malibu Boats, LLC v. MasterCraft Boat Company, LLC*, Case No. 3:15-cv-00276 in the Eastern District of Tennessee.
Transcript of 30(b)(6) Deposition of Springer [Redacted] (part 1 of 2), dated Jan. 26, 2017, in *Malibu Boats, LLC v. MasterCraft Boat Company, LLC*, Case No. 3:15-cv-00276 in the Eastern District of Tennessee.
Transcript of 30(b)(6) Deposition of Springer [Redacted] (part 2 of 2), dated Jan. 26, 2017, in *Malibu Boats, LLC v. MasterCraft Boat Company, LLC*, Case No. 3:15-cv-00276 in the Eastern District of Tennessee.
Transcript of Deposition of Roberty K. Taylor [Redacted] (Part 1 of 2), dated Mar. 8, 2017, in *Malibu Boats, LLC v. MasterCraft Boat Company, LLC*, Case No. 3:15-cv-00276 in the Eastern District of Tennessee.
Transcript of Deposition of Roberty K. Taylor [Redacted] (Part 2 of 2), dated Mar. 8, 2017, in *Malibu Boats, LLC v. MasterCraft Boat Company, LLC*, Case No. 3:15-cv-00276 in the Eastern District of Tennessee.
Transcript of Deposition of Wayne R. Wilson [Redacted], dated Jan. 17, 2017, in *Malibu Boats, LLC v. MasterCraft Boat Company, LLC*, Case No. 3:15-cv-00276 in the Eastern District of Tennessee.
Transcript of 30(b)(6) Deposition of Wayne R. Wilson [Redacted] (part 1 of 3), dated Jan. 17, 2017, in *Malibu Boats, LLC v. MasterCraft Boat Company, LLC*, Case No. 3:15-cv-00276 in the Eastern District of Tennessee.
Transcript of 30(b)(6) Deposition of Wayne R. Wilson [Redacted] (part 2 of 3), dated Jan. 17, 2017, in *Malibu Boats, LLC v. MasterCraft Boat Company, LLC*, Case No. 3:15-cv-00276 in the Eastern District of Tennessee.
Transcript of 30(b)(6) Deposition of Wayne R. Wilson [Redacted] (part 3 of 3), dated Jan. 17, 2017, in *Malibu Boats, LLC v. MasterCraft Boat Company, LLC*, Case No. 3:15-cv-00276 in the Eastern District of Tennessee.
Plaintiff Malibu Boats's Supplemental Objections and Responses to Defendant MasterCraft Boats' Interrogatories Nos. 1, 2, 3, and 7, dated Apr. 18, 2016, in *Malibu Boats, LLC v. MasterCraft Boat Company, LLC*, Case No. 3:15-cv-00276 in the Eastern District of Tennessee.
Plaintiff Malibu Boats's Objections and Responses to Defendant MasterCraft Boats' Interrogatories Nos. 13 and 14, dated May 2 2016, in *Malibu Boats, LLC v. MasterCraft Boat Company, LLC*, Case No. 3:15-cv-00276 in the Eastern District of Tennessee.
Plaintiff Malibu Boats's Supplemental Objections and Responses to Defendant MasterCraft Boats' Interrogatory Nos. 2-6, 8-11, 13, and 15-18, dated Feb. 28, 2017, in *Malibu Boats, LLC v. MasterCraft Boat Company, LLC*, Case No. 3:15-cv-00276 in the Eastern District of Tennessee.
Malibu's Complaint for Patent Infringement, filed Feb. 16, 2016 in *Malibu Boats, LLC v. MasterCraft Boat Company, LLC*, Case No. 3:16-cv-00082 in the United States District Court for the Eastern District of Tennessee.
MasterCraft's Answer, Affirmative Defenses, and Counterclaims, filed Nov. 14, 2016 in *Malibu Boats, LLC v. MasterCraft Boat Company, LLC*, Case No. 3:16-cv-00082 in the United States District Court for the Eastern District of Tennessee.

MasterCraft's Invalidity Contentions, filed Nov. 14, 2016 in *Malibu Boats, LLC v. MasterCraft Boat Company, LLC*, Case No. 3:16-cv-00082 in the United States District Court for the Eastern District of Tennessee.
Malibu's Answer to Counterclaims, filed Dec. 5, 2016 in *Malibu Boats, LLC v. MasterCraft Boat Company, LLC*, Case No. 3:16-cv-00082 in the United States District Court for the Eastern District of Tennessee.
Declaration of Edmund J. Haughey in Support of Motion for Leave to Amend Invalidity Contentions with Exhibits, filed Dec. 13, 2016 in *Malibu Boats, LLC v. MasterCraft Boat Company, LLC*, Case No. 3:16-cv-00082 in the United States District Court for the Eastern District of Tennessee.
Joint Claim Construction and Prehearing Statement, filed Dec. 22, 2016 in *Malibu Boats, LLC v. MasterCraft Boat Company, LLC*, Case No. 3:16-cv-00082 in the United States District Court for the Eastern District of Tennessee.
MasterCraft's Motion for Summary Judgment of Invalidity Due to Inadequate Written Description, with Brief, Statement of Material Facts, Declarations, and Exhibits, filed Dec. 27, 2016 in *Malibu Boats, LLC v. MasterCraft Boat Company, LLC*, Case No. 3:16-cv-00082 in the United States District Court for the Eastern District of Tennessee.
Malibu's Opposition to MasterCraft's Motion for Summary Judgment of Invalidity Due to Inadequate Written Description, with Declarations and Exhibits, filed Jan. 20, 2017 in *Malibu Boats, LLC v. MasterCraft Boat Company, LLC*, Case No. 3:16-cv-00082 in the United States District Court for the Eastern District of Tennessee.
MasterCraft's Reply in Support of its Motion for Summary Judgment of Invalidity Due to Inadequate Written Description, filed Feb. 3, 2017 in *Malibu Boats, LLC v. MasterCraft Boat Company, LLC*, Case No. 3:16-cv-00082 in the United States District Court for the Eastern District of Tennessee.
MasterCraft's Reply to Malibu's Response to the Statement of Material Facts in Support of MasterCraft's Motion for Summary Judgment of Invalidity Due to Inadequate Written Description, filed Feb. 3, 2017 in *Malibu Boats, LLC v. MasterCraft Boat Company, LLC*, Case No. 3:16-cv-00082 in the United States District Court for the Eastern District of Tennessee.
Reply Declaration of Robert K. Taylor in Support of MasterCraft's Motion for Summary Judgment of Invalidity Due to Inadequate Written Description, filed Feb. 3, 2017 in *Malibu Boats, LLC v. MasterCraft Boat Company, LLC*, Case No. 3:16-cv-00082 in the United States District Court for the Eastern District of Tennessee.
Reply Declaration of Edmund J. Haughey in Support of MasterCraft's Motion for Summary Judgment of Invalidity Due to Inadequate Written Description, filed Feb. 3, 2017 in *Malibu Boats, LLC v. MasterCraft Boat Company, LLC*, Case No. 3:16-cv-00082 in the United States District Court for the Eastern District of Tennessee.
Malibu's Opening Claim Construction Brief, filed Feb. 6, 2017 in *Malibu Boats, LLC v. MasterCraft Boat Company, LLC*, Case No. 3:16-cv-00082 in the United States District Court for the Eastern District of Tennessee.
Declaration of Cameron W. Westin in Support of Malibu's Opening Claim Construction Brief, filed Feb. 6, 2017 in *Malibu Boats, LLC v. MasterCraft Boat Company, LLC*, Case No. 3:16-cv-00082 in the United States District Court for the Eastern District of Tennessee.
MasterCraft's Responsive Claim Construction Brief, filed Feb. 20, 2017, in *Malibu Boats, LLC v. MasterCraft Boat Company, LLC*, Case No. 3:16-cv-00082 in the United States District Court for the Eastern District of Tennessee.
Malibu's Reply Claim Construction Brief, filed Feb. 27, 2017, in *Malibu Boats, LLC v. MasterCraft Boat Company, LLC*, Case No. 3:16-cv-00082 in the United States District Court for the Eastern District of Tennessee.
Plaintiff Malibu Boats's Objections and Responses to Defendant MasterCraft Boats' Interrogatories Nos. 1-11 and Revised Interrogatory Nos. 1-8, dated Jul. 25, 2016, in *Malibu Boats, LLC v. MasterCraft Boat Company, LLC*, Case No. 3:16-cv-00082 in the United States District Court for the Eastern District of Tennessee.

(56) References Cited

OTHER PUBLICATIONS

Plaintiff Malibu Boats's Objections and Responses to Defandant MasterCraft Boats' Interrogatories Nos. 12-14, dated Oct. 31, 2016, in *Malibu Boats, LLC* v. *MasterCraft Boat Company, LLC*, Case No. 3:16-cv-00082 in the United States District Court for the Eastern District of Tennessee.
Plaintiff Malibu Boats's Objections and Responses to Defandant MasterCraft Boats' Interrogatories Nos. 15-18, dated Nov. 14, 2016, in *Malibu Boats, LLC* v. *MasterCraft Boat Company, LLC*, Case No. 3:16-cv-00082 in the United States District Court for the Eastern District of Tennessee.
Plaintiff Malibu Boats's Supplemental Objections and Response to Defendant MasterCraft Boats' Interrogatories No. 1, dated Nov. 14, 2016, in *Malibu Boats, LLC* v. *MasterCraft Boat Company, LLC*, Case No. 3:16-cv-00082 in the United States District Court for the Eastern District of Tennessee.
Plaintiff Malibu Boats's Supplemental Objections and Responses to Defendant MasterCraft Boats' Interrogatories No. 5, 6, 8, and 13, dated Nov. 22, 2016, in *Malibu Boats, LLC* v. *MasterCraft Boat Company, LLC*, Case No. 3:16-cv-00082 in the United States District Court for the Eastern District of Tennessee.
First Petition for Inter Partes Review of U.S. Pat. No. 8,578,873 (IPR2016-01057), filed May 17, 2016.
First Expert Declaration of Brant R Savander in Support of Petition for Inter Partes Review of U.S. Pat. No. 8,578,873 (IPR2016-01057) dated May 12, 2016.
Patent Owner's Preliminary Response to Petition for Inter Partes Review of U.S. Pat. No. 8,578,873 (IPR2016-01057) with Exhibits, filed Aug. 23, 2016.
Petitioner's Submission of Additional Exhibit, filed Nov. 3, 2016 in IPR2016-01057.
Decision Denying Institution of Inter Partes Review of U.S. Pat. No. 8,578,873 (IPR2016-01057), entered Nov. 16, 2016.
Second Petition for Inter Partes Review of U.S. Pat. No. 8,578,873 (IPR2016-01058), filed May 17, 2016.
Second Expert Declaration of Brant R Savander in Support of Petition for Inter Partes Review of U.S. Pat. No. 8,578,873 (IPR2016-01058) dated May 12, 2016.
Eugene P. Clement and Donald L. Blount, *Resistance Tests of a Systematic Series of Planing Hull Forms*, 71 Transactions 491, 1964.
Patent Owner's Preliminary Response to Petition for Inter Partes Review of U.S. Pat. No. 8,578,873 (IPR2016-01058) with Exhibits, filed Aug. 23, 2016.
Decision Denying Institution of Inter Partes Review of U.S. Pat. No. 8,578,873 (IPR2016-01058), entered Nov. 16, 2016.
Request for Ex Parte Reexamination of U.S. Pat. No. 9,260,161 (Control No. 90/013,819), filed Sep. 26, 2016.
Declaration of David Williams, dated Sep. 19, 2016.
Order Granting Request for Ex Parte Reexamination of U.S. Pat. No. 9,260,161 (Control No. 90/013,819), dated Nov. 18, 2016.
First Look Nautique Surf System Wakeworld in 3 pages, Author: David Williams, Jan. 16, 2013.
Lenco Marine Inc., Electric Trim Tab Kits in 2 pages, Oct. 2007.
QL—Quality Line product news: Trim system with new technology, dated Aug. 16, 2004.
Nautique Launches the Nautique Surf System—Press Release, dated Jan. 3, 2013.
Luke, Surf Expo WBM's Surf Expo-Booth View: MasterCraft, dated Sep. 10, 2009.
Luke, Wakeboarding Mastercraft X-25 2011, Wakeboard Boat Review, Feb. 16, 2011.
Luke, Wakeboarding Mastercraft X-2 2011, Wakeboard Boat Review, Feb. 16, 2011.
Luke, Wakeboarding Zane Schwenk Shreds MasterCrafts New Surf Tabs, Sep. 17, 2009.
Machine transcription (using a method from http://www.labnol.org/internet/transcribe-video-to-text/28914/) taken from a video titled "MasterCraft Rewind 2010—The BIG Review", allegedly uploaded on Dec. 30, 2009 at https://www.youtube.com/watch?v=85CoNjFc-wY.
Machine transcription (using a method from http://www.labnol.org/internet/transcribe-video-to-text/28914/) taken from a video titled "MasterCraft Rewind 2010—Surf Tab and Tower Camera Review", allegedly uploaded on Dec. 30, 2009 at https://www.youtube.com/watch?v=UVRra35MV7A.
Machine transcription (using a method from http://www.labnol.org/internet/transcribe-video-to-text/28914/) taken from a video titled "MasterCraft CSX 265 Review", allegedly uploaded on Nov. 11, 2009 at https://www.youtube.com/watch?v=--N30QPJtfQ.
Machine transcription (using a method from http://www.labnol.org/internet/transcribe-video-to-text/28914/) taken from a video titled "Z3 Wakesurf Side to Side in Seconds", allegedly uploaded on Jul. 8, 2012 at https://www.youtube.com/watch?v=jVJIVomFjT0.
Machine transcription (using a method from http://www.labnol.org/internet/transcribe-video-to-text/28914/) taken from a video titled "The All-New Nautique Surf System", allegedly uploaded on Jan. 3, 2013 at https://www.youtube.com/watch?v=gtaySYhmAdA.
Machine transcription (using a method from http://www.labnol.org/internet/transcribe-video-to-text/28914/) taken from a video titled "Nautique Surf System How-to-Video", allegedly uploaded on Jan. 3, 2013 at https://www.youtube.com/watch?v=GnKfEtMskao.
MasterCraft Boat Company Recipient of NMMA Innovation Award, Feb. 2010.
MasterCraft Reveals New Innovations for 2010, Aug. 2009.
MasterCraft X-Series Models HV700 and HV450 Owner's Manual in 58 pages, Jul. 24, 2012.
Medallion Instrumentation Systems 2010 MasterCraft Viper System in 41 pages, alleged to have a date of prior to Sep. 16, 2010.
Medallion Instrumentation Systems MasterCraft University Instrumentation Training Part 1, Feb. 2012.
Nautique Surf System the new standard in Wakesurfing in 3 pages, Jan. 16, 2013.
Sanger Boats V237 2008 Wakeboarding Magazine in 4 pages, Jan. 1, 2008.
Screenshot taken early in a video titled "2011 MasterCraft X-25", allegedly uploaded on Mar. 15, 2011 at https://www.youtube.com/watch?v=CpPRDrLznoQ.
Screenshot taken early in a video titled "MasterCraft Rewind 2009—Day in the Life of the CSX 265", allegedly uploaded on Dec. 24, 2008 at https://www.youtube.com/watch?v=nr5xXu5fA54.
Screenshot taken early in a video titled "The History of Wake Surfing", allegedly uploaded Sep. 27, 2012 at https://www.youtube.com/watch?v=KWYZf3A7aas.
Teakgate Modifications & Accessories (p. 1), TheMalibuCrew.com in 13 pages, Oct. 2012.
Teakgate Modifications & Accessories (p. 2), TheMalibuCrew.com in 11 pages, Oct. 2012.
Teakgate Modifications & Accessories (p. 3), TheMalibuCrew.com in 3 pages, Oct. 2012 to Nov. 2012.
Teakgate Modifications & Accessories (p. 4), TheMalibuCrew.com in 5 pages, Nov. 2012 to Mar. 2013.
Transcription taken from a video titled "2008 Surfing Sanger 237 Edition", allegedly uploaded on Sep. 17, 2008 at https://www.youtube.com/watch?v=VedGGGD79bM.
Transcription taken from a video titled "A ride on the wakesurf board", allegedly uploaded on Oct. 15, 2012 at https://www.youtube.com/watch?v=3ru47pbUgyo.
Transcription taken from a video titled "Malibu Sunsetter First Crossover", allegedly uploaded on Oct. 14, 2012 at https://www.youtube.com/watch?v=5Wou4sWdTXk.
Transcription taken from a video titled "Malibu Sunsetter with Teakgate—first water test", allegedly uploaded on Oct. 14, 2012 at https://www.youtube.com/watch?v=u3Bx5k7dOD8.
Transcription taken from a video titled "Malibu Sunsetter with 'Teakgate'", allegedly uploaded on Oct. 13, 2012 at https://www.youtube.com/watch?v=pUwoFd4wOTs.

(56) References Cited

OTHER PUBLICATIONS

Transcription taken from a video titled "MasterCraft X10 Featuring Surf Tabs", allegedly uploaded on Feb. 9, 2013 at https://www.youtube.com/watch?v=nVddaDkKR5k.
Transcription taken from a video titled "No need surf gates . . . Only a Mastercraft X10", allegedly uploaded on Nov. 23, 2012 at https://www.youtube.com/watch?v=oltqqKwEes.
Transcription taken from a video titled "Riding the Teakgate Wave", allegedly uploaded on Oct. 15, 2012 at https://www.youtube.com/watch?v=VgH-WvdWdSo.
Transcription taken from a video titled "Steve wake surfing both sides of the wake", allegedly uploaded on Aug. 12, 2007 at https://www.youtube.com/watch?v=TAjUt6Kh-Xw.
Transcription taken from a video titled "Teakgate Dual Gate Test", allegedly uploaded on Nov. 12, 2012 at https://www.youtube.com/watch?v=c6nEgA099fs.
Transcription taken from a video titled "Teakgate Testing", allegedly uploaded on Nov. 12, 2012 at https://www.youtube.com/watch?v=H5tOiz9SdaQ.
Transcription taken from a video titled "Wakesurfing the Sanger 237", allegedly uploaded on Apr. 29, 2008 at https://www.youtube.com/watch?v=nG0YH8fwCmM.
Transcription taken from a video titled "Wakesurfing Crossover behind a 1987 Sunsetter", allegedly uploaded on Oct. 15, 2012 at https://www.youtube.com/watch?v=yCGsKoyLbYs.
Volvo Penta, QL Boat Trim System & Automatic Boat Trim Option in 4 pages, 2008.
Volvo Penta, QL Boat Trim System Brochure in 4 pages, 2007.
Volvo Penta, QL Boat Trim System Marine Accessories, www.qlmarine.com in 2 pages, 2004.
WakeWorld Forum Showthread, Is the Razor Blade the Switch Blade for Surfing in 14 pages, forum posts dated Feb. 8, 2008 and earlier.
WakeWorld MasterCraft Reveals New Innovations for 2010 in 3 pages, Aug. 24, 2009.
2010 Mastercraft Owner's Manual.
2011 Mastercraft Owner's Manual (Part 1—covering pp. #i-#4-33).
2011 Mastercraft Owner's Manual (Part 2—covering pp. #5-1-#24-4).
2012 Mastercraft Owner's Manual.
2013 Mastercraft Owner's Manual (Part 1—covering pp. #i-#2-45).
2013 Mastercraft Owner's Manual (Part 2—covering pp. #3-1-#6-18).
New QL Boat Trim System—Always Perfect Trim, dated Jul. 2007.
Malibu 2009 Owner's Manual.
MasterCraft Reveals 2010 Innovations, dated Sep. 3, 2009.
Machine transcription (using a method from http://www.labnol.org/internet/transcribe-video-to-text/28914/) taken from a video titled "Zane Schwenk—MasterCraft Surf Tabs", allegedly uploaded on May 26, 2010 at http://www.youtube.com/watch?v=b1Q_MLRO31M.
Nautique Surf System (2 Pages), dated Jan. 3, 2013, http://www.nautique.com/blog/index/nautique-surf-system.
Screenshot taken early in a video titled "X-2 Surfing 2010," allegedly uploaded on Aug. 31, 2010 at https://www.youtube.com/watch?v=1FbuXfaWFwU.
Complaint for Patent Infringement, filed Jan. 12, 2018 in *Malibu Boats, LLC v. Skier's Choice, Inc.*, Case 3:18-cv-00015 in the United States District Court for the Eastern District of Tennessee.
Defendant Skier's Choice's Answer and Counterclaims, filed Mar. 13, 2018 in *Malibu Boats, LLC v. Skier's Choice, Inc.*, Case 3:18-cv-00015 in the United States District Court for the Eastern District of Tennessee.
Malibu's Answer to Counterclaims, filed Apr. 3, 2018 in *Malibu Boats, LLC v. Skier's Choice, Inc.*, Case 3:18-cv-00015 in the United States District Court for the Eastern District of Tennessee.
Malibu's Motion to Strike Defendant's Affirmative Defense of Inequitable Conduct and/or Unclean Hands and Supporting Memorandum, filed Apr. 3, 2018 in *Malibu Boats, LLC v. Skier's Choice, Inc.*, Case 3:18-cv-00015 in the United States District Court for the Eastern District of Tennessee.
Joint Stipulation Concerning Skier's Choice's Tenth Affirmative Defense, filed Apr. 17, 2018 in *Malibu Boats, LLC v. Skier's Choice, Inc.*, Case 3:18-cv-00015 in the United States District Court for the Eastern District of Tennessee.
Castle Bravo—Power Trim Tabs, dated May 11, 2011, http://mhkaufman.blogspot.com/2011/05/power-trim-tabs.html.
Wake Plates?—Wakeboarder.com Forum, Posts dated Mar. 23, 2005 to Mar. 24, 2005, http://forums.wakeboarder.com/viewtopic.php?t=40149&sid.
Tips for Proper Boat Weighting, dated Sep. 28, 2012, https://www.wakeutah.com/2012/09/28/tips-for-proper-boat-weighting/.
Malibu's Disclosure of Asserted Claims and Infringement Contentions, dated May 10, 2018 in *Malibu Boats, LLC v. Skier's Choice, Inc.*, Case 3:18-cv-00015 in the United States District Court for the Eastern District of Tennessee.
Preliminary Invalidity Contentions of Defendant Skier's Choice, dated Jun. 15, 2018, in *Malibu Boats, LLC v. Skier's Choice, Inc.*, Case 3:18-cv-00015 in the United States District Court for the Eastern District of Tennessee.
Transcript of Deposition of Adam A. McCall [Redacted], dated Sep. 25, 2018, in *Malibu Boats, LLC v. Skier's Choice, Inc.*, Case 3:18-cv-00015 in the United States Ditrict Court for the Eastern District of Tennessee.
Transcript of Deposition of Daniel Lee Gasper [Redacted], dated Sep. 20, 2018, in *Malibu Boats, LLC v. Skier's Choice, Inc.*, Case 3:18-cv-00015 in the United States District Court for the Eastern District of Tennessee.
Transcript of Deposition of Rachael Marie Green [Redacted], dated Sep. 14, 2018, in *Malibu Boats, LLC v. Skier's Choice, Inc.*, Case 3:18-cv-00015 in the United States District Court for the Eastern District of Tennessee.
Transcript of Deposition of Jeffrey Lee Predmore [Redacted], dated. Sep. 13, 2018, in *Malibu Boats, LLC v. Skier's Choice, Inc.*, Case 3:18-cv-00015 in the United States District Court for the Eastern District of Tennessee.
Transcript of Deposition of Timothy Michael Lopes [Redacted], dated Sep. 20, 2018, in *Malibu Boats, LLC v. Skier's Choice, Inc.*, Case 3:18-cv-00015 in the United States District Court for the Eastern District of Tennessee.
Malibu's Opening Claim Construction Brief, filed Oct. 5, 2018, in *Malibu Boats, LLC v. Skier's Choice, Inc.*, Case 3:18-cv-00015 in the United States District Court for the Eastern District of Tennessee.
Skier's Choice's Responsive Claim Construction Brief [Redacted], filed Oct. 26, 2018, in *Malibu Boats, LLC v. Skier's Choice, Inc.*, Case 3:18-cv-00015 in the United States District Court for the Eastern District of Tennessee.
Malibu's Reply Claim Construction Brief, filed Nov. 9, 2018, in *Malibu Boats, LLC v. Skier's Choice, Inc.*, Case No. 3:16-cv-00082 in the United States District Court for the Eastern District of Tennessee.
Lenco Marine, Drawing 20609, 2 Pages, dated Dec. 3, 2009.
Transcript of Markman Hearing dated Feb. 22, 2019, in *Malibu Boats, LLC v. Skier's Choice, Inc.*, Case 3:18-cv-00015 in the United States District Court for the Eastern District of Tennessee.
Skier's Choice's Supplemental Claim Construction Brief, filed May 22, 2019 in *Malibu Boats, LLC v. Skier's Choice, Inc.*, Case 3:18-cv-00015 in the United States District Court for the Eastern District of Tennessee.
Malibu's Response to Supplemental Claim Construction Brief, filed May 29, 2019 in *Malibu Boats, LLC v. Skier's Choice, Inc.*, Case 3:18-cv-00015 in the United States District Court for the Eastern District of Tennessee.
Report and Recommendation Regarding Claim Construction, filed Jul. 22, 2019 in *Malibu Boats, LLC v. Skier's Choice, Inc.*, Case 3:18-cv-00015 in the United States District Court for the Eastern District of Tennessee.

(56) References Cited

OTHER PUBLICATIONS

Skier's Choice's Objection to Report and Recommentation as to Claim Construction, filed Aug. 5, 2019, in *Malibu Boats, LLC* v. *Skier's Choice, Inc.*, Case 3:18-cv-00015 in the United States District Court for the Eastern District of Tennessee.
Malibu's Objections to Report and Recommentation on Claim Construction, filed Aug. 5, 2019, in *Malibu Boats, LLC* v. *Skier's Choice, Inc.*, Case 3:18-cv-00015 in the United States District Court for the Eastern District of Tennessee.
Skier's Choice's Response to Malibu's Objections to the Report and Recommendation on Claim Construction, filed Aug. 19, 2019, in *Malibu Boats, LLC* v. *Skier's Choice, Inc.*, Case 3:18-cv-00015 in the United States District Court for the Eastern District of Tennessee.
Malibu's Response to Skier's Choice's Objections to the Report and Recommendation on Claim Construction, filed Aug. 19, 2019, in *Malibu Boats, LLC* v. *Skier's Choice, Inc.*, Case 3:18-cv-00015 in the United States District Court for the Eastern District of Tennessee.
Complaint for Patent Infringement, filed Jun. 19, 2019 in *Malibu Boats, LLC* v. *Skier's Choice, Inc.*, Case 3:19-cv-00225 in the United States District Court for the Eastern District of Tennessee.
Skier's Choice's Answer and Counterclaims, filed Jul. 11, 2019 in *Malibu Boats, LLC* v. *Skier's Choice, Inc.*, Case 3:19-cv-00225 in the United States District Court for the Eastern District of Tennessee.
Malibu's Answer to Counterclaims, filed Aug. 7, 2019 in *Malibu Boats, LLC* v. *Skier's Choice, Inc.*, Case 3:19-cv-00225 in the United States District Court for the Eastern District of Tennessee.
Joint Claim Construction and Prehearing Statement for U.S. 10,322,777, filed Feb. 14, 2020 in *Malibu Boats, LLC* v. *Skier's Choice, Inc.*, Case 3:19-cv-00225/3:18-cv-00015 in the United States District Court for the Eastern District of Tennessee.
Malibu's Opening Claim Construction Brief Regarding U.S. 10,322,777 and Supporting Westin Declaration, filed Feb. 21, 2020 in *Malibu Boats, LLC* v. *Skier's Choice, Inc.*, Case 3:19-cv-00225/3:18-cv-00015 in the United States District Court for the Eastern District of Tennessee.
Skier's Choice's Responsive Claim Construction Brief Concerning U.S. 10,322,777, filed Mar. 6, 2020, in *Malibu Boats, LLC* v. *Skier's Choice, Inc.*, Case 3:19-cv-00225/3:18-cv-00015 in the United States District Court for the Eastern District of Tennessee.
Malibu's Reply Claim Construction Brief Regarding U.S. 10,322,777, filed Mar. 13, 2020 in *Malibu Boats, LLC* v. *Skier's Choice, Inc.*, Case 3:19-cv-00225/3:18-cv-00015 in the United States District Court for the Eastern District of Tennessee.
Presentations presented during Telephonic Claims Construction Hearing held on Apr. 13, 2020 in *Malibu Boats, LLC* v. *Skier's Choice, Inc.*, Case 3:19-cv-00225/3:18-cv-00015 in the United States District Court for the Eastern District of Tennessee.

\* cited by examiner

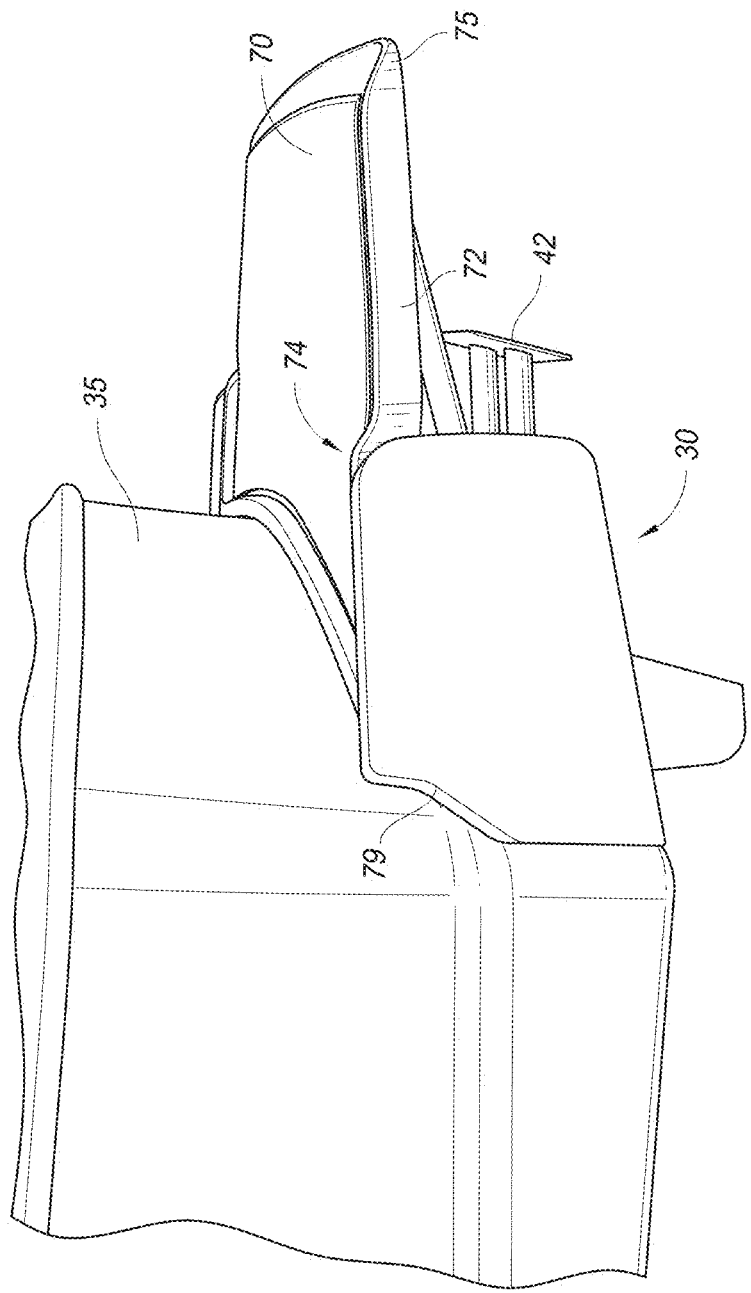

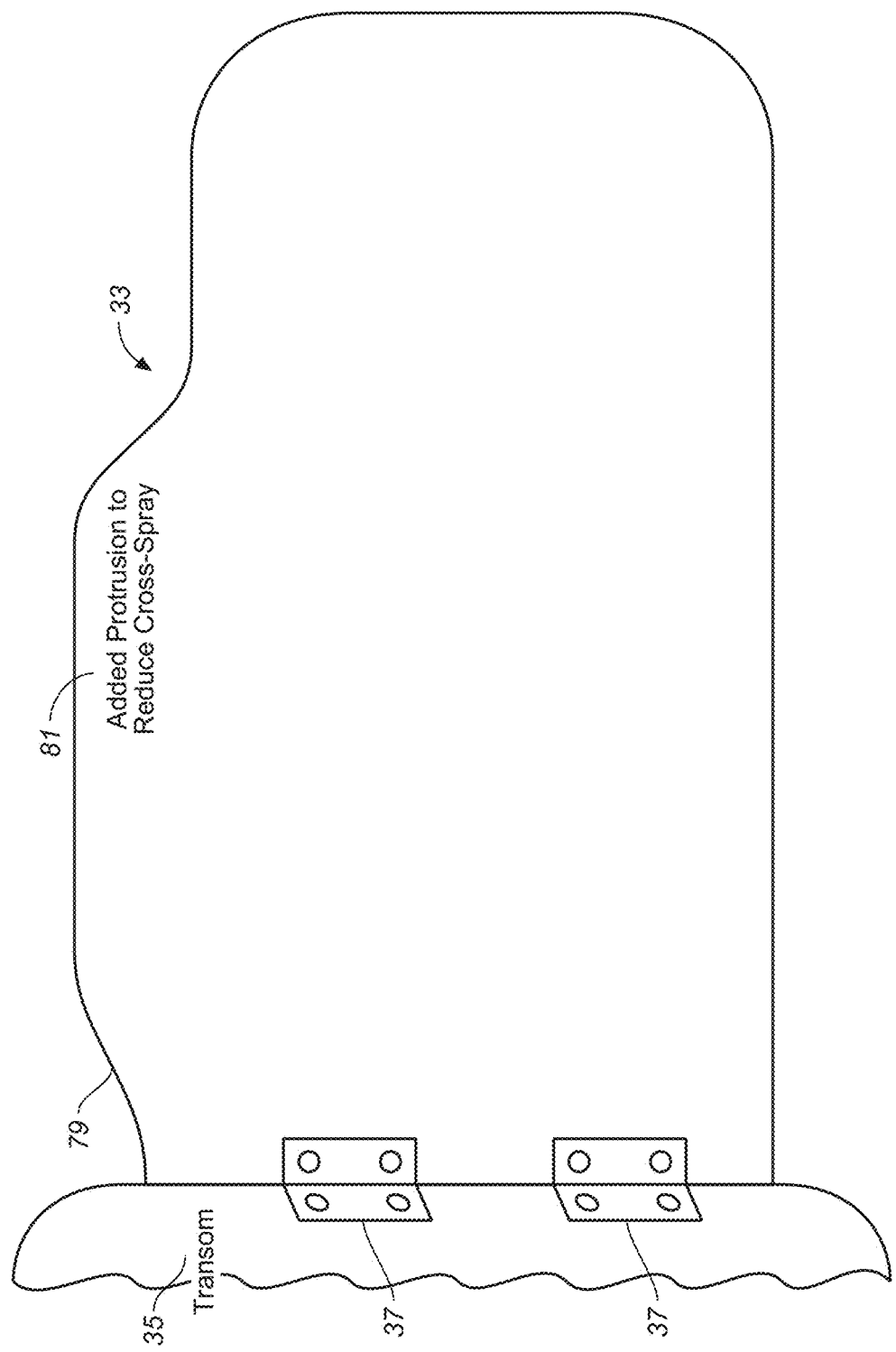

SURF WAKE SYSTEM FOR A WATERCRAFT

CROSS-REFERENCE TO RELATED APPLICATIONS

This application is a continuation of U.S. patent application Ser. No. 15/133,157, filed Apr. 19, 2016, and titled SURF WAKE SYSTEM FOR A WATERCRAFT, which is a continuation of U.S. patent application Ser. No. 14/082,086, filed Nov. 15, 2013, and titled SURF WAKE SYSTEM FOR A WATERCRAFT, which is a continuation-in-part of U.S. patent application Ser. No. 14/075,978, filed Nov. 8, 2013, and titled SURF WAKE SYSTEM FOR A WATERCRAFT, which is a continuation of U.S. patent application Ser. No. 13/830,356, filed on Mar. 14, 2013, and titled SURF WAKE SYSTEM FOR A WATERCRAFT. U.S. patent application Ser. No. 13/830,356 is a continuation-in-part of U.S. patent application Ser. No. 13/545,969, filed on Jul. 10, 2012, and titled SURF WAKE SYSTEM FOR A WATERCRAFT, which claims the benefit under 35 U.S.C. § 119(e) of U.S. Provisional Patent Application No. 61/559,069, filed on Nov. 12, 2011, and titled SURF WAKE SYSTEM FOR A WATERCRAFT. U.S. patent application Ser. No. 13/830,356 is also a continuation-in-part of International Patent Application No. PCT/US2012/055788, with an international filing date of Sep. 17, 2012, titled SURF WAKE SYSTEM AND METHOD FOR A WATERCRAFT, which designates the United States, and which claims the benefit under 35 U.S.C. § 119(e) of U.S. Provisional Patent Application No. 61/535,438, filed on Sep. 16, 2011, and titled SURF WAKE SYSTEM AND METHOD FOR A WATERCRAFT. U.S. patent application Ser. No. 15/133,157 is also a continuation-in-part of U.S. patent application Ser. No. 14/026,983, filed Sep. 13, 2013, and titled SURF WAKE SYSTEM AND METHOD FOR A WATERCRAFT, which is a continuation of U.S. patent application Ser. No. 13/830,274, filed Mar. 14, 2013, and titled SURF WAKE SYSTEM AND METHOD FOR A WATERCRAFT, which is a continuation of International Patent Application No. PCT/US2012/055788, with an international filing date of Sep. 17, 2012, and titled SURF WAKE SYSTEM AND METHOD FOR A WATERCRAFT, which designates the United States, and which claims the benefit under 35 U.S.C. § 119(e) of U.S. Provisional Patent Application No. 61/535,438, filed on Sep. 16, 2011, and titled SURF WAKE SYSTEM AND METHOD FOR A WATERCRAFT. Each of the above-identified patent applications is hereby incorporated by reference in its entirety and is made a part of this specification for all that it discloses.

BACKGROUND

Field of the Disclosure

This application relates, in general, to a wake system for a watercraft, and more particularly, to a surf wake system for modifying a wake produced by a watercraft travelling through water.

Description of the Related Art

Wake surfing has become increasingly popular in recent years because, unlike an ocean wave, a wake produced by a watercraft is on-demand not to mention continuous and endless as long as the watercraft is moving forward. As a watercraft travels through water, the watercraft displaces water and thus generates waves including bow wave and diverging stern waves on both sides of the watercraft. Due to pressure differences, these waves generally converge in the hollow formed behind the traveling watercraft and/or interfere with each other to form a wake behind the watercraft. Such a wake, however, is generally small, choppy or too close to the watercraft to be suitable and safe for water sports, and particularly not suitable for wake boarding or surfing.

To facilitate surfing, a wake can be formed away from the stern of the watercraft, for example, about ten feet away, and with a waist-height peak, for example, about three feet or higher. Those of skill in the art will understand that a wake for wake surfing can be formed at various different distances behind the watercraft, and the wake can have various different heights. Generally hundreds, and sometimes thousands, of pounds of additional weight or ballast to a rear corner of the watercraft to make the watercraft tilt to one side, displaces more water, and hence generates a larger wake on that side. Such additional weight may be in the form of removable ballast bags, installed ballast tanks or bladders, or passengers positioned to one side of the watercraft, which is primarily used to tip the watercraft to that side. Using such additional weight to produce larger wakes, however, poses several disadvantages. For example, such additional weight may take up significant space and capacity that may otherwise reduce the passenger capacity of the watercraft. Also, such additional weight may unbalance the watercraft creating difficulties in control. Moreover, the additional weight generally must be moved from one side of the water craft to the other in order to generate a wake on the other side of the water craft. Shifting such additional weight may require significant time and effort. For example, filling and emptying ballast tanks to switch from one side to the other may require 20 minutes or more.

Alternatively, it is known to require extensive modification to a boat hull to promote a proper surf wake. An example of generating a larger wake can be found in a U.S. Pat. No. 6,105,527 to Lochtefeld et al.

Generally, wake surfing is a water sport in which a surfer trails behind a ballasted wake boat at relatively slow speeds. Riders surf on an endless wave. The wake boats are specific wake boats with rear platforms and direct submerged drives so the propeller is under the boat.

In order to create wakes, owners of inboard boats place ballast, such as water, lead weights, cement, or other heavy objects in different sections of the boat in order to weight the boat down and create a larger wake. The weight may add a bias of weight toward the back corner of the boat that the rider is surfing on.

However, it takes trial and error to figure out where to put the ballast and how much to produce the best wave on your boat. For example, if a left surf wake is desired, one would position a significant amount of weight near the aft left corner of the boat. Positioning several hundred pounds of ballast (e.g., 600-800 lbs, or more) or several large men adjacent the desired corner may be necessary for creating a suitable surf wake. One will appreciate such imbalance generally leads to significant lean of the watercraft. For example, a lean of approximately 14° is often necessary when using conventional ballast systems in order to create a suitable surf wake. As one can imagine, such lean may have deleterious effects on both handling and passenger enjoyment.

The information disclosed in this Background of the Invention section is only for enhancement of understanding of the general background of the invention and should not be taken as an acknowledgement or any form of suggestion that this information forms the prior art already known to a person skilled in the art.

In light of the foregoing, it would therefore be useful to provide surf wake system that overcomes the above and other disadvantages.

SUMMARY

One aspect of the present invention is directed to a surf wake system for modifying a wake formed by a watercraft travelling through water. The surf wake system may include a pair of upright water diverters including a port diverter and a starboard diverter, each independently movable from a neutral position to a deployed position in which a respective water diverter extends outboard of a transom of the watercraft to deflect water traveling along a hull of the watercraft and past the transom. In some embodiments, positioning the port diverter in its deployed position while the starboard diverter is in its neutral position modifies the wake to provide a starboard surf wake, and positioning the starboard diverter in its deployed position while the port diverter is in its neutral position modifies the wake to provide a port surf wake.

In various embodiments, in the deployed position, the respective water diverter may extend outboard beyond a side strake of the watercraft to deflect water traveling along the side strake and past the transom.

Each upright water diverter may be pivotally mounted to the watercraft adjacent the transom or a respective side strake.

Each upright water diverter may be pivotally mounted to directly to the transom or a respective side strake.

The surf wake system may include a plurality of positioners operably connected to a respective water diverter for positioning the respective water diverter relative to a longitudinal axis of the watercraft.

At least one of the plurality of positioners may be a linear actuator configured to selectively move a respective water diverter between its neutral and extended positions.

Another aspect of the present invention is directed to a surf wake system including a flap for deflecting water traveling past a transom of the watercraft, a hinge for pivotally mounting the flap relative to the watercraft, the hinge having a pivot axis extending adjacent and along a side edge of the transom, and a positioner operably connected to the flap for positioning the flap relative to a longitudinal axis of the watercraft between a neutral position and an outward position.

The flap may include a substantially planar member.

The flap may be approximately 10-15 inches high and approximately 15-20 inches long.

The flap may be formed of plastic, stainless steel, wood and/or fiberglass.

The hinge may be a jointed device having a first member pivotally affixed to a second member by a pin, wherein the first member is affixed to the watercraft and the second member is affixed to the flap.

The second member may be monolithically formed with the flap.

The actuator may be dimensioned and configured to pivotally move and position the flap between the neutral position, in which the flap pulls inboard, and the extended position, in which the flap extends outboard.

The flap may extend outboard at least approximately 5-15° relative to a longitudinal axis of the watercraft.

The surf wake system may include a manual actuator to selectively position the flap.

The surf wake system may include a controller installed within the watercraft and operably connected to the actuator to selectively position the flap.

The controller may include a display panel for displaying an indication of a position of the flap.

The surf wake system may include a plurality of flaps and hinges, each flap pivotally mounted to the watercraft by a respective hinge.

The plurality of flaps may include a port flap and a starboard flap, each mounted adjacent respective port side and starboard side edges.

The positioner may include a plurality of actuators each secured on the watercraft and operably connected to a respective one of the plurality of flaps.

The surf wake system may include a controller installed within the watercraft and operably connected to the plurality of the actuators to selectively position the plurality of the flaps.

In various embodiments, positioning the port flap in the outward position and the starboard flap in the neutral position enhances a right surf wake, and wherein positioning the starboard flap in the outward position and the port flap in the neutral position enhances a left surfing wake.

Various embodiments disclosed herein can relate to a boat configured to generate a starboard side surf wake for at least goofy-foot (or right-foot-forward) wake surfing and a port side surf wake for at least regular-foot (or left-foot-forward) wake surfing, with the port side surf wake different from the starboard side surf wake. The boat can include an upright port side water diverter movable between a first and second position, where one of said first and second positions produces the starboard side surf wake. The boat can include an upright starboard side water diverter movable between a first and second position, where one of said first and second positions produces the port side surf wake. The boat can include a controller responsive to driver input into an input device, and one or more actuators responsive to the controller to move the port side water diverter from one of the first and second positions to the other of the first and second positions, and move the starboard side water diverter from one of the second and first positions to the other of the second and first positions.

Various embodiments disclosed herein can relate to a boat configured to produce a right side surf wake and a left side surf wake different from the right side surf wake. Both the right side surf wake and left side surf wake can be different from a wake of the boat moving through water without water diverters engaged. The boat can include a memory storing information including wake surf settings, a control responsive to the memory, one or more actuators responsive to the control, an upright right side water diverter operably connected to the actuator(s) to move between a first and second position, where one of the first and second positions produces the left side surf wake, and an upright left side water diverter operably connected to the actuator(s) to move between a first and second position, where one of the first and second positions produces the right side surf wake.

Various embodiments disclosed herein can relate to a boat configured to create an asymmetrical wake suitable for wake surfing. The boat can include first and second upright wake modifiers. The first wake modifier can be configured to engage to form a right side asymmetrical wake, and the second wake modifier can be configured to engage to form a left side asymmetrical wake. Each of the right and left side asymmetrical wakes can be different from a non-surf wake of the boat moving through water without the first and second wake modifiers engaged. In some embodiments, the boat can include a controller responsive to one or more safety features to override engagement of said first or second upright wake modifiers.

The methods and apparatuses of the present invention have other features and advantages which will be apparent from or are set forth in more detail in the accompanying drawings, which are incorporated herein, and the following Detailed Description, which together serve to explain certain principles of the present invention.

Various embodiments of the present disclosure include a boat configured to produce a wake for wake surfing. The boat includes a hull configured to produce a wake when the hull moves through water, a first element having a vertical orientation, the first element electronically positionable to change a flow of water when the hull moves through water, said change of said flow modifying the wake to be surfable on a right side. The boat also includes a first actuator configured to move the first element. The boat also includes a second element having a vertical orientation, the second element electronically positionable to change a flow of water when the hull moves through water, said change of said flow modifying the wake to be surfable on a left side. The boat also comprises a second actuator configured to move the second element. The boat also includes a user input device configured to receive input from a user. The input can include a determination to change the surfable side of the wake. Responsive to said input, at least one of the first and second actuators can move at least a corresponding one of the first and second elements to responsively modify the wake.

Various embodiments of the present disclosure include a boat producing a wake for wake surfing. The boat can include a hull producing a wake as the hull moves through water. The boat also includes a movable first structure producing a first surfable side of the wake, said first surfable side of the wake including a substantially smooth water surface while another side of the wake includes a substantially turbulent water surface, said first structure movable between positions to change a shape of the first surfable side of the wake, said first structure including a vertical orientation. The boat also includes a first actuator configured to move the first structure. The boat also includes a movable second structure capable of producing a second surfable side of the wake, said second surfable side of the wake including a substantially smooth water surface while another side of the wake includes a substantially turbulent water surface, said second structure capable of being movable between positions to change a shape of the second surfable side of the wake, said second structure including a vertical orientation. The boat also includes a second actuator configured to move the second structure. The boat can also include a user input device configured to receive input from a user, and said input can include desired wave shapes. Responsive to said input, at least one of the first and second actuators can move at least a corresponding one of the first and second elements to responsively modify the shape of the wake.

Various embodiments of the present disclosure include a boat configured to produce a wake for wake surfing. The boat can include a hull configured to produce a wake when the hull moves through water. The boat also can include a rudder configured to steer the boat as the hull moves through the water. The boat also can include a plurality of electronically controlled actuators, and an end of each actuator can be operably secured with respect to the transom. The boat also can include first and second water diverters. Each water diverter can be configured to redirect water as it passes a transom of the hull. Each water diverter can be movable by one of said plurality of actuators. Each water diverter can include a vertical orientation configured to shape a side of the wake for surfing, the first water diverter shaping the right side of the wake and the second water diverter shaping the left side of the wake.

Various embodiments of the disclosure relate to a boat configured to produce a wake for wake surfing. The boat can include a hull configured to produce a wake when the hull moves through water. The boat also can include one or more wake modifying elements having a first setting that is configured to produce a right-side surf wake, and a second setting that is configured to produce a left-side surf wake and one or more actuators configured to move the one or more wake modifying elements from the first setting to the second setting. The boat also can include a user input device configured to receive input from a user corresponding to a selection of the left-side surf wake. The boat also can include one or more actuators activated in response to the selection of the left-side surf wake to move the one or more wake modifying elements to the second setting to produce the left-side surf wake and the right-side wake that is unsuitable for surfing. Various embodiments of the disclosure relate to a boat that includes one or more rider notification elements configured to provide a rider notification in response to the selection of the left-side surf wake, wherein the rider notification is configured to inform a wake surfer that the wake will transition, or is transitioning, from the right-side surf wake to the left-side surf wake.

Moreover in various combinations of embodiments, the one or more rider notification elements are configured to provide a visual rider notification. The one or more rider notification elements can include one or more lights. The one or more lights can be on a transom of the boat, on a swim platform of the boat, or on a wake tower of the boat, or some or all of the foregoing. The one or more rider notification elements can be configured to provide an audio rider notification. The one or more rider notification elements can include one or more audio speakers. The rider notification can include a plurality of sounds that precede the transition from the right-side surf wake to the left-side surf wake. The one or more rider notification elements can be configured to provide a visual rider notification and the audio rider notification. The one or more rider notification elements can be configured to provide the rider notification at a first time, and the one or more actuators can activate at a second time that is later than the first time by a delay time. A memory can be configured to store a plurality of delay times, and the user input device can be configured to receive a selection corresponding to a selected delay time. The one or more actuators can activate at the second time that is later than the first time by the selected delay time. The delay time may be based at least in part on one or more of a rider identifier, a rider skill level, a rider weight, a surfboard length, a surfboard type, a wake height, a wake length, and a wake shape. One or more driver notification elements can be configured to provide a driver notification in response to the selection of the left-side surf wake. The driver notification can be configured to inform a driver that the wake will transition, or is transitioning, from the right-side surf wake to the left-side surf wake. The user input device can be configured to be operated by an operator that is not the driver of the boat.

In various embodiments, a boat comprises a hull configured to produce a wake when the hull moves through water. The boat can include one or more wake modifying elements configured to modify the wake and one or more rider notification elements configured to provide a rider notification that the one or more wake modifying elements is changing the wake or will change the wake. The one or more wake modifying elements can be configured to produce an asymmetrical wake having a right-side surf wake or a left-side surf wake, and the one or more rider notification elements can be configured to provide the rider notification when the wake is transitioning, or will transition, from a right-side surf wake to a left-side surf wake or from a left-side surf wake to a right-side surf wake. The one or more wake modifying elements can be configured to modify the height of the wake. The one or more rider notification elements can be configured to provide the rider notification when the wake height is changing or when the wake height will change. The one or more wake modifying elements can be configured to modify the shape of the wake, and the one or more rider notification elements can be configured to provide the rider notification when the wake shape is changing or when the wake shape will change. The one or more wake modifying elements can include a foil (e.g., configured to pull a rear of the boat down into the water as the boat moves through the water). The foil can be movable between two or more positions, and the one or more rider notification elements can be configured to provide the rider notification when the foil is moving or is going to move. The one or more rider notification elements can be configured to provide a visual rider notification. The one or more rider notification elements an be configured to provide an audio rider notification.

Various embodiments can include a boat configured to produce a wake for wake surfing. The boat can include a hull configured to produce a wake when the hull moves through water, and one or more wake modifying elements having a first setting that is configured to produce a right-side surf wake and a left-side wake that is unsuitable for surfing, and a second setting that is configured to produce a left-side surf wake and a right-side wake that is unsuitable for surfing. The boat also can include one or more actuators configured to move the one or more wake modifying elements from the first setting to the second setting and from the second setting to the first setting. The boat also can include a rider control device that includes one or more user input elements configured to enable a rider (e.g., wake surfer) to select the right-side surf wake and configured to enable the wake surfer to select the left-side surf wake. The rider control device can include a wireless communication interface configured to transmit data corresponding to a selection received by the user input elements. A wireless communication interface is configured to receive the transmitted data corresponding to the selection received by the user input elements. One or more actuators can be actuated in response to the data corresponding to the selection received by the user input elements to move the one or more wake modifying elements to the first setting in response to selection of the right-side surf wake and to move the one or more wake modifying elements to the second setting in response to selection of the left-side surf wake.

In various embodiments, the rider control device can include a wearable article configured to be worn on a body of the wake surfer. The wearable article can include one or more of an arm band, a watch, a necklace, a vest, and a jacket. The rider control device can be water resistant. The rider control device can include a waterproof housing. The rider control device can be configured to float in water. The one or more driver notification elements can be configured to provide a driver notification in response to the data corresponding to the selection received by the user input elements. The driver notification can be configured to inform a driver that the wake will transition, or is transitioning, from the right-side surf wake to the left-side surf wake or from the left-side surf wake to the right-side surf wake.

In various embodiments, a boat can include a hull configured to produce a wake when the hull moves through water, one or more wake modifying elements configured to modify the wake, and a rider control device configured to receive input from a rider. The wake modifying elements can be configured modify the wake in response to the input from the rider (e.g., received by the rider control device. In some embodiments, the boat can include a controller configured to modify the wake using the one or more wake modifying elements in response to the input from the rider.

In various embodiments, the rider control device can include a wireless communication interface configured to transmit data corresponding to the input from the rider to the boat (e.g., to the controller). The one or more wake modifying elements can be configured to produce an asymmetrical wake having a right-side surf wake or a left-side surf wake, and the rider control device can include one or more user input elements configured to receive a selection of the right-side surf wake and to receive a selection of the left-side surf wake.

In various embodiments, the rider control device can include one or more user input elements configured to receive a selection corresponding to a wake height or a wake length. The one or more wake modifying elements can be configured to change the wake height or the wake length in response to the selection. For example, a controller can be configured to move the one or more wake modifying elements to change the wake height or the wake length in response to the selection. The one or more wake modifying elements can include a foil configured to pull a rear of the boat down into the water as the boat moves through the water, and the foil can be movable between two or more positions. The foil can be movable in response to the selection received by the rider control device, to modify the wake. For example, a controller can be configured to move the foil in response to the selection received by the rider control device. The rider control device can include a wearable article configured to be worn on a body of the wake surfer, can be water resistant, and can be configured to float in water.

Various embodiments of the disclosure relate to a wearable rider control device for controlling a wake of a boat. The rider control can include a wearable element configured to be worn on a body of a rider and one or more user input elements configured to receive input from the rider associated with a change for a wake of a boat. The device can also include a wireless communication interface configured to transmit data corresponding to a selection received by the user input elements.

In various embodiments, the one or more user input elements can be configured to enable the rider to select a right-side surf wake and configured to enable the rider to select a left-side surf wake. The wearable element can include one or more of an arm band, a watch, a necklace, a vest, and a jacket, and can include a water resistant housing, a waterproof housing, and/or can be configured to float in water.

In various embodiments, the boat can include a hull configured to produce a wake when the hull moves through water and one or more wake modifying elements configured to produce an asymmetrical wake having a right-side surf wake or a left-side surf wake. The boat can include a wireless communication interface configured to receive data from a rider control device. The data can correspond to selection of the right-side surf wake or the left-side surf wake. The one or more wake modifying elements can be configured produce the right-side surf wake in response to the data corresponding to selection of the right-side surf wake and to produce the left-side surf wake in response to the data corresponding to selection of the left-side surf wake. For example, a controller can be configured to modify the wake using the one or more wake modifying elements to have the right-side surf wake in response to the data corresponding to selection of the right-side surf wake and to have the left-side surf wake in response to the data corresponding to selection of the left-side surf wake. In various embodiments, a rider control device can be included.

Various embodiments can includes a boat having a hull configured to produce a wake when the hull moves through water and one or more wake side adjustment elements having a first setting that is configured to produce a right-side surf wake and a left-side wake that is unsuitable for surfing, and a second setting that is configured to produce a left-side surf wake and a right-side wake that is unsuitable for surfing. The boat also can include one or more wake shape adjustment elements movable between two or more positions to adjust one or more of a wake height, a wake length, and a wake steepness. The boat can include a user input device configured to receive selections from a user. The one or more wake side adjustment elements can move to the first setting in response to a selection received by the user input device corresponding to a right-side surf wake. The one or more wake side adjustment elements can move to the second setting in response to a selection received by the user input device corresponding to a left-side surf wake. The one or more wake shape adjustment elements can move in response to a selection receive by the user input device corresponding to a change in one or more of the wake height, the wake length, and the wake steepness. For example, in some embodiments, the boat can include a controller configured to move the one or more wake side adjustment elements to the first setting in response to a selection received by the user input device corresponding to a right-side surf wake, configured to move the one or more wake side adjustment elements to the second setting in response to a selection received by the user input device corresponding to a left-side surf wake, and configured to move the one or more wake shape adjustment elements in response to a selection receive by the user input device corresponding to a change in one or more of the wake height, the wake length, and the wake steepness.

In various embodiments, the one or more wake shape adjustment elements can include a foil movable between a deployed position and a retracted position. The foil can be configured to pull a rear of the boat down into the water as the boat moves through the water when the foil is in the deployed position. The user input device can include a single selection element that corresponds to a right-side surf wake having a first height, and the one or more wake side adjustment elements can move to the first setting and the one or more wake shape adjustment elements can move to a positioned that corresponds to the first height in response to a selection of the single selection element. The user input device can include a second single selection element that corresponds to a left-side surf wake having a second height, and the one or more wake side adjustment elements can move to the second setting and the one or more wake shape adjustment elements can move to a positioned that corresponds to the second height in response to a selection of the second single selection element. The single selection element can include a button.

In various embodiments, a boat can be configured to produce a wake for wake surfing. The boat can include a hull configured to produce a wake when the hull moves through water and one or more wake modifying elements having a first setting that is configured to produce a right-side surf wake and a left-side wake that is unsuitable for surfing, and a second setting that is configured to produce a left-side surf wake and a right-side wake that is unsuitable for surfing. The boat can include a rudder configured to steer the boat as the hull moves through the water and a steering device configured to enable a driver to operate the rudder to steer the boat. The steering device (e.g., steering wheel) can include one or more user input elements configured to receive input from the driver corresponding to a selection of a right-side surf wake or a left-side surf wake. The one or more wake modifying elements can move to the first setting in response to a selection received by the user input elements corresponding to the right-side surf wake. The one or more wake modifying elements can move to the second setting in response to a selection received by the user input elements corresponding to the left-side surf wake. For example, in some embodiments, the boat can include a controller configured to move the one or more wake modifying elements to the first setting in response to a selection received by the user input elements corresponding to the right-side surf wake and configured to move the one or more wake modifying elements to the second setting in response to a selection received by the user input elements corresponding to the left-side surf wake.

In various embodiments, the steering device can include a steering wheel or a joystick. The steering device can include a wireless communication interface configured to transmit data corresponding to a selection received by the one or more user input elements. The boat can include a wireless communication interface (e.g., in communication with the controller) and configured to receive the data transmitted from the wireless communication interface of the steering device. The one or more input elements can be configured to enable the driver to adjust one or more of a wake height, a wake length, and a wake steepness.

In various embodiments, a boat can be configured to produce a wake for wake surfing, and can include comprises a hull configured to produce a wake when the hull moves through water. The boat can include and a left-side upright flap positioned on a left side of the boat, and the left-side upright flap can be movable between a retracted position and a deployed position. The deployed position can be configured to produce a right-side surf wake. The left-side upright flap can include an edge disposed along a corresponding left portion of the hull with a gap between the edge and the left portion of the hull when the left-side upright flap is in the deployed position. The left portion of the hull can be substantially linear, and the edge can be substantially linear.

In various embodiments, the hull can include a chamfer line, and the edge of the left-side upright flap can be substantially entirely disposed below the chamfer line at the left portion of the hull when the left-side upright flap is in the deployed position. A right-side upright flap can be positioned on a right side of the boat, and the right-side upright flap can be movable between a retracted position and a deployed position. The deployed position can be configured to produce a left-side surf wake. The right-side upright flap can include an edge disposed along a corresponding right portion of the hull with a gap between the edge of the right-side upright flap and the right portion of the hull. The right portion of the hull can be substantially linear, and the edge of the right-side upright flap can be substantially linear. The hull can include a chamfer line, and the edge of the right-side upright flap can be substantially entirely disposed below the chamfer line at the right portion of the hull when the right-side upright flap is in the deployed position. The gap can be less than or equal to about 10 mm and/or can be at least about 0.1 mm. A spray reducing element can be configured to at least partially cover or fill the gap between the left-side upright flap and the corresponding left portion of the hull. The spray reducing element can be coupled to the left-side upright flap and can extend past the edge of the left-side upright flap towards the hull when the left-side upright flap is in the deployed position such that the spray reducing element at least partially covers the gap. The spray reducing element can include a rigid plate. The spray reducing element can include a flexible material. The spray reducing element can be configured to abut against the hull when the left-side upright flap is in the deployed position.

Various aspects of the present invention are directed to a wake modifying system for modifying a wake produced by a watercraft traveling through water.

In various aspects of the present invention, the wake modifying system may include a rudder pivotally mounted to the watercraft for steering the watercraft, a fin pivotally mounted to the watercraft substantially along a centerline of the watercraft and forward the rudder, wherein the fin pivots about an upright axis to modify the wake produced by the watercraft traveling through the water, an actuator mounted within the watercraft and operably coupled to the fin for pivoting the fin relative to the centerline, and a controller mounted on the watercraft allowing an operator to control the actuator and selectively pivot the fin to a desired angle θd relative to the centerline.

The fin may be disposed along the centerline substantially adjacent a midline of the watercraft, wherein the fin includes a short portion extending in a direction from the upright axis and a long portion extending in another direction from the upright axis, and wherein the long portion may be longer than the short portion. A length ratio of the short portion and the long portion may be approximately 13. The short portion and the long portion have lengths of approximately 3.5 inches and approximately 8.5 inches, respectively.

The wake modifying system may further include another fin pivotally mounted to the watercraft substantially along the centerline of the watercraft and forward the fin, wherein the another fin pivots about another upright axis substantially parallel to the upright axis. Each of the fin and the another fin include short and long portions extending in opposing directions from the upright axis and the another upright axis, respectively. The short portion of both the fin and the another fin extend in a direction from the upright axis and the another upright axis, respectively. The long portion of both the fin and the another fin extend in another direction from the upright axis and the another upright axis, respectively, wherein the actuator may be operably coupled to both the fin and the another fin for pivoting the fins relative to the centerline in phase.

One end of the actuator may be affixed to the watercraft and another end thereof may be operably coupled to the fin by a link mechanism. One end of the actuator may be affixed to the watercraft and another end thereof may be operably coupled to the fin by a rack and pinion.

The controller may be configured to control the actuator to return the fin to approximately 0° relative to the centerline when a speed of the watercraft may be above a predetermined speed, wherein the predetermined speed may be approximately 10 miles per hour. Maximum value of the desired angle may be approximately 22°. The controller includes a touch screen allowing the operator to set the desired angle. The rudder may be pivoted in opposite direction of rotation direction of the fin.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

A water-sports boat can be configured to facilitate user-controlled selection of which side of a wake of the water-sports boat to enhance for wake surfing. The water-sports boat can have a starboard-side surf selector and a port-side surf selector (e.g., the right and left buttons 67 of FIG. 8A). The water-sports boat can have a port-side deflector and a starboard-side deflector (e.g., the "flaps" or "water diverters" 33s, 33p, and 102). The water-sports boat can have a port-side surf configuration (e.g., FIG. 5C) where the port-side deflector is positioned at a neutral position and the starboard-side deflector is positioned at a deployed position. The water-sports boat in the port-side surf configuration can be configured to enhance port-side wake surfing when the hull moves through water by at least causing the port-side wave to be smoother than the starboard-side wave (e.g., FIG. 6C). The water-sports boat can have a starboard-side surf configuration (e.g., FIG. 5B) where the starboard-side deflector is positioned at a neutral position and the port-side deflector is positioned at a deployed position. The water-sports boat in the starboard-side surf configuration can be configured to enhance starboard-side wake surfing when the hull moves through water by at least causing the starboard-side wave to be smoother than the port-side wave (e.g., FIG. 6B). The water-sports boat can be configured to transition between the port-side surf configuration and the starboard-side surf configuration upon actuation of the corresponding starboard-side and port-side surf selectors. The starboard-side and port-side surf selectors can be touchscreen buttons (e.g., buttons 67 of FIG. 8A). A user interface can be configured to receive user input comprising a selection of a port-side surf mode and a selection of a starboard-side surf mode.

A method of operating a water-sports boat can facilitate wake surfing. The method can include performing at least one of a starboard-to-port transition and a port-to-starboard transition. The starboard-to-port transition can include transitioning the water-sports boat from a starboard-side surf configuration (e.g., FIG. 5B) to a port-side surf configuration (e.g., FIG. 5C) by moving a port-side wake shaping flap (e.g., 33p or 102) from a deployed position to a neutral position and moving a starboard-side wake shaping flap (e.g., 33s or 102) from a neutral position to a deployed position as the water-sports boat moves through water. The port-to-starboard transition can include transitioning the water-sports boat from a port-side surf configuration (e.g., FIG. 5C) to a starboard-side surf configuration (e.g., FIG. 5B) by moving a starboard-side wake shaping flap (e.g., 33s or 102) from a deployed position to a neutral position and moving a port-side wake shaping flap (e.g., 33p or 102) from a neutral position to a deployed position as the water-sports boat moves through water.

A port-side deflector or starboard-side deflector can have a generally horizontal portion 76 and a down-turned portion 78. The down-turned portion can be positioned at an edge of the generally horizontal portion and can be angled downward relative to the generally horizontal portion (e.g., as shown in at least FIG. 12A). A wake surf system can have a port-side electronic actuator configured to move the port-side deflector between a neutral position and a deployed position, and a starboard-side electronic actuator configured to move the starboard-side deflector between a neutral position and a deployed position. The water-sports boat can have a movable structure (e.g., platform 150 of FIGS. 28 and 29) coupled to a transom such that the movable structure can pivot relative to the transom.

BRIEF DESCRIPTION OF THE DRAWINGS

FIG. 11 is a side view of the exemplary surf wake system of FIG. 10.

FIG. 15A, FIG. 15B and FIG. 15C are side and top views of other exemplary flap assemblies in accordance with various aspects of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF CERTAIN EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Generally, the present invention relates to a surf wake system for a watercraft that is concerned with flow management of water passing the stern as the water craft is moving forward through a body of water, so that water is directed in such a manner to enhance size, shape and/or other characteristics the resulting wake of the watercraft. As will become apparent below, the surf wake system of the watercraft allows diversion of water passing along one side of the stern away from the usual converging area immediately behind the transom of the watercraft, so that the diverging water will enhance the resulting wake on the opposing side of the watercraft. In doing so, the surf wake system of the present invention allows the enhancement of wake without significant pitching or leaning of the watercraft to one side or the other.

Figure 1:
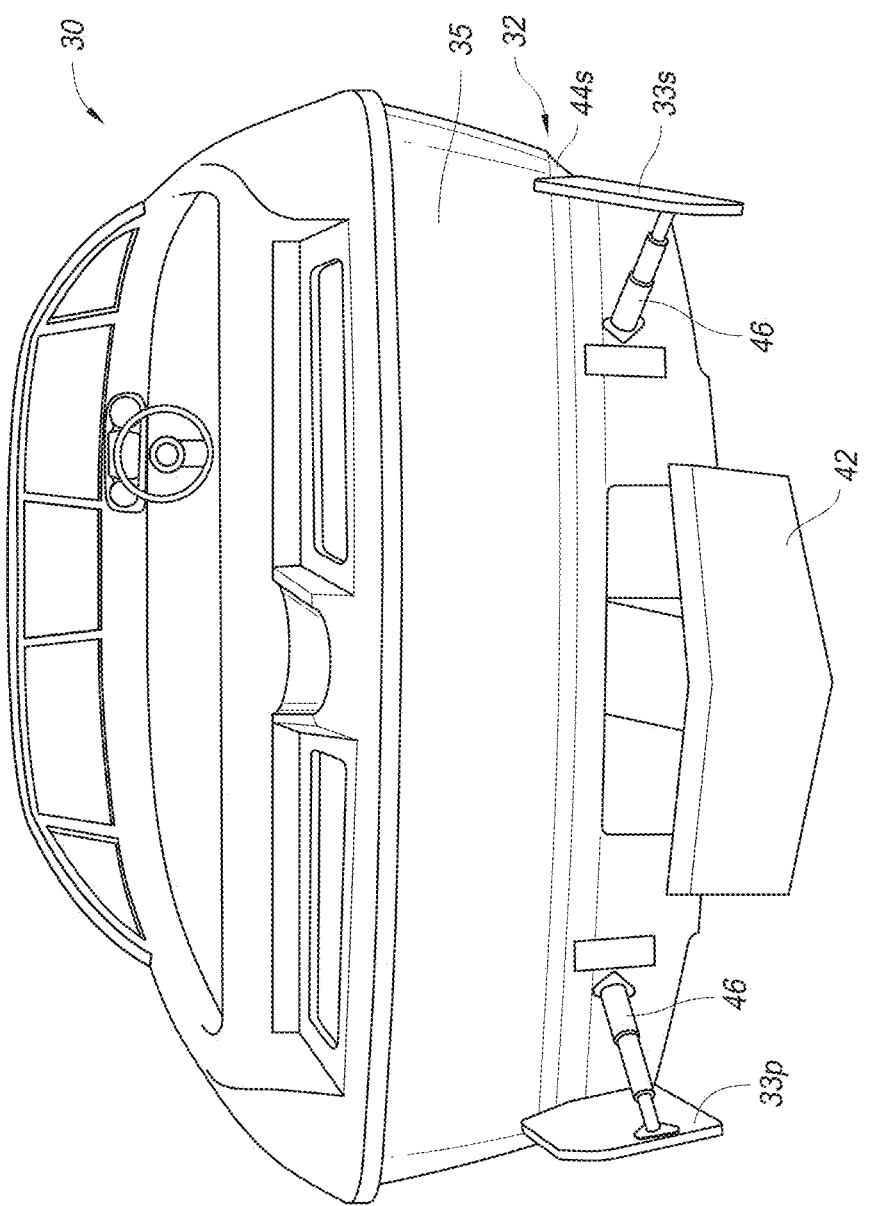
FIG. 1 is a rear perspective view of an exemplary surf wake system including a pair of flap assemblies in accordance with various aspects of the present invention.

Turning now to the drawings, wherein like components are designated by like reference numerals throughout the various figures, attention is directed to FIG. 1 which illustrates a watercraft 30 equipped a surf wake system 32 for modifying a wake formed by the watercraft travelling through water. Advantageously, the surf wake system may enhance surf wakes with or without supplemental ballast and thus it is possible to enhance wake with less watercraft lean. The surf wake system of the present invention in general includes one or more water diverters 33, each water diverter is adjustably mounted relative to the watercraft for deflecting water travelling past a transom 35 of the watercraft. Broadly, the water diverters are movably mounted with respect to transom 35.

In the illustrated embodiment, the water diverters are in the form of flaps 33, pivotally mounted on respective hinges 37, which have a pivot axis 39 extending adjacent and along a side edge 40 of the transom. Although the illustrated embodiment shows the flaps mounted directly on the transom, one will appreciate that the flaps may be moveably mounted directly or indirectly to the transom. For example, the flaps and associated hardware may be mounted on a removable swim platform or other structure that is mounted on or adjacent the transom.

As also shown in FIG. 1, watercraft 30 may be equipped with a wake-modifying device 42 to enhance the overall size of the wake formed by the watercraft. One such device is sold by Malibu Boats as the Power Wedge, which is similar to that described in U.S. Pat. No. 7,140,318, the entire content of which is incorporated herein for all purposes by this reference. Another such device may incorporate pivotal centerline fins of the type developed by Malibu Boats and described in U.S. Patent Application No. 61/535,438, the entire content of which is also incorporated herein for all purposes by this reference. One will appreciate that, while various other wake modifying devices may be very beneficial in enhancing the size and shape of a wake, such other wake modifying devices need not be used, nor is essential to be used, in combination with the surf wake system of the present invention. Similarly, one will appreciate that positioning extra weight or ballast adjacent the transom may also be very beneficial in enhancing the size of a wake, with or without the use of a wake modifying device, however, such weight or ballast need not be used, nor is essential to be used, in combination with the surf wake system of the present invention.

Figure 3:
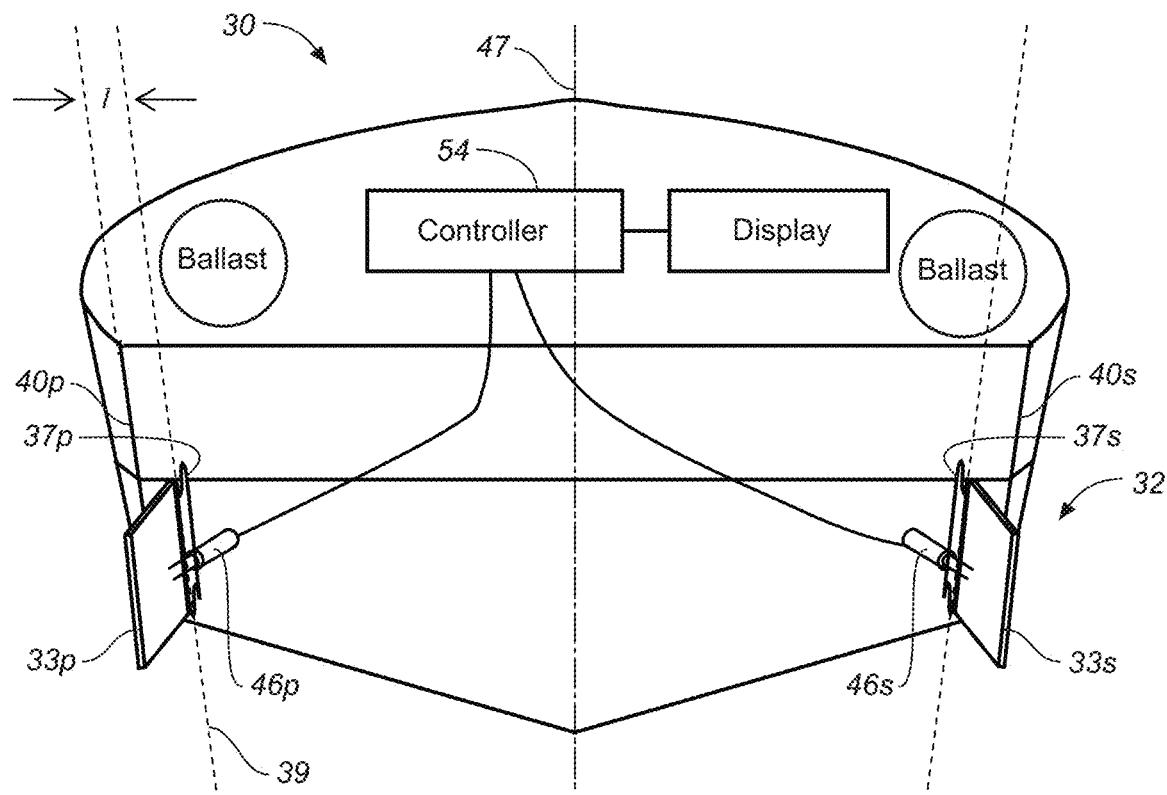
FIG. 3 is a schematic rear view of the exemplary surf wake system of FIG. 1.

Turning now to FIG. 3, a side edge is the intersection of the transom with either a port side strake 44$p$ or a starboard side strake 44$s$, wherein the suffixes "p" and "s" represent features on the port side and the starboard side, respectively. Therefore, the intersection of the transom with the port side strake is referred to as the port side edge 40$p$ and the intersection of the transom with the starboard side strake is referred to as the starboard side edge 40s. Accordingly, a port side flap 33p refers to a flap adjacent the port side edge, and a starboard side flap 33s refers to a flap adjacent the starboard side edge.

In general, a distance L between a respective pivot axis and the side edge is less than the longest dimension of the flap in order to allow the flap to extend parallel to the side strake of the hull or beyond. The distance is preferably less than 10-5 inches and more preferably less than 5 inches. That is, the flaps are positioned away from an imaginary center line or longitudinal axis of the watercraft and adjacent a respective port side or starboard side.

For illustration purposes, the pivot axis of the hinge shown in this application is drawn parallel to the corresponding side edge. One will appreciate that the pivot axis does not necessary need to be parallel to the corresponding side edge. One will also appreciate that the pivot axis may be substantially vertical, substantially parallel to the side edge, some other angle therebetween, or some angle slightly inclined with respect to the side edge. Preferably the angle between the pivot axis and the side edge is less than approximately 15°, more preferably less than 10°, and even more preferably less than 5°.

Figure 2:
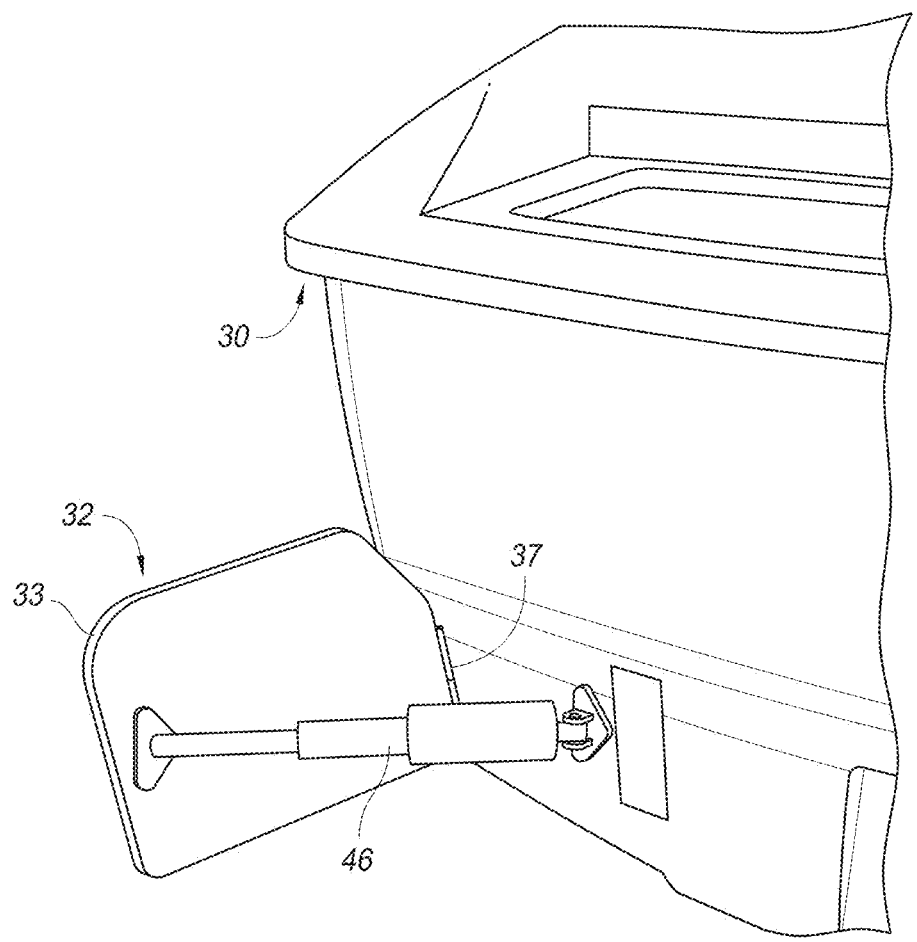
FIG. 2 is an enlarged perspective view of one of the flap assemblies of FIG. 1.

With reference to FIG. 1 and FIG. 2, the surf wake system also includes one or more positioners or actuators 46, each secured on the watercraft and operably connected to a respective flap 33. In the illustrated embodiment, the actuators are linear actuators including electric motors. However, one will appreciate that other suitable actuators may be employed to move the flaps, including hydraulic and pneumatic motors. Preferably the actuators are watertight or water resistant, and more preferably waterproof. The actuators are configured to pivot the flaps about their respective pivot axis and position the flaps in different positions, as will be discussed in greater detail below. One will also appreciate that manual actuators or positioners may be utilized to secure the flaps in a desired position.

In various embodiments, the actuators may be electric actuators of the type manufactured by Lenco Marine Inc. which include a linearly-extendable threaded rod assembly driven by a step motor. In various embodiments, the actuator may be configured to move between an inner retracted position and an outer extended position, while in other embodiments, the actuators are configured to also move to one or more interim positions, for example, every 5°, 10°, 15°, etc. By activating the actuator for predetermined periods of time, the actuator may be accurately and repeatedly controlled to move to the desired position. One will appreciate that the actuator may be configured to accommodate a wide variety of angular ranges as well as interim positions.

One will also appreciate that other actuators may be utilized in accordance with the present invention. For example, hydraulic and pneumatic actuators may be used, as well as manual actuators.

Figure 4A:
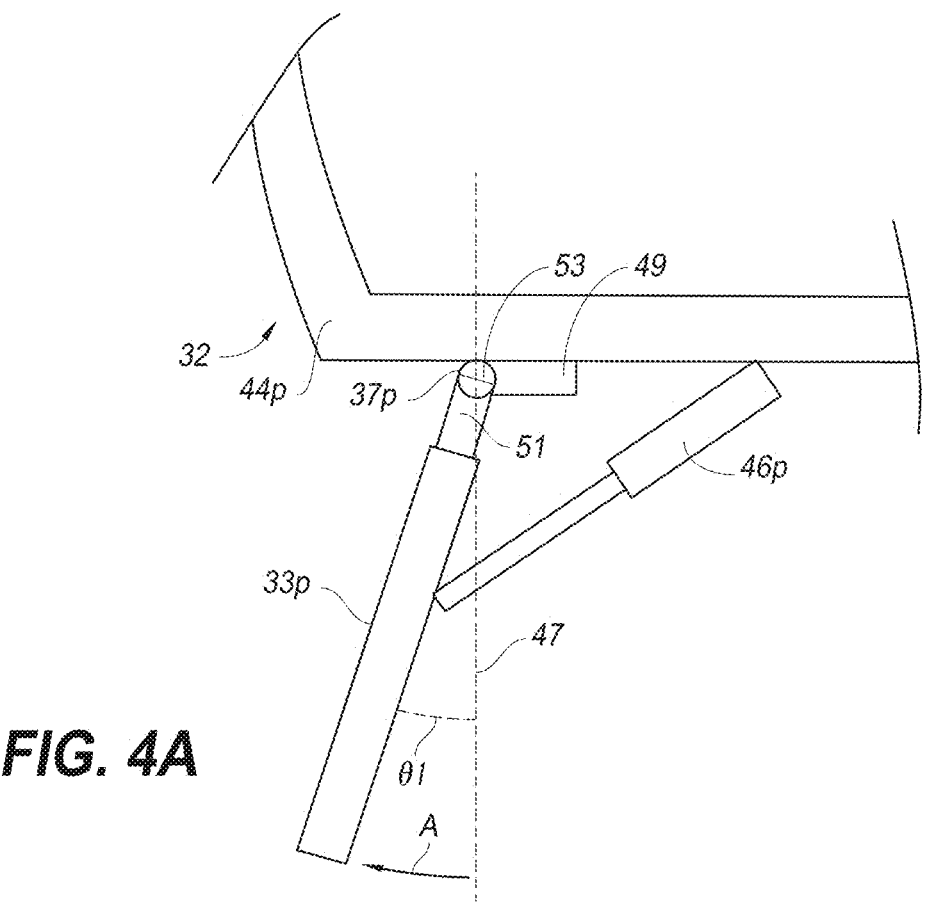
FIG. 4A and FIG. 4B are schematic views of the flap assembly of FIG. 2 in extended and retracted positions, respectively.
Figure 4B:
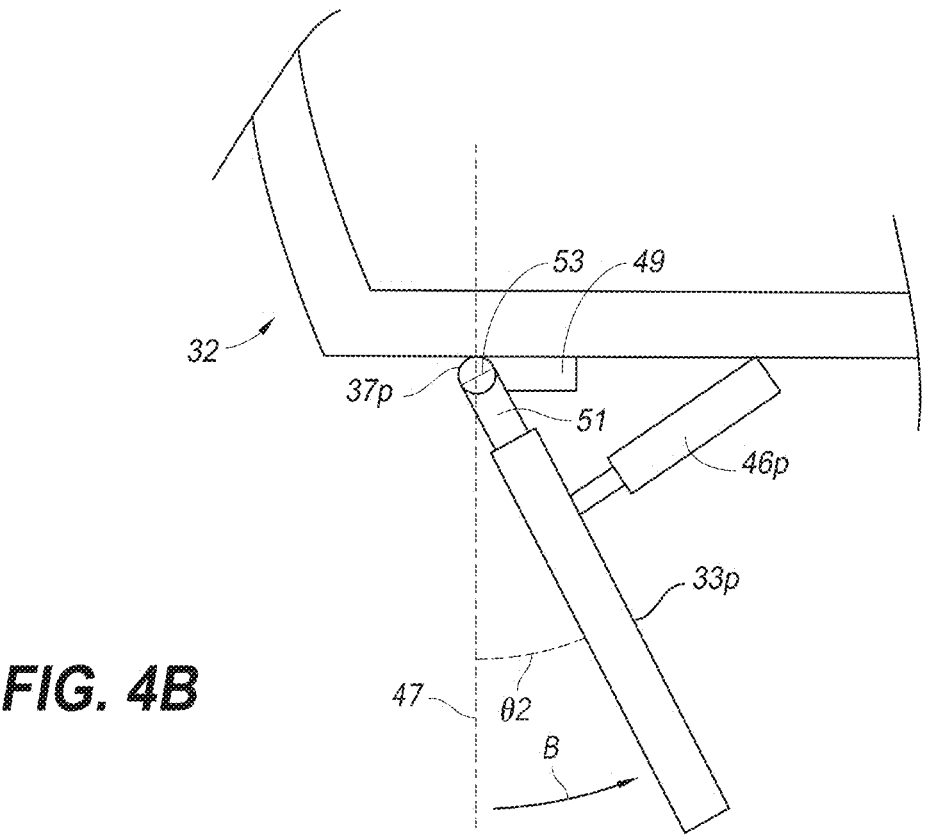

Turning now to FIG. 4A and FIG. 4B, port side flap 33p is shown in two different positions, namely an outward position in FIG. 4A and a neutral position in FIG. 4B. As illustrated, the flap in the outward position extends away from a longitudinal axis 47 of watercraft 30 as the flap moves in the direction illustrated by arrow A. In the illustrated embodiment, the flap and has at least a portion of the flap extending outwardly beyond the side strake and the transom. In the neutral position, the flap extends toward the center line as it moves in the direction illustrated by arrow B and is located behind the transom and inboard of the side strake 44p. In various embodiments of the present invention, the flap has an angle θ1 of approximately 0° to 45°, preferably between 5° to 30°, and more preferably 5° to 15° relative to the longitudinal axis of the watercraft when the flap extends to its outermost position, and has an angle θ2 of approximately 0 to −90°, preferably −15° to −30° relative to the longitudinal axis when the flap extends in its innermost position. One will also appreciate that system may be configured to allow the flap to laterally extend beyond the side strake substantially perpendicular to the longitudinal axis of the watercraft in order to redirect and/or deflect water passing along the water craft as it moves beyond the transom. Alternatively, one will appreciate that the flap may extend parallel to the longitudinal axis to direct water straight back and prevent water from flowing directly behind the transom. While extending the flap beyond the side strake will likely delay convergence of water to a greater degree (as will become apparent below), extending the flap parallel to the longitudinal axis may sufficiently delay convergence of water to produce a desired waveform.

One will appreciate that the surf wake system of the present invention may be configured to hold the flaps in one or more interim positions between their respective outward and neutral positions. For example, the surf wake system may be configured to hold the flaps at 0°, 5°, 10°, 15°, 20°, 25°, 30° and etc. relative to the centerline. Such interim positions may allow the system to further modify or incrementally modify the resulting wake, and may thus accommodate surfer preferences. For example, such interim positions may more precisely shape the wake to accommodate for specific watercraft setup, watercraft speed, watercraft weight, passenger weight variances and distributions, and other variables to provide a desired wake shape and waveform. Moreover, a number of interim positions may optimize waveform for various other parameters such user preferences. For example, experienced surfers may prefer larger faster wakes, while novice surfers may want a smaller, slower manageable wake.

As a watercraft travels through water, the watercraft displaces water and generates waves including bow waves and diverging stern waves. Due to pressure differences and other phenomena, these waves generally converge in the hollow formed behind the watercraft and interfere with each other to form an otherwise conventional wake behind the watercraft, such as that shown in FIG. 6A. As noted above, such a wake is generally small, choppy or too close to the watercraft to be suitable and safe for water sports, and particularly not suitable for wake surfing.

By moving a flap of the present invention to an outward position, however, water is redirected, which may lead to constructive interference to form a larger wake having a higher peak and a smoother face, which wake is conducive for surfing. In addition, the flap may redirect water so that the larger wake is formed further away from the watercraft, and thus creating a safer environment for surfing. Moreover, by placing the flaps along the side edges, the watercraft can generate a suitable surfing wake with less tilt or lean to one side, thus making the watercraft easier to control. One will appreciate that the flaps may enhance wake shape and size with or without the use of significant additional weight or ballast located toward the rear corners of the watercraft. Other advantages will become apparent later on in the description of the operation of the present invention.

In various embodiments of the present invention, the wake system may include one or more flap assemblies, for example, one or more port flap assemblies, and/or one or more starboard flap assemblies may be used. Preferably, the wake system is configured and positioned to have one flap and corresponding hinge immediately adjacent each of the port side edge and the starboard side edge.

In various embodiments of the present invention, the flap is a substantially planar member, as can be seen in FIG. 2. The flap is generally dimensioned and configured such that the top of the flap is located within the resting freeboard distance (i.e., the distance between the waterline and the gunwale) and will be located approximately at the waterline while the watercraft is at use accommodating for both watercraft speed and displacement with additional ballast and/or passenger weight.

In the illustrated embodiment, the flap is approximately 14 inches high, approximately 17 inches long and approximately ¾ inch thick. One will appreciate that the actual dimensions of the flap may vary. Preferably, the flap is approximately 10-18 inches high, approximately 12-22 inches long, and approximately ½ to 1¼ inches thick, and more preferably approximately 12-16 inches high, 15-19 inches long, and ¾ to 1 inch thick. One will appreciate that the deeper the flap extends below the waterline, the more water will be diverted.

In addition, one will appreciate that the flap need not be planar and its actual dimensions will vary depending on the size of the watercraft, the demand of the type of the wake and/or other factors. Other suitable configurations and sizes can be employed, including curved surfaces, curved edges, different geometric profiles, and/or different surface textures. The flap can be made of plastic, stainless steel, fiberglass, composites, and/or other suitable materials. For example, the flap may be formed of gelcoated fiberglass and/or stainless steel trim plate.

As shown in FIGS. 4A-4B, in the illustrated embodiment, hinge 37, is a jointed device having a first hinge member 49 pivotally affixed to a second hinge member 51 by a pin 53. First member 49 is affixed to the watercraft and second member 51 is affixed to flap 33. One will appreciate that other hinge devices may be utilized. For example, the hinge may include a flexible member allowing relative pivotal motion instead of a pinned joint. In addition, various configurations may be utilized. For example, the second member may be monolithically formed with the flap.

Turning back to FIG. 3, wake system 32 may include a controller 54 that is operationally connected to actuators 46, of the wake system, which actuators selectively control the positions of respective flaps 33.

An exemplary method of operating the surf wake system in exemplary embodiments of the present invention will be explained with reference to FIGS. 5-8. A pair of flaps 33p, 33s with their respective hinges 37p, 37s and actuators 46p, 46s are installed on transom 35 of the watercraft adjacent respective side edges 40, one on the port side and the other on the starboard side of the watercraft. One will appreciate that the present invention is not limited to this specific configuration. The number of the flaps and the positions thereof can be varied as noted previously.

Figure 5A:
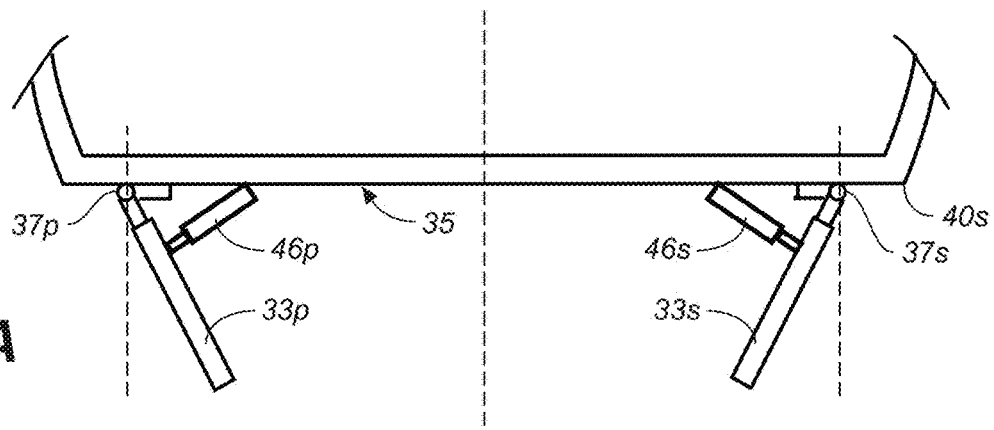
FIG. 5A, FIG. 5B and FIG. 5C are schematic views of the exemplary surf wake system of FIG. 1 in which the flap assemblies are positioned for cruising, a starboard side surf wake, and a port side surf wake, respectively.
Figure 6A:
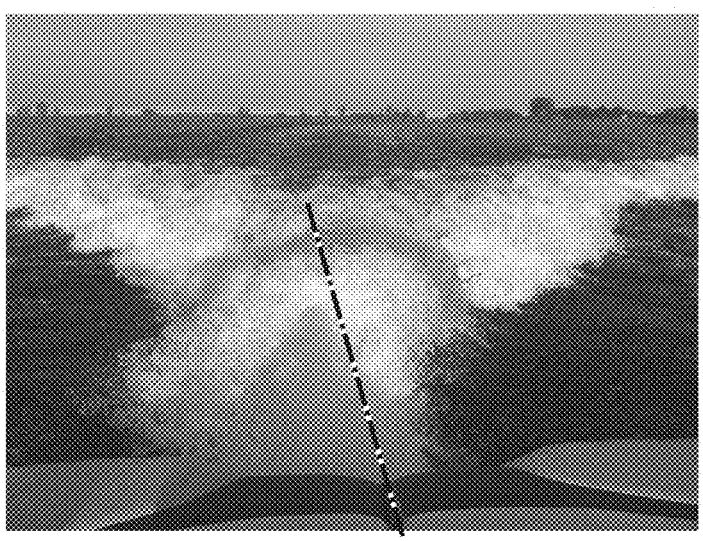
FIG. 6A, FIG. 6B and FIG. 6C illustrate conventional, starboard surf, and port surf wakes, respectively, as produced by the surf wake system of FIG. 1.

As shown in FIG. 5A, both flaps are retracted and positioned in their neutral positions behind transom 35, and not extending outward or outboard form their respective port and starboard side strakes 44p, 44s. At such positions, the flaps in general do not interference with the waves generated by the watercraft travelling through water, and hence have no or negligible effects on the wake, and thus the flaps can be positioned in such configuration for cruising. As shown in FIG. 6A, having the flaps positioned in the manner illustrated in FIG. 5A does not redirect water passing by the transom that thus produces an otherwise conventional wake, that is, one without a smooth face or a high peak, and is thus not suitable for surfing.

Figure 5B:
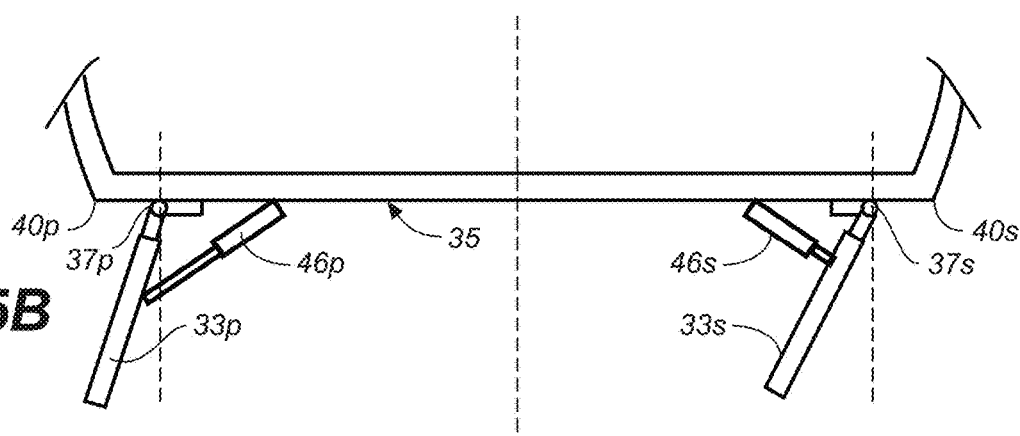
Figure 6B:
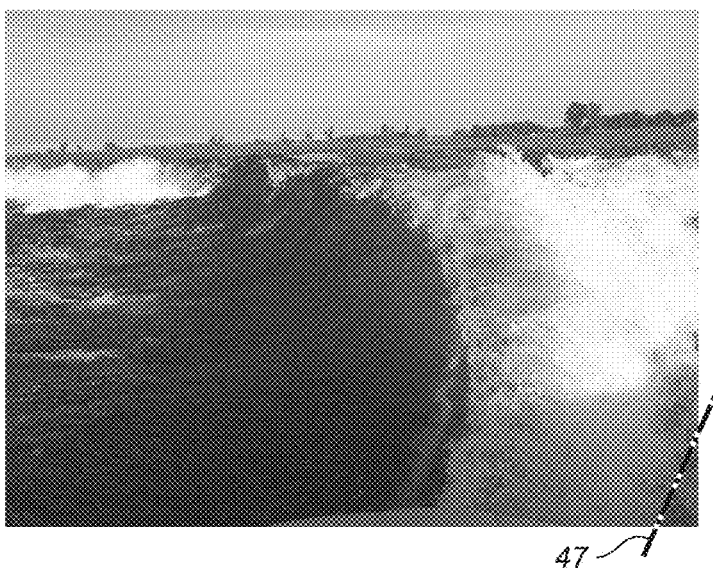
Figure 6C:
Figure 6D:
FIG. 6D shows a wake having a starboard-side surf wake and a disorganized port-side wake.

Turning to FIG. 5B, when a starboard surf wake is desired, port side flap 33p is positioned in an outward position while the starboard side flap 33s remains in a neutral position. Since the port side flap is in an outward position and thus extends beyond the port side strake 44p, waves on the port side are redirected, which facilitates constructive interference of converging waves to form a larger starboard wake with a higher peak and smoother face that is suitable for starboard surfing, such as that shown in FIG. 6B. Comparing to the non-enhanced wake of FIG. 6A with the starboard wake shown in FIG. 6B, it is evident that surf wake system 32 modified and/or enhanced the wake with a smooth face and a relatively high peak. As can be seen in FIG. 6B, waist-high peaks of three or four feet are attainable, thus providing a reproducible wake that is suitable for surfing. FIG. 6D shows a wake having a starboard-side surf wake that is suitable for wake surfing and a disorganized port-side wake that is not suitable for wake surfing. In some embodiments, when the port side flap 33p is deployed (e.g., in an outward position) and when the starboard side flap 33s is in the neutral position, the wake of the water craft can have a starboard-side surf wake and a disorganized port-side wake (as shown in FIG. 6D).

Figure 5C:
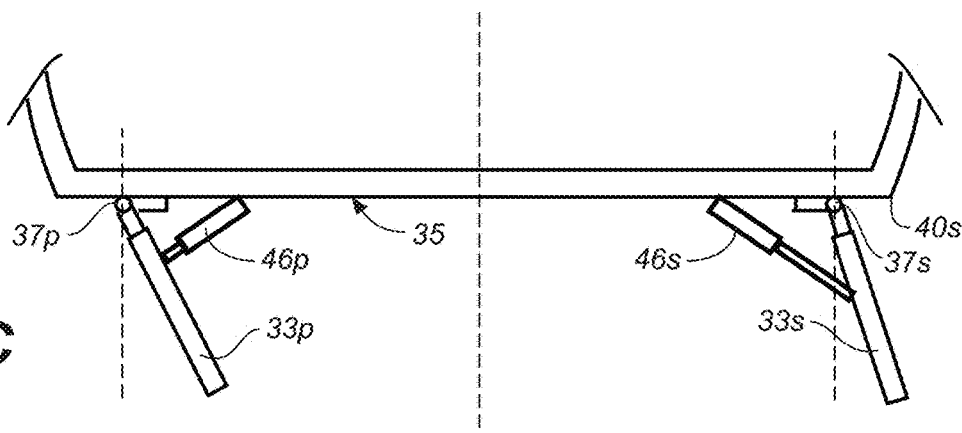
Figure 6E:
FIG. 6E shows a wake having a port-side surf wake and a disorganized starboard-side wake.

Turning to FIG. 5C, when a port side surf wake is desired, starboard side flap 33s is positioned in an outward position while the port side flap 33p remains in a neutral position. Now that the starboard side flap is an outward position, the surf wake system, a port side wake, such as that shown in FIG. 6C is produced in a manner similar to that described above. Such configuration produces a left side surf wake. Comparing to the non-enhanced wake of FIG. 6A with the port side wake shown in FIG. 6C, it is evident that surf wake system 32 modified and/or enhanced the port side wake with a smooth face and a relatively high peak. As can be seen in FIG. 6C, waist-high peaks of three or four feet are attainable, thus providing a reproducible wake that is suitable for surfing. FIG. 6E shows a wake having a port-side surf wake that is suitable for wake surfing and a disorganized starboard-side wake that is not suitable for wake surfing. In some embodiments, when the starboard side flap 33s is deployed (e.g., in an outward position) and when the port side flap 33p is in the neutral position, the wake of the water craft can have a port-side surf wake and a disorganized starboard-side wake (as shown in FIG. 6E).

As noted before, the watercraft equipped with the surf wake system of the present invention can generate a suitable surfing wake with or without adding significant extra weight at a rear corner of the watercraft. As such, weight need not be moved from one side to another, and thus no significant shifting of the watercraft from one side to the other is not required, and thus there are no significant changes to the handling of the watercraft. The surf wake system of the present invention allows switching from a port side wake to a starboard wake, or vice versa, on demand or "on the fly" thus accommodating both regular (or natural) and goofy surfers, as well as surfers that are sufficiently competent to switch from a port side wake to a starboard wake while under way. To this end, the controller is preferably configured to allow operation of the actuators on-demand and on-the-fly.

In addition to modifying wakes for recreational purposes, the water diverters of the surf wake system may be activated for other purposes such as steering assist. For example, the port flap may be actuated to provide turning assist to the left at gear idle, and similarly the starboard flap actuated to provide turning assist to the right. Thus, with an appropriate flap extended, the watercraft may turn within a very small radius around a fallen skier, boarder or surfer. Also, it is sometimes difficult for inboard watercraft to turn to left while moving backwards, the flaps may be activated to assist in such maneuvering. One will appreciate that the control system may be configured to utilize input from the steering system and/or the drive system to determine an appropriate level of "turning assist". For example, the control system may be configured such that turning assist would only work below a predetermined speed, for example 7 mph. One will also appreciate that such turning assist may utilize controls that that are integrated into the surf wake system, or alternatively, such turning assist may utilize discrete controls to that are separately activated in accordance with the needs of turning assistance.

Figure 7:
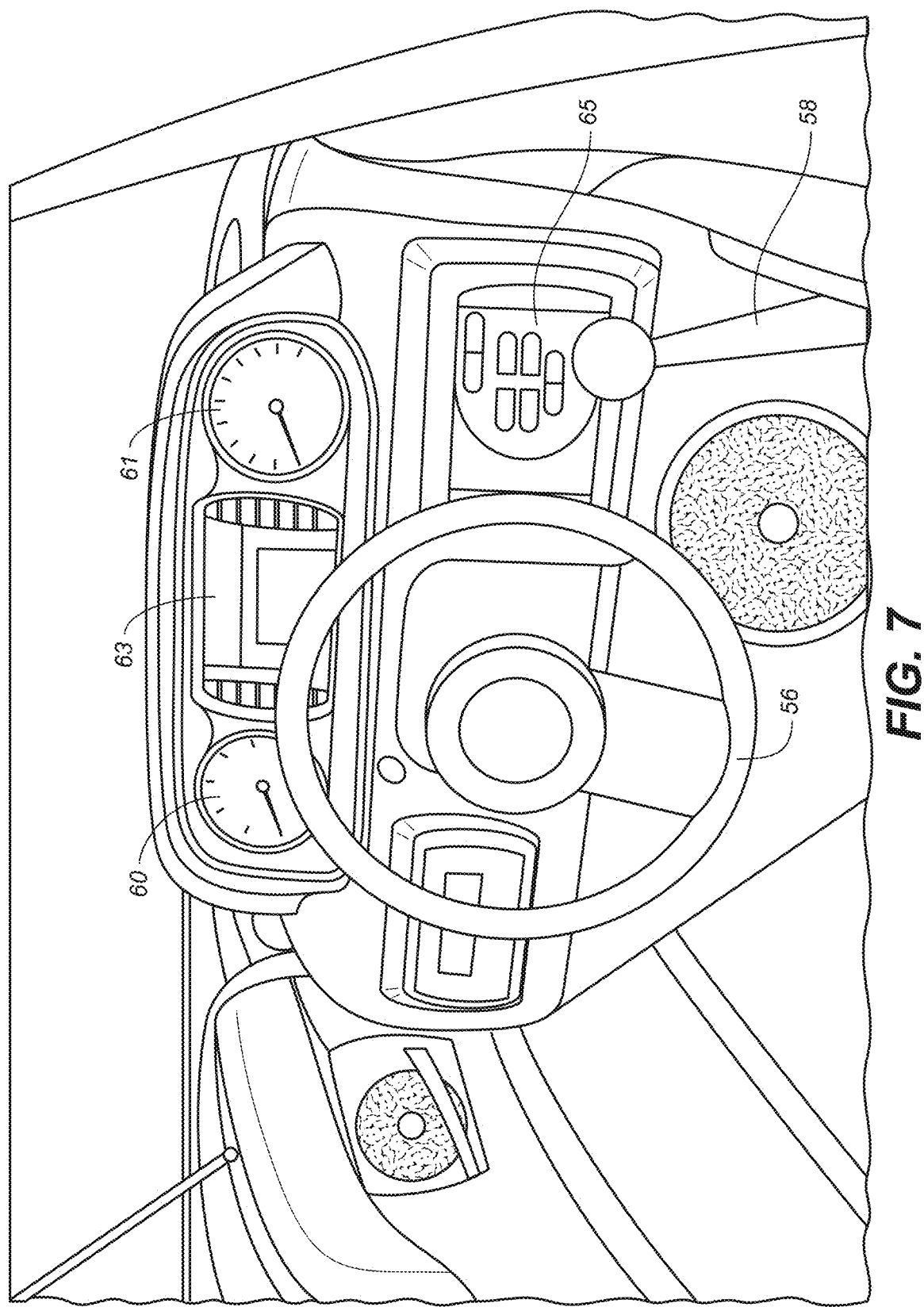
FIG. 7 is a perspective view of an exemplary cockpit of a watercraft incorporating a surf wake system including an input controller for operation of the surf wake system.

Turning now to FIG. 7, watercraft 30 includes a steering wheel 56 and throttle control 58 and instrument panel bearing a tachometer 60 and speedometer 61. In addition, the water craft includes a multipurpose graphical display 63 and/or a discrete input device 65. The graphic display and the touch screen are operably connected to or integrated with controller 54. In the illustrated embodiment, the input device is a discrete touch screen, however, one will appreciate that the graphic display and the input device may be integrated into a single device, for example, a single screen that is suitable for both displaying information and receiving touch screen inputs. Alternatively, a variety of switches, buttons and other input devices may be utilized instead of, or in addition to, a touch screen device.

Display 63 is configured to convey a variety of desired information such as speed of the watercraft, water depth, and/or other useful information concerning the watercraft and operation thereof including, but not limited to, various service alerts, such as low oil pressure, low battery voltage, etc., and/or operational alerts such as shallow water, bilge pump status, etc.

Input device 65 is primarily configured to receive a variety of input commands from the watercraft operator. In accordance with the present invention, and with reference to FIG. 8A, the input display includes a SURF GATE center which serves as input control for operation of surf wake system 32. As shown, the input control may include buttons 67 to activate surf wake system 32 to generate a surfable wake on the left portside or on the right starboard side. For example, if the operator chooses to generate a portside surfable wake, the operator may select left button 67, which in turn would cause controller 54 to extend flap 33s to generate a left port side wake in the manner described above. And the operator may similarly press right button 67 to generate a right starboard side surfable wake. In accordance with the present invention, an operator may reconfigure the watercraft to switch from a left surf wake mode to a right surf wake mode by pressing a single button.

One will appreciate that other suitable input means may be utilized to activate the flaps. For example, a graphic or virtual slide assembly may be provided to activate the flaps as to the desired degree left or right, or a plurality of graphic or virtual buttons may be provided to activate the flaps to the desired degree left or right. In addition, one will appreciate that mechanical and/or electromechanical switches and input devices may also be used to activate the flaps as desired. For example, in some embodiments, one or more levers, knobs, switches, or other mechanical input devices can be used to receive input from a user. The mechanical input devices can be mechanically coupled to the flaps (e.g., water diverters), e.g., via a cable, rod, or other mechanical coupling element, such that actuation of the mechanical input element actuates the flaps (e.g., water diverters).

With reference to FIG. 8A through FIG. 8F, input device 65 serves as an input device for other watercraft systems such as Malibu Boats' POWER WEDGE system, ballast tank systems (see, e.g., FIG. 8C), lighting systems (see, e.g., FIG. 8D), etc.

Figure 8A:
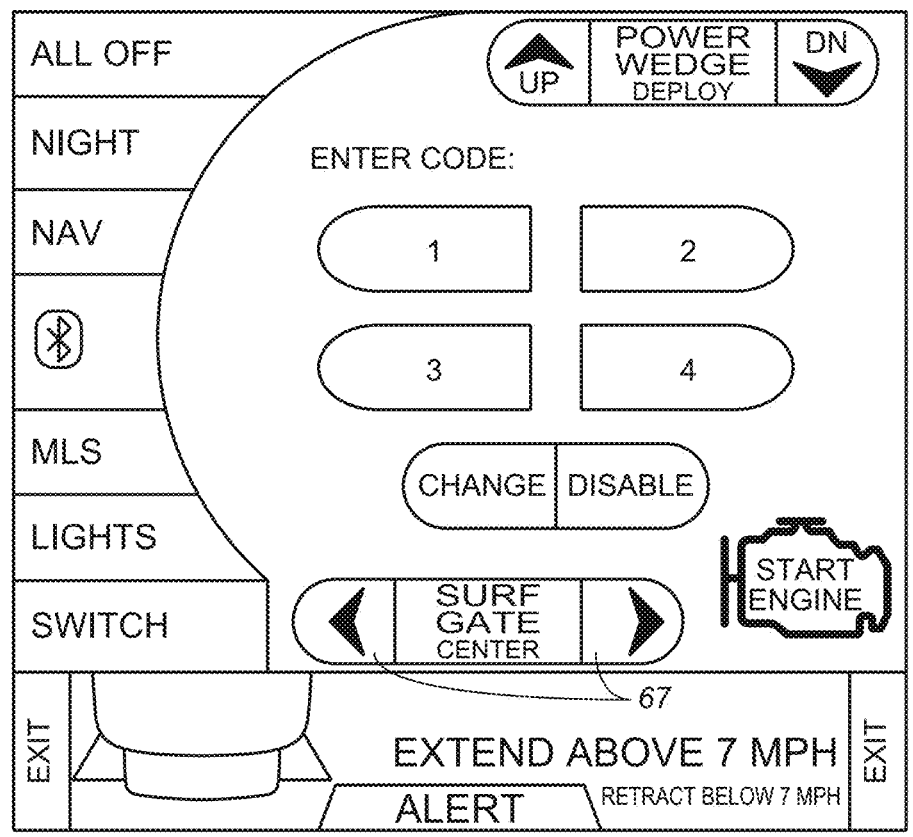
FIG. 8A, FIG. 8B, FIG. 8C, FIG. 8D, FIG. 8E and FIG. 8F are exemplary screen shots of the input controller of FIG. 7.
Figure 8B:
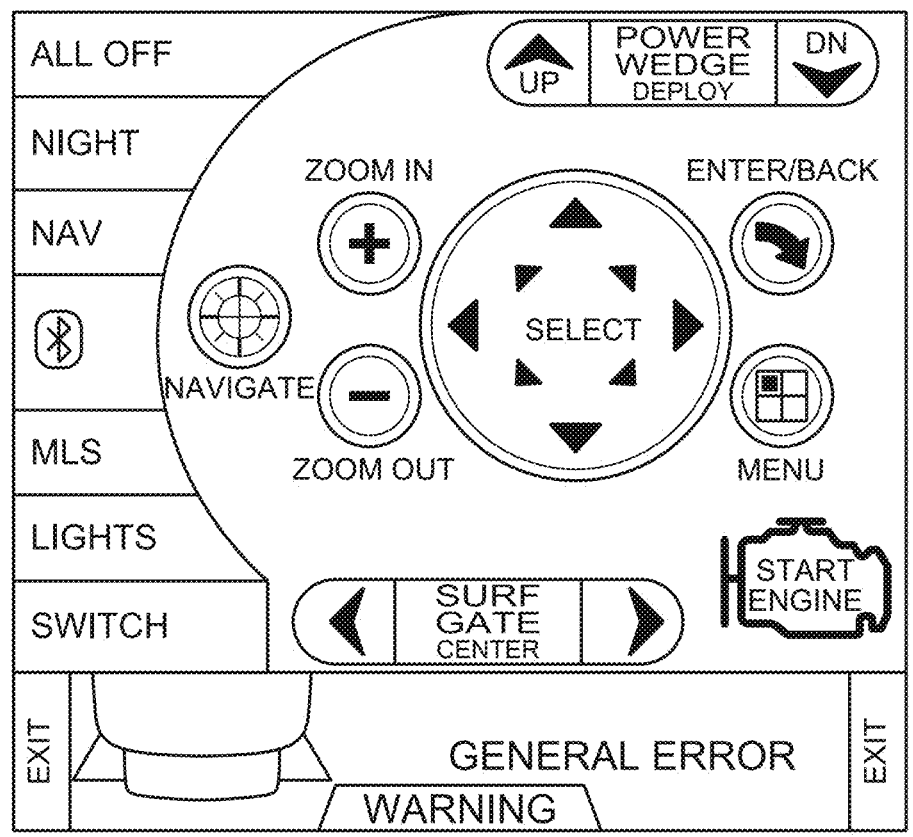
Figure 8C:
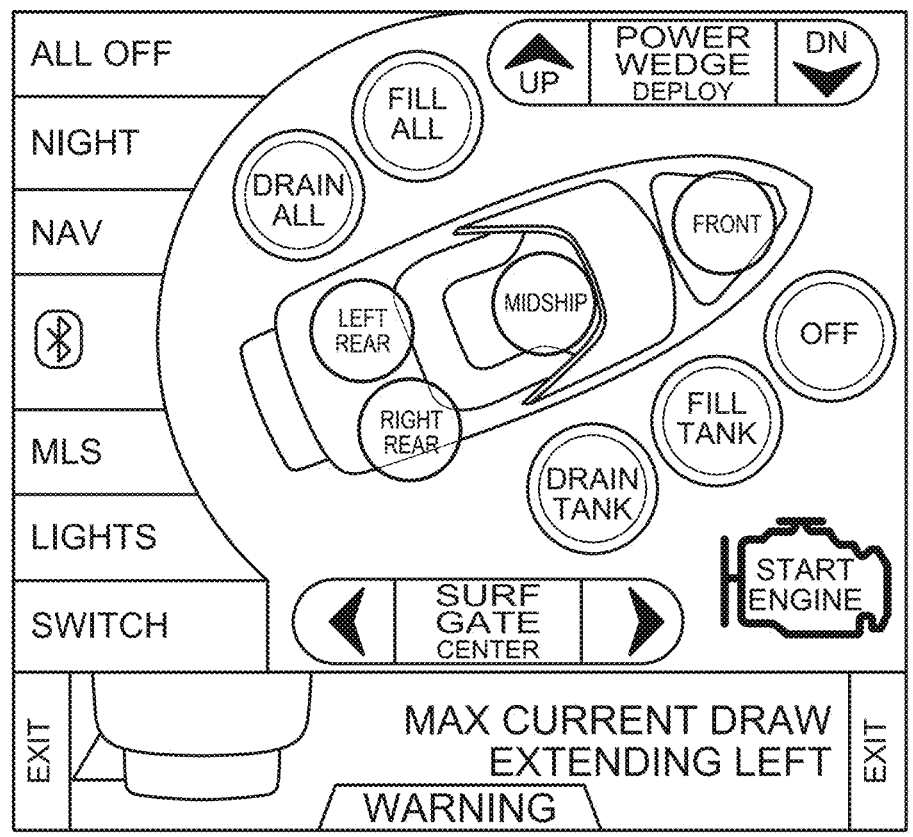
Figure 8D:
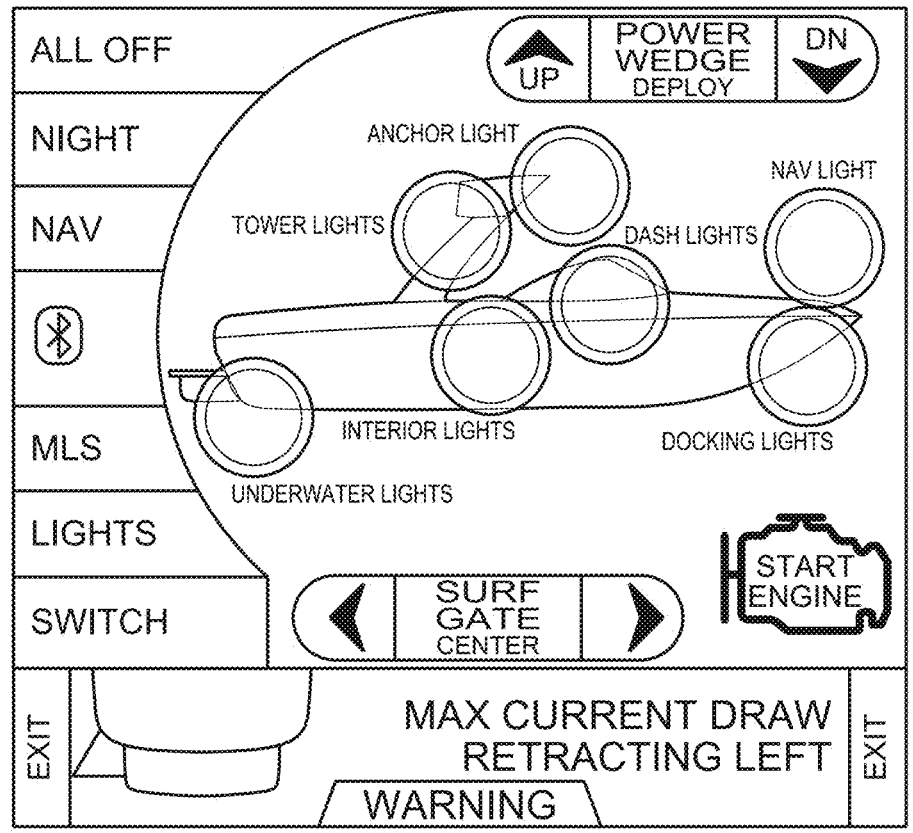
Figure 8E:
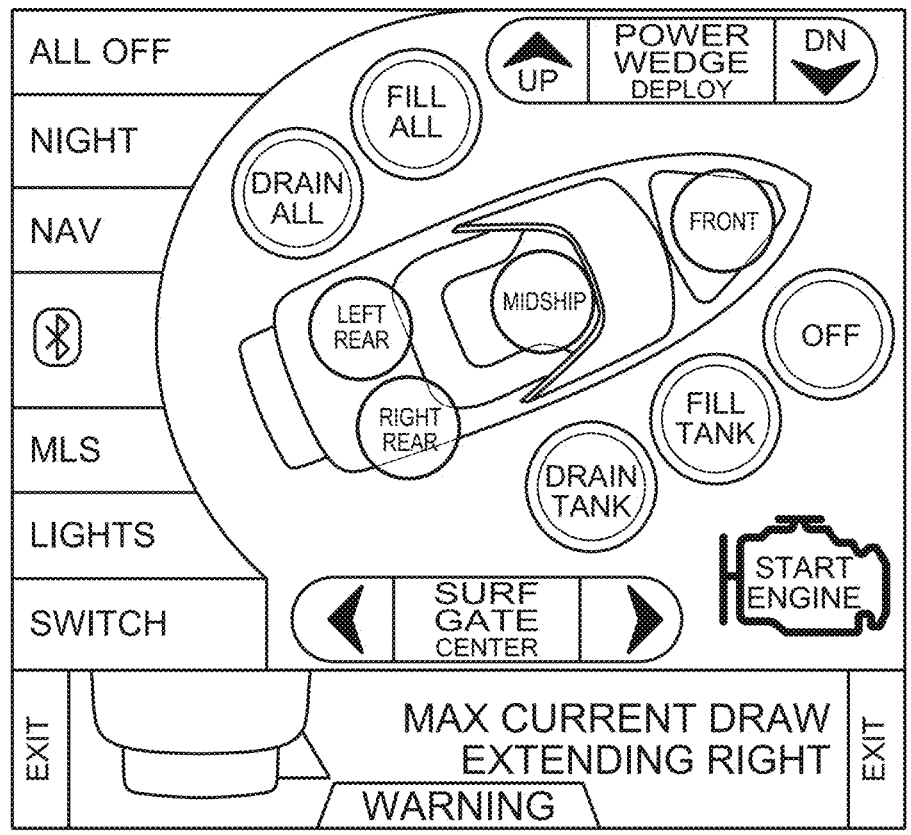
Figure 8F:
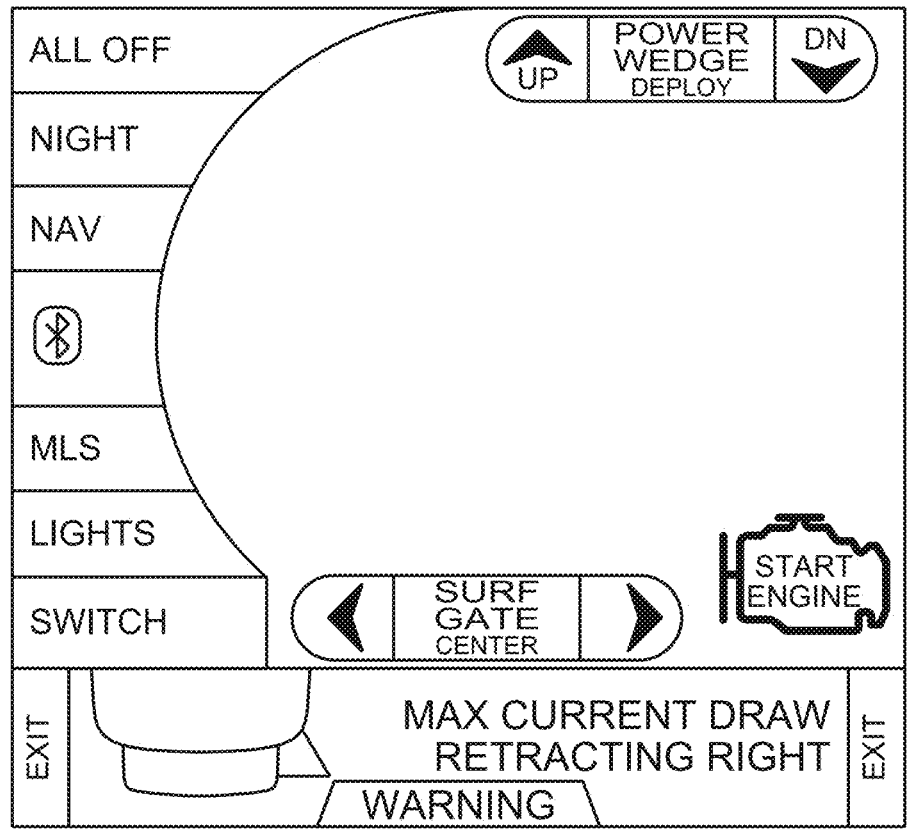

Also, input device 65 may also provide various alerts regarding the operation of the surf wake system. For example, FIG. 8A illustrates an operational alert that the once activated, surf wake system will extend above 7 mph and retract under 7 mph. One will appreciate that the surf wake system may be configured to operate only within various speeds deemed suitable for surfing, and may vary from moving to about 20 mph, and in some cases from about 7 mph to about 13 mph. FIG. 8B illustrates a general error alert, FIG. 8C through FIG. 8F illustrate a maximum current warnings for various stages of flap operation to alert the operator of excessive resistance in moving the flaps form one position to another.

In various embodiments, the surf wake system can be configured with various safety features which limit operation and/or alert the driver to various situations. For example, the system may be configured to provide a visual and/or audible alarm to alert the operator when the watercraft is traveling faster than a predetermined speed, for example 15 mph.

Figure 9:
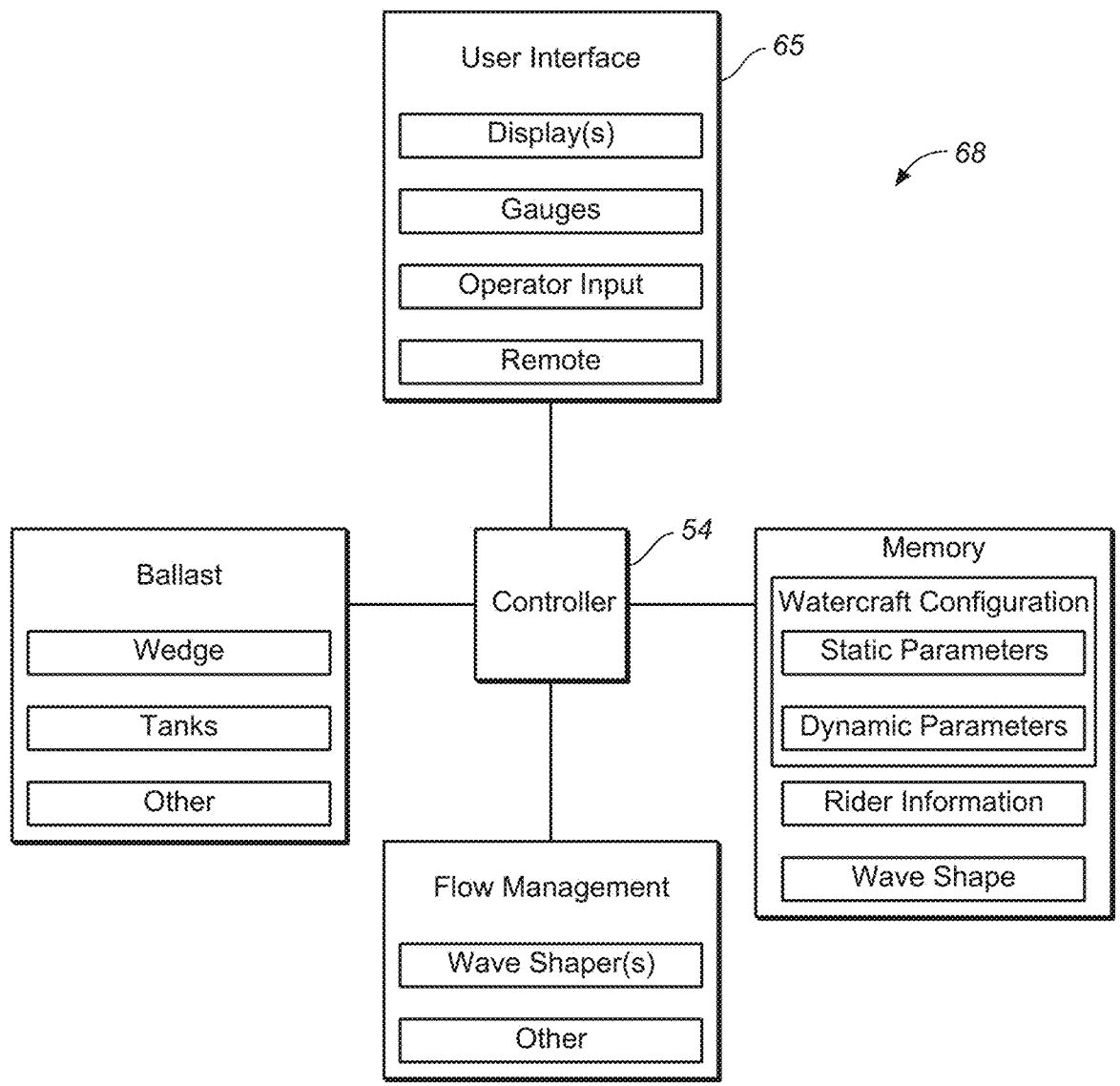
FIG. 9 is a schematic view of an exemplary control system of a surf wake system in accordance with the present invention.

FIG. 9 is a schematic of an exemplary control system 68 in which the user interface, in the illustrated embodiment, input device 65 communicates with controller 54 in order to control flow management by operating associated wave shaper(s), (e.g., flaps 33 and actuators 46). As illustrated and as noted above, input device 65 may also be configured to control other watercraft systems including Malibu Boats' POWER WEDGE system, ballast tank systems.

Control system 32 may also include a memory that is configured to store information regarding watercraft configuration including static parameters such as hull shape, hull length, weight, etc., as well as dynamic parameters passenger weight, ballast, wedge, speed, fuel, depth, wind, etc. The memory may also include "Rider" information regarding the surfer (or boarder or skier), including goofy/regular footed, weight, board length, board type, skill level, etc. Moreover, the memory may be configured to store "presets" that include the information regarding a specific "Rider" including the Rider information as well as the Rider's preferences such as left or right wave, a preferred watercraft speed, a preferred wake height, etc. One will appreciate that the presets could be for the surf wake system as well as other parameters including POWER WEDGE setting, watercraft speed, goofy/regular footed, steep wave face, amount of weight, wave size, etc. One will appreciate that such presets would allow the watercraft operator to quickly reconfigure the surf wake system to accommodate various "Riders", for example very experienced professional wake surfers, beginner wake surfers, and anyone in between.

Control system 32 may also include a remote which may allow a rider to actuate the surf wake system. For example, a remote may allow a rider to further deploy or retract flap 33, to an interim position to vary the size of the wake.

One will appreciate that control system 32 may be integrated into the watercraft, for example, fully integrated with a CAN bus of the watercraft. Alternatively, the control system may be an aftermarket solution which may be installed on a watercraft, either connecting into the CAN bus, or operating completely independently of the CAN bus.

Figure 10:
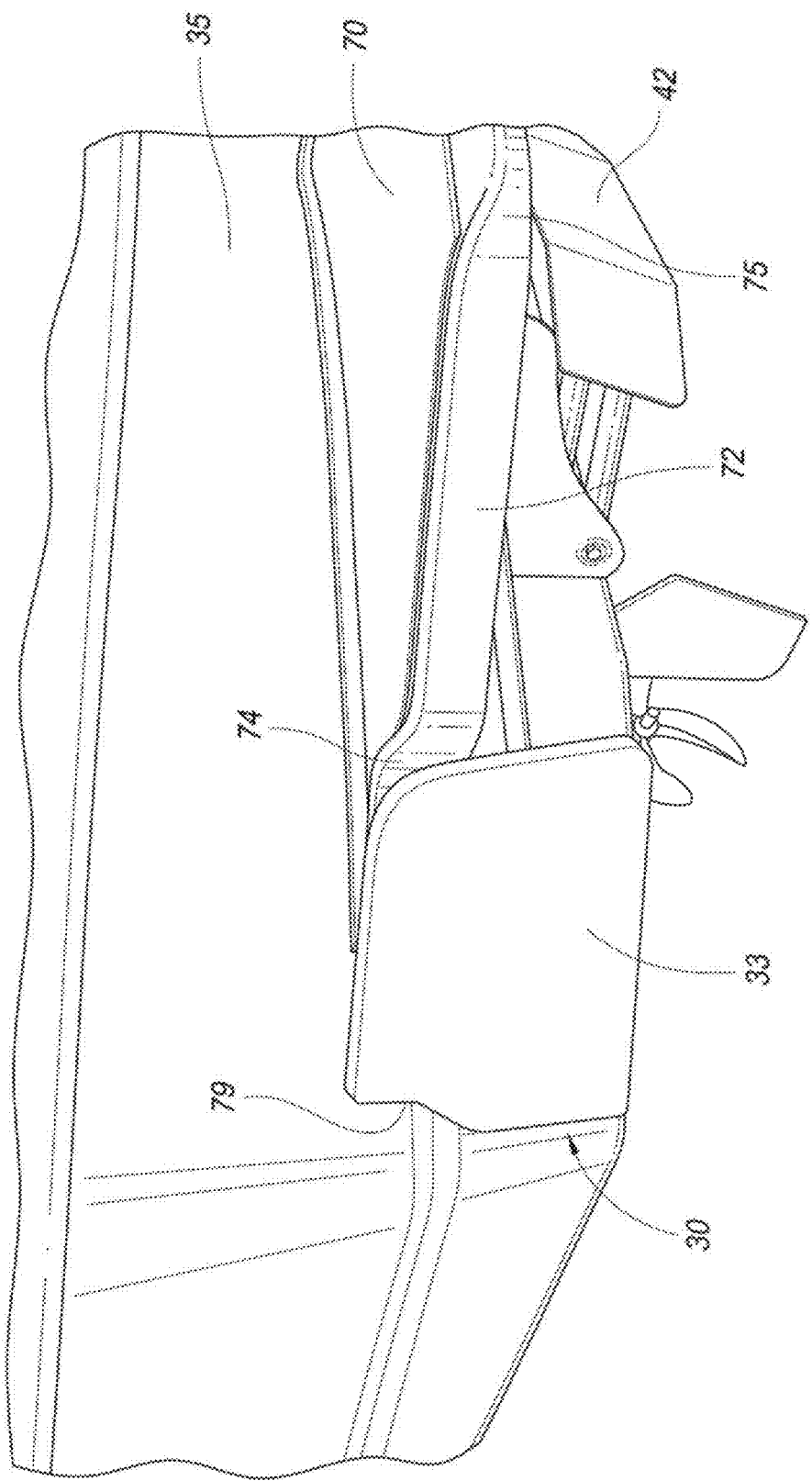
FIG. 10 is a rear perspective view of an exemplary surf wake system including contoured flap assemblies with a complementary swim platform in accordance with various aspects of the present invention.

Turning now to FIG. 10 and FIG. 11, surf wake system 32 may be utilized with a swim platform 70. In the illustrated embodiment, the swim platform includes tapered sides 72 having recessed notches 74 which provide space to receive flaps 33, therein. Such tapered sides and notches allow for flaps 33, to return to neutral positions which have little to no effect on the wake, while allowing for a larger surface area of the swim platform. In the illustrated embodiment, the tapered sides extend inwardly approximately 15-30° from the longitudinal axis, however, one will appreciate that actual angle that the tapered sides angle in may vary, for example, up to approximately 45°. Also, although the depth of the notch is approximately equal to the thickness of the corresponding flap, one will appreciate that the actual dimensions of the notch may vary.

As shown in FIG. 10, the swim platform has rounded corners 75 which are also configured to diminish the effect the swim platform has on the resulting wake. In this regard, the rounded corners lessen the amount of swim platform that contacts water flowing behind the transom, and thus lessens any adverse effect the swim platform may have on the modified wake.

Figure 12A:
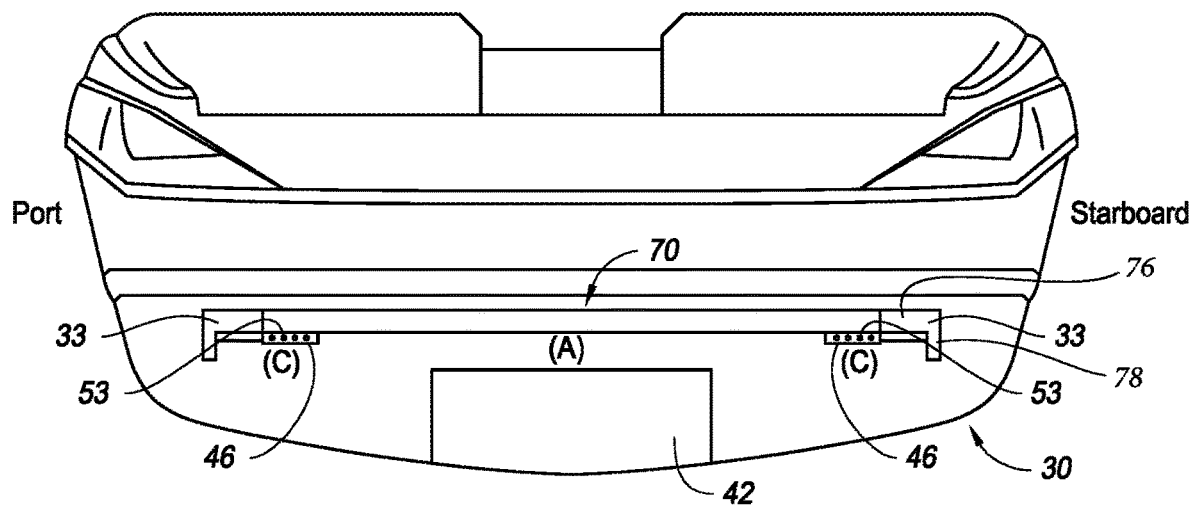
FIG. 12A and FIG. 12B are a rear and plan views of an exemplary surf wake system including a flap assembly integrated with a complementary swim platform in accordance with various aspects of the present invention.
Figure 12B:
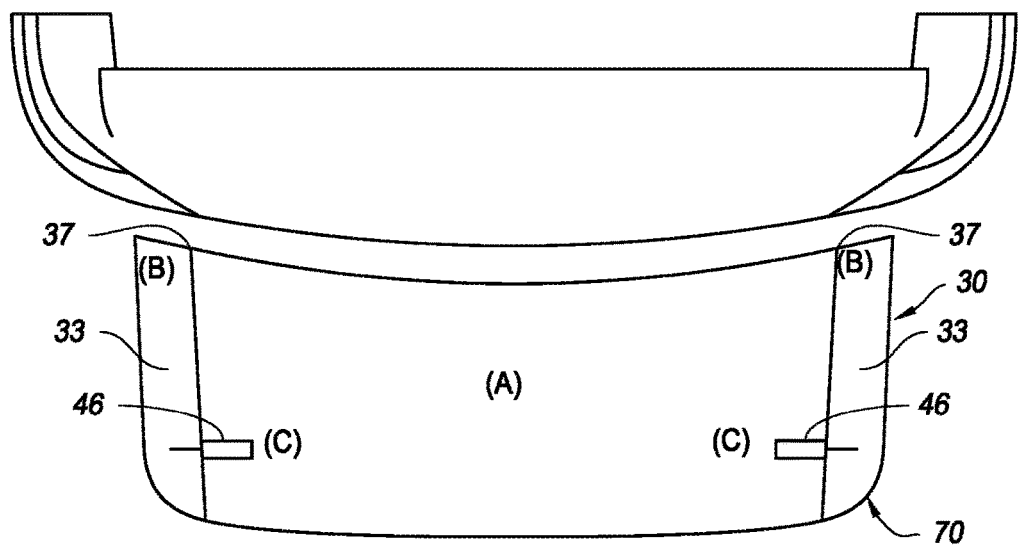

Turning now to FIG. 12A and FIG. 12B, surf wake system 32 is mostly integrated into a swim platform and can thus be readily installed on an existing watercraft in the form of an aftermarket kit. In various embodiments, swim platform 70 may be mounted to a watercraft in an otherwise conventional fashion, but unlike conventional swim platforms, swim platform 70 includes integrated flaps 33, hinges 37, and actuators 46, in which the integrated assembly may be mounted onto a watercraft in much the same manner as an otherwise conventional swim platform. In the illustrated embodiment, actuators 46 are manually adjustable in the form of a telescopic rod assembly which may be secured in various lengths, for example, by a link pin extending through one of a plurality of holes 53, or by other suitable means. Thus, in various embodiments, the surf wake system of the present invention may be a substantially mechanical system in which the angles of flaps 33 are manually set by the user.

In the illustrated embodiment, the actuators are mounted on the swim platform to selectively deploy the flaps, however, one will appreciate that the actuators may be mounted on the transom.

One will also appreciate that actuators 46 may be automated in a manner similar to that described above, for example, the actuators may be electric, electromechanical, pneumatic and/or hydraulic actuators as described above. In the case that the actuators are automated, the actuators may be integrated with the watercraft's existing control system (e.g., by connecting to the CAN bus of the watercraft), or a dedicated control system may be installed to control the actuators that is completely independent of the watercrafts other systems. For example, the control system may include toggle switches or other suitable devices to selectively move actuators 46 and flaps 33 as desired.

Figure 13A:
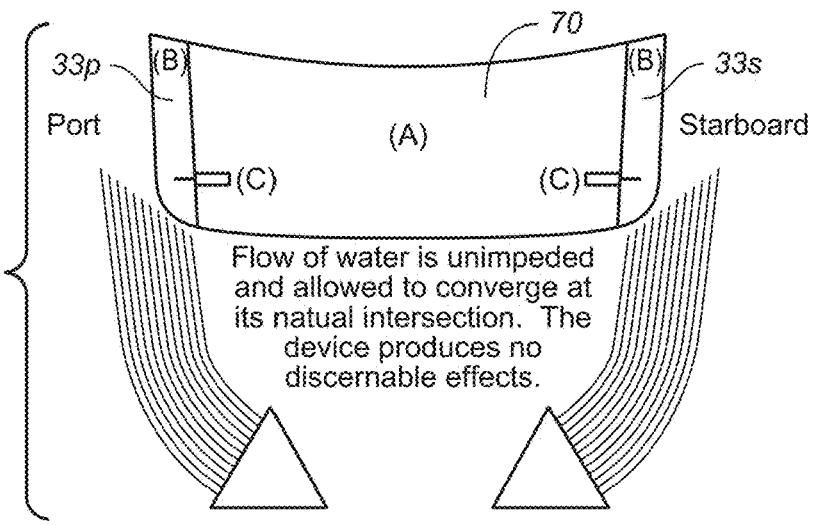
FIG. 13A, FIG. 13B FIG. 13C are schematic plan views illustrating the operation of the exemplary surf wake system in accordance with various aspects of the present invention.
Figure 13B:
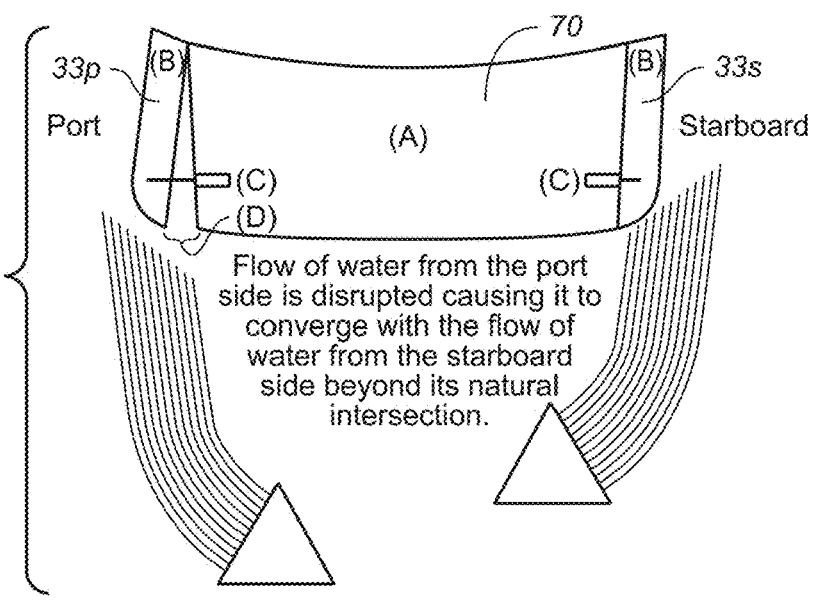

In operation and use, swim platform 70 functions in the same manner as that described above. The neutral position of surf wake system 32 is shown in FIG. 13A in which flaps 33 are in their neutral, retracted position. In this position, the flow of water past the transom is unimpeded by the flaps and the water is allowed to converge at it is natural intersection relatively close to the transom. When a surfable starboard side wake is desired, the operator may deploy the port side flap 33p as shown in FIG. 13B. In this position, the flow of water along the port side past the transom is disrupted such that the flow of water is redirected outwardly and/or rearwardly thereby delaying convergence of the port side flow with starboard side flow to a point further from the transom. Such disruption and redirection facilitates constructive interference of converging waves to form a larger starboard wake with a higher peak and smoother face that is suitable for starboard surfing, such as the waveform shown in FIG. 6B.

Figure 13C:
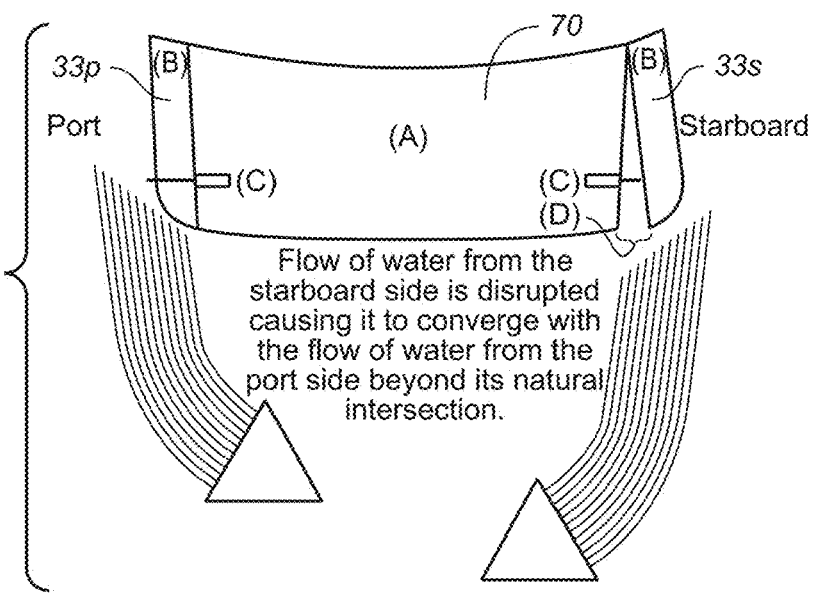

Similarly, when a surfable port side wake is desired, the operator may deploy the starboard side flap 33s as shown in FIG. 13C. In this position, the flow of water along the starboard side past the transom is disrupted such that the flow of water is redirected outwardly and/or rearwardly thereby delaying convergence of the starboard side flow with the port side flow to a point further from the transom, which facilitates constructive interference of converging waves to form a larger portside wake with a higher peak and smoother face that is suitable for starboard surfing, such as the waveform shown in FIG. 6C.

Figure 14B:
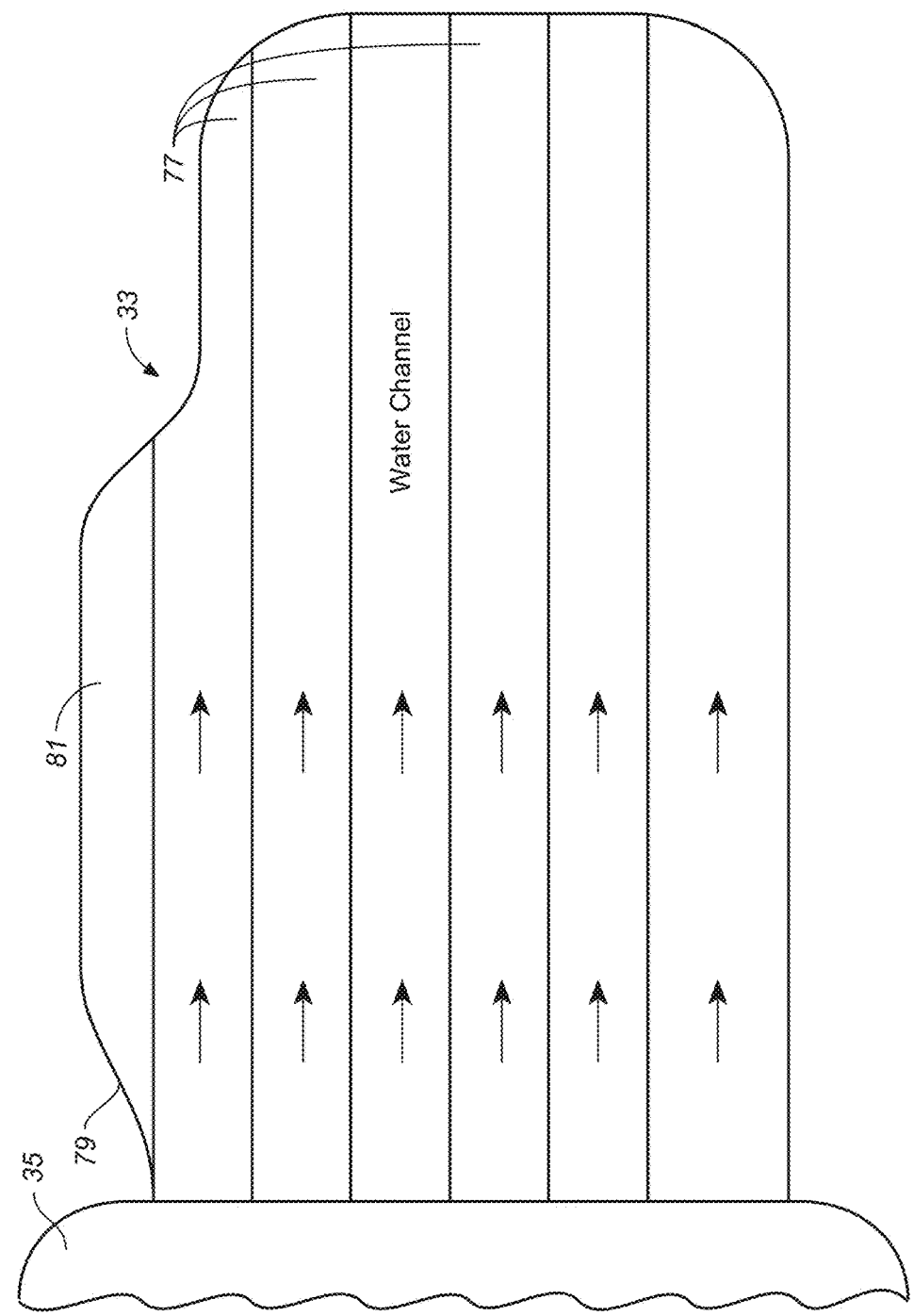
FIG. 14A and FIG. 14B are rear and side views of another exemplary flap assembly in accordance with various aspects of the present invention.
Figure 14A:
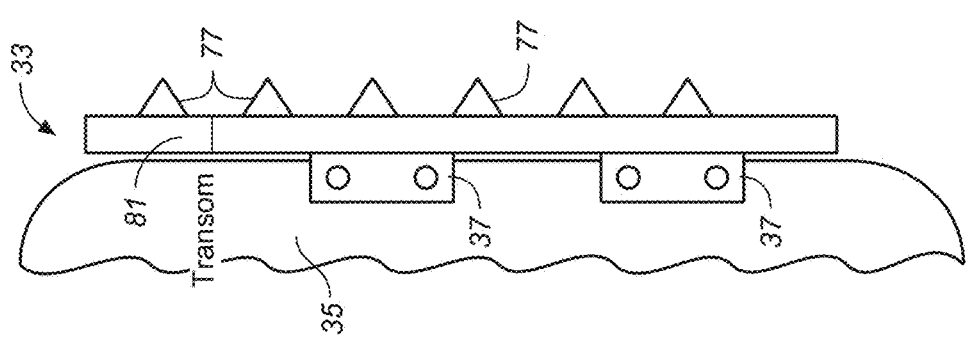

In various embodiments and as noted above, the size and shape of the flaps may vary depending upon varies factors. One such variation is illustrated in FIG. 14A and FIG. 14B, which shows a channeled flap 33, having a series of parallel horizontally extending channels 77. The channels are on the outboard side of the flap and extend linear to the direction of watercraft travel. The channels may assist in creating laminar flow across the gate, thus producing a cleaner waveform.

In the illustrated embodiment, the flap includes five channels, however, one will appreciate that one, two, three or more channels may be utilized to redirect the flow of water as desired. One will also appreciate that the channel need not be linear or horizontal. For example, the channels may extend at an incline upwardly away from transom 35 to direct the flow of water upwardly as it flows along the surface of flap 33, which may provide a net downward force on the flap and, in turn, the transom to further enhance displacement of the watercraft stern. Also, the channels may be curved in order to gently redirect water upwardly or downwardly. One will also appreciate that other patterns and/or textured surfaces may also be utilized to manage the direction of flow of water along the flap.

The peripheral shape of flap 33 is similar to that shown in FIG. 10, as well as that shown in FIG. 15A. Flap 33 includes a transom indentation 79 and a cross-spray protrusion 81. The transom indentation allows for the flap to be positioned immediately adjacent to the hull such that a minimal gap exists between the transom and the flap, and thus promoting a smooth flow of water along the hull and along the flap. One will appreciate that the actual size and shape of the transom indentation may vary to accommodate for a wide variety of hulls. The cross-spray protrusion 81 is provided to reduce the amount of water at the water line that is inadvertently kicked up in the form of cross-spray, thus reducing the amount of cross-spray formed by deployment of the flaps. In some embodiments, the spray reducing element 81 can be a portion of the flap 33 that extends above the water line when the flap 33 is deployed and that is positioned to block spray from the flap 33 (e.g., resulting from a gap or interface between the transom 35 and the flap 33). In some embodiments, the spray reducing element 81 can be an integral portion of the flap 33, which can be integrally formed with the water diverting portion of the flap 33.

Figure 15B:
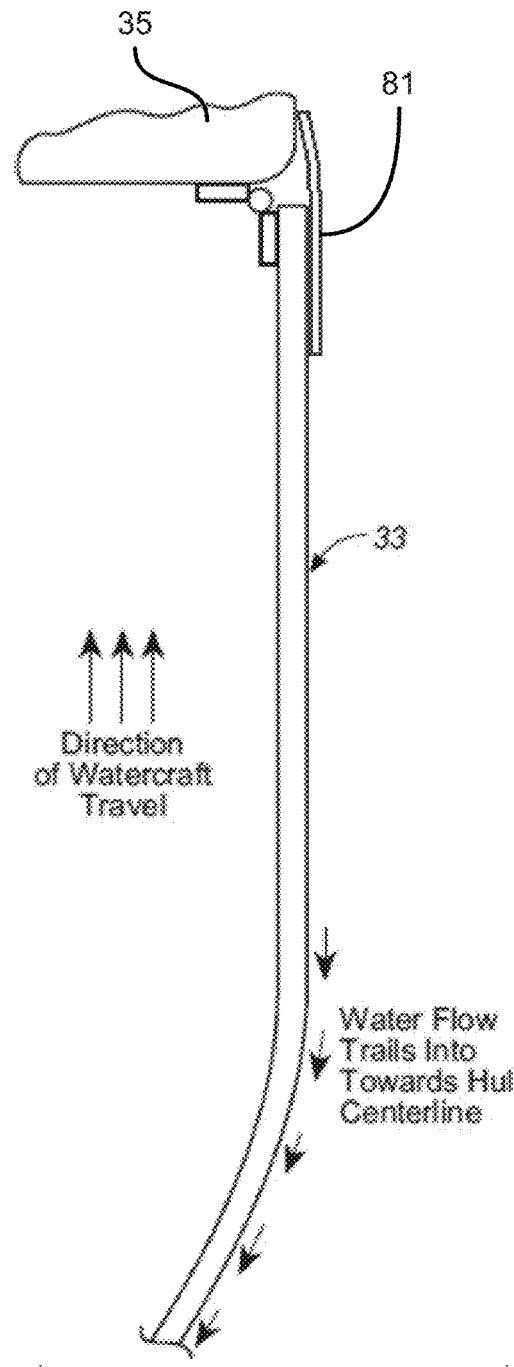
Figure 15C:
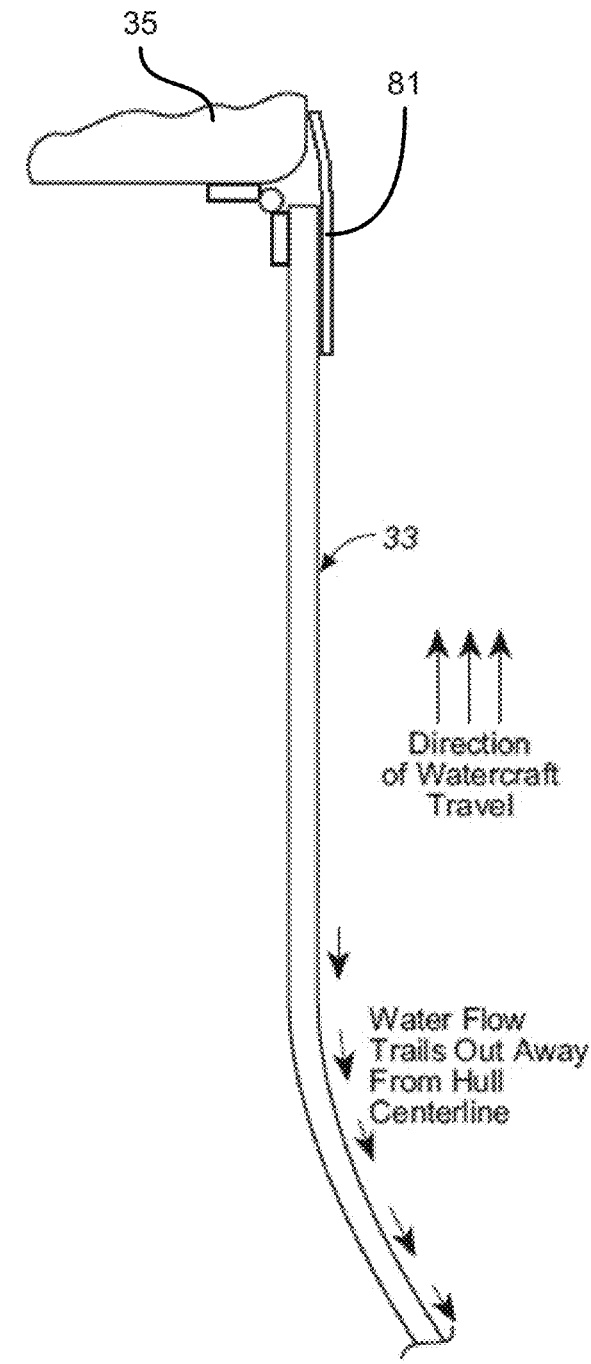

In some embodiments, the spray reducing element 81 can be configured to cover or fill at least a portion of a gap between the transom 35 and the water diverter (e.g., flap 33), as shown, for example, in FIGS. 15B and 15C. The spray reducing element 81 can be coupled to an outside surface of the water diverter 33 (e.g., to a surface of the water diverter 33 that faces generally away from the longitudinal axis of the boat). The spray reducing element 81 can encourage water to flow from the side of the hull to the water diverter 33 without being deflected (e.g., towards the longitudinal axis).

Figure 15D:
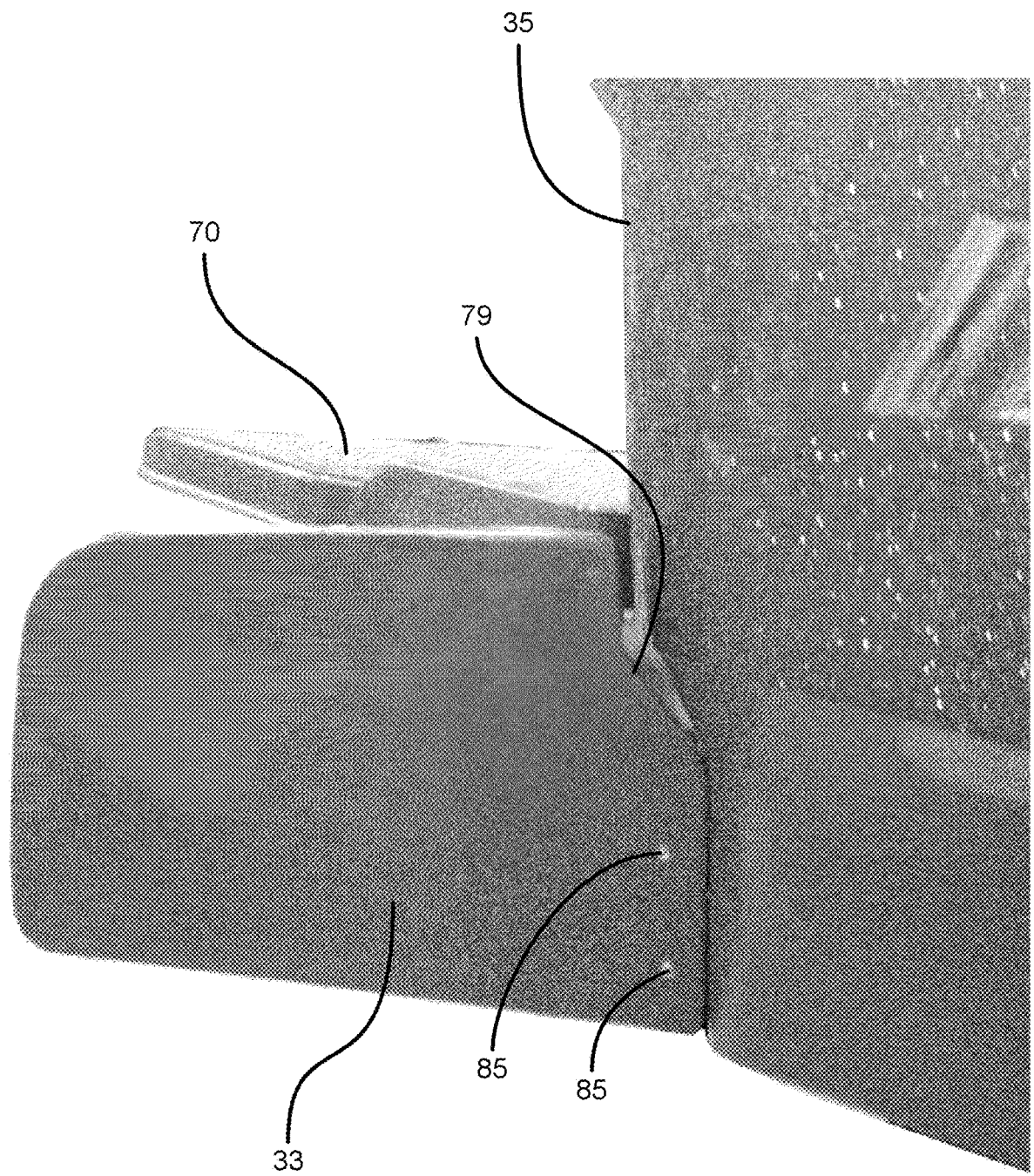
FIG. 15D shows an example embodiment of a water diverter that includes an indentation that corresponds to the shape of the transom.

FIG. 15D shows a water diverter 33 in a deployed position. In some embodiments, a gap can be located between at least a portion of the water diverter 33 and the hull of the boat (e.g., the transom 35) and the water diverter 33. For example, a gap can be located between the transom indentation 79 of the water diverter 33 and the transom 35 of the boat. The transom indentation 79 can correspond to a tapered shape of the transom 35 and the shape of the transom indentation 79 can allow the water diverter 79 to be angled towards the centerline of the boat when in the retracted or neutral position (see FIG. 4B). However, when the water diverter 33 moves to the extended or deployed position (see FIG. 4A), the transom indentation 79 can cause there to be a gap between the transom 35 and the water diverter 33. Water flowing from the boat hull to the water diverter 33 can be diverted by the gap. For example, the leading edges of the water diverter 33 can cause the water to spray inward towards the centerline of the boat. In some circumstances, the water can spray onto the wave that is formed on the side of the boat opposite the deployed water diverter 33, which can degrade the shape of the wave. The spray can also cause discomfort for passengers in the boat and can reduce visibility of the rider from the boat. In some embodiments, a spray reducing element 81 can be used to reduce or eliminate the spray.

Figure 15E:
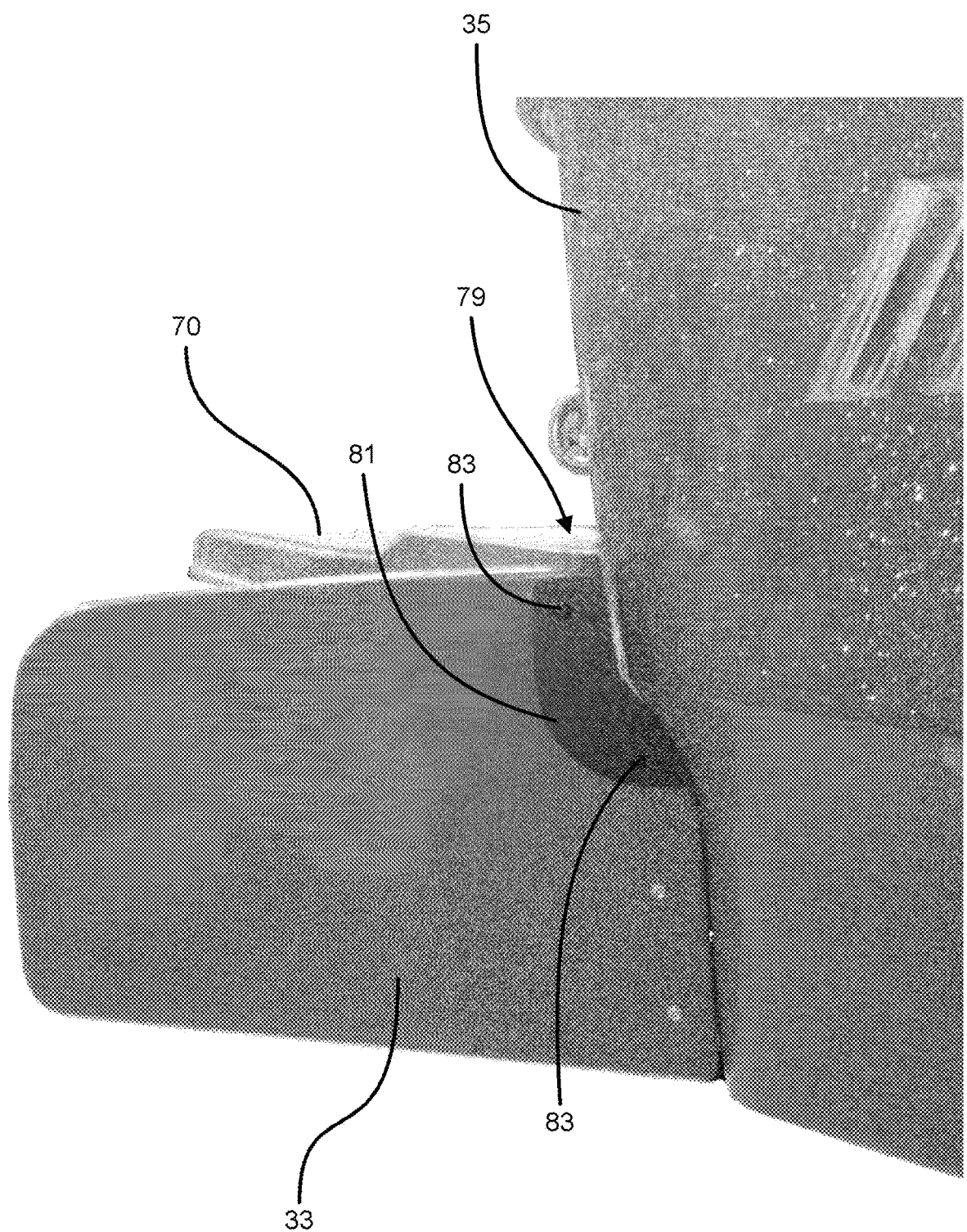
FIGS. 15E-15J show various example embodiments of spray reducing elements that can be configured to reduce or eliminate cross-spray from the water diverters.
Figure 15F:
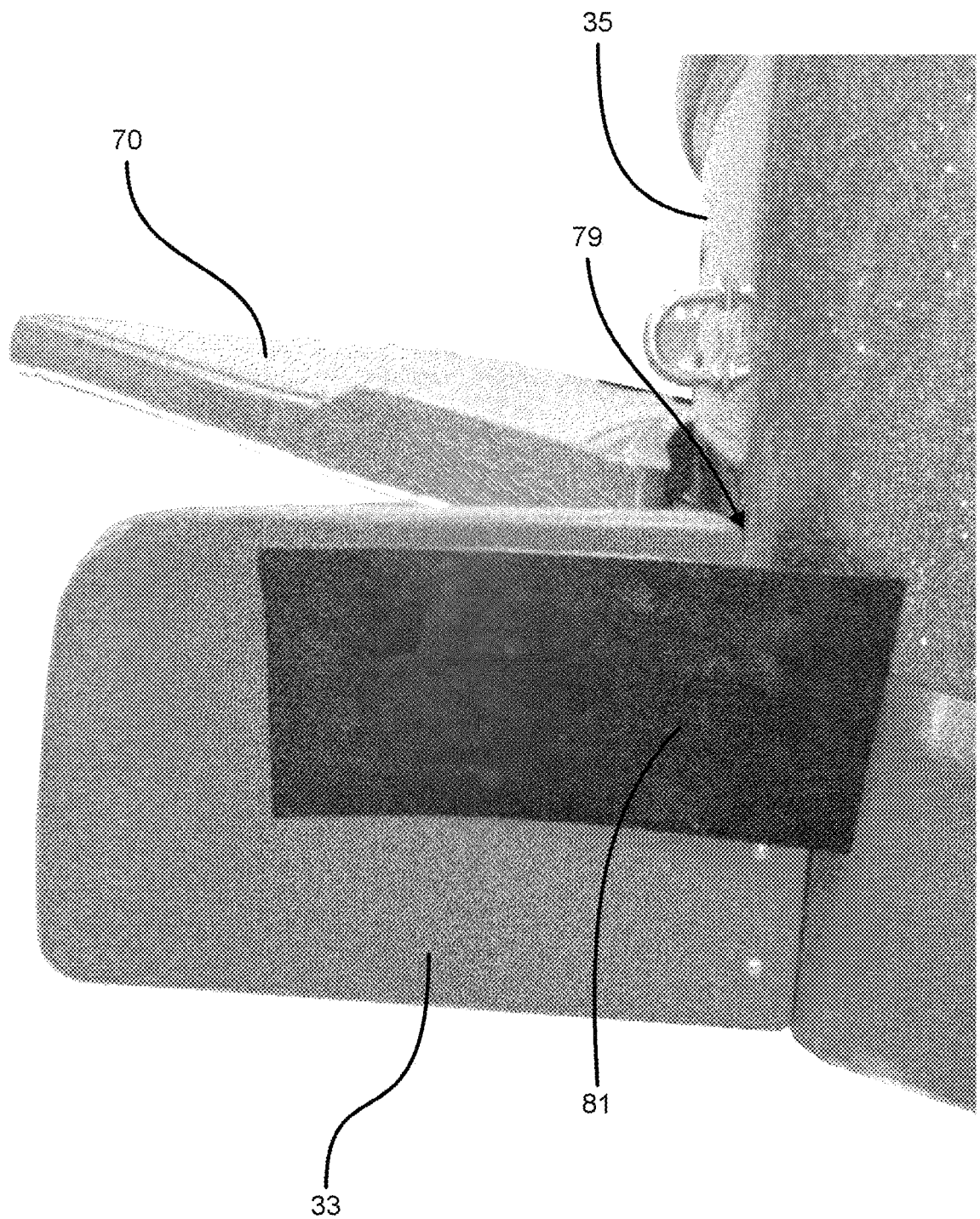

As shown in FIG. 15E, in some embodiments, the spray reducing element 81 can include a cover piece that covers at least a portion of the gap to impede the water from entering the gap as it flows from the boat hull to the water diverter 33. The cover piece can be disposed outside of the gap between the water diverter 33 and the boat hull, so that the cover piece does not interfere with the movement of the water diverter 33 toward the retracted or neutral position (FIG. 4B). The cover piece can be coupled to the outside surface of the water diverter 33 using bolts 83, or using an adhesive, or any other suitable coupling mechanism. When the water diverter 33 is in the extended or deployed position (FIG. 4A), the cover piece can abut against the hull or come within close proximity to the hull, thereby reducing or eliminating the cross-spray. The spray reducing element 81 can include a rigid, semi-rigid, or a flexible material. For example, in some embodiments, the spray reducing element 81 can include a flexible material and can be configured to contact the hull when then water diverter is in the deployed position. FIG. 15F shows an implementation of a spray reducing element 81 that abuts against the hull when the water diverter 33 is in the deployed position.

In some embodiments, the spray reducing element 81 can be coupled to the water diverter 33 so that it moves with the water diverter 33, e.g., between the neutral and deployed positions. In some embodiments, the spray reducing element 81 can be coupled to the boat, so that the spray reducing element 81 does not move with the water diverter 33. For example, with reference to FIG. 15F, the spray reducing element 81 can be coupled to the side of the hull, and can cover at least part of the gap between the transom 35 and the water diverter 33 when the water diverter is in the deployed position.

Figure 15G:
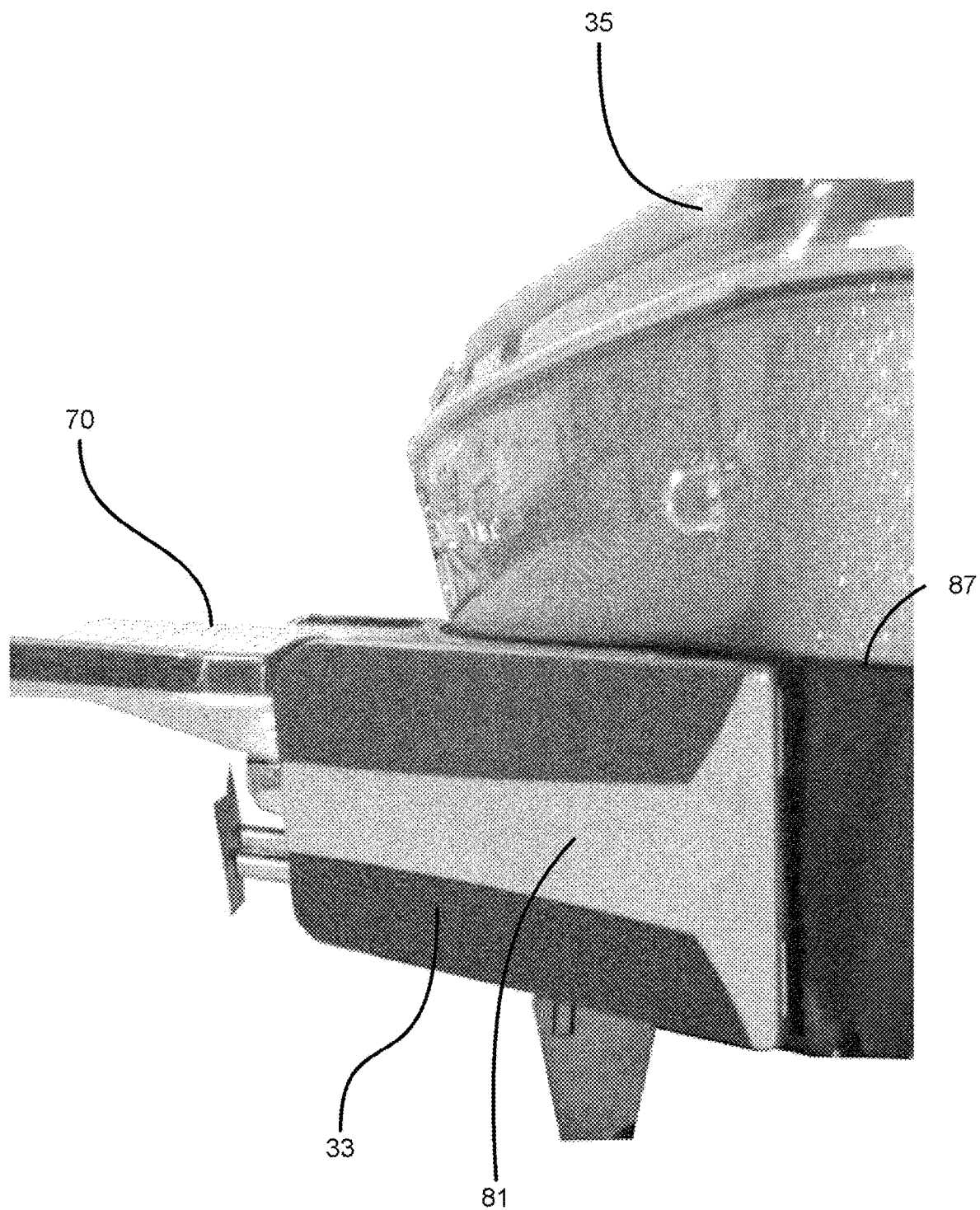
Figure 15H:
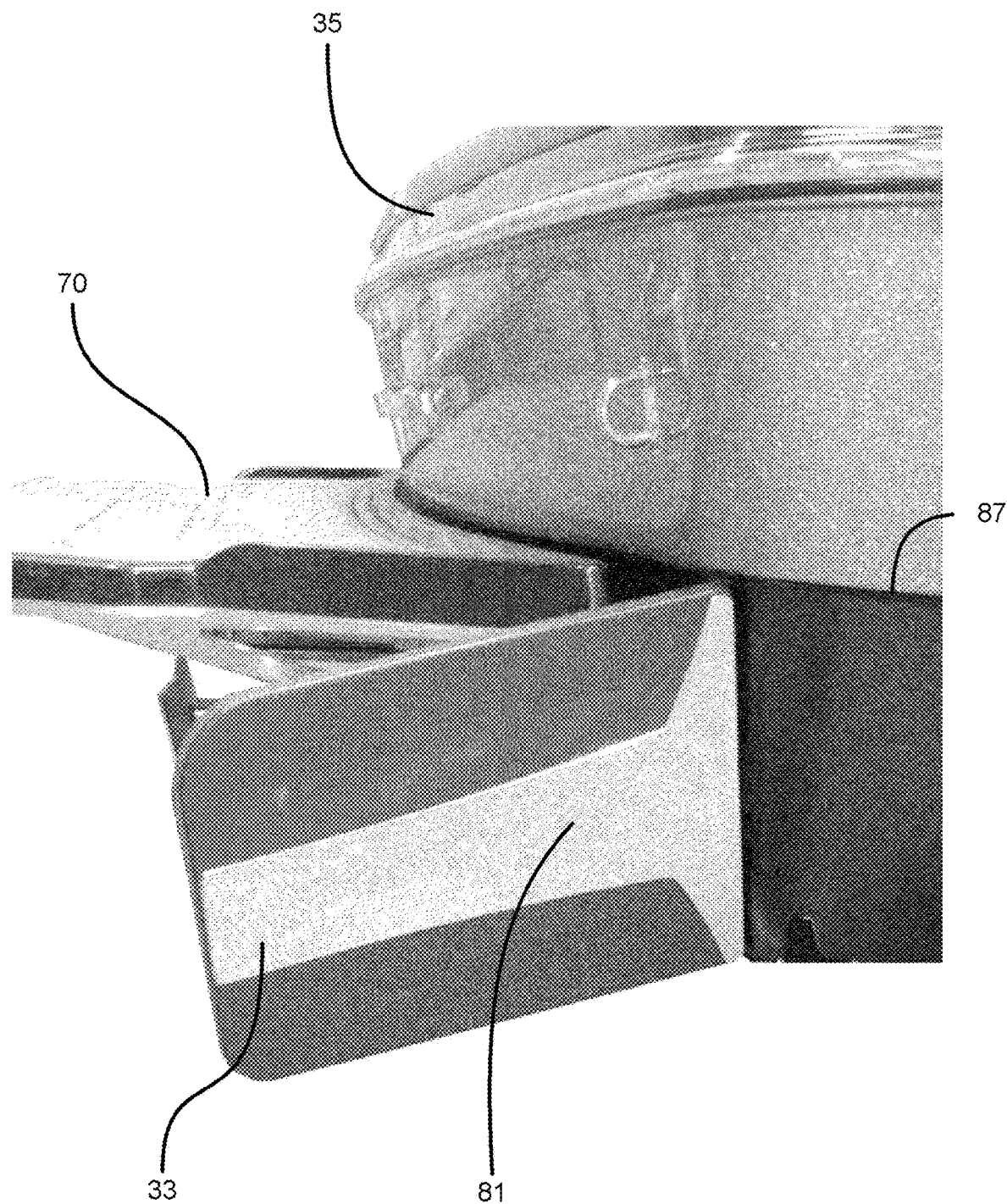

FIGS. 15G and 15H show an implementation with a water diverter 33 that includes a cover piece, which can be a plate (e.g., made of metal or another rigid material), over at least a portion of the outer surface thereof. FIG. 15G shows the water diverter in a retracted or neutral position. FIG. 15H shows the water diverter in an extended or deployed position. The cover piece can be a spray reducing element 81. The cover piece can extend past the edge of the water diverter 33 so that the plate covers at least a portion of the gap between the water diverter 33 and the hull of the boat when the water diverter 33 is in the deployed position. The plate can remained spaced apart from the hull by a small distance when the water diverter 33 is deployed. In some embodiments, the cover piece can cover one or more bolts, screws, or other attachment mechanisms (e.g., the bolts 85 show in FIG. 15D) that couple the water diverter 33 to the boat. In some embodiments, the cover piece can include a plurality of sections, and the different sections can extend past the edge of the water diverter 33 by different distances, e.g., such that the cover piece generally conforms to the shape of the boat hull that is near the cover piece when the water diverter is deployed. In some embodiments, the edge of the cover piece that extends past the edge of the water diverter 33 can have a shape that generally conforms to at least a portion of the shape of the edge of the water diverter 33, or that generally conforms to the shape of the boat hull that is near the cover piece when the water diverter is deployed. For example, in some embodiments, the cover piece can have a transom indentation (e.g., similar to the transom indentation 79 on the water diverter 33).

In some embodiments the shape of the hull of the boat can be configured to reduce or eliminate the spray by reducing the size of the gap between the deployed water diverter 33 and the hull, or eliminating the gap altogether. For example, in some embodiments, the boat hull can have a substantially linear shape extending across substantially the entire height of the water diverter 33, as shown in FIGS. 15G and 15H. Thus, in some embodiments, the water diverter 33 does not include a transom indentation 79. A perfectly linear hull shape may not be required, and the hull shape can be sufficiently linear for at least a portion of the hull near the water diverter to impede cross-spray. The edge of the water diverter 33 that is disposed nearest the boat hull can be substantially linear, in some embodiments. Although a perfectly linear shape may not be required, the edge of the water diverter 33 can be sufficiently linear to impede cross-spray. In some embodiments, the water diverter 33 can be disposed substantially entirely below a chamfer line 87 of the boat hull. Although in some implementations, a small portion of the water diverter 33 can be at or above the chamfer line 87, a sufficient amount of the water diverter 33 can be disposed below the chamfer line 87 to provide a small enough gap between the water diverter 33 and the hull to reduce or eliminate cross-spray.

In some embodiments in which the water diverter 33 includes a transom indentation 79 that is configured to correspond to the shape of the hull when the water diverter is in the retracted or neutral position, the hull can include a bulge or a hull shape that causes the transom indentation 79 to also correspond to the shape of the hull when the water diverter 33 is in the extended or deployed position.

In some embodiments, the gap between the hull and the deployed water diverter 33 (or between the hull and the spray reducing element 81) can be less than or equal to about 10 mm, less than or equal to about 7.5 mm, less than or equal to about 5 mm, less than or equal to about 2.5 mm, less than or equal to about 1 mm, or less. In some embodiments, the gap can be at least about 0.1 mm, at least about 0.5 mm, at least about 1 mm, at least about 1.5 mm, at least about 2.0 mm, or more (e.g., for embodiments having a plate or other rigid spray reducing element 81 that does not abut against the hull). Those of skill in the art will understand based on the disclosure herein that various other gap sizes can be used outside of the ranges discussed herein, and that the size of the gap can be minimized to a size that does not produce significant spray (which can degrade the shape of the wave), and that in some embodiments the gap size can be large enough to reliably prevent the deployed water diverter 33 from contacting the hull.

Figure 15I:
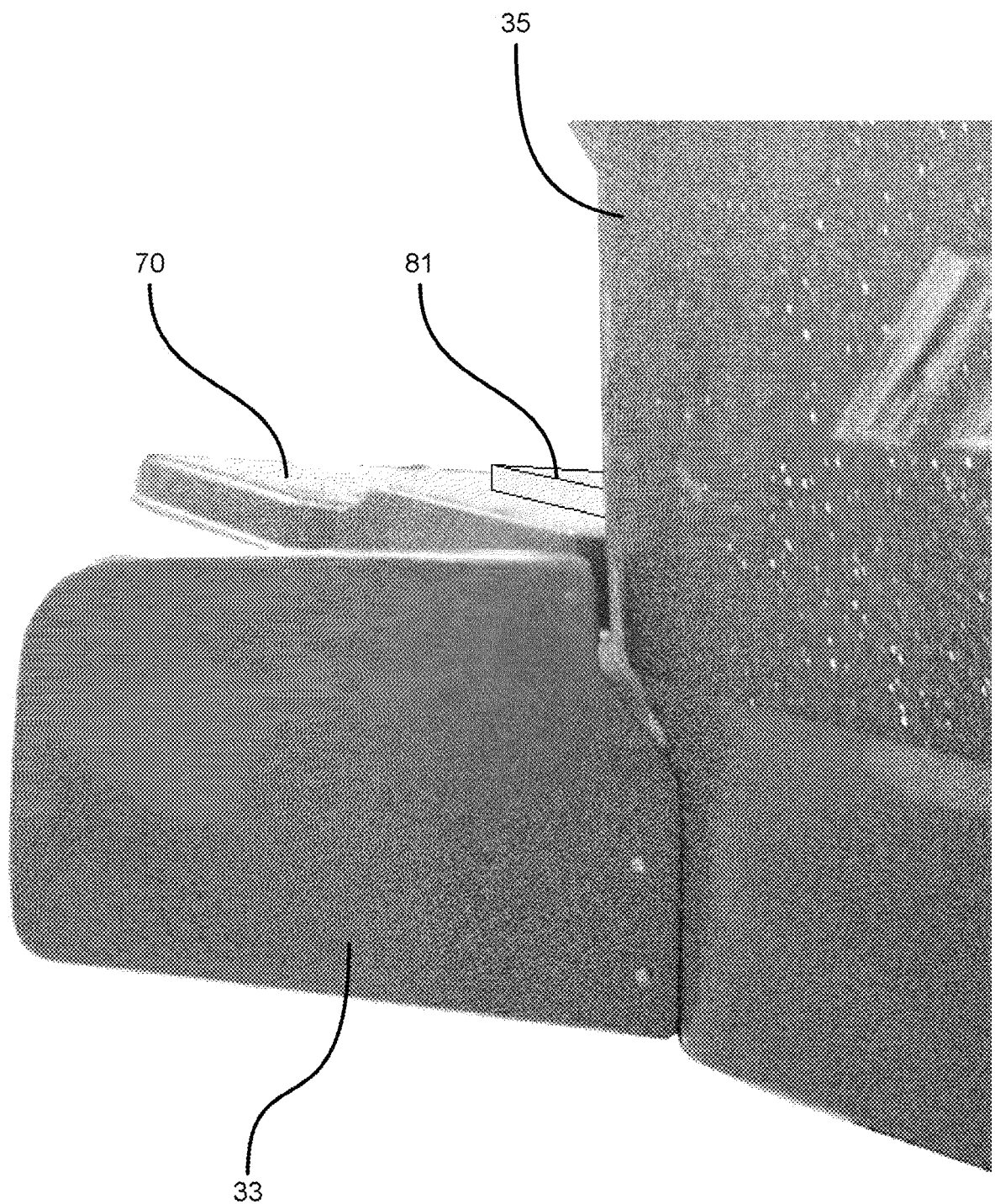
Figure 15J:
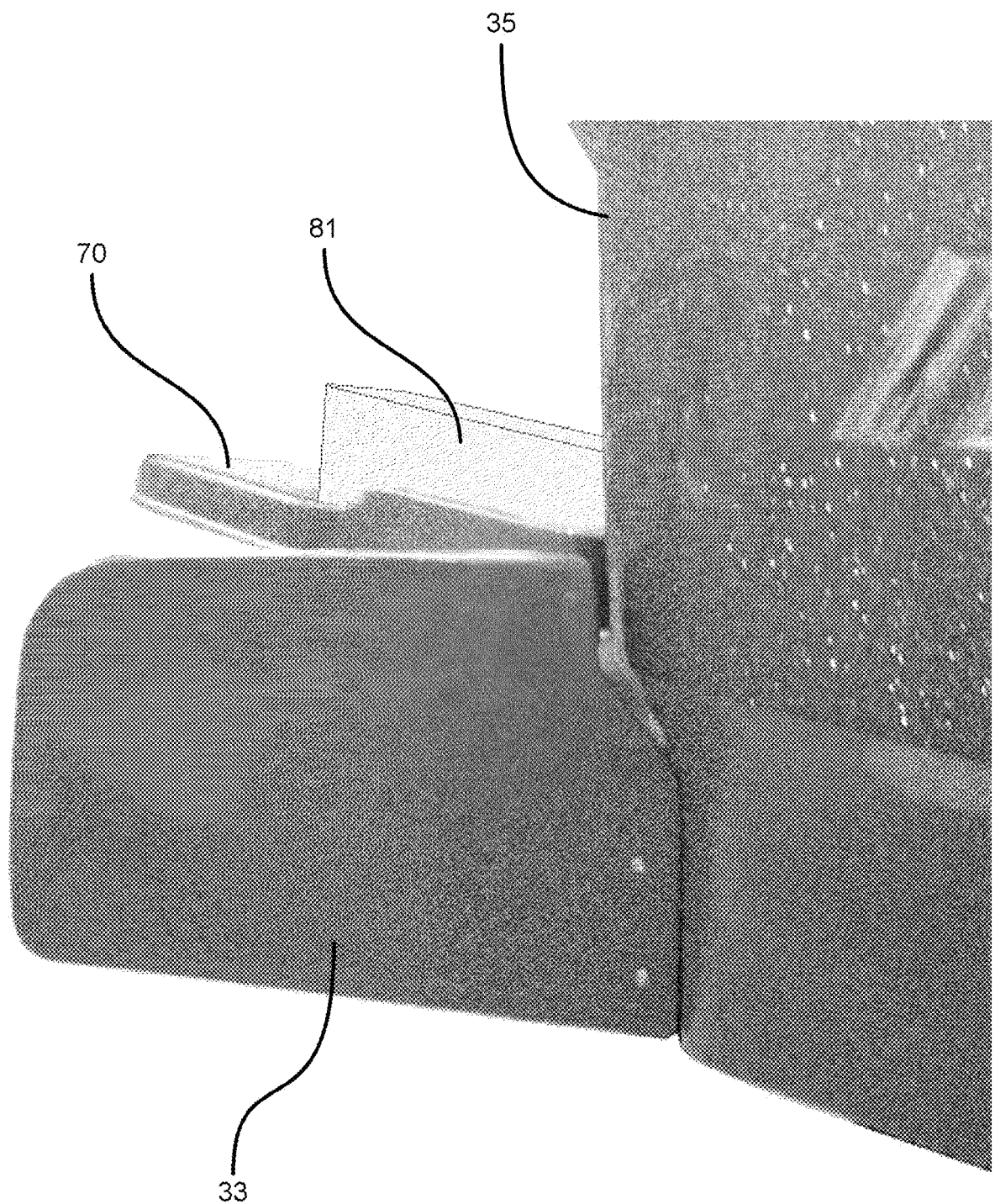

With reference to FIGS. 15I and 15J, the spray reducing element 81 can include a spray blocker that is positioned in the path of the spray, e.g., to prevent the spray from reaching the wave. The spray blocker can knock the spray down into the water or divert the spray to a more favorable direction. The implementation shown in FIG. 15I has a spray reducing element 81 that includes a ledge disposed generally above and inward from the water diverter 33. The ledge can be generally horizontal, although various other orientations are possible. The ledge can be positioned in the path of the cross-spray so that the ledge can knock the cross-spray down to impede the water from spraying onto the wave formed by the boat. Those of skill in the art will recognize from the disclosure herein that many other configurations are possible. For example, with reference to FIG. 15J, in some embodiments, the spray reducing element 81 can include a wall (e.g., extending upward from the swim platform 70), which can be generally vertical, although various other orientations are possible. The wall can be positioned in the path of the cross-spray so that the wall can impede the water from spraying across to the wave on the side of the boat opposite the deployed water diverter 33.

Although only one water diverter 33 is shown in FIGS. 15A through 15J, spray reducing elements 81 can be used to reduce or eliminate spray from both of the water diverters 33. The spray reducing element 81 can be implemented in various other manners. For example, in some embodiments, a compressible material (e.g., an open cell or a closed cell foam) can be coupled to the water diverter 33 and/or to the boat (e.g., to the transom 35) so that the compressible material at least partially fills the gap between the water diverter 33 and the boat hull when the water diverter 33 is in the deployed position. In some embodiments, a spray reducing element 81 can be coupled to the boat hull (e.g., to the transom 35 or the side strake of the hull), e.g., such that the spray reducing element 81 fills or covers at least a portion of the gap between the water diverter 33 and the boat hull, or otherwise impedes spray.

With reference again to FIGS. 15A and 15B, in various embodiments, the flaps may be planar or non-planar. For example, FIG. 15B shows a convexly-flared flap 33, which allows water flow along the outer surface of the flap that gently trails in towards the hull centerline, while FIG. 15C shows a concave flap 33, that allows water flow along the outer surface of the flap to be further redirected outward away from the centerline of the hull. One will appreciate that curved flap may effectively extend or otherwise adjust the range of deployment allowing for the use of variously sized actuators. For example, concave flaps may effectively extend the range of deployment such that smaller displacement actuators may be used. Furthermore, convex flaps may reduce face friction, promote laminar flow, or otherwise enhance or modify the wake.

One will appreciate that other flap shapes and configurations may also be utilized in accordance with the present invention, including, but not limited to, oval shaped flaps, other polygonal shapes, perforate surfaces, patterned surfaces, and etc. One will also appreciate that the flaps may be replaceable and interchangeable such that a user may replace flaps of one type with flaps of another type in order to further customize the performance of the surf wake system. Alternatively, supplemental "bolt-on" shapes may be provided which can be attached to an existing flap to further modify its overall shape.

Figure 16A:
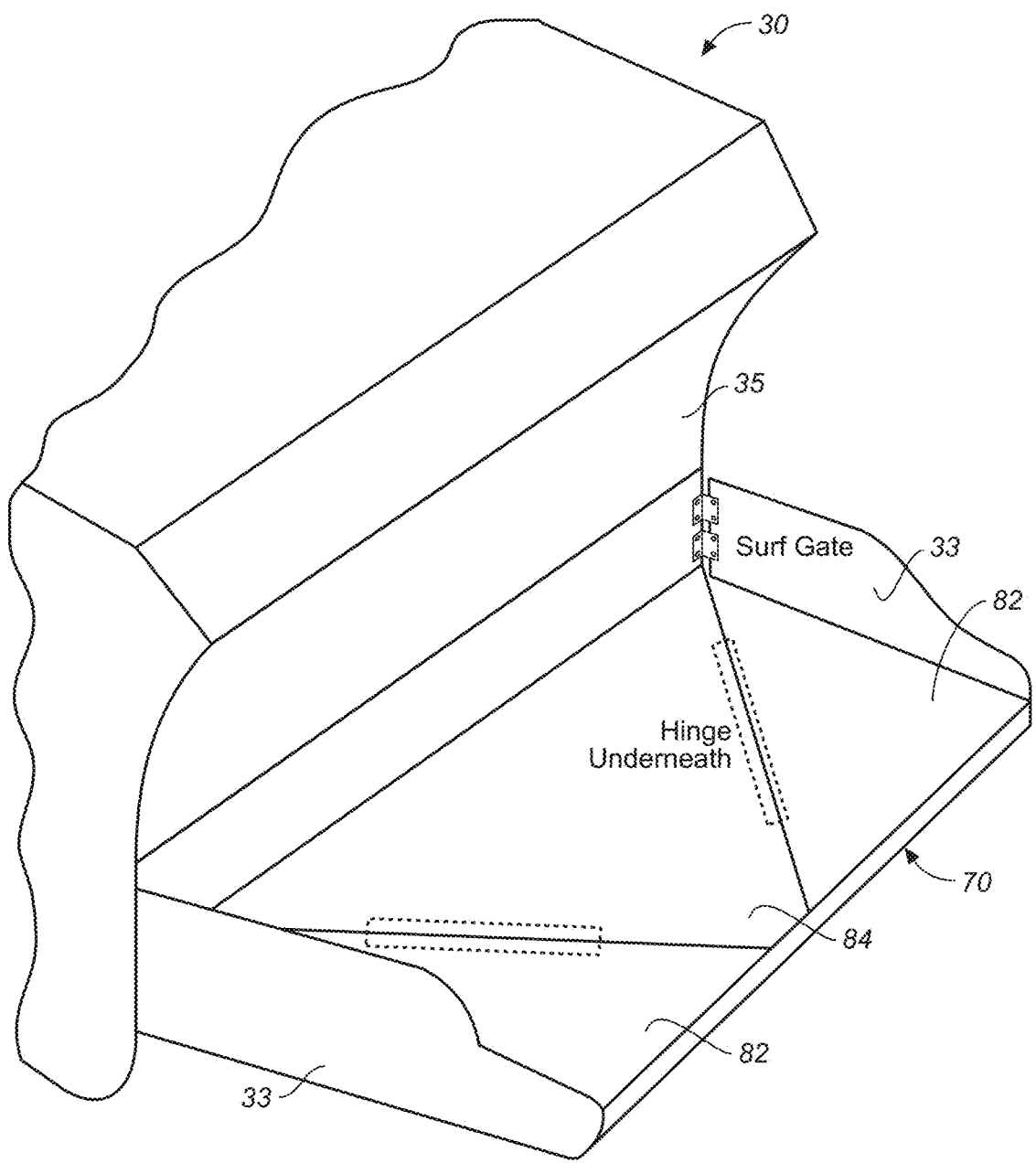
FIG. 16A and FIG. 16B are rear perspective and rear elevation views, respectively, of another exemplary flap assembly integrated with a complementary swim platform in accordance with various aspects of the present invention.
Figure 16B:
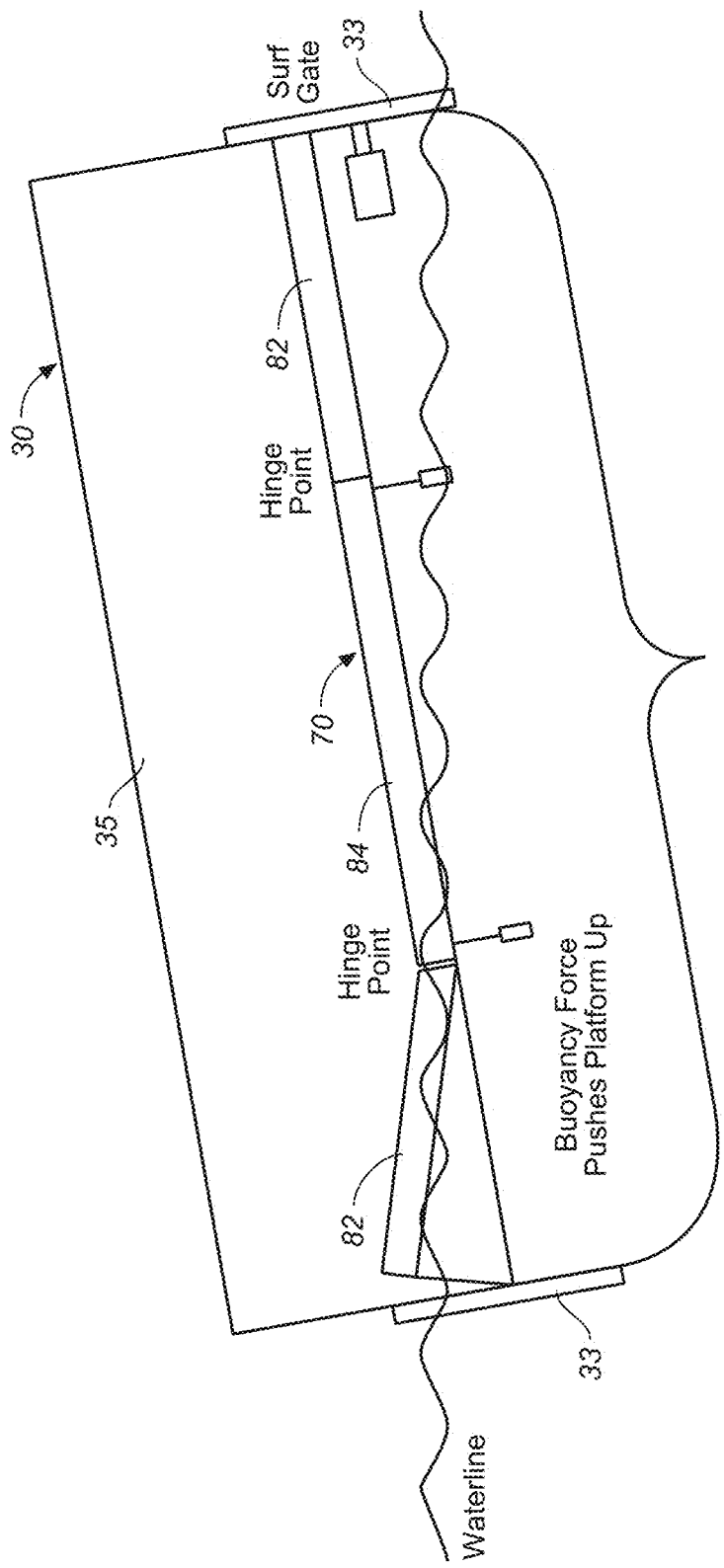

In various embodiments, upper surfaces of the swim platform may be hinged to facilitate the flow of water past the swim platform. Conventional swim platforms generally impede waveform by suppressing water flow on surf side when boat is rolled to the same side. As shown in FIG. 16A and FIG. 16B, swim platform 70 may be provided with hinged surfaces 82 which are configured to pivot up and away from flow of water as respective side of the swim platform approaches the waterline. The hinged surfaces are designed to allow only upward movement from the resting plan of the swim platform. As shown in FIG. 16B, hinged surface 82 is configured to allow water forces to push the hinged portion up and away from the flow of water creating the resulting surf wave. In the illustrated embodiment, hinged surface 82 is pivotally attached to a fixed main portion 84, whereby the hinged surface may pivot up and not impede waveform. In the illustrated embodiment, the hinged surface is pivotally attached to the fixed main portion by a hinge, however, one will appreciate that other suitable means may be utilized to allow the hinged portion to flex upwardly. One will appreciate that swim platform 70 and hinged surfaces 82 may be used in conjunction or separate from the surf wake system of the present invention.

Figure 17:
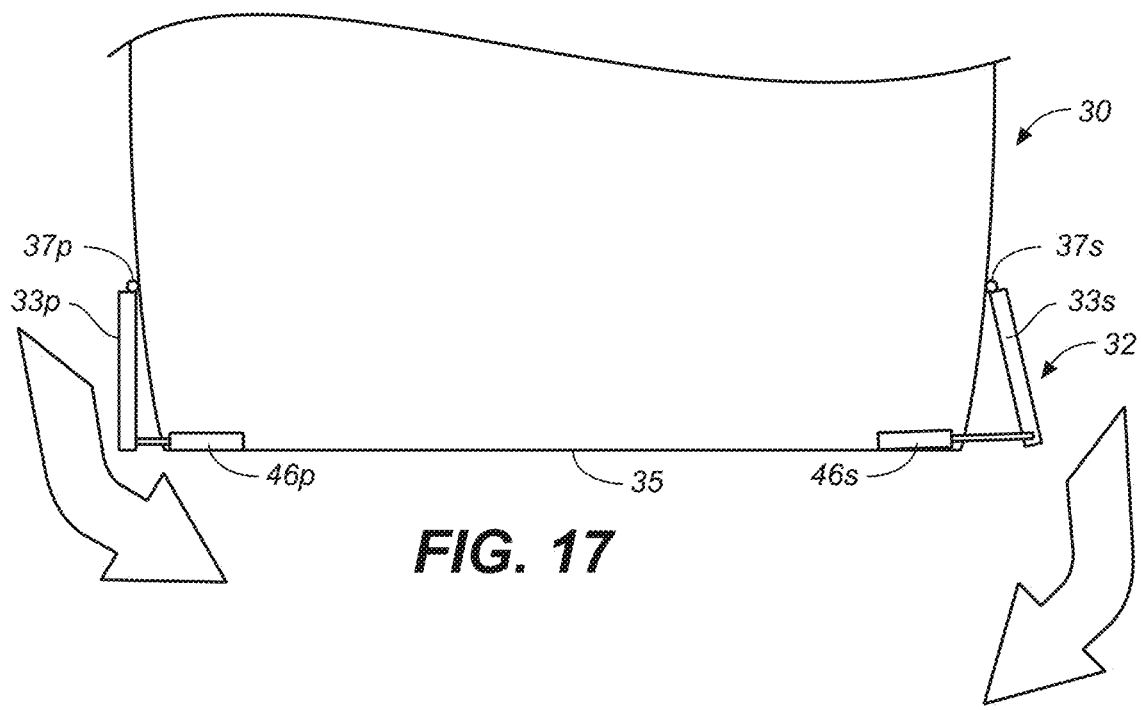
FIG. 17 is a schematic view of an exemplary surf wake system including side-hull flap assemblies in accordance with various aspects of the present invention.

In another exemplary embodiment of the present invention, surf wake system 32 is similar to the systems described above but includes flaps 33 that are mounted on the side of the hull instead of the transom, as shown in FIG. 17. In this embodiment, the actuators are mounted on an appropriate section of the hull to effect deployment from a neutral position, as illustrated by flap 33p, to an extended deployed position, as illustrated by flap 33s. In a manner similar to the systems described above, deploying a flap will disrupt the flow of water along the side of the hull past the transom such that the flow of water is redirected outwardly and/or rearwardly to facilitate constructive interference of converging waves in a manner that is described above with respect to FIG. 13B and FIG. 13C.

One will appreciate that the various flap and actuator configurations described above may be utilized with a hull-side configuration.

Figure 18:
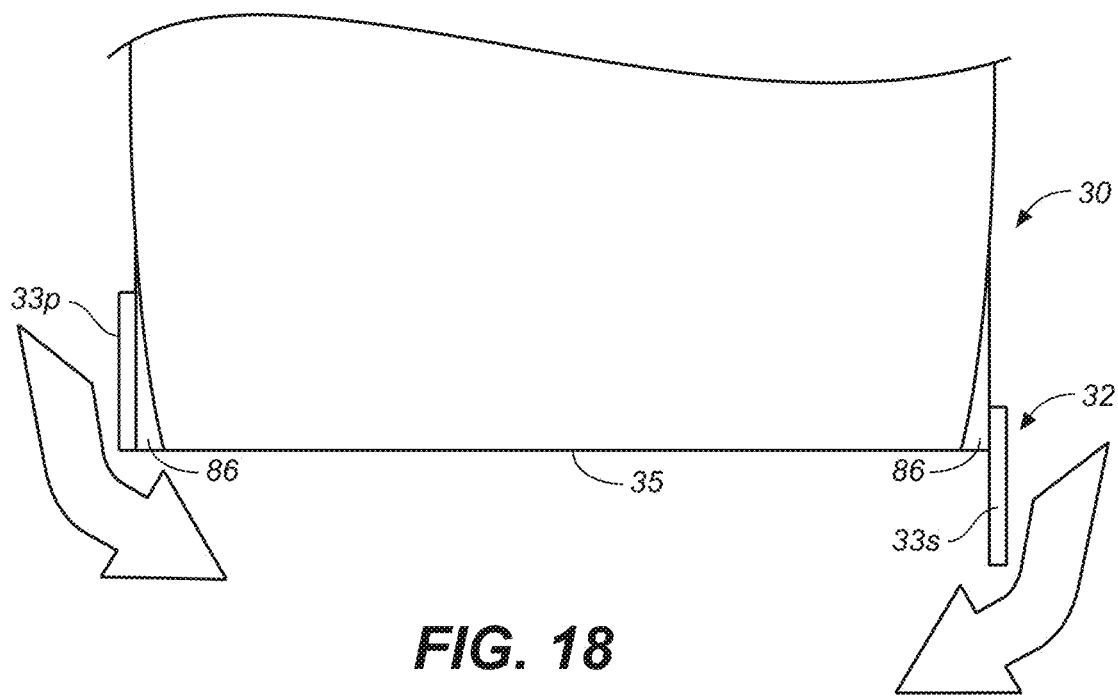
FIG. 18 is a schematic view of an exemplary surf wake system including longitudinally extendable flap assemblies in accordance with various aspects of the present invention.

In still another exemplary embodiment of the present invention, surf wake system 32 is similar to the systems described above but includes flaps 33 that are mounted to extend rearward of transom 35, as shown in FIG. 18. Flaps may be mounted to slide along a track assembly 86 mounted on the side of the hull, or alternatively, may be configured to extend directly outwardly from the hull. In this embodiment, actuators (not shown) are mounted on an appropriate section of the hull or track assembly to effect deployment from a neutral position, as illustrated by flap 33p, to an extended deployed position, as illustrated by flap 33s. In a manner similar to the systems described above, deploying a flap will disrupt the flow of water along the side of the hull past the transom such that the flow of water is redirected rearwardly to facilitate constructive interference of converging waves in a manner that is described above with respect to FIG. 13B and FIG. 13C.

One will appreciate that the various flap and actuator configurations described above may also be utilized with such a retractable flap configuration.

Figure 19:
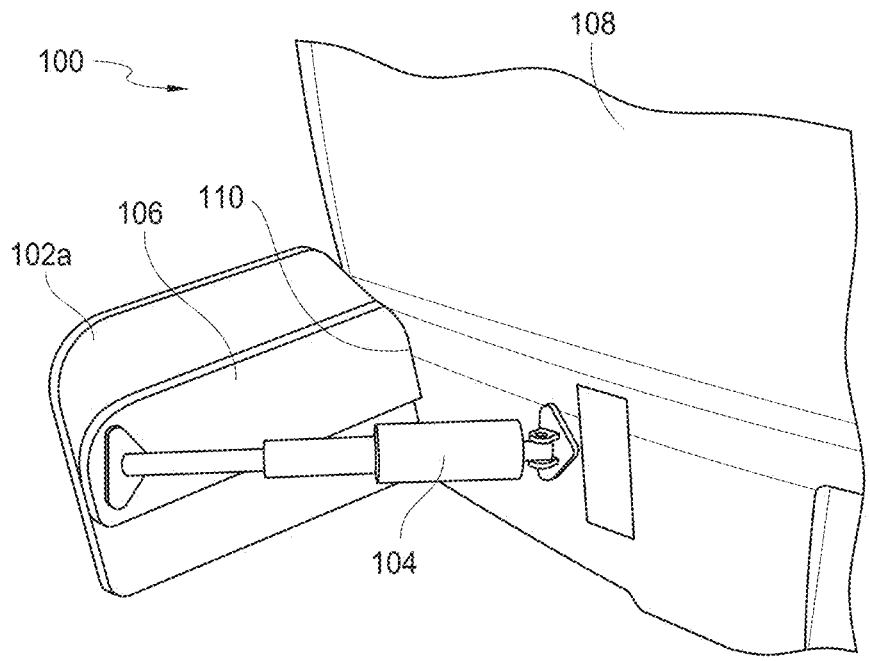
FIG. 19 is a partial perspective view of an example embodiment of a water removable water diverter coupled to a coupling member on a boat.
Figure 20:
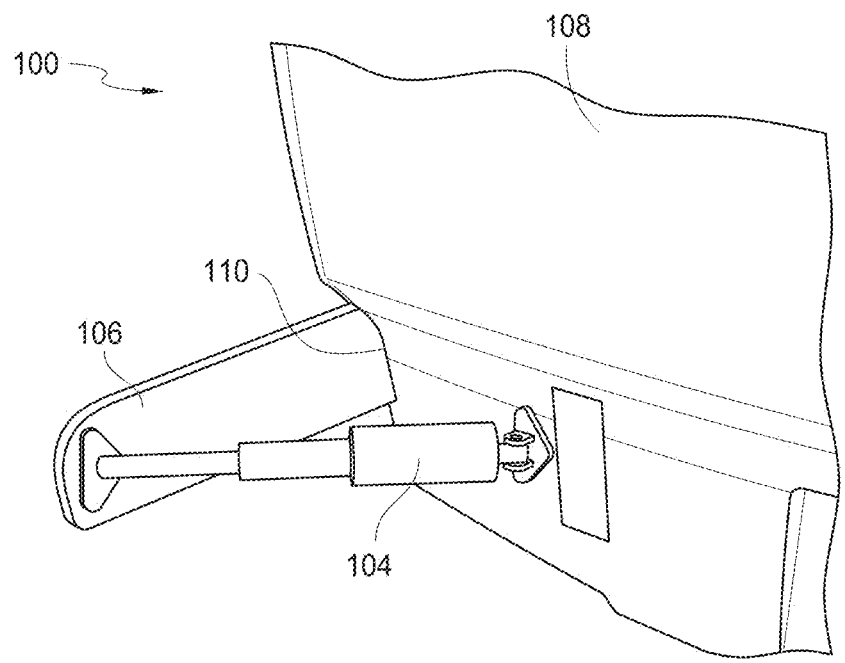
FIG. 20 is a partial perspective view of the coupling member of FIG. 20 on the boat with the water diverter removed therefrom.
Figure 21:
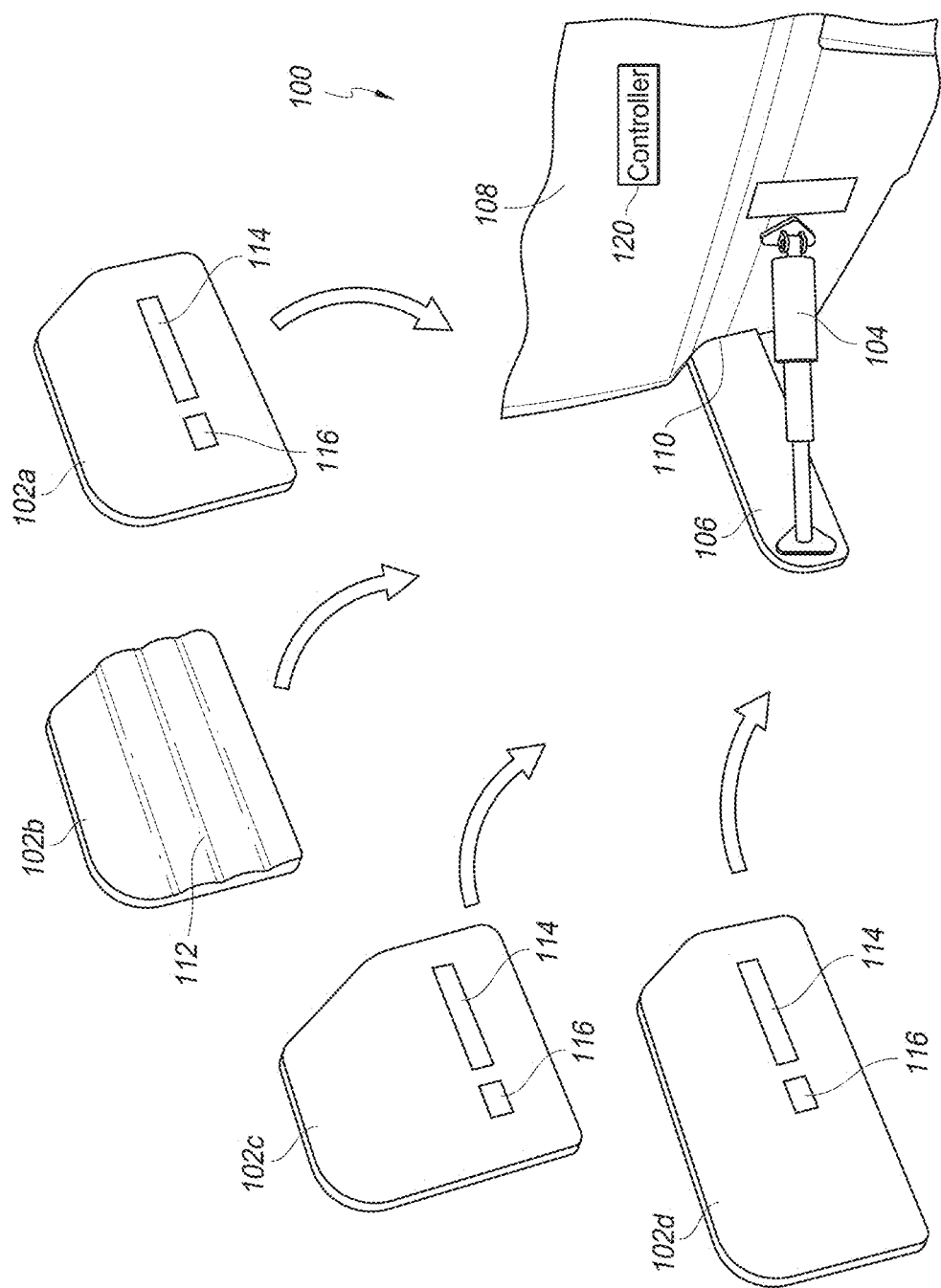
FIG. 21 is a partial perspective view showing multiple example embodiments of water diverters compatible for use interchangeably with the boat.

With reference to FIGS. 19-21, in some embodiments, a wake shaping system 100 can be configured to use removable and/or interchangeable water diverters 102a-d, which can have different sizes, different shapes, or other different configurations. FIGS. 19-21 are partial views of the wake shaping system 100, and show example embodiments of port-side water diverting elements. Although not shown in FIG. 19-21, the wake shaping system 100 can include similar starboard-side water diverting elements. The wake shaping system 100 can include one or more actuators 104 configured to selectively position the water diverters 102a-d. The one or more actuators 104 can include an electric motor, a hydraulic motor, a pneumatic motor, or other mechanism suitable to move the water diverters 102a-d. The actuators 104, the water diverters 102a-d, and various other elements of the wake shaping system 100 can be similar to, or the same as, corresponding elements in various other embodiments disclosed herein, and various features described in connection with the other embodiments can be incorporated into the wake shaping system 100 even when not specifically described in connection with FIG. 19-21.

The system 100 can include a coupling member 106 that is configured to couple the removable water diverters 102a-d to the actuator 104 and/or to the boat 108 (e.g., to the transom of side portion thereof). The coupling member 104 can be attached to the boat 108 by a joint or other mechanism that enables the coupling member 104 to move with respect to the boat 108. For example, the coupling member 106 can be pivotally coupled to the boat 108 (e.g., by joint 110) so that the coupling member 106 can pivot between two or more positions that are configured to modify wake shape. The coupling member 106 can slidably be coupled to the boat 108, such that the coupling member 106 can slide (e.g., in a direction that is generally transverse to the longitudinal axis, generally parallel to the longitudinal axis, or any angle therebetween) between two or more position that are configured to modify wake shape. The coupling member 105 can be coupled to the actuator 104 such that the actuator 104 can selectively position the coupling member, 106 as described herein. The coupling member 106 can be permanently or semi-permanently attached to the boat 108 and/or to the actuator 104 (e.g., using screws, bolts, rivets, or other suitable fasteners). For example, in some embodiments, the coupling member 106 can disassembled from the boat 108 and/or actuator 104 (e.g., for repair), but the coupling member 106 is not removably by a user during normal operation of the wake shaping system 100.

The coupling member 106 can be configured to removably receive a water diverter 102a-d. FIG. 19 shows a port-side coupling member 106 with a water diverter 102a attached thereto. FIG. 20 shows the port-side coupling member 106 with no water diverter attached thereto. In some embodiments, the coupling member 106 can be used as a water diverter (e.g., of relatively small size) without any additional water diverter 102a-d attached thereto. FIG. 21 shows four example water diverters 102a-d that can each be removably attached to the coupling member 106. The water diverters 102a-d can have different sizes, different shapes, or other different configurations configured to affect wake shape in different ways. For example, the water diverter 102b can include ridges or channels 112 (e.g., similar to the embodiments discussed in connection with FIGS. 14A and 14B. For ease of illustration, the water diverter 102b is shown oriented differently than the water diverters 102a, 102c, and 102d, such that the outboard side of the water diverter 102b is visible. As another example, the water diverter 102c can be taller than the water diverter 102a. As yet another example, the water diverter 102d is longer than the water diverter 102a. Many other variations are possible. The different water diverters 102a-d can be configured to divert water in different manners, e.g., to achieve different wake shaping effects. For example, different water diverters 102a-d can be used depending on the desired wake size, the desired wake steepness, the desired wake position, the rider's weight, age, or skill level, the depth of the water, etc.

The water diverters 102a-d and/or the coupling member 106 can include one or more coupling mechanisms 114 configured to removably attach a water diverter 102a-d to the coupling member 106. For example, a sliding engagement mechanism 114 can be disposed on an inboard side of the water diverters 102a-d, and a corresponding mechanism (hidden from view in FIG. 21) can be configured to engage the sliding engagement mechanisms 114 of the water diverters 102a-d to secure a water diverter 102a-d to the coupling member 106. Many other types of coupling mechanisms 114 can be used, such as clamps, snaps, friction-fit elements, or any other suitable mechanism that can enable a user to remove one water diverter 102a-d and replace it with a different water diverter 102a-d during normal operation of the wake shaping system 100.

Some embodiments can include water diverters that include removable portions. For example, a water diverter 102 can include a coupling mechanism that is configured to removably receive a supplemental portion (e.g., an extension portion) that changes the size and/or shape of the water diverter 102. For example, the supplemental portion can be added to make the water diverter 102 taller or longer, etc. to modify the wake produced by the boat. In some configurations, both the main water diverter portion and the supplemental portion can be configured to divert water when deployed.

In some embodiments, the wake shaping system 100 can include a controller 120 that can adjust various features on the boat 108 based on various factors or inputs to achieve a desired wake condition, as discussed herein. In some embodiments, the controller 120 can adjust one or more actuators 104 (e.g., to position the water diverters 102a-d) differently depending on the type of interchangeable water diverter 102a-d that is coupled thereto. Accordingly, in some embodiments, a memory can store an indication of the type of water diverter 102a-d that is being used. A user input device can enable a user to input the indication of the type of water diverter 102a-d.

In some embodiments, the wake shaping system 100 can be configured to automatically change the indication of the type of water diverter being used in response to an interchange of the water diverters 102a-d. The wake shaping system 100 can be configured to detect the type of water diverter 102a-d that is attached thereto. For example, the water diverters 102a-d can include an indicator element 116 that is different for the different types of water diverters 102a-d. The coupling member 106 can be configured to detect what type of water diverter 102a-d is attached thereto based at least in part on the indicator element 116. For example, the indicator element 116 can include a pin or protrusion that can be positioned at a different location on different types of water diverters 102a-d. The coupling member 106 can detect the location of the pin or protrusion (e.g., with a series of buttons or a pressure sensor). An indication of the type of water diverter 102a-d can be transferred (e.g., from coupling member 106) to the controller 120, such as using a cable or a wireless communication link. Many variations are possible. For example, in some embodiments, the indicator element 116 can be a radio-frequency identification (RFID) tag, and the system 100 can be configured to detect what water diverter 102a-d is being used by the RFID tags therein.

In some embodiments, the wake control system 100 can be configured to provide a notification to a rider that depends, at least in part on the positions of the water diverters 102. For example the rider notification can be an indication of which side of the wake is currently adapted for surfing, a notification that the surf wake is changing from one side to the other, a notification that the surf wake will soon change from one side to the other, an indication of a current wake property (e.g., height, steepness, etc.), a notification that a wake property is changing or is about to change, etc. A controller 120 can be configured to provide a signal to one or more rider notification elements 122 that are configured to provide the notification to the rider (e.g., a wakesurfer riding the wake of the boat 108). The rider notification elements 122 can be positioned at or near the transom of the boat 108 such that they are visible to a rider, although other positions are possible (e.g., on a wake tower). In some embodiments, the controller 120 can send a notification (e.g., by a wireless communication link) to a remote notification device, which can be worn by the rider (e.g., on the wrist), located on the wake surfboard, etc.

Figure 22:
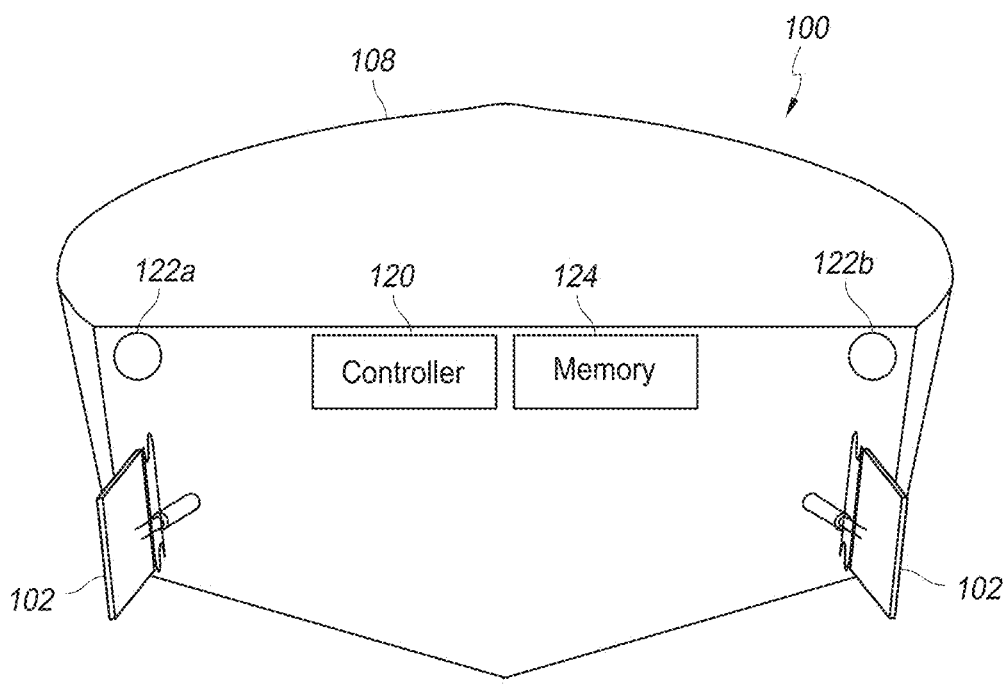
FIG. 22 shows an example embodiment of a boat with a wake shaping system that includes rider notification elements.

In some embodiments, the system 100 can include a port notification element 122a and a starboard notification element 122b, as shown, for example in FIG. 22. The port and starboard notification elements 122a and 122b can include one or more lights. As shown in FIG. 22, for example, the system 100 can include a port notification light 122a and a starboard notification light 122b, and the controller 120 can operate the lights 122a and 122b to provide notifications to the rider. For example, if the wake shaping system 100 is configured to provide a port-side surfing wake, the port notification light 122a can be illuminated and the starboard notification light 122b can be off (or vice versa). In some embodiments, both the port notification light 122a and the starboard notification light 122b (or neither) is be illuminated while the water diverters 102 change the side of the wake that is adapted for surfing from one side to the other. In some embodiments, one or both of the port indicator light 122a and the starboard indicator light 122b can flash to indicate that the water diverters 102 will soon change the side of the wake that is adapted for surfing from one side to the other. For example, if the controller 120 receives an instruction to change the side of the surf wake (e.g., from the driver via a user interface 142 or from instructions stored in memory 124), the controller 120 can wait for a delay period before making the change, and the controller can provide a notification of the upcoming change to the rider during some or all of the period of delay (e.g., for about 2 seconds to about 10 seconds prior to the start of the transition). Many variations are possible.

Figure 23:
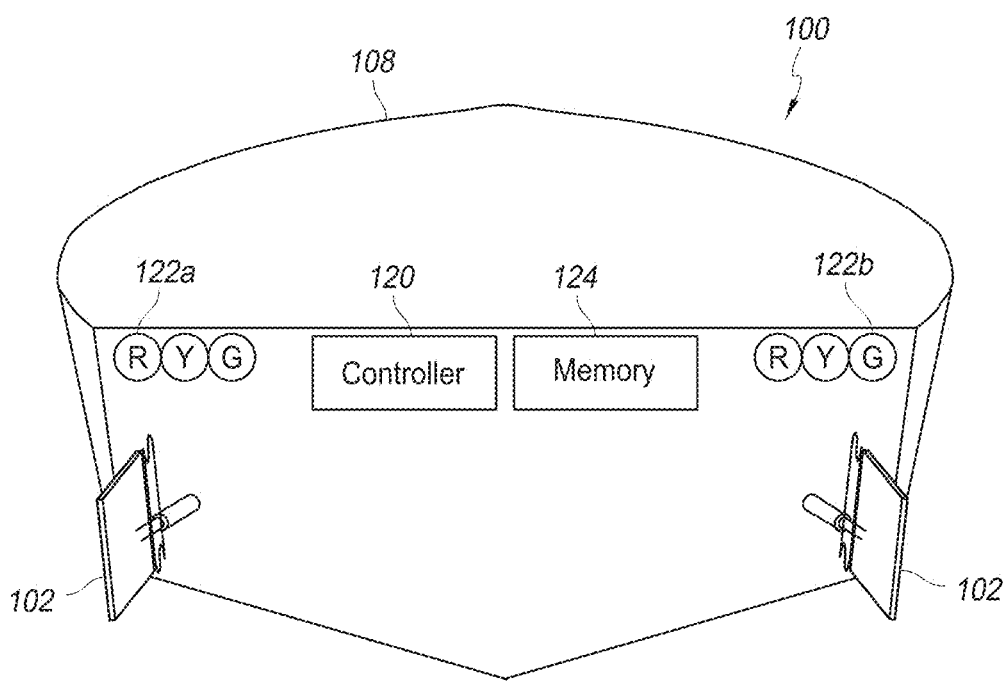
FIG. 23 shows another example embodiment of a boat with a wake shaping system that includes rider notification elements.

As shown in FIG. 23, in some embodiments, the port notification element 122a can be configured to emit multiple colors of light (e.g., red, yellow, and green), such as from multiple light sources. Similarly, the starboard notification element 122b can be configured to emit multiple colors of light (e.g., red, yellow, and green), such as from multiple light sources. In some embodiments, a first color (e.g., green) can be emitted when the wake is adapted for surfing on the same side as the light. A second color (e.g., yellow) can be emitted when the surf wake is moving from one side to the other, or as an indication that the surf wake will soon move from one side to the other. A third color (e.g., red) can be emitted when the wake is adapted for surfing on the opposite side as the light. The colors can be used to provide information to the user regarding other wake properties. For example, a first color (e.g., green) can be emitted to indicate that the wake has a relatively low height or a relatively low steepness (e.g., a beginner wake). A second color (e.g., yellow) can be emitted to indicate that the wake has an intermediate height or an intermediate steepness (e.g., an intermediate wake). A third color (e.g., red) can be emitted to indicate that the wake has a relatively large height or is relatively steep (e.g., an advanced wave). An individual flashing color can be used to indicate that the wake properties are changing, or are about to change. The lights on one side 122a or 122b can be all off to indicate that the wake is adapted for surfing on the side of the boat 108 opposite the lights that are off. In some embodiments, the lights on both sides can be turned on, or off, or can flash to indicate that the surf wake is changing from one side to the other or that the surf wake will soon change from one side to the other. For example, lights on both sides can flash to notify the rider that the surf wake will soon change sides. The rate at which the lights flash can indicate how long before the transition will start. For example a faster rate of flashing can indicate that the transition will start relatively soon (e.g., within 1 second or less), and a slower rate of flashing can indicate more time (e.g., about 3 seconds or more) until the transition will start. During the transition of the surf wake from one side to the other (e.g., during actuation of the water diverters 102), one or more lights on both sides can be turned on. Many variations are possible.

Figure 24:
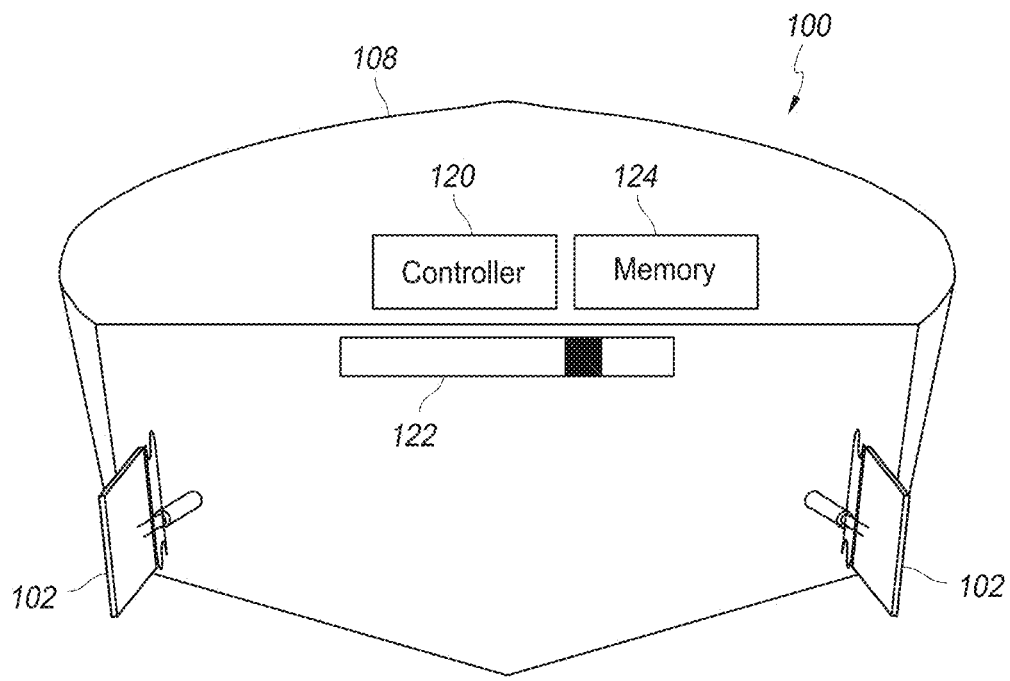
FIG. 24 shows another example embodiment of a boat with a wake shaping system that includes rider notification elements.
Figure 25:
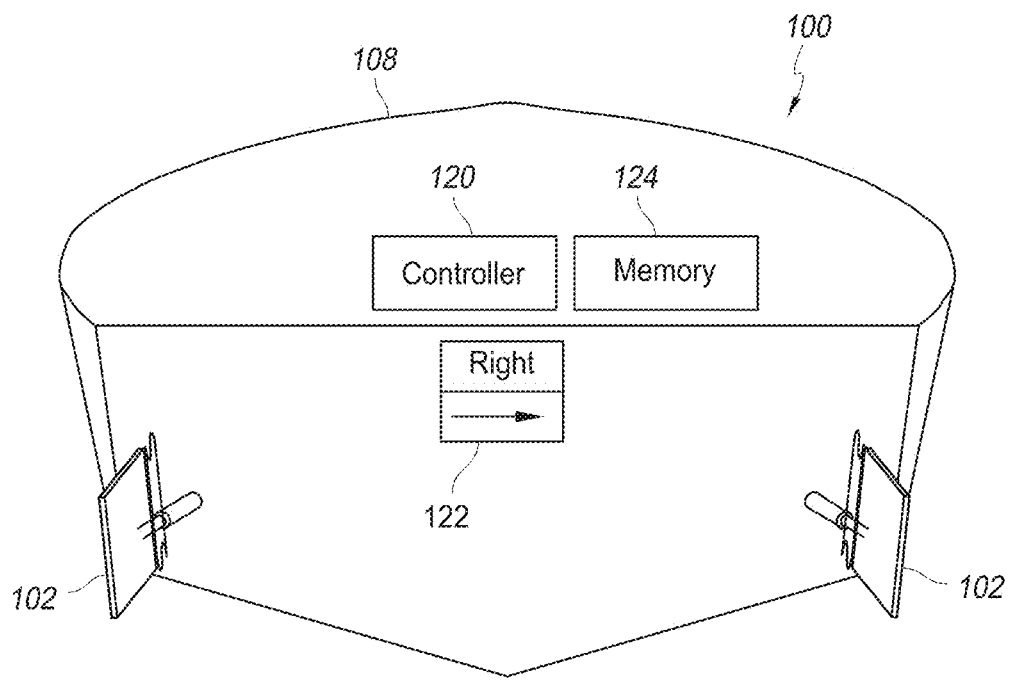
FIG. 25 shows an example embodiment of a boat with a wake shaping system that includes rider notification elements.

With reference to FIG. 24, the rider notification element 122 can include a graphical slide 122 that can be configured to provide a notification based on the position of one or both of the water diverters 102. For example, the graphical slide 122 can indicate where one or both of the water diverters 102 is positioned between the fully deployed and the fully retracted positions. Thus, a slide indication that is somewhat to the right (as shown in FIG. 24) can indicate that the starboard side of the wake is adapted for surfing and that the at least one water diverter implanting the starboard-side surf wake is not fully deployed.

In some embodiments, the rider notification element 122 can include a display, such as an alpha-numeric display or a graphical display. The display 122 can be configured to display the rider notification, e.g., either as text or as a graphical image. The display 122 can display other information to the rider, such as an identification of a trick to be performed, boat speed, ballast information, a score awarded during a competition, etc. The rider notification element 122 can display a countdown to the rider, where the countdown indicates an amount of time until an event such as a transition from a port-side wave to a starboard-side wave, or vise versa, or a change in wave shape (e.g., steepness or size).

Although some examples have been given, it will be understood that many different types of rider notification elements can be used. For example, the rider notification element 122 can include an audio speaker, and the controller 120 can be configured to play audio notifications for the rider. The audio speaker can be disposed at or near the transom of the boat 108, and can be directed toward the rider (e.g., rearward). The audio speaker can be a speaker dedicated to rider notifications (e.g., having a special location or orientation). In some embodiments, the controller 120 can be in communication with speakers that can also be used to play music or other sounds, and those same speakers can be used to send an audio rider notification. The audio rider notification can be a sound (e.g., a load blast) indicating that the surf wake is changing sides, or will soon change sides. In some implementations, different sounds can be used to indicate different things to the rider. For example, the rider notification can include an audio countdown, which can be similar to the visual countdown discussed above. In some embodiments, the audio rider notification can include a series of sounds (e.g., beeps) that have a frequency that corresponds to a change in the wake. For example, the frequency of the sounds can increase as the time approaches for the wake to transition from one side to the other side. In some embodiments, the frequency of the short sounds (e.g., beeps) can increase until the water diverters 33 begin the transition, and a longer continuous sound can indicate that the wake is transitioning from one side to the other. In some embodiments, a series of short sounds can have an increasing (or decreasing) frequency as the wake transitions from one side to the other, thereby indicating the progress of the wake transition as it occurs.

Those of skill in the art will understand from the disclosure herein that many variations are possible. In some embodiments, the rider notification element can be a single light source. For example, the light can be off when the parameters of the surf wake are static. The light can turn on or flash as a notification that the surf wake is changing sides or is about to change sides. In some embodiments, the rider notification can include a combination of visual and audio elements to notify the rider of adjustments in the wake. In some embodiments, the rider notification element 122 can include one or more movable mechanical elements. For example, the rider notification element 122 can be configured to raise a flag or move an indicator from a first location to a second location (e.g., to notify the rider that a wake adjustment is beginning or about to begin). In some cases, a plurality of flags or other indicators can be movable to different positions to notify the rider of different types of wake adjustments (e.g., transition from right-side to left-side, transition from left-side to right-side, a change in wake height, or the wake position behind the boat, etc.). In some embodiments, the visual rider notifications element 122 can be located at a location that is easy for the rider to see while riding the wave produced by the boat 108, such as on the transom of the boat 108, on the swim platform, on a low portion of the boat 108 (e.g., on the hull, near the water line). In some embodiments, the one or more rider notification elements 122 (e.g., visual or audio) can be located on the rider control 134 (which is discussed below in connection with FIG. 27A). In some embodiments, one or more rider notification elements 122 (e.g., visual or audio) can be located on a tow rope handle, and the rider notification data can be communicated to the tow rope handle via a wireless communication interface or via a wire extending in or along the tow rope. In some embodiments, the one or more rider notification elements 122 can be located on the wake surfboard or can be coupled to the wake surfboard. For example, the wake surfboard can include a mount configured to couple an electronic device to the wake surfboard, wherein the electronic device includes the one or more rider notifications elements 122. In some embodiments, one or more rider notification elements 122 can be positioned on a tower (e.g., a wake boarding tower), such as on one or both of the side bars of the tower and/or on the cross bar that connects the side bars of the tower. In some embodiments, rider notification data can be communicated (e.g., wirelessly) to the rider (e.g., to the rider control 134 or to the wake surfboard). The rider notification data can be communicated (e.g., wirelessly) to allow the notifications to be presented to spectators, to passengers on the boat 108, to other competitors in a competition, etc. In some embodiments, the rider notification elements 122 can include audio and visual elements, which can be coordinated or can complement each other. For example, one or more speakers can emit a plurality of sounds (e.g., a series of beeps), and one or more lights can emit light (e.g., a series of flashes) at the same time as the sounds.

In some embodiments, the rider notifications can be adjustable. For example, a wake change (e.g., change of sides, change of size, change of shape) can occur after a delay time after the rider notification, and the delay time can be adjustable. For example, one rider may prefer to receive a notification half-a-second before the wake change, and another rider may prefer to receive a notification 1 second, 1.5 seconds, or 2 seconds, etc. before the wake adjustment. Different delay times can be used for different types of wake changes. For example, a rider may want to receive a notification 1 second before the wake changes from the right-side surf wake to a left-side surf wake, and the rider may want to receive a notification half-a-second before the wake changes from a flat shape to a steep shape. The memory 124 can include stored setting for the lengths of the delay times. The controller can be configured to operate the rider notification element 122 based in part on the stored settings. The settings can be adjusted, e.g., via a user interface. Different settings can be set for different riders. In some embodiments, the rider notification settings (e.g., the delay from the notification to the transition) can depend at least in part on the rider's experience, the rider's weight, the board size, the board type (e.g., skimmer board or finned surfboard), wave height, wave length, wave shape, the rider's position on the wave, etc. For example, a rider may prefer a different amount of delay between the rider notification and the transition depending on whether the wave has a relatively large height and relatively short length or a relatively small height and a relatively long length. For example, if the wave has a longer length, the rider may be rider further from the back of the boat and may need more time to prepare to transition from one side of the wake to the other.

In some embodiments, the wake shaping system 100 can be configured to execute a predetermined sequence of wake shaping operations. The same predetermined sequence of wake shaping operations can be performed multiple times in order to provide a preset run for use during a wakesurfing competition. Also the same predetermined sequence of wake shaping operations can be performed multiple times in order to provide a consistent environment for a rider to learn or practice particular maneuvers or tricks. For example, when a rider is learning the maneuver of transitioning from one side of the wake to the other, the rider can have more success if the surf wake moves from one side to the other in the same manner each time the rider attempts the maneuver.

Figure 26:
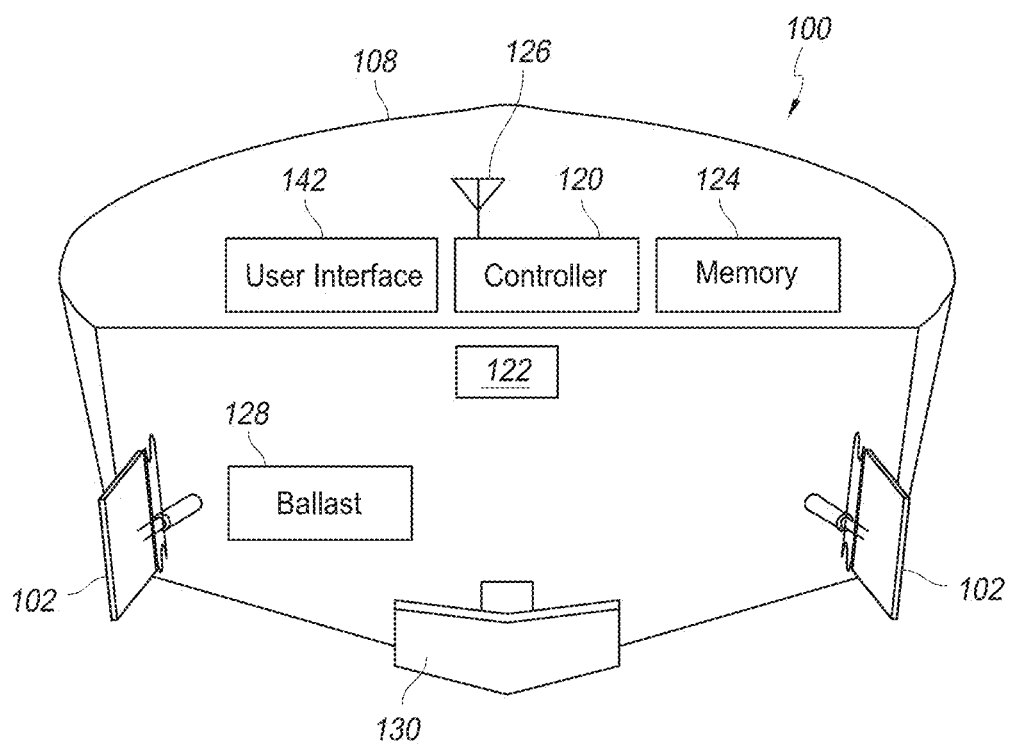
FIG. 26 shows an example embodiment of a boat with a wake shaping system.

With reference to FIG. 26, the wake shaping system 100 can include a memory 124 that stores one or more sets of wake shaping operations (e.g., as one or more preset runs). A user interface 142 (e.g., on the boat 108) can allow a user (e.g., a driver, a competition judge, etc.) to select a preset run to be delivered to the controller 120. The user interface 142 can also allow a user to adjust the parameters of a preset run or define new preset runs. For example, a set of wake shaping operations can include a first type of port-side surf wake for 30 seconds, then a second type of port-side surf wake for 14 seconds, then a transition from a port-side surf wake to a starboard-side surf wake lasting 2 seconds, then a first type of starboard-side surf wake for 30 seconds, and ending with a second type of starboard-side surf wake for 14 seconds. This example would provide a 1.5 minute long preset run that can be used to allow multiple riders to compete in a run that is dynamic and exciting to observe, while also being consistent across each execution of the run, thereby enabling an exciting and fair competing environment. Many variations are possible, and many types of preset runs can be used (e.g., stored in memory 124). The preset run can last for a relatively short time (e.g., about 5 to about 30 seconds) or for relatively long times (e.g., about 5 minutes to 30 minutes). The preset run can include two or more wake shaping operations, wherein the second wake shaping operation is to be performed at a later time than the first wake shaping operation. Additional wake shaping operations can be included and can be performed at times later than the first and second operations. For example, 5, 10, 20, or more wake shaping operations can be included in a single preset run. In some embodiments, the operations can be configured to effect gradual changes in the wake shaping features, and the effects of the different operations can overlap each other, in some instances. In some cases, the wake shaping operations can be distinct from each other, in that one operation is configured to create a wake type independent from the other operations of the preset run.

The controller 120 can receive instructions (e.g., from memory 124, from a user interface 142, or via a communication interface 126 from a remote device (e.g., a remote computer or mobile device such as a phone or tablet)) corresponding to the sequence of wake shaping operations, and the controller 120 can implement the wake shaping operations by adjusting one or more wake shaping features on the boat 108. Example wake shaping features include, by way of example, water diverters 102 (which can be configured to control which side of the wake is adapted for surfing and/or other surf wake properties), ballast tanks 128, boat speed, one or more wake-modifying devices 130 (e.g., the Power Wedge discussed above), one or more trim tabs (not shown in FIG. 26), etc. These wake shaping features can be used in various different combinations of settings to achieve surf wakes of various different types. In some embodiments, the controller 120 can receive instructions that specify the settings for the various wake shaping features that correspond to desired sequence of surf wakes, and the controller can implement the desired sequence of surf wakes by applying the specified settings to the various wake shaping features.

In some embodiments, the controller 120 can receive instructions that include a sequence of desired surf wake types (e.g., as mentioned in the example above). The controller 120 can be configured to determine what settings should be applied at what times to the various wake shaping features to achieve the specified sequence of surf wake types. In some embodiments, the controller 120 can consider factors specific to the boat 108 when determining how to implement the specified sequence of surf wake types. For example, controller 120 can consider the type of water diverters 102 (especially for systems that include interchangeable water diverters), the weight in the boat (dynamic ballast), the distribution of weight in the boat 108, the hull shape and/or boat model, the depth of the water, etc. (e.g., which information can be entered by a user via the user interface or can be received from sensors or from a remote source via the communication interface 126). Accordingly, a preset sequence of wake shaping operations can be consistently applied by different boats, or by the same boat at different times, by using a controller that is configured to determine the settings for implementing the desired surf wake types.

In some embodiments, the system 100 can include one or more rider notification elements 122, as discussed above. The rider notification element 122 can notify a rider of upcoming changes in the surf wake type, of a type of preset run, a score, etc. The rider notification element 122, or other features similar to thereto, can also be used provide information to observers of a wakesurfing competition, so that observers are informed of the dynamic setting of the competition.

Figure 27A:
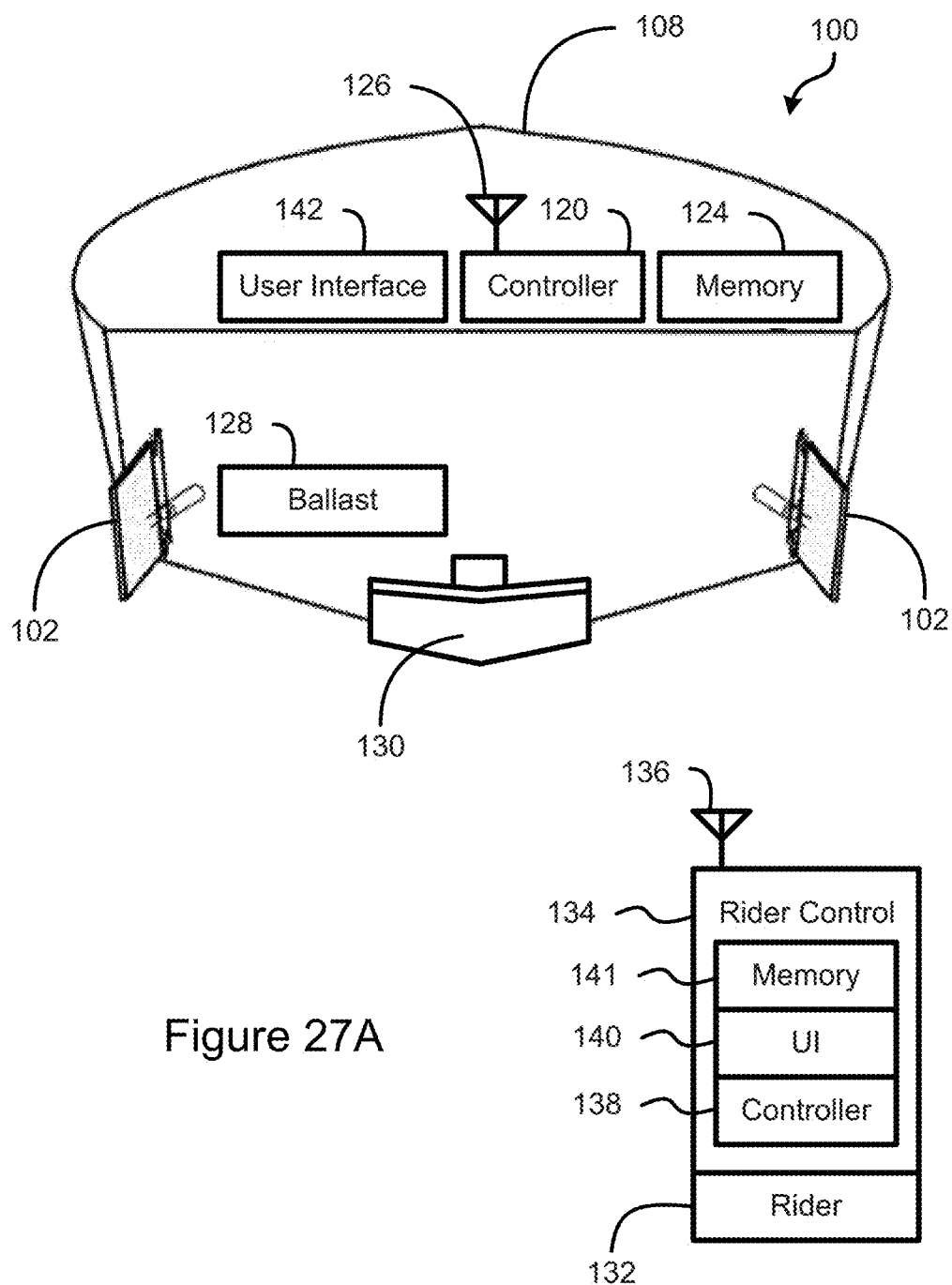
FIG. 27A shows an example embodiment of a wake shaping system that includes a rider control device.

With reference to FIG. 27A, in some embodiments, the wake shaping system 100 can be configured to allow a rider 132 to control the surf wake. For example, the controller 120 can be configured to receive instructions from a rider control device 134 via a communication interface 126. The system 100 can include a rider control device 134 that is configured to send instructions to the controller 120 via a communication interface 136. The communication interfaces 126 and 136 can communicate, for example, via a wireless communication link such as by Bluetooth, WiFi, or via other suitable communication protocol. The user control device 134 can include a user interface 140 configured to receive input from the rider 132. The user control device 134 can include a memory 141 that can store input from the rider 132 or various other information discussed herein. The rider control device 134 can include a controller 138 which can be configured to handle the transfer of data between the user interface 140, the memory 141, and the communication interface 136 of the rider control device 134. In some embodiments, the controller 138 can perform various determinations discussed herein. For example, various determinations that are discussed as being performed by the controller 120 can be performed instead by the controller 138 on the rider control device 134. Various determinations can also be made by an outside controller (e.g., on a remote computer or a mobile device such as a phone or tablet) and results of the determinations can be received by one or both of the communication interfaces 126 and 136.

In some embodiments, the rider control device 134 can be buoyant such that it floats in water (e.g., if it becomes separated from the rider 132). The rider control device 134 can be water resistant or waterproof. For example, the rider control device 134 can include a water resistant or waterproof housing. The rider control device 134 can be wearable device that is configured to worn on the rider's body, for example as an arm band, watch, necklace, hat, hood, life jacket, life vest, etc. The rider control device 134 can be a fob or a handheld device, in some embodiments. The rider control device 134 be attached to, or integrated into, a wake surfboard. The rider control device 134 can be attached to or integrated into a tow rope handle. Many other configurations are possible.

The rider control device 134 can be configured to allow a rider 132 to change settings of one or more of the wake shaping features on the boat 108, such as the water diverters 102 (which can be configured to control which side of the wake is adapted for surfing and/or other surf wake properties), one or more ballast tanks 128, boat speed, one or more wake-modifying devices 130 (e.g., the Power Wedge discussed above), one or more trim tabs (not shown in FIG. 26), etc. The settings can be adjusted individually, and the settings can also be adjusted together, e.g., by selecting a preset configuration. The user interface 140 can enable the rider 132 to input information, such as the rider's height, weight, and skill level, selection of a preset rider profile, board type or dimensions (e.g., length, volume, rocker, etc.), dynamic ballast information (e.g., amount of weight in boat 108 and distribution of weight in the boat 108), the type of water diverters 102 being used, etc. Various selections and operations that are discussed as being performed on the user interface 140 can be performed on the user interface 142 on the boat 108, and vice versa. For example, the rider 132 can select, modify, or define preset runs that can be stored in the memory 141 or in the memory 124. The rider control device 134 can allow a rider 132 to control various settings on the fly, while riding the surf wake. For example, a rider 132 may push a button (or otherwise provide input) corresponding to a maneuver that is associated with a particular surf wake type, and the system 100 can be configured to adjust the settings of the wake shaping features to achieve the desired surf wake type. The rider control device 134 can enable a rider 132 to input a command to change the surf wake from one side to the other, which can give the rider 132 better control over the wake surfing experience. For example when attempting a maneuver that involves transitioning from one side of the boat to the other, the rider 132 can send the command to change sides when the rider 132 is ready to perform the maneuver, instead of having to depend on input from a driver or other user which may come at a time when the rider 132 is not prepared to attempt the maneuver.

The rider control device 134 can include the rider notification elements 122 discussed herein. Accordingly the rider control device 134 can be used to receive input from the rider 132 and to output information to the rider 132, e.g., by sound or visually. For example the rider control device 134 can include a display (e.g., a touchscreen).

In some embodiments, the system can be configured to enable the driver to disable the rider control device 134. For example, if the driver wants to have control over the boat 108 independent of the rider commands (e.g., so that rider commands do not affect the boat steering), the diver can provide an input to the user interface 142 to disable the rider control device 134, or to ignore commands received therefrom. The user interface 142 on the boat 108 can be configured to receive a command (e.g., from the driver) to disable or ignore the rider control device 134. The controller 120 can be configured to disable or ignore the rider control device 134 in response to the command (e.g., from the driver).

In some embodiments, the user interface 142 on the boat 108 can be configured to provide a notification to the driver based on input received from the rider control device 134. For example, if a rider 132 sends a command to change the surf wake from one side to the other, a visual or audio notification can be issued to the driver via the user interface 142. This can alert the driver to adjust the steering of the boat 108 to compensate for the change in the water diverters 102. The system 100 can be configured to notify the driver of changes made by the rider 132 to settings on other wake shaping features as well, especially for changes that may affect the steering of the boat 108. In some embodiments, a visual driver notification can be displayed to the driver. For example, a heads-up-display (HUD) can display a visual driver notification, e.g., by projecting the visual driver notification onto the windshield of the boat 108. A visual driver notification can be displayed on the rear-view mirror. For example, the controller 120 can be in communication with the mirror, e.g., via a wire or a wireless (e.g., Bluetooth) data connection. Data can be sent to the mirror, and the visual notification can be displayed on the mirror. For example, the rear-view mirror can include one or more lights, or a display for displaying graphical or text information, etc. In some embodiments, one or more driver notification elements can be mounted onto the rear-view mirror. For example a driver notification module can include one or more driver notification elements (e.g., visual or audio notification elements), a communication interface (e.g., a wireless communication interface) that is configured to receive information from the controller 120, and a driver notification element controller that is configured to operate the one or more driver notification elements in response to data received from the controller 120 via the communication interface. The driver notification elements can operate similar to the rider notification elements 122 discussed herein.

Allowing the rider 132 to control the wake can be advantageous for certain competitive settings. For example, in a freestyle competition a competitor may have the freedom to select various different combinations of wake surf types, which can allow for unique and creative combinations of maneuvers and tricks (which can provide improved entertainment to observers of the competition). Thus, in a freestyle competition, the competitors can be scored partially on the creativity and dynamic nature of the run selected (or input on the fly) by the competitor. The increased freedom afforded by the user control device 134 can also improve the wakesurfing experience in casual and practice settings.

Figure 27B:
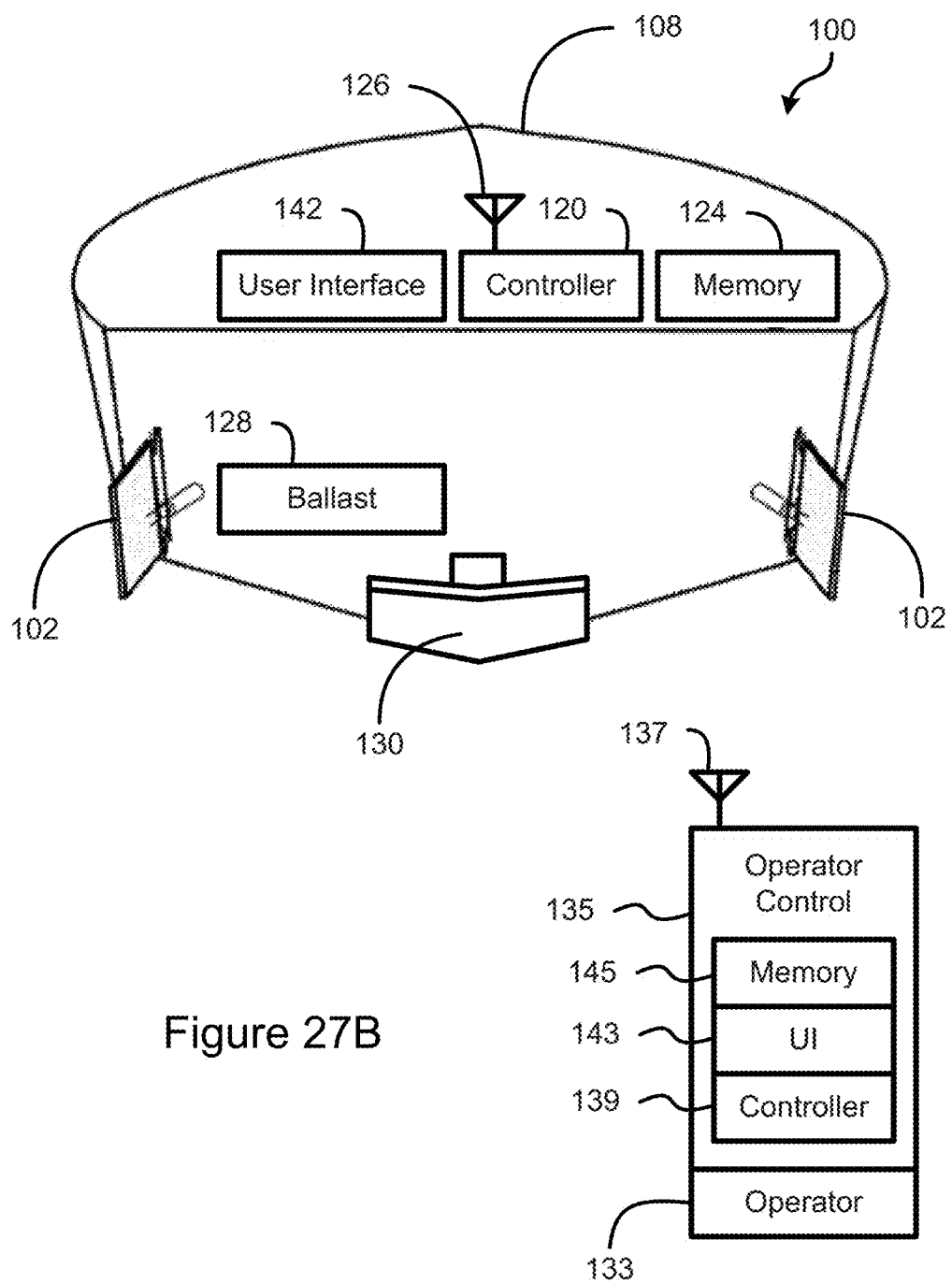
FIG. 27B shows an example embodiment of a wake shaping system that includes an operator control device.

With reference to FIG. 27B, in some embodiments, the wake shaping system 100 can be configured to allow an operator 133 to control the surf wake (e.g., the side, shape, steepness, length, size, etc. of the wake). In some embodiments, the operator 133 can be a person other than the driver and other than the rider, and in some embodiments the rider or driver can control the surf wake. For example, in some embodiments, a passenger in the boat 108, a judge or administrator of a competition, etc. can operate an operator control device 135 to control the surf wake. The operator control device 135 can allow for control of the wake shaping system 100 by someone inside the boat 108 or outside the boat 108. In some embodiments, a passenger in the boat 108 can use an operator control device 135 to modify the wake while the rider is wake surfing. In some cases, the passenger can watch the rider wake surf and can receive instructions from the rider (e.g., verbal or hand signals) and the passenger can adjust the wake based at least in part on the instructions from the rider. In some embodiments, operator control device 135 can include a memory 145, a user interface 143, a controller 139, and a communication interface 137. The operator control device 135 can operate similar to the rider control device 134 discussed herein, and many of the features discussed in connection with the rider control device 134 also apply to the operator control device 135. The operator control device 135 can be a handheld electronic device. In some embodiments, the operator control device 135 can water resistant or waterproof. The operator control device 135 can be a wearable article. The operator control device 135 can be incorporated into a floating article. In some embodiments, the operator control device 135 can be a device dedicated to the operation of the wake shaping system 100. In some embodiments, the operator control device 135 can be an electronic device that can perform additional functions unrelated to the wake shaping system 100. For example the operator control device can be a mobile computing device (e.g., a phone or tablet or laptop) running a program or app that enables the mobile computing device to control the wake shaping system 100. The operator control device 135 can be a hand-held remote. In some embodiments, the operator control device 135 can be attached to or built into the boat. For example, the operator control device 135 can be similar to the driver control systems described herein, except that the operator control device 135 can be positioned at a non-driver location on the boat (e.g., where a passenger would sit). For example, the operator control device 135 can be built into the boat or attached to the boat at or near the passenger side of the dash, at or near the transom (e.g., so the operator can face rearward towards the rider), or at other passenger locations on the boat. The operator control device 135 can include features similar to, or the same as, the input device 65, the user interface 142, or other user interfaces described herein. The operator control device 135 can include a display for providing information to the operator. The display can be a touchscreen, which can be configured to receive input from the operator. In some embodiments, the operator control device 135 does not include a display. The operator control device 135 can include a joystick. The operator control device 135 can communicate with the controller 120 via a wireless communication interface, or via one or more wires. In some embodiments, when the operator control device 135 modifies the wake, the system 100 can issue a rider notification and/or a driver notification, as discussed herein.

Figure 29:
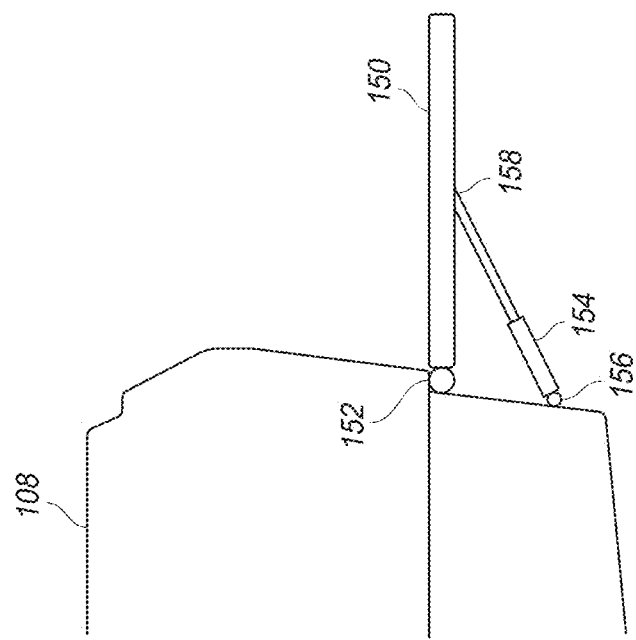
FIG. 29 shows the movable swim platform of FIG. 28 in a raised position.
Figure 28:
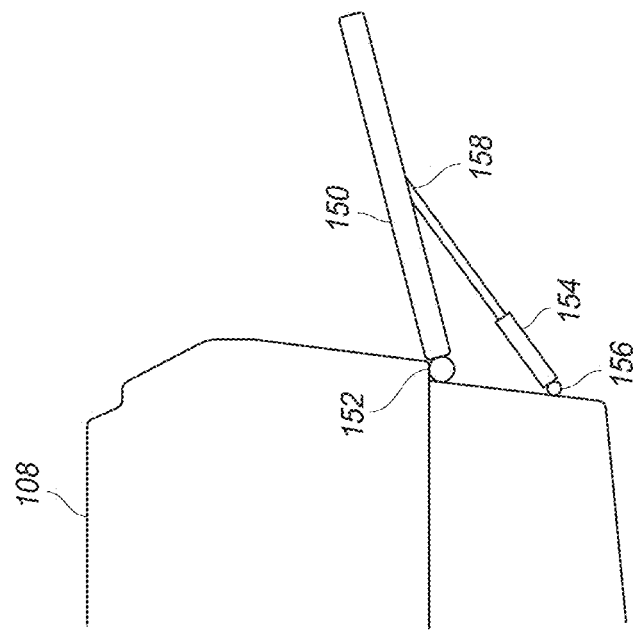
FIG. 28 shows an example embodiment of a boat having a movable swim platform.

With reference to FIGS. 28 and 29, in some embodiments, the swim platform 150 can be movable (e.g., pivotable) with respect to the boat 108, such that the swim platform 150 can be moved to a raised position to reduce the effect of the swim platform 150 on the wake. For example, the swim platform 150 can be coupled to the boat 108 (e.g., to the transom) by a joint 152 that enables the swim platform 150 to move between a neutral position (e.g., shown in FIG. 28) and a raised position (e.g., shown in FIG. 29). In some embodiments, an actuator 154 can be configured to move the swim platform between the neutral and raised positions. The actuator 154 can include an electric motor, a hydraulic motor, a pneumatic motor, or any other suitable mechanism for actuating the swim platform 150. In some embodiments, the actuator 154 can be coupled to the boat 108 (e.g., to the transom at a location below the swim platform 150) by a joint 156 that allows the actuator 154 to pivot with respect to the boat 108 (e.g., to accommodate a change in the position of the actuator 154 (e.g., the angle between the actuator 154 and the boat 108) as the swim platform 150 moves). Similarly, the actuator 154 can be coupled to the swim platform 150 (e.g., to the underside or edges thereof) by a joint 158 that allows the actuator 154 to move (e.g., pivot) with respect to the swim platform 150.

In some embodiments, the actuator 154 can be in communication with the controller 120 and can be configured to move the swim platform in response to instructions received from the controller 120. For example, a user can provide a command (e.g., via the user interface 140 or 142) to raise or lower the swim platform. In some embodiments, the swim platform 150 can automatically raise when the boat 108 goes above a predetermined speed (e.g., about 7 mph) and/or can automatically lower when the speed of the boat 108 goes below a predetermined speed (e.g., about 7 mph).

In some embodiments, the system 100 can be configured such that the swim platform 150 will not move (e.g., from the raised to neutral position and/or from the neutral to the raised position) when the boat speed is below a threshold value (e.g., about 5 mph). Also, in some embodiments, the system 100 can monitor the resistance on the actuator 154 as it moves the swim platform 150, and the controller 120 can stop (or reverse) movement of the swim platform 150 if the resistance goes above a threshold value. The threshold value can correspond to a force that is low enough that it would not injure a person's body portion (e.g., a child's leg) if it were to be caught by the swim platform 15, and that is high enough to move the swim platform 150 between the neutral and raised positions. For example, the threshold value can correspond to a force between about 3 lbs. and about 200 lbs., between about 5 lbs. and about 100 lbs., between about 10 lbs. and about 50 lbs., between about 20 lbs. and about 40 lbs., or between about 25 lbs. and about 35 lbs., although values outside these ranges can used. The system can be configured to monitor a signal (e.g., power, amperage, etc.) provided to the actuator 154 to determine whether stop (or reverse) movement of the swim platform 150. For example, the threshold value can be between about 3 amps and about 12 amps, between about 4 amps and about 10 amps, between about 6 amps and about 8 amps, or about 6.5 amps, although the threshold value can be outside these ranges in some embodiments. Similarly, in some embodiments, system 100 can be configured such that the water diverters 102 will not move (e.g., from the neutral position to the deployed position and/or from the deployed position to the neutral position) when the boat speed is below a threshold value (e.g., about 5 mph). Also, in some embodiments, the system 100 can monitor the resistance on the one or more actuators 104 as they move the water diverter(s) 102, and the controller 120 can stop (or reverse) movement of the water diverter(s) 102 if the resistance goes above a threshold value. The threshold value can correspond to a force that is low enough that it would not injure a person's body portion (e.g., a child's leg) if it were to be caught by the water diverter 102, and that is high enough to move the water diverter 102 between positions. For example, the threshold value can correspond to a force between about 3 lbs. and about 200 lbs., between about 5 lbs. and about 100 lbs., between about 10 lbs. and about 50 lbs., between about 20 lbs. and about 40 lbs., or between about 25 lbs. and about 35 lbs., although values outside these ranges can used. The system can be configured to monitor a signal (e.g., power, amperage, etc.) provided to the actuator 104 to determine whether stop (or reverse) movement of the water diverter 102. For example, the threshold value can be between about 3 amps and about 12 amps, between about 4 amps and about 10 amps, between about 6 amps and about 8 amps, or about 6.5 amps, although the threshold value can be outside these ranges in some embodiments.

With reference again to FIGS. 28 and 29, in some embodiments, the swim step 150 can be manually movable between the neutral and raised positions. For example a locking mechanism can be include (e.g., on the joint 152) that is configured to lock the swim platform 150 in the neutral and/or raised positions. A release mechanism (e.g., on the joint 152) can enable a user to release the swim platform 150 from the locked state so that it can be moved. In some embodiments, the locking mechanism and release mechanism can be incorporate together as a single mechanism (e.g., on the joint 152). In some embodiments, the swim platform 150 can be positioned (e.g., locked) at one or more of intermediate positions (or can be infinitely positionable between the raised and neutral positions), either by the actuator 154 or by the locking and release mechanism(s). In some embodiments, a spring or shock can be used to facilitate movement of the swim platform 150 between positions.

In some embodiments, the swim platform 150 can be configured to redirect water to improve wake shape. For example, in some embodiments, instead of raising the swim platform 150 to reduce its effect on the wake (as discussed in connection with FIGS. 28 and 29), a water redirecting mechanism (not shown) can be coupled to the swim platform 150 (e.g., on the underside thereof) or can be positioned under the swim platform 150 (e.g., coupled to the boat 108). The water redirecting mechanism can be configured to redirect water (e.g., water that would otherwise hit the swim platform 150) into the wake produced by the boat 108, thereby improving wake shape and/or size.

In some embodiments, the user interface 140 or 142 can be configured to display fuel efficiency information. Some wake shaping features can cause reduced fuel efficiency when used. Accordingly, the system 100 can provide the user with information to enable to the user to decide whether to disable features that reduce fuel efficiency, or to adjust those features to a setting that provides acceptable fuel efficiency. In some embodiments, the controller 120 can be configured to consider fuel efficiency when adjusting the wake shaping features to achieve a specified wake type. In some embodiments, the user interface 142 can allow a user to specify a priority level for fuel efficiency. For example if the priority level is set to a low value, the controller 120 can give low priority to improving fuel efficiency, and if a high priority level is specified by the user the controller 120 can give higher priority to improving fuel efficiency.

In some embodiments, the user interface 140 or 142 can be configured to receive input from a user for feedback regarding wake quality. For example, a user can specify a quality value for the wake created by the boat 108 under its current settings. The controller 120 store the user feedback (e.g., in memory 124) and can take the user's prior feedback into account when determining the settings to use for the wake shaping features. Thus, the controller 120 can be configured to "learn" a user's preferences and use those preferences to improve wake shape (e.g., for a particular rider).

In some embodiments, the user interface 142 can include a joystick configured to receive input (e.g., from the driver) for controlling the wake shaping features. The joystick can allow for various buttons or other user input elements to be readily available to a user's hand. Thus, if the joystick is configured to steer the boat 108 (e.g., in some embodiments, no steering wheel is used), the wake shaping input controls can be readily available to the driver's hand even while the drier operates the steering mechanism (e.g., joystick). Also a joystick can have improved water resistance and/or improved resilience as compared to some user input devices (e.g., a touchscreen). The wake shaping system 100 disclosed herein includes various features applicable to improving the shape of a wake (e.g., for wake surfing). Various wake shaping features described herein can operate in concert to achieve various different wake types. The wake shaping system 100 can provide a wide range of user freedom and control to achieve optimal wake shape and size for a wide variety of uses.

Figure 30:
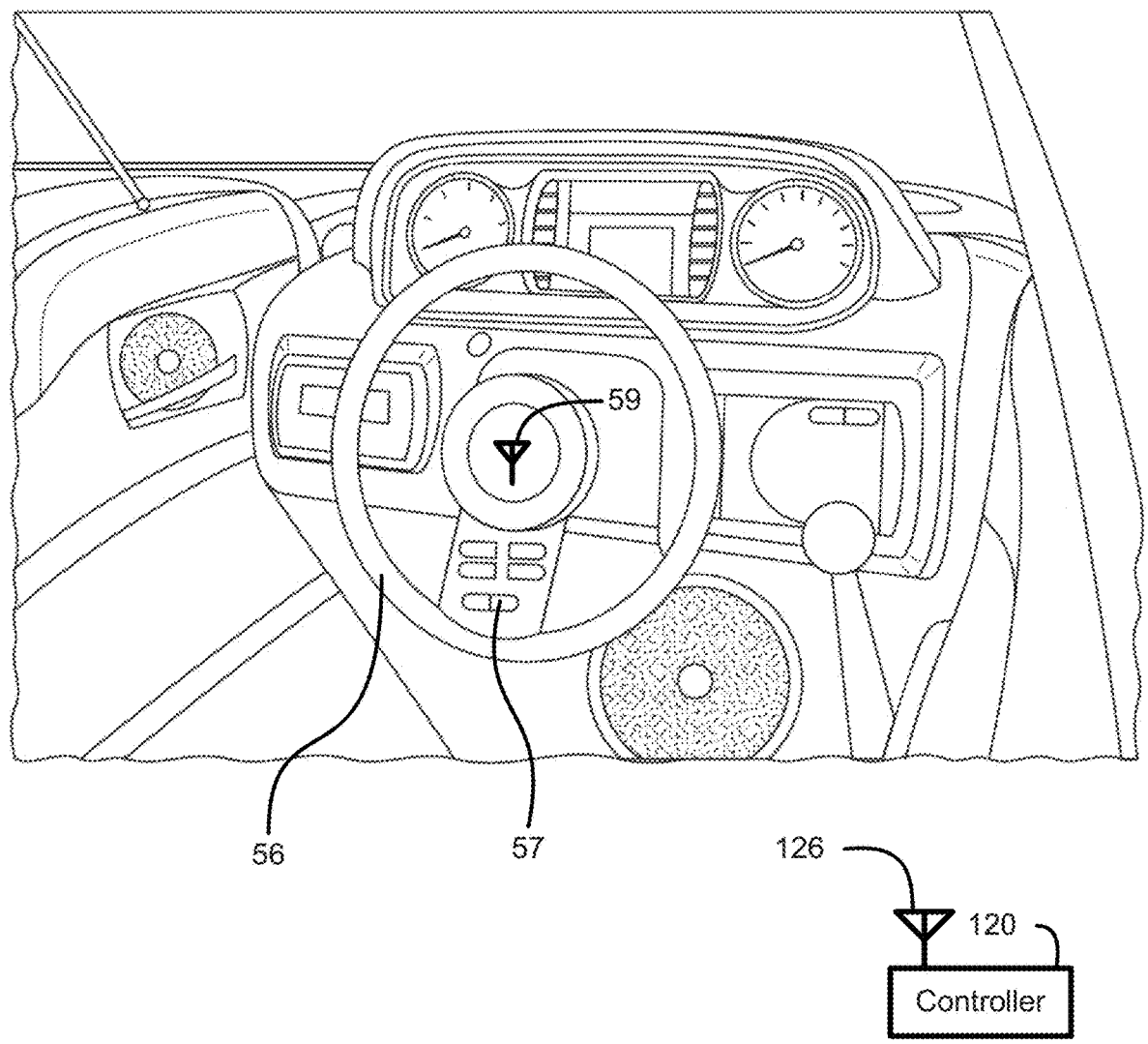
FIG. 30 shows an example embodiment of a steering wheel with wake control input elements incorporated therein to facilitate control of the wake by a driver.

With reference to FIG. 30, in some embodiments, the steering wheel 56 can include user input elements 57 to allow a driver to control the wake shaping features. The user input elements 57 can include features similar to the other embodiments discussed herein. The user input elements 57 can include buttons (or other features) that allow a user to select a right-side surf wake, a left-side surf wake, an amount of ballast, settings for other wake-modifying devices (e.g., a power wedge), etc. In some embodiments, the user input elements 57 can allow the driver to select a wave type and the controller can adjust the wake shaping features to achieve the specified wake type. In some embodiments, the user input elements 57 can be coupled to the controller 120 via a wire. In some embodiments, the user input elements 57 can be coupled to the controller 120 via a wireless communication interface 59 (e.g., Bluetooth), which can be advantageous in some instances.

The wake shaping system 100 can allow a user (e.g., a driver, rider, or other operator) to select a wake type. For example, the user can select a right-side surf wake or a left-side surf wake. Different wake shapes can be optimal for different types of wake surfing and for different types of tricks and maneuvers. For example, in some cases a rider using a skimmer wake surfboard may want a wake that has a relatively consistent, linear slope, while a rider using a conventional wake surfboard may want a wake that has a relatively curved shape that is steep near the top of the wave. Also, a rider may have particular preferences regarding the height and length of the wave, and various other wave features.

Figure 31:
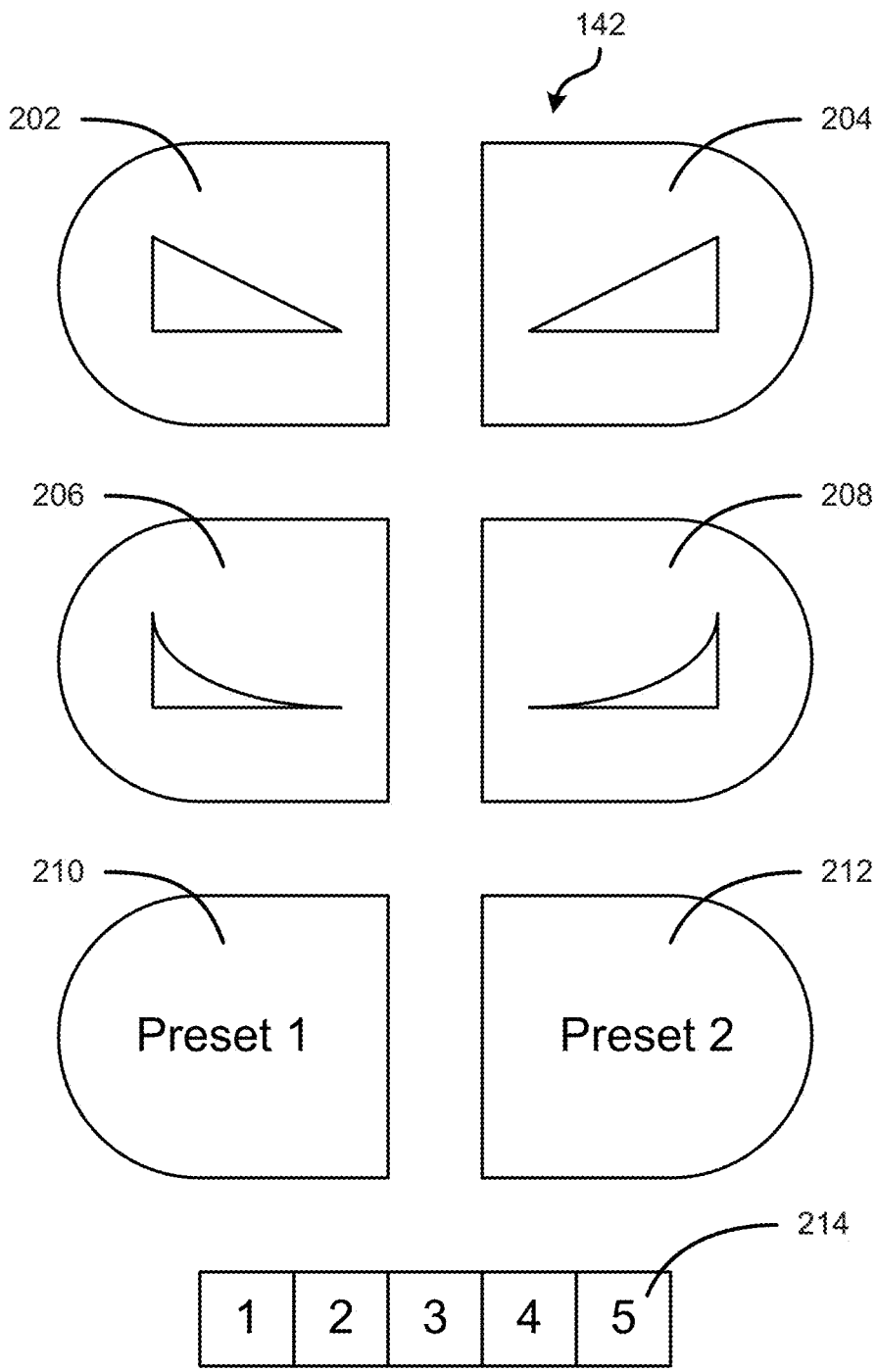
FIG. 31 shows an example embodiment of a user interface for selecting different types of surf wakes.
Figure 32:
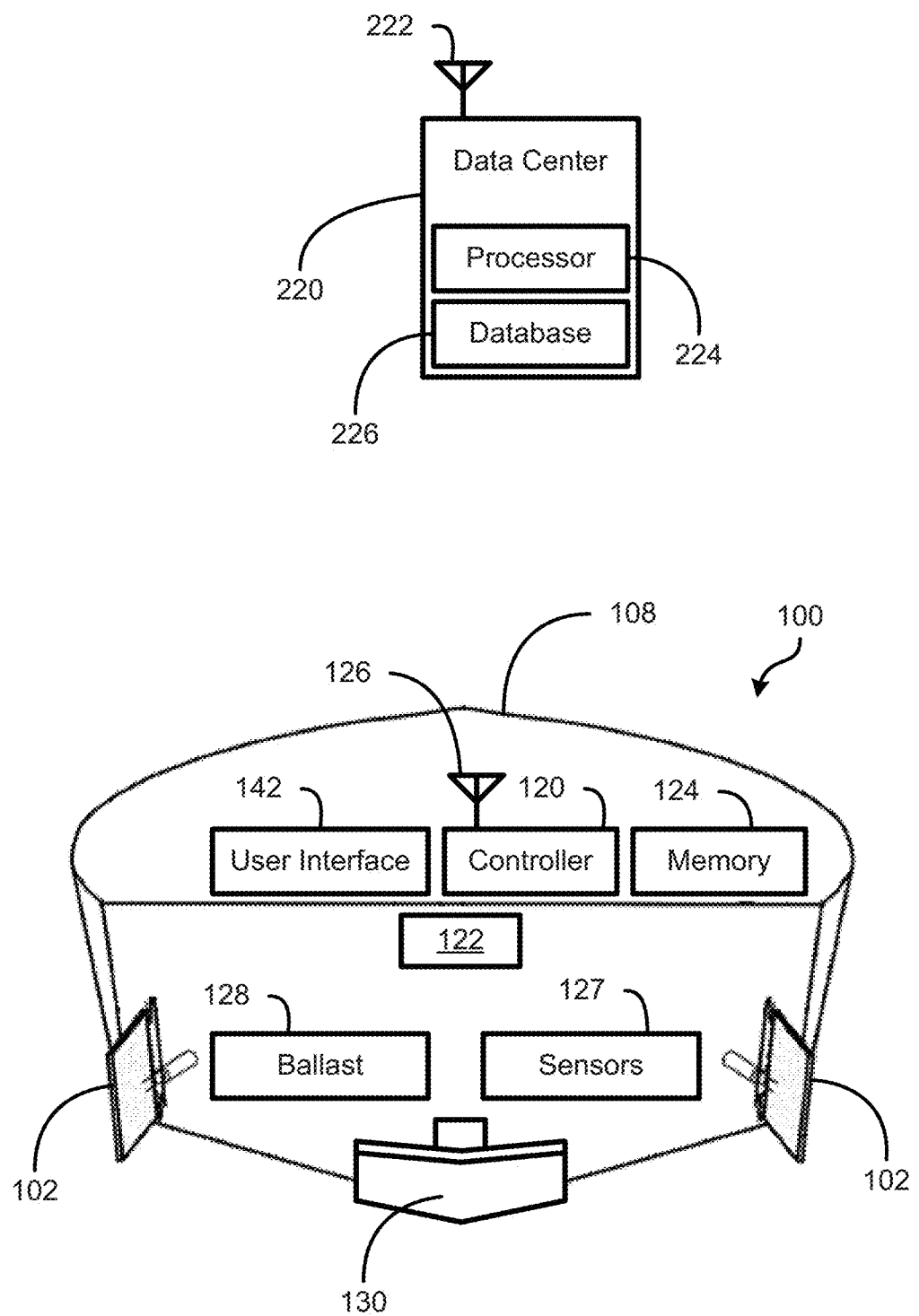
FIG. 32 shows an example embodiment of a boat and a data center that can send and receive data from the boat.

FIG. 31 shows an example user interface 142 for selecting a wake type. FIG. 32 shows a wake shaping system incorporating the user interface 142. In the illustrated example, the user interface 142 can include a button 202 that corresponds to a relatively linear left-side surf wake, a button 204 that corresponds to a relatively linear right-side surf wake, a button 206 that corresponds to a relatively curved left-side surf wake, and a button 208 that corresponds to a relatively curved right-side surf wake. Additional buttons can be included for selecting other wake types or other wake features (e.g., wake height, length, etc.). The user interface 142 can include additional buttons 210 and 212 for user specified preset wake types. The user interface 142 can include user input elements (e.g., buttons) that allow a user to adjust one or more aspects (e.g., wake height, length, steepness, etc.) of the wake. For example, a user can select a default wake type (e.g., by selecting one of buttons 202-208), and the user can push a button to adjust the wake to differ from the default wake. For example, the user can press buttons to selectively increase or decrease the height of the wake, to selectively increase or decrease the length of the wake, or to selectively increase or decrease the steepness of the wake. In some cases, the user input elements can allow for both micro adjustments and macro adjustments. The user interface 124 can permit a user to store the adjusted settings (e.g., in the memory 124) for later use (e.g., as a new present wake that can be selected by buttons 210 or 212).

The controller 120 can be configured to adjust multiple wake shaping features (e.g., water diverters 102, wedge 130, and/or ballast 128, etc.) based on the selection of a single wake-type button. For example, if the user pushes button 206, which corresponds to a relatively curved left-side surf wake, the controller 120 can deploy the right-side water diverter 102 to create a left-side surf wake, and the controller can deploy the wedge 130 to a position that creates a relatively curved wave shape. If the user pushes button 204, which corresponds to a relatively linear right-side surf wake, the controller 120 can deploy the left-side water diverter 102 to create a right-side surf wake, and the controller can move the wedge 130 to a position that creates a relatively linear wave shape. The wedge 130 can pull the back of the boat down into the water when the wedge 130 is in a deployed position, which can produce a relatively taller and steeper wake shape. When the wedge 130 is in a neutral position, the boat can produce a wake that is less tall and less steep than the wake produced with the wedge 130 deployed. In some cases, positioning the wedge in the neutral position can produce a longer surf wake with a surfable area that extends further from the back of the boat than the wake produced with the wedge 130 deployed. The controller 120 can also adjust the ballast 128, as well as other wave shaping features such as trim tabs, boat speed, positions of the water diverters, etc. to produce the selected wake type.

In some embodiments, the controller 120 can be configured to set the boat speed, or to present a recommended boat speed. In some case, a faster boat speed can cause the surfable area on the wake to lengthen behind the boat, which can be advantageous for certain tricks and maneuvers. However, a faster boat speed can also reduce the height of the wake. A slower boat speed (that is still sufficiently fast enough to create a surf wake) can produce a taller wave that has a shorter surfable length behind the boat. In some embodiments, the controller 120 can set the boat speed, upon the selection of the wake type. In some embodiments, the controller 120 can determine a recommended boat speed and can communicate (e.g., via a visual display or an audio speaker) the recommended boat speed to the driver. In some embodiments, the amount or distribution of the ballast can be changed by the controller 120 in response to a user selection of a wave type. The ballast (e.g., water held in containers in the boat) can be automatically moved from one side of the boat (e.g., right side) to the other side of the boat (e.g., left side) based on a selection that changes the surf wake from one side to the other. The amount of ballast can increased (e.g., to increase the size of the surf wake) or reduced (e.g., to reduce the size of the surf wake) in response to a user selection of a wake type. The distribution of the ballast can be changed by the controller 120 based on a user selection of a wake type. For example, more ballast in the back of the boat can result in a wake that has a taller wave height and/or a shorter surfable area behind the boat. More ballast in the front of the boat can result in a wake that has a shorter wave height and/or a longer surfable area behind the boat. Thus in response to a user selection of a wake type, the controller 120 can automatically move ballast in the boat from the front to the rear or from the rear to the front of the boat. In some embodiments, one or more trim tabs can be used, and the controller 120 can automatically move the one or more trim tabs in response to a user selection of a wake type. For example, one or more trim tabs in a deployed position can raise the back of the boat, which can result in a surf wake with a shorter wave height and/or a longer surfable area behind the boat. Setting the one or more trim tabs to a neutral position can produce a surf wake with a taller wave height and/or a shorter surfable area behind the boat. Those of skill in the art will understand based on the disclosure herein that various different combinations of settings for the different wake shaping features can be used to produce a variety of different wake shapes.

In some embodiments, the water diverters 102 can be adjustable. For example, the water diverters 102 can be positioned at intermediate positions between the fully retracted and the fully deployed positions. In some embodiments, the water diverters 102 can be movable in other directions in addition to the movement between the retracted and deployed positions. For example, in some cases the water diverters can be raised and lowered. If a large about of weight is on the boat 108 (e.g., as ballast 128, or passengers, or equipment), the water diverters 102 can be raised to compensate for the boat riding lower in the water. In some embodiments, the water diverters can be movable forward (towards the bow), rearward, and/or from side to side (e.g., towards the starboard or port sides of the boat 108. The positions of the water diverters 102 can be changed by the controller 120 based on other parameters, such as boat speed, etc. Various mechanisms can be used to move the water diverters 102 (e.g., rails, slides, hydraulic actuators, etc.)

In some embodiments, the controller can consider both static variables (such as the type of boat) and dynamic variables (such as the depth of the water, the number of passengers on board, etc.) when setting the wake shaping features to achieve a specified wake type. Because the dynamic variables can have different values at different times, the controller can be configured to adjust the wake shaping features differently at different times even when trying to achieve the same wake type. For example, the controller 120 may use less ballast 128 when more passengers are on the boat 108. In some embodiments, the controller 120 can be configured to adjust the wake shaping features on the fly, while the boat is moving, for example, to try and keep the wake consistent when dynamic variables change. For example, if the depth of water under the boat changes, the shape of the wake can also change, and the controller can be configured to adjust the wake shaping features to compensate for the change in water depth to minimize the change in shape in the wake. In some embodiments, the system 100 can include one or more sensors 127 to measure dynamic variables. For example, a water depth sensor can be included. A boat speed sensor can be included, especially where the user is permitted to adjust the speed of the boat. The boat can include weight sensors for determining how much passenger weight is on the boat and/or the distribution of the passenger weight. Weight sensors can be located in the seats and/or in the floor of the boat 108. In some embodiments, the user interface 142 can be configured to receive input from the user regarding at least some of the dynamic variables. For example the user interface 142 can allow a user to specify a number of passengers on the boat and/or the distribution of the passengers on the boat 108.

The user interface 142 shown in FIG. 31 includes a wake quality input element 214, which can allow a user to grade the quality of the wake produced by the boat 108. For example, if the user pushes button 204, which corresponds to a relatively linear right-side surf wake, but the user observes that the produced wake is more curved than desired, the user can give the wake a low score (e.g., by pushing a button for a lower number such as 1 or 2). On the other hand, if the user observes that the current settings produce a wake that conforms well to the specified wake shape, the user can give the wake a high score (e.g., by pushing a button for a higher score such as a 4 or 5). The user interface 142 can include user input elements that are configured to permit the user to provide quality feedback regarding a particular aspect of the wake. For example, the user can select a button corresponding to wake height and can make a selection that indicates the height of the wake. The system can use the collected data to improve the wake and to "learn" the preferences of the rider. In some cases, the memory 124 can store different settings for different riders, to account for the individual rider preferences. The user interface 142 can allow the user to identify the rider.

In some embodiments, settings and/or algorithms for particular wake shapes can be downloaded to the memory 124 of the wake shaping system 100, e.g., from a remote source such as a data center 220. The data center 220 can include a processor 224 and a database 226 that includes settings and/or algorithms for various wake types. The algorithms can specify how the settings should change as a result of changes in the dynamic variables. The data center 220 can communicate with the wake shaping system 100 via a communication interface 222 associated with the data center and the communication interface 126 on the boat 108. For example, a wireless communication link can be established between the data center 220 and the boat 108, so that data can be downloaded to the memory 124 in the boat 108 from the database 226 of the data center 220. In some embodiments, updates can be released for the settings and/or algorithms for the types of wakes, and the updates can be downloaded to the boat memory 124 from the data center 220. In some embodiments, data can be transferred from the boat memory 124 to the data center 220. For example, a user can upload personalized settings to the data center 220 for storage, and the personalized settings can later be downloaded to a different boat. Thus, the user can have personal settings saved independent of the specific boat that was used to develop the personalized settings. Thus if the user is on a different boat (e.g., during a competition or when traveling), the user can still access the personalized settings that were stored in the data center. In some embodiments, the data center 220 can allow a user to download settings and/or algorithms that were uploaded and/or developed by other users. For example, the data center can allow a user to download the same settings and/or algorithms used by a professional wake surfer, by the user's friend, etc. In some embodiments, the data center 220 can allow the users to score, grade, or rank the settings and/or algorithms of others, and the data center 220 can communicate the scores, grades, or ranks to others. The data center 220 and/or the interface 142 can permit a user to search for settings for a particular wake type. Thus, a user searching for settings and/or an algorithm for producing a particular type of wave can identify settings and/or algorithms for that wake type that were well received by other users. In some embodiments, the processor 224 can be configured to perform statistical analysis on the data uploaded by the users. The statistical analysis can be used to generate additional settings and/or algorithms. In some embodiments, a mobile device (e.g., a cell phone or tablet computer) can include the interface 142 (e.g., as part of a mobile device program or app). The mobile device can communicate with the data center 220 as discussed above. In some embodiments, the mobile device can communicate (e.g., via a wired or wireless communication interface) with the boat controller 120. Thus, a user can use the mobile device to control the wake, and some or all the functions described in connection with the controller 120 can be performed by the mobile device. The user can use the mobile device to send data to, or receive data, from the data center 220, as discussed herein. In some embodiments, the boat can include a wireless communication interface 126, which can communicate with the data center 220 via a wireless network when a user parks the boat in a garage or at another location that is accessible to the wireless network. In some embodiments, the wireless communication interface 126 on the boat can communicate with the data center 220 when the boat is in use (e.g., on a lake).

A wake surfing competition can be operated in various different manners, and can include various different features. Various features and ideas that can be incorporated into a wake surfing competition are discussed below. Riders can receive scores based on one or more of power, flow, and variety of tricks. In some embodiments, a rider's run can end after a set amount of time or after a set number of falls, or the sooner of the two. In some embodiments, there is no penalty for falling (other than loss of time), thereby providing an incentive to attempt innovative and difficult tricks. In some embodiments, a rider can receive scores for each trick performed during a run, and the overall score for the run and be based at least in part on a set number of one or more top trick scores. For example, the total score for a run can be based at least in part on the sum of the top two or three trick scores. This can create an incentive for riders to perform difficult and innovative tricks during the run, as opposed to a large number of relatively easy maneuvers. In some embodiments, scores can be given for a group of tricks that are strung together, as opposed to each individual trick. In some embodiments, the run can be divided into sections, for example, a pre-set run may have a first section on the right side, a second section on the left side, a third section on the right side, and a fourth section on the left side. Each section of the run can receive a score, and the overall score for the run can be based on a set number of one or more top section scores.

In some embodiments, scores can be provided to the rider while the rider is performing the run. This real-time scoring can allow the rider to adjust strategy during the run based on the scores received. The rider notification elements 122 discussed herein can be used to provide scores to the rider. The scores can be provided visually (e.g., on a display) and/or audibly (e.g., from an audio speaker). The scores can be provided to spectators during the run as well, which can heighten spectator enjoyment. One or more video cameras can be mounted onto the boat 108 or can be held by one or more camera operators on the boat 108. The video data can be transmitted during the run (e.g., via a wireless signal from the communication interface 126), so that the video can be viewed live by judges, other competitors, and/or by spectators. In some embodiments, multiple competitors can be on the same boat 108, so that the competitor can rotate through runs quickly. In some embodiments, one or more judges, coaches, or spectators can be on the boat 108 during the competition.

In some embodiments, a rider can start a run by using a tow rope, and the user can use the tow rope to gain extra speed for performing an initial trick or maneuver. The rider can drop the tow rope and perform the remainder of the run without the tow rope. In some embodiments, the rider can receive a separate score for the initial trick or maneuver that was performed with the initial boost in speed. In some embodiments, tricks and maneuvers performed while transitioning from a right-side surf wake to a left-side surf wake (or vice versa) can be scored differently than maneuvers and tricks that are performed when the surf wake is not in transition. In some cases, the contest can include an award for the best transfer from one side to the other. The contest can also include awards for the best single trick, the best air, the best trick performed with a speed boost from the tow rope, etc. The contest can also include an overall winner based on the aggregate of several scores.

In some embodiments, the run can include obstacles, ramps, or other physical structures that the rider can incorporate into the tricks and maneuvers. In some embodiments, the run can pass over different areas that have different water depths in order to vary the shape of the wake. In some embodiments, a rider can ride the surf wake formed behind a first boat, and a second boat can produce a wake that interacts with and modifies the surf wake of the first boat. In some embodiments, the wakes from the two boats can interfere with each other to increase the size of the surf wake produced by the first boat. In some embodiments, the two boats can travel in the same direction so that the wake can maintain an increased size. In some embodiments, the boats can travel in different directions so that the two wakes interact only temporarily, e.g., creating a temporary water ramp. The rider can try to time one or more tricks to take advantage of the temporarily modified wake shape.

In some embodiments, multiple riders can perform runs without stopping the boat. For example, jet skis can be used to tow the riders into the wake at the start of a run. Jet skis can also pick up riders when they fall. In some embodiments, a rider's run ends when the rider falls, so that the boat does not need to stop to pick up the fallen rider and so that the next rider can start a run. For example, when a rider falls, a jet ski can tow the next rider into the wake to start the next run.

In some embodiments, the runs can be short and the runs can be performed in an area that is visible to spectators. This can increase spectator enjoyment of the competition. For example, the distance of the runs can be less than or equal to about 200 meters, less than or equal to about 100 meters, less than or equal to about 50 meters, less than or equal to about 25 meters, or less. The distance of the runs can be at least about 10 meters, at least about 20 meters, at least about 30 meters, at least about 50 meters, or more. For example, runs that cover a distance of about 50 meters can last for about 15 seconds each. The competition can include a large number of runs preformed in rapid secession. In some embodiments, multiple boats can be used. While one boat is performing a run, another boat can be preparing to start a run. In some embodiments, a queue of boats (e.g., 3, 4, 5, or more) can be used to reduce time between runs. When a boat finishes a run, it can travel back to the starting side and can enter the back of the queue. In some embodiments, boats can travel in two directions across the course. For example, two boats can be positioned at opposing ends of the course. A first boat can perform a run and travel across the course in a first direction. After the first boat performs a run, the second boat and perform a run and travel across the course in a second, generally opposite direction. While one boat is performing a run, the other boat can turn around and prepare for its next run.

In some embodiments, the riders can perform the same preset run, as discussed herein, which can provide a consistent environment for the competition. The preset run can be selected or created by the rider, the driver, an operator, a judge, one or more spectators, etc. In some instances, a group of people (e.g., riders, judges, spectators) can vote in order to select a preset run that will be used by multiple riders. In some embodiments, riders that are regular-footed (left-foot-forward) can use a first preset run that includes a plurality of wake shape changes and/or a plurality of transitions from one side to the other. Riders that are goofy-footed (right-foot-forward) can use a second preset run that includes the same wake shape changes and transitions except that the sides are reversed. For example, a first preset run (for regular-footed riders) can start with a left-side surf wake and can transition to a right-side surf wake, while the second preset run (for goofy-footed riders) can start with a right-side surf wake and can transition to a left-side surf wake. Thus both regular-footed and goofy-footed riders would ride frontside (front of the rider facing the surf wake) for the same portions of the run, and they would also ride backside (back of the rider facing the surf wake) for the same portions of the run. In some embodiments, the rider can have control over the wake shaping operations (e.g., using the rider control device 134), which can allow for more freedom and creativity during the competition because the rider can choose when to transition from one side to the other and the rider can modify the wake shape to optimize the maneuvers that the rider wants to perform.

In some embodiments, an operator on the boat can control the wake (e.g., using operator control 135). The rider can give instructions (e.g., verbally or using hand signals) to the operator. In some cases, the operator can be a coach or a colleague associated with the rider. In some cases, the operator can also be the driver of the boat. The operator and rider can practice together to coordinate wake shape changes and wake side transitions with particular tricks and maneuvers. Thus, the competition can involve not only the skill of the riders, but also the skill of the operators in timing the wake shape changes and wake side transitions. For example, a rider can instruct the operator that the rider intends to perform a particular trick that involves a modification of the wake (e.g., a transition from a left-side surf wake to a right-side surf wake). The rider can begin to perform the maneuver, and the operator can issue a command (e.g., using the user interface 143) at a particular time during the maneuver (e.g., based on prior practice performed by the rider and operator).

Figure 33:
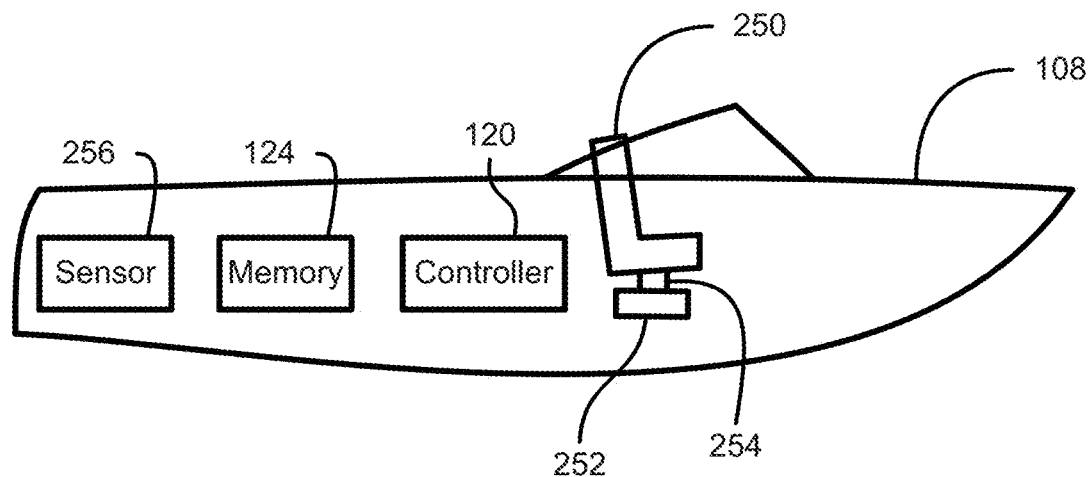
FIG. 33 shows a boat in a relatively level orientation with a chair at a first position.
Figure 34:
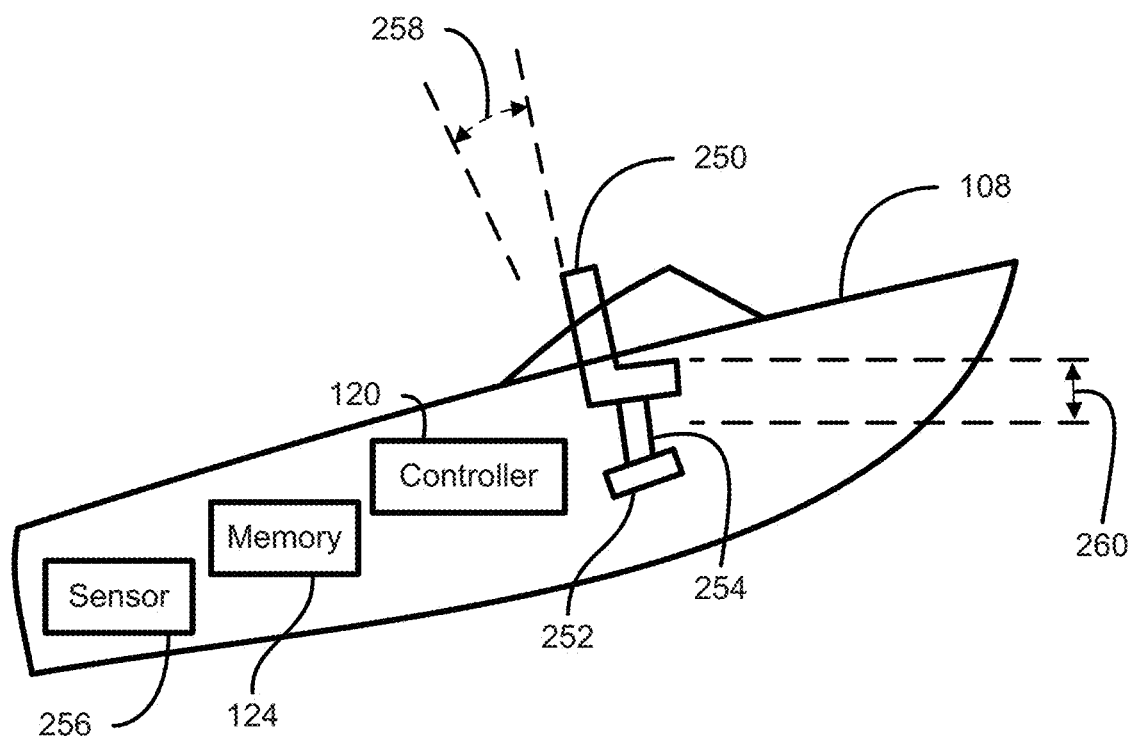
FIG. 34 shows a boat with the bow lifted upward and the chair in a second position.

With reference to FIGS. 33 and 34, the boat 108 can include a chair 250 that is movable to help the driver see over the bow of the boat 108 (e.g., when the bow is raised). In some situations, the bow of the boat 108 can lift upward. For example, when the boat 108 starts moving or accelerates the bow of the boat 108 can lift upward. In some cases, the bow of the boat 108 can remain raised until the boat 108 reaches a speed that causes the hull to plane. When the bow of the boat 108 is raised, the stern of the boat 108 can be lowered deeper into the water, which can increase the size of the wake produced by the boat 108. Accordingly, the driver can drive the boat 108 at a speed that keeps the stern deep in the water, which can also keep the bow lifted upward. In some embodiments, the boat 108 can include one or more wake-modifying devices (e.g., the Power Wedge 130 discussed herein) that are configured to pull the stern of the boat 108 downward, which can raise the bow of the boat 108. FIG. 33 shows the boat 108 in a relatively level position. FIG. 34 shows the boat 108 in a position with the bow lifted upward. The lifted bow can obstruct the visibility of a driver that is seated in the driver's seat 250. The driver can stand to see over the raised bow, but standing can be uncomfortable for the driver, and can make it more difficult for the driver to operate the controls of the boat 108, which may be designed to be accessible to a seated driver.

The boat 108 can include a chair 250 that is movable to help the driver see over the raised bow. The chair 250 can have a first (e.g., neutral) position, as shown in FIG. 33, and the chair 250 can have a second (e.g., raised and/or forward) position, as shown in FIG. 34. In some embodiments, the chair 250 can be positioned higher in the second position than in the first position. The distance 260 between the first position of the chair 250 and the second position of the chair 250 can be at least about 10 cm, at least about 20 cm, at least about 30 cm, at least about 40 cm, at least about 50 cm, at least about 60 cm, or more. The distance can be less than or equal to about 100 cm, less than or equal to about 75 cm, less than or equal to about 50 cm, or less. In some embodiments, the chair 250 can be raised higher than the ranges provided above. In some embodiments, the chair 250 can angle forward when it moves from the first position to the second position. The angle 258 between the first position and the second position can be at least about 2°, at least about 5°, at least about 10°, at least about 15°, at least about 20°, or more. The angle 258 can be less than or equal to 45°, less than or equal to 30°, less than or equal to 20°, less than or equal to 15°, or less. The chair 250 can be angled forward by an amount outside the ranges provided below, in some embodiments.

One or more actuators 254 can be coupled to the chair 250 can be configured to move the chair 250 between the first and second positions. In some embodiments, the actuators 254 can be configured to position the chair 250 at intermediate positions between the first and second positions. The actuators 254 can include one or more hydraulic and/or pneumatic actuators, rails and slides, electric motors, etc. In some embodiments, multiple actuators 254 can be used to enable the chair 250 to move in multiple degrees of motion. For example, chair 25 can be raised and lowered, rotated forward and rearward, slide forward and rearward, etc. A seat portion of the chair 250 and a back portion of the chair 250 can move together, independently, and/or relative to each other. In some embodiments, a base member 252 can couple the chair 250 to the boat 108.

In some embodiments, the chair 250 can include manual controls configured to permit a user to set the position of the chair 250. Accordingly, a user can manually adjust chair to the second position when the bow is raised. For example, buttons, dials, or other user control elements can be provided (e.g., on the chair 250 or on a control panel), and the user can actuate the user control elements to move the chair 250. The user control elements can include a first button, and the controller 120 can move the chair 250 to the first (e.g., neutral) position in response to user selection of the first button. The user control elements can include a second button, and the controller 120 can move the chair 250 to the second (e.g., raised and/or forward) position in response to user selection of the second button. The memory 124 can include saved settings for the first and second positions of the chair 250, and in some embodiments the user can adjust the saved settings. For example, the user can adjust the chair 250 to a desired first position (e.g., using the user control elements) and the user can save the settings for the desired first position. Similarly, the user can adjust the chair 250 to a desired second position (e.g., using the user control elements) and the user can save the settings for the desired second position. The memory 124 can have saved settings for multiple drivers. The memory 124 can have saved settings for first and second positions for each of multiple drivers. The user input elements can be configured to allow a user to change the selected driver, and also to change between the first and second chair positions for the selected driver.

In some embodiments, the controller 120 can move the chair from the first position to the second position automatically when the bow is raised. The boat 108 can include a sensor 256, which can be configured to determine whether the bow is raised. For example, the sensor 246 can be an orientation sensor (e.g., comprising an accelerometer) or a level sensor that is configured to measure the orientation of the boat 108. In some embodiments, when the angle of the boat 108 is below a threshold value, the controller 120 can position the chair 250 at the first position, and when the angle of the boat 108 is above a threshold value, the controller 120 can position the chair 250 at the second position. In some embodiments, the controller 120 moves the chair 250 to the second position when the angle of the boat 108 is above the threshold angle for a threshold amount of time. This can avoid movement of the chair 250 when the boat 108 is only in a raised-bow position for a short time. The controller 120 can be configured to move the chair 250 gradually between the first position and the second position as the angle of inclination of the boat 108 increases. The controller 120 can be configured to move the chair 250 gradually toward the first position as the angle of inclination of the boat 108 decreases towards a level orientation. Thus, in some embodiments, the chair 250 can move gradually to various different positions as orientation of the boat 108 moves gradually between various different angles.

In some embodiments, one or more driver control features can move when the chair 250 moves. For example, the angle and/or height of the steering wheel can change as the chair 250 moves toward the first position or toward the second position. The throttle control, touch screen, buttons, driver output elements (e.g., a speedometer or a display), and/or other driver control features can be movable in similar manner to maintain proximity and orientation relative to the driver as the chair 250 moves back and forth between the first position and the second position.

The driver control features can be coupled to the chair 250 such that they move together, e.g., as part of a movable driver station that includes the chair 250 and the driver control features. In some embodiments, the driver control features can include one or more actuators separate from the one or more chair actuators 254. The driver control features can move independent from or relative to the chair 250, in some cases.

In some embodiments, the driver's chair and the driver control features (e.g., steering wheel, etc.) can be positioned in a generally central portion of the boat 108, as opposed to a starboard or port side.

Figure 35:
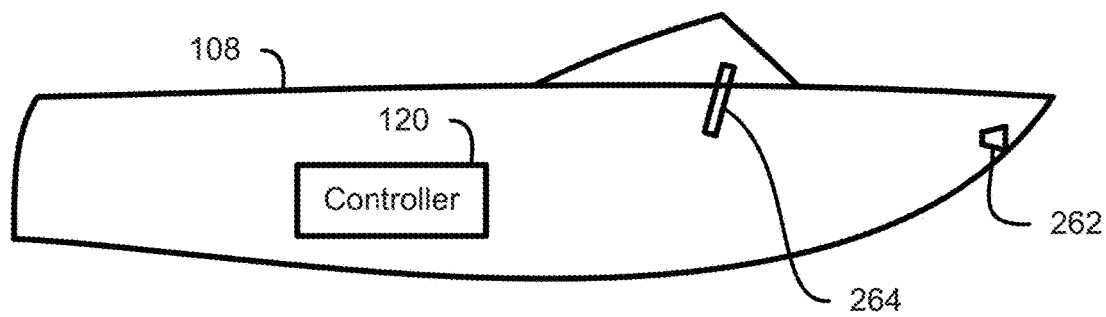
FIG. 35 shows an example embodiment of a boat that includes a forward-facing camera and a display configured to display images of the area in front of the boat.

With reference now to FIG. 35, in some embodiments, the boat 108 can include a camera 262 (e.g., a video camera) that is positioned to generate pictures or video of an area in front of the boat 108. The pictures or video can be displayed (e.g., to a driver) on a display 264, e.g., to thereby show the viewer where the boat 108 is going. In some embodiments, the controller 120 can receive the pictures or video from the camera 262 (e.g., via a wire or a wireless communication link), and the controller 120 can display the pictures or video on the display 264. The camera 262 can be positioned in or on a bow portion of the boat 108 and can be pointed forward. Various other positions are possible for the camera 262. The camera 262 and display 264 can improve the visibility of the driver, especially when the bow of the boat 108 is raised, as discussed herein.

Figure 36:
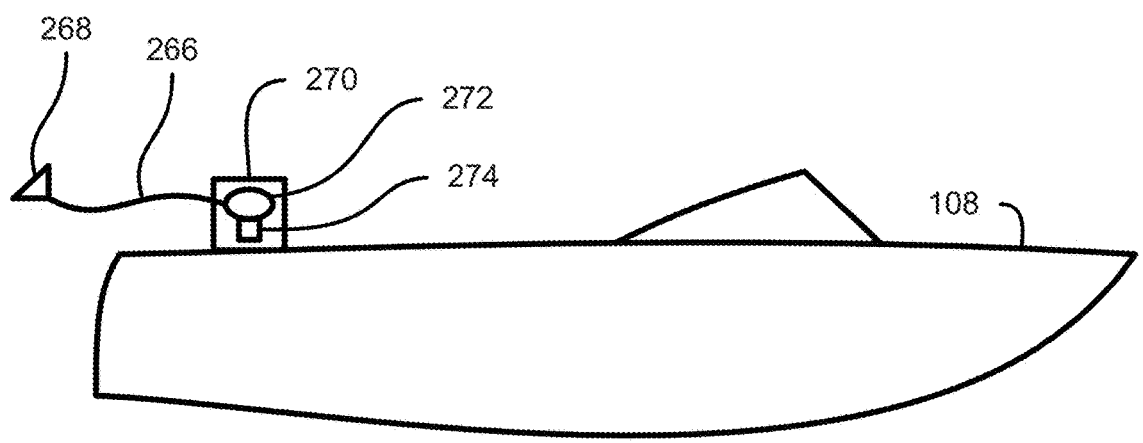
FIG. 36 shows an example embodiment of a boat that includes a retractable tow rope.

With reference to FIG. 36, in some cases, a rider can hold on to a rope 266 (e.g., to a handle 268 on the rope 266) during the start of a wake surf run. The rope 266 can pull the rider up out of the water as the boat 108 starts moving. Once the rider is positioned on the surf wake, the rider can release the rope 266 and can ride the surf wake without the assistance of the rope 266. In some instances, the rope 266 can interfere with the rider. For example, a rider may toss the rope 266 aside, but the flow of water can drive the rope 266 back towards the rider, which can cause the rider to fall and/or become tangled in the rope 266. When the rider releases the rope 266, a passenger in the boat 108 can gather the rope 266 into the boat, which can be burdensome on the passenger. In some embodiments, the boat 108 can include a retractable rope 266. The rope 266 can automatically retract (e.g., into the boat 108) when the rider releases the rope 266.

In some embodiments, the boat 108 can include a rope retracting mechanism 270. The rope retracting mechanism 270 can include a spool 272, which can be rotatable about an axis. The rope can be coupled to the spool 272 such that rotation of the spool 272 in a first direction causes the rope 262 to wrap around the spool 272. Accordingly, rotation of the spool 272 in the first direction can cause the rope 266 to be gathered into the rope retracting mechanism. Rotation of the spool 272 in a second direction can release the rope 266 from the spool 272, which can allow the rope 266 to exit the rope retracting mechanism. The rope retracting mechanism 270 can include a biasing element 274 that is configured to bias the spool 272 in the first direction. The biasing element 274 can be a spring coupled to the spool 272 such that rotation of the spool 272 in the second direction causes potential energy to build up in the spring. If the rope 266 is in an extended position and there is insufficient force to hold the rope 266 in the extended position (e.g., when the rider releases the rope 266), the biasing element 274 can cause the spool 272 to rotate in the first direction to retract the rope 266. When a sufficient force is applied to the rope 266 to overcome the biasing element 274 (e.g., when a rider is holding the rope and being towed behind the boat 108), the rope 266 can remain in the extended position. When the rider releases the rope 266, the rope 266 can be automatically retracted to the boat 108.

In some embodiments, the rope 266 can be locked at a desired length. For example, one or more engagement features on the spool 272 can be selectively engaged by one or more locking features, which can lock the spool 272 in place, thereby preventing the spool 272 from retracting the rope 266 and/or preventing the spool 272 from releasing more of the rope 266. An actuator (e.g., a button or lever) can be configured to engage and/or disengage the locking features and the engagement features. The engagement features and locking features can include one or more teeth and one or more pawls. For example, the spool 272 can included various teeth distributed around the spool 272, and an actuator can cause a pawl to engage the teeth to lock the spool. To lock the rope 266 at a particular length, the rope can be extracted to the particular length, and the actuator can be actuated to engage the locking features with the engagement features.

In some embodiments, the rope 266 can be set to a selectable maximum length while rope retraction is enabled. Different riders may prefer to use different lengths of rope. Different lengths of rope may be preferable for different wake types and different wake settings. Accordingly, in some embodiments, a maximum length of the rope 266 can be set, such that the spool 272 is impeded from rotating further in the second direction. The spool 272 can be permitted to rotate in the first direction (e.g., due to a force applied by the biasing element 274). Thus, in some embodiments, when the locking mechanism is activated, the length of rope 266 behind the boat 108 can only shorten and cannot increase in length. In some embodiments, the locking mechanism can include a ratchet system, e.g., which can include one or more pawls and one or more teeth. When engaged with each other, the pawls and teeth can be configured to ratchet in a first direction (e.g., to allow the spool 272 to rotate in the first direction to retract the rope 262) and to prevent rotation of the spool 272 in the second direction. The locking mechanism can be released (e.g., by pushing a button or moving a lever, etc.), which can cause the pawls and teeth to disengage, which can allow rotation of the spool 272 in both directions.

In some embodiments, the water diverters 102 can be set manually. In some embodiments, the features for manually setting the water diverters 102 can be used in place of the actuators and electronic controllers discussed herein. In some embodiments, the features for manually setting the water diverters 102 can be included along with the actuators and electronic controllers discussed herein. For example, if a malfunction occurs with the electronic system for setting the water diverters 102, the manual features can be used as a backup. In some embodiments, the actuators can be decoupled from the water diverters 102 (e.g., by removing a pin or bolt, or by releasing a clamp or other releasable attachment mechanism). Thus, the water diverters 102 can be detached from the actuators when the manual positioning system is used. In some embodiments, the manual positioning system can be used while the actuators remain coupled to the water diverters 102.

Figure 37:
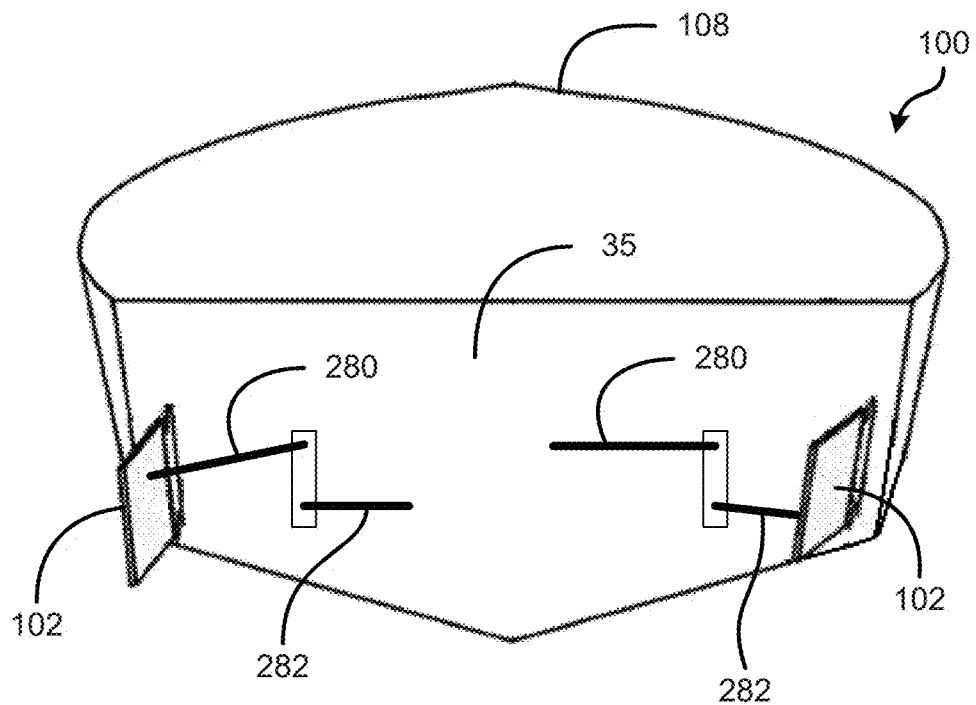
FIG. 37 shows an example embodiment of a boat that includes features for manually positioning the water diverters.

Various types of mechanisms can be used to manually set the water diverters 102. With reference to FIG. 37, in some embodiments, the manual features can include first positioning elements 280 configured to position the water diverters 102 at the extended or deployed position (as shown on the left side of FIG. 37). In some embodiments, second positioning elements 282 can be included and can be configured to position the water diverters 102 at a neutral or retracted position (as shown on the right side of FIG. 37). In some embodiments, the positioning elements 280 and/or 282 can be movably (e.g., pivotally) coupled to the boat 108 (e.g., to the transom), and the positioning elements 280 and/or 282 can be moved aside when not coupled to the water diverters 102. For example, the positioning elements 280 and/or 282 that are not in use can be engage retaining mechanisms that are configured to hold the positioning elements 280 and/or 282 against or near the hull of the boat 108. The water diverters 102 can include retaining mechanisms that are configured to couple the positioning elements 280 and/or 282 to the water diverters 102 to position the water diverters at the respective deployed and neutral positions. The first positioning elements 280 can be longer than the second positioning elements 282 such that the first positioning elements 280 are configured to cause the water diverters 102 to extend past the side of the transom when the first positioning elements 280 are coupled to the water diverters 102, which can create a surf wake, as discussed herein. In some embodiments, the positioning elements 280 and/or 282 can be removably attachable to the water diverters 102 via pins, bolts, clamps, snap fit elements, friction fit elements, or other suitable releasable attachment elements. In some embodiments, the second positioning elements 282 can be omitted. For example, in some cases, a water diverter 102 can be removable when not deployed.

Many variations are possible. In some embodiments, the water diverters 102 can rotate towards the center line of the boat 108 until they are near, or abutting against, the transom 35 of the boat 108. A retaining member on the transom can couple with a corresponding retaining member on the water diverter 102 to hold the water diverter at against or near the transom 35. In some embodiments, the water diverters 102 can be removable. For example, the water diverters 102 can slide into a slot formed on the boat 108 (e.g., on or near the transom 35), and the slot can be configured to position the water diverter 102 in the extended or deployed positions to create a surf wake as discussed herein. To create a right-side surf wake, the left-side water diverter 102 can be positioned in the deployed position (e.g., using the slot), and the right-side water diverter 102 can be removed.

Figure 38:
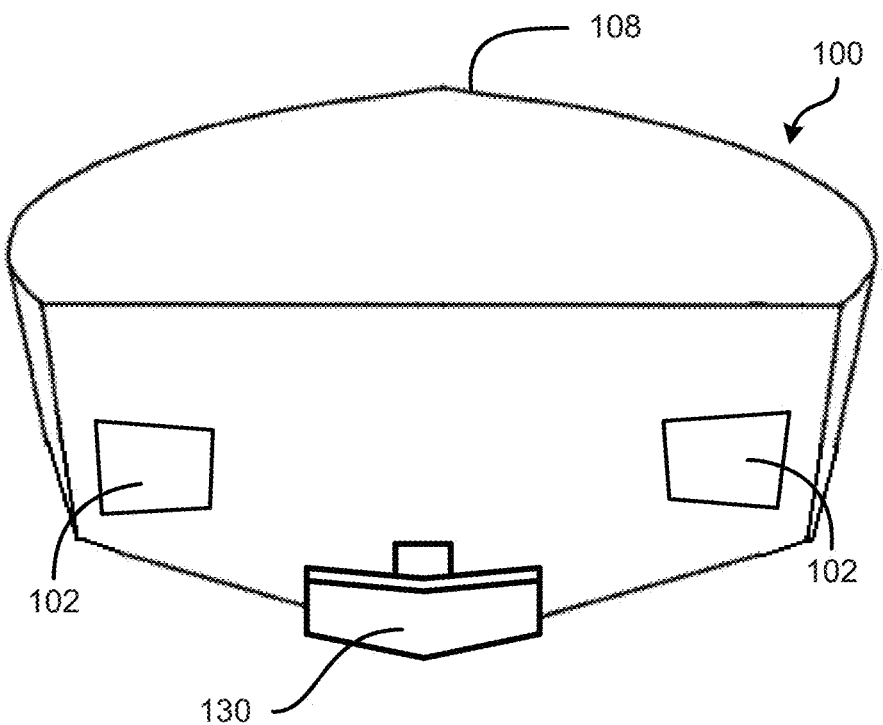
FIG. 38 shows an example embodiment of a boat with the water diverters in a collapsed position.

In some embodiments, the water diverters 102 can be removable, or the water diverters can move (e.g., pivot) to a collapsed position that facilitates storage of the boat 108. In some cases, the swim platform can be removed to make the boat 108 more compact for storage (e.g., in a garage). The water diverters 102 can also be removable (as discussed above), which can facilitate storage of the boat 102. In some embodiments, the water diverters 102 can be movable (e.g., pivotable) to a collapsed position, which can be further inward than the neutral or retracted position. For example, in the collapsed position, the water diverter 102 can extend generally parallel with the transom 35. In the collapsed position, the water divert 102 can extend towards the center line of the boat 108. For example, FIG. 38 shows an example embodiments of a boat 108 with the swim platform 70 omitted or removed, and with the water diverters 102 pivoted inward to the collapsed position. In some embodiments, the swim platform 70 would prevent the water diverters 102 from pivoting to the collapsed position when the swim platform 70 is attached. With the swim platform 70 removed, the water diverters 102 can be moved to the collapsed position. In some embodiments, the water diverters 102 can slide forward to the collapsed position, to reduce the amount of the water diverters that extends past the rear of the boat 108. In some embodiments, the water diverters 102 do not extend rearward past the other portions of the boat when in the collapsed position and/or when the swim platform 70 is removed. In some embodiments, the water diverters 102 extend rearward no more than about 1 cm, no more than about 3 cm, no more than about 5 cm, no more than about 10 cm, no more than about 20 cm, or more past the other portions of the boat 108 (e.g., the boat hull, the Power Wedge 130, etc.) when the water diverter 102 is in the collapsed position and/or when the swim platform 70 is removed.

Figure 39:
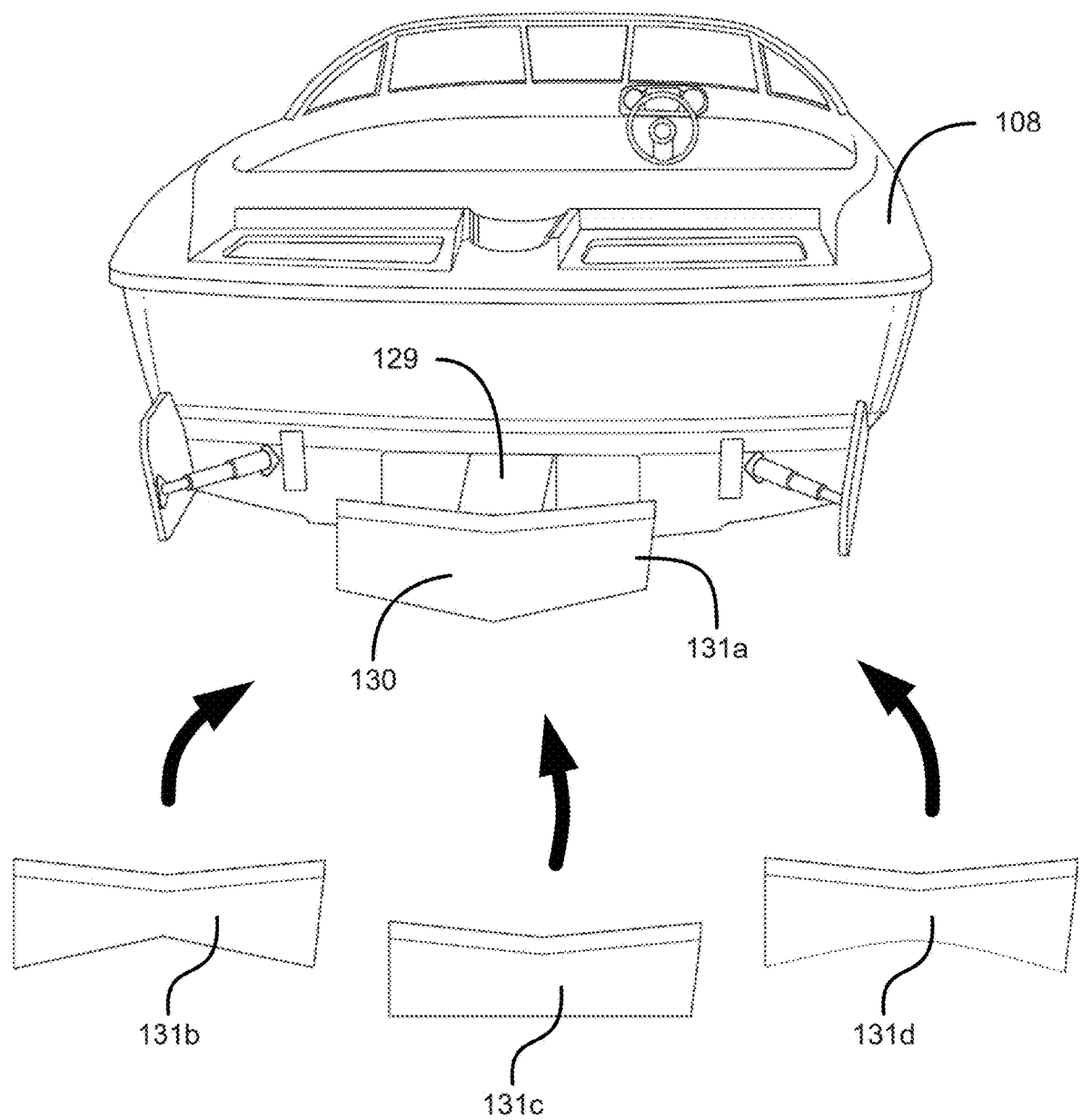
FIG. 39 shows an example embodiment of a boat with interchangeable foils on a wake shaping element.

With reference to FIG. 39, in some embodiments, the wake-modifying device 130 (which can be a Power Wedge similar to that described in U.S. Pat. No. 7,140,318, the entire contents of which is incorporated by reference herein for all that it discloses) can have removable and/or interchangeable wake shaping features. For example the wedge 130 can have interchangeable foils 131a-d. The different foils 131a-d can have different shapes, different orientations, and/or different sizes, which can be configured to produce different wake shaping effects. The interchangeable foils 131a-d can have features that are similar to, or the same as, the interchangeable water diverters 102a-d discussed in connection with FIGS. 19-21, and much of the disclosure of associated with FIGS. 19-21 is applicable to the interchangeable foils 131a-d and is not repeated here. The wedge 130 can include a positioning element 129 (e.g., a shaft) and the boat 108 can include an actuator configured to move the positioning element 129 between at least a deployed position and a neutral position. FIG. 39 shows the wedge 130 in a neutral position. In some embodiments, the actuator can position the wedge at interim positions between the neutral position and the deployed position (e.g., depending on a selected wake type). The positioning element 129 can be coupled to the boat 108 (e.g., by a joint) such that the positioning element 129 can pivot (e.g., about an axis that is substantially transverse to a longitudinal axis of the boat 108). The positioning element 129 can be configured to removably receive the foils 131a-d, and the foils 131a-d can be configured to removably attach to the positioning element 129. The foils 131a-d and/or the positioning element 129 can include coupling mechanisms (not shown in FIG. 39) configured to removably attach one of the foils 131a-d to the positioning element 129. For example, a sliding engagement members, snap fit engagement members, friction fit engagement members, claps, pins, or any other suitable engagement members can be used to removably couple the foils 131a-d to the positioning element 129.

Figure 40:
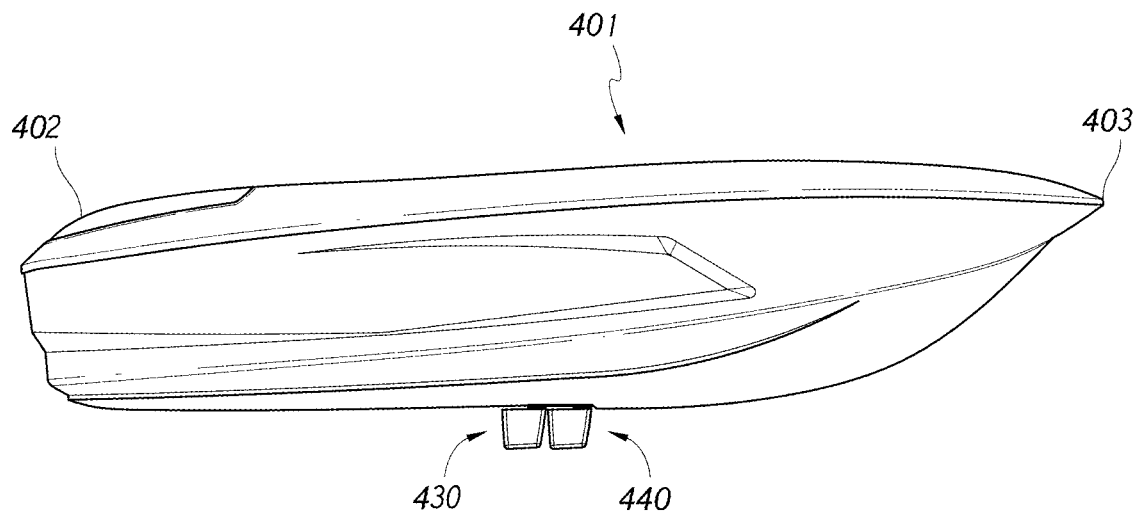
FIG. 40 is a side view of an exemplary surf wake system having adjustable surf fins according to the present invention.
Figure 41:
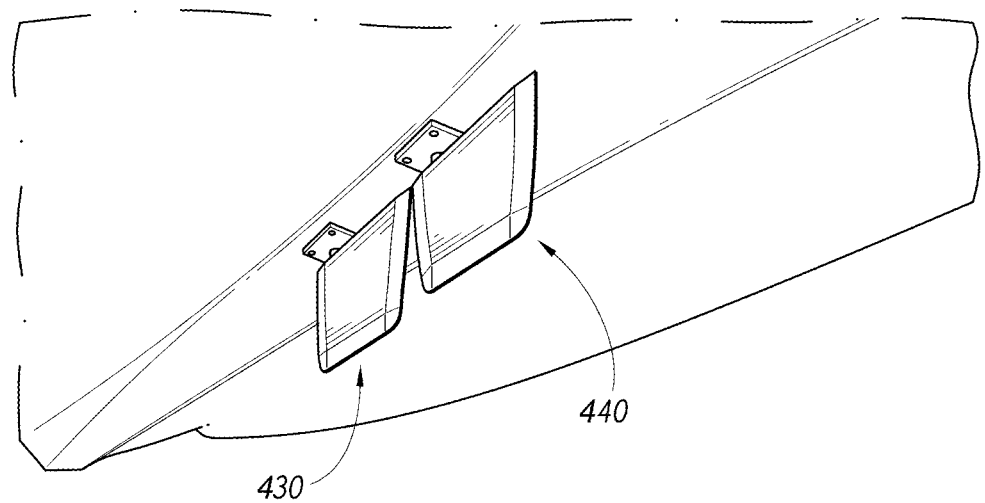
FIG. 41 is an enlarged perspective view of two fins of FIG. 40 aligned along a centerline.

Attention is directed to FIGS. 40 and 41, which illustrate a wake modifying system for modifying a wake produced by a watercraft 401 traveling through water. The system generally includes a rudder 405 pivotally mounted to the watercraft for steering the watercraft, one or more fins pivotally mounted to the watercraft substantially along a centerline 410 of the watercraft and forward the rudder 405. In the illustrated embodiment, the fin pivots about an upright axis thereof to modify the wake produced by the watercraft traveling through the water. One will appreciate that the axis may be substantially vertical, or somewhat inclined. The system also includes an actuator 450 mounted within the watercraft and operably coupled to the fin for pivoting the fin relative to centerline 410. A controller 460 is mounted on the watercraft allowing an operator to control actuator 450 to selectively pivot the fin to a desired angle θd relative to centerline 410.

In an exemplary embodiment of the present invention, the wake modifying system may include a single fin 430 or 440. Fin 430 or 440 may be disposed along centerline 410 substantially adjacent a midline 420 of the watercraft.

Centerline 410 is an imaginary line dividing the watercraft along a longitudinal direction substantially in equal ratio in a traverse direction of the watercraft. The midline 420 is an imaginary line dividing the watercraft along a traverse direction substantially in equal ratio in a longitudinal direction of the watercraft.

Figure 42:
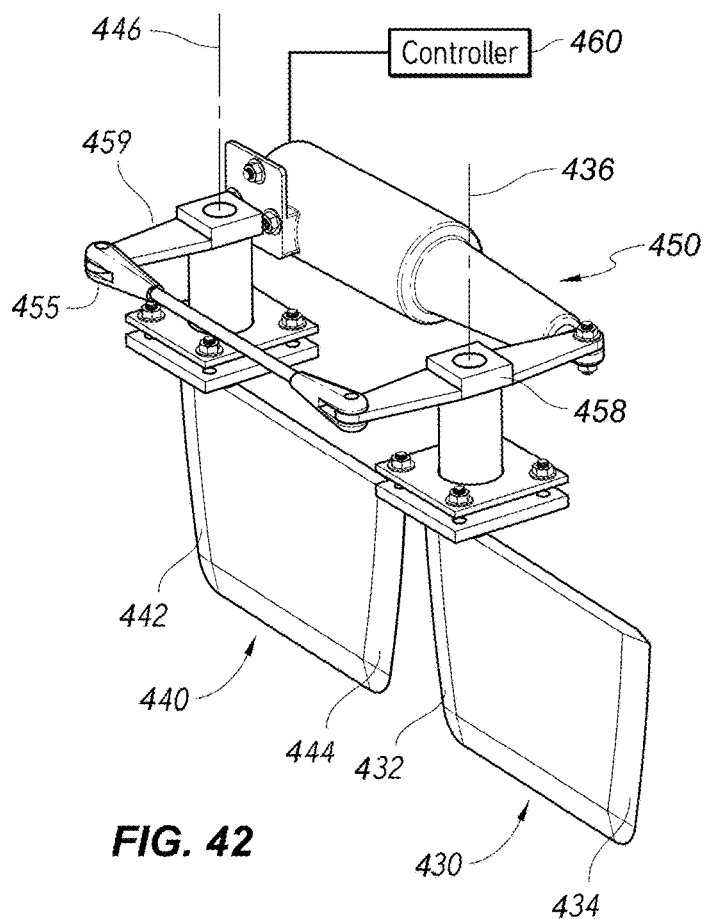
FIG. 42 is an enlarged schematic view of the actuator and the two fins of FIG. 41 aligned along a centerline of a watercraft.
Figure 43:
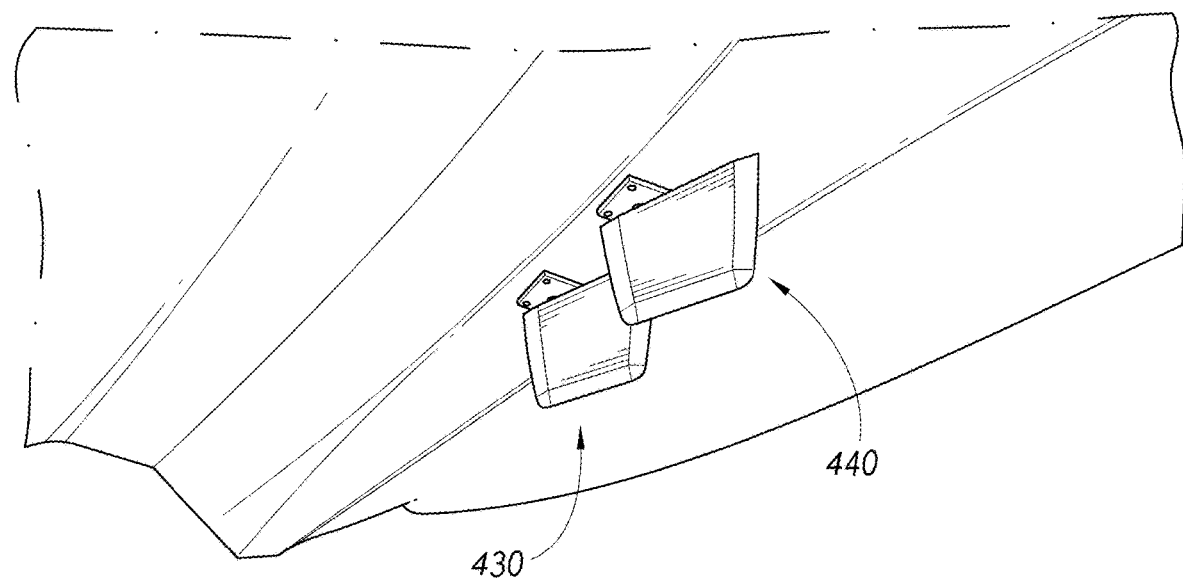
FIG. 43 is an enlarged perspective view of the two fins of FIG. 40 tilted with a predetermined angle with respect to a centerline of a watercraft.

As shown in FIG. 42, each of fin 430 or 440 may include a short portion 432, 442 extending in a direction from the upright axis 436 or 446 of fin 430 or 440 and a long portion 434, 444 thereof extending in another direction from the upright axis 436 or 446, wherein each short portion of fin 430 or 440 extends in opposing directions from the upright axis 436 or 446 respectively. One will appreciate that the forward portion of the fins may be longer or shorter than the rearward portion of the fins.

In various embodiments of the present invention, the length ratio of short portions 432, 442 and long portions 434, 444 may be approximately 1:3. In other embodiments, short portions 432, 442 and the long portions 434, 444 may have lengths of approximately 3.5 inches and approximately 8.5 inches, respectively. One will appreciate that the actual dimensions may vary.

The wake modifying system may further include an actuator 450 that is operably coupled to one or both fins 430 and 440 for pivoting the fins relative to centerline 410 in phase.

In various embodiments, the wake modifying system of the present invention may have one, two, three or more fins. The fin(s) may be disposed between stern 402 and midline 420, or in various embodiments, forward the midline. The long portion 434 of fin 430 may be aligned toward stern 402 or toward bow 403 of the watercraft.

In other embodiments of the present invention, the wake modifying system may include only a fin 440 that is disposed between bow 403 and midline 420. The long portion 444 of fin 440 may be aligned toward stern 402 of the watercraft or toward bow 403 of the watercraft.

Fin 430 or 440 may be pivoted by a link mechanism, a rack and pinion mechanism, or other suitable means. Since operation of the actuator applied to a single fin is similar to that applied to a plurality of fins, the below explanation will be made primarily with reference to a wake modifying system having two fins. One will appreciate that one or more actuators may be provided to control one or more fins.

In addition, the plurality of fins may include two or more fins which that may be individually rotated, or cooperatively controlled to rotate the fins simultaneously, synchronously or asynchronously, and/or in-phase or out-of-phase.

Fins 430 and 440 may be pivotally mounted to the watercraft substantially along centerline 410 of the watercraft. Fins 430 and 440 may be substantially adjacent the midline 420 of the watercraft as shown in FIGS. 41-44. In various embodiments, one fin may be disposed between stern 402 and midline 420 while another fin may be disposed between bow 403 and midline 420.

Figure 45:
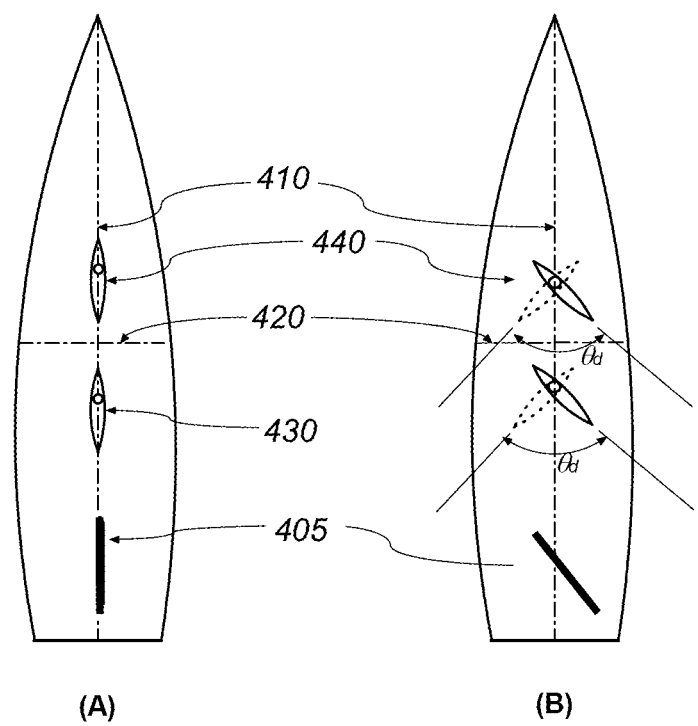
FIGS. 45(A) and (B) are schematic views illustrating two fins aligned along a center line of the watercraft and operation thereof, where long portions of the fins are oriented aft of a watercraft according to an exemplary embodiment of the present invention.

In various embodiments of the present invention, as shown in FIGS. 45(A) and 45(B), the long portions 434 and 444 of fins 430 and 440 may be disposed toward stern 402, that is, the long portions may extend aft. The long portions 434 and 444 of fins 430 and 440 may operate to move to the same side (i.e., left or right direction) with respect to centerline 410 as shown in FIG. 45(B). Accordingly, the long portions 434 and 444 of fins 430 and 440 may synchronously pivot to the left or right side of the center line 410.

However, while the long portions 434 and 444 of fins 430 and 440 may operate in one side, for instance, the right side of the watercraft with respect to centerline 410 as shown in FIG. 45(B), the watercraft may tend to rotate in a counter-clockwise direction in the drawing. Accordingly, the rudder 405 may be actuated by controller 460 to rotate in a clockwise direction, as shown in the drawing, or in a counter clockwise direction.

Figure 46:
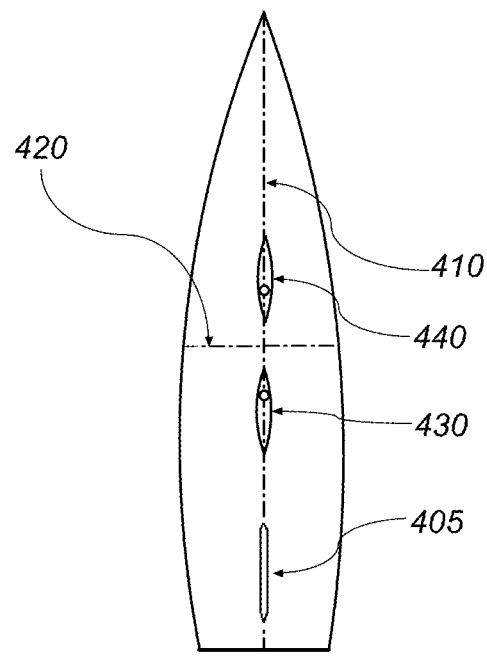
FIG. 46 is a schematic view illustrating two fins, wherein a long portion of a fin is oriented toward the bow and a long portion of another fin is oriented aft of a watercraft according to an exemplary embodiment of the present invention.
Figure 47:
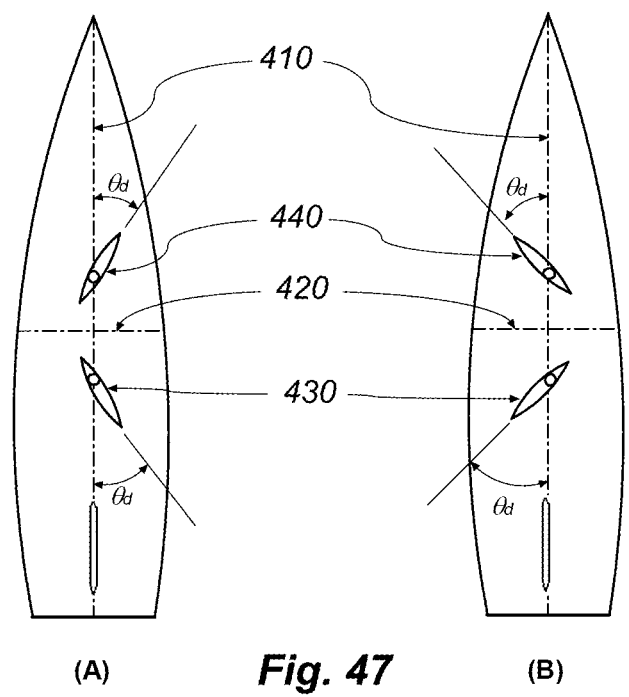
FIGS. 47(A) and (B) are schematic views illustrating two fins, wherein a long portion of a fin is oriented toward the bow and a long portion of another fin is oriented aft, and wherein each fin is controlled independently to be placed in the same side with respect to the centerline of a watercraft according to an exemplary embodiment of the present invention.
Figure 48:
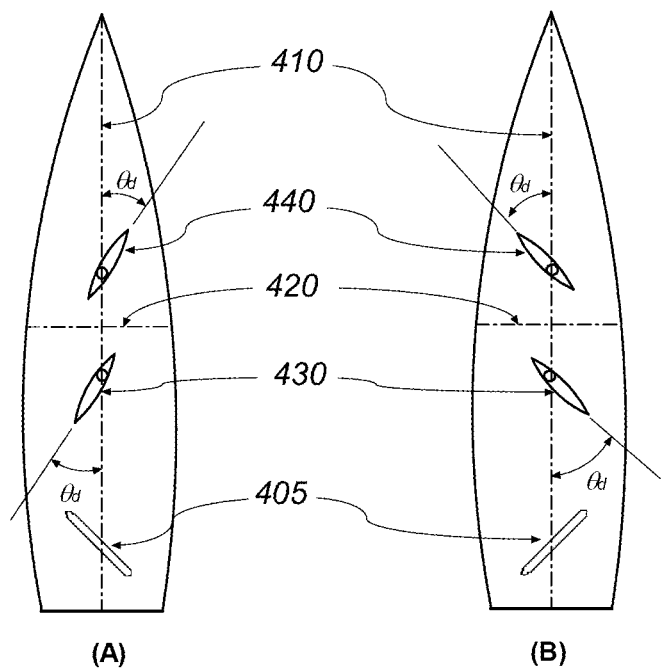
FIGS. 48(A) and (B) are schematic views illustrating two fins, wherein a long portion of a fin is oriented toward the bow and a long portion of another fin is oriented aft, and wherein each fin is controlled independently to be placed in the opposite side with respect to the centerline of a watercraft according to an exemplary embodiment of the present invention.

FIGS. 46-48 show another exemplary embodiment of the present invention in which a long portion 434 of fin 430 is aligned toward stern 402 and the long portion 444 of fin 440 is aligned toward the bow 403.

In this structure, long portions 434 and 444 of fins 430 and 440 may operate in the same side (i.e., left or right side) with respect to centerline 410 as shown in FIGS. 47(A) and 47(B). Accordingly, the long portions 434 and 444 of fins 430 and 440 may synchronously pivot in the left or right side of the center line 410 with a phase difference.

In another exemplary embodiment of the present invention, long portions 434 and 444 of fins 430 and 440 may operate in the opposite sides (i.e., left side and right side) individually with respect to centerline 410 as shown in FIGS. 48(A) and 48(B).

However, as shown in FIGS. 48(A) and 48(B), while the long portions 434 and 444 of fins 430 and 440 may operate in opposite sides respectively with respect to the centerline of the watercraft, the watercraft may tend to rotate by the reaction force of water applied to fins 430 and 440 in front thereof. Accordingly, the rudder 405 may be steered by the controller 460 to counteract the rotation of the watercraft.

Hereinafter, a link mechanism and a rack and pinion to control fins 430 and 440 of wake modifying system in an exemplary embodiment of the present invention will be explained.

Figure 44:
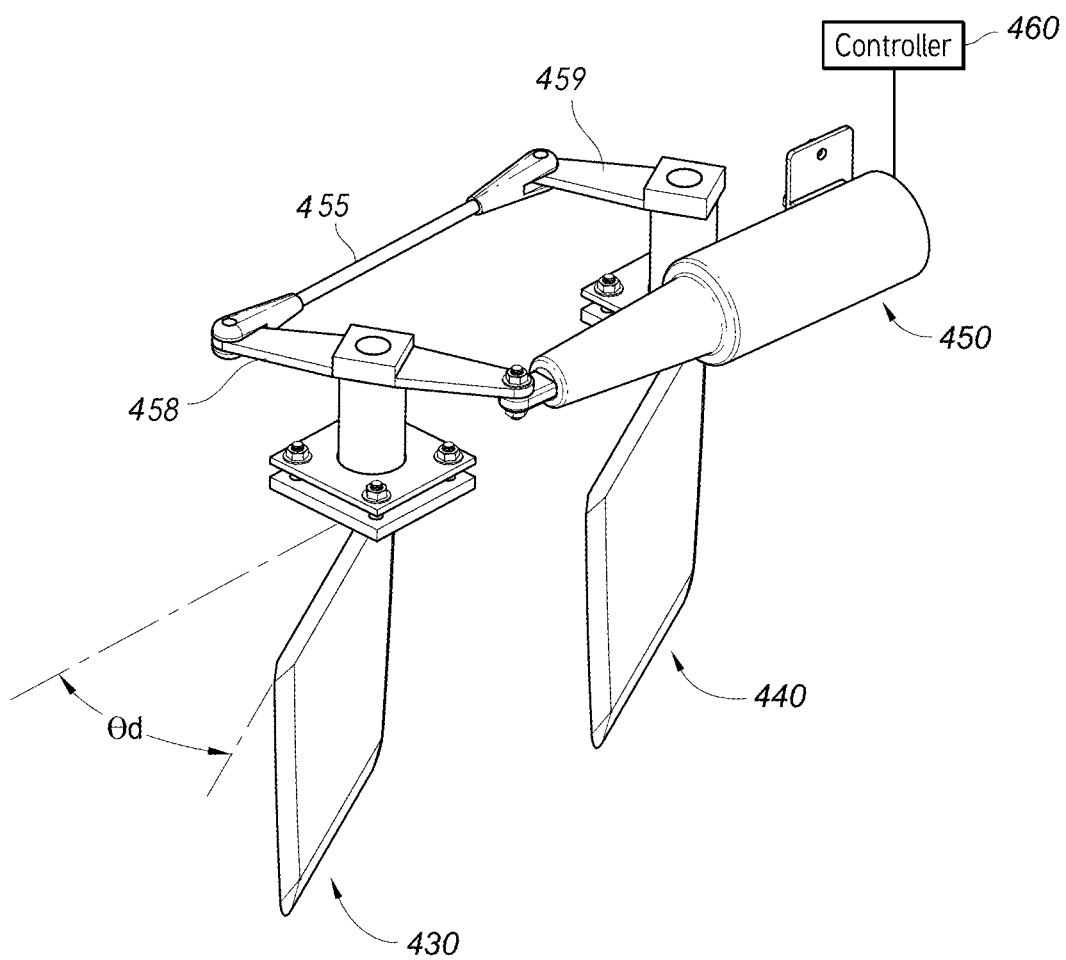
FIG. 44 is an enlarged schematic view of the actuator and two fins of FIG. 40 wherein the two fins are tilted with a predetermined angle with respect to the centerline.
Figure 49:
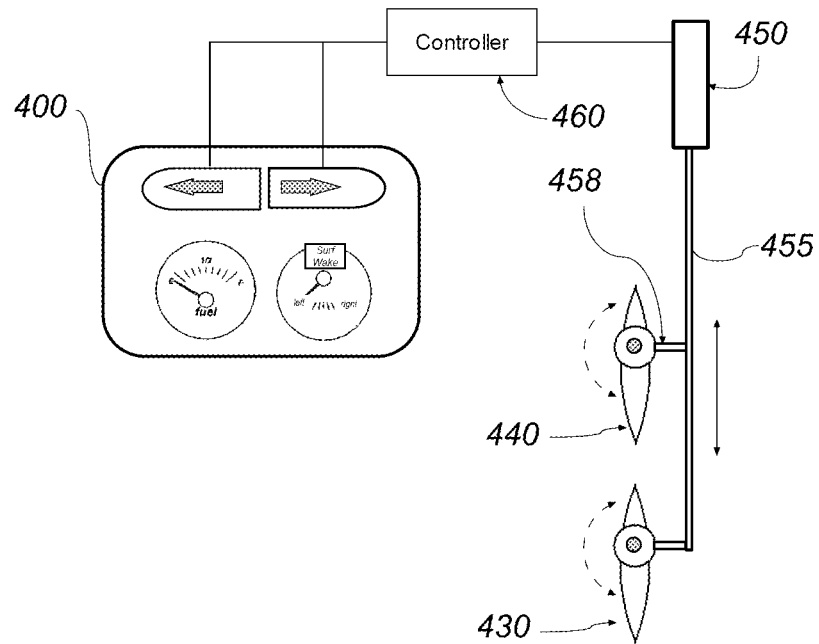
FIG. 49 is a schematic view illustrating two fins coupled to an actuator via a link mechanism according to an exemplary embodiment of the present invention.

FIGS. 42, 44, and 49 are a schematic view illustrating two fins coupled to an actuator via a link mechanism according to an exemplary embodiment of the present invention.

The link mechanism may include arms 458 and 459 which are fixed to fins 430 and 440 wherein an end of each arm 458 or 459 is pivotally coupled to a connecting rod 455.

In various embodiments, as shown in FIGS. 42 and 44, one end of actuator 450 may be affixed to the watercraft and another end thereof is operably coupled to another end of one of the arms 458 and 459 such that actuator 450 can synchronously pivot fins 430 and 440 relative to centerline 410.

In various embodiments, another end of actuator 450 may be fixed to one end of the connecting rod 455 and disposed in parallel as shown in FIG. 48 such that actuator 450 can synchronously pivot fins 430 and 440 relative to centerline 410.

Figure 50:
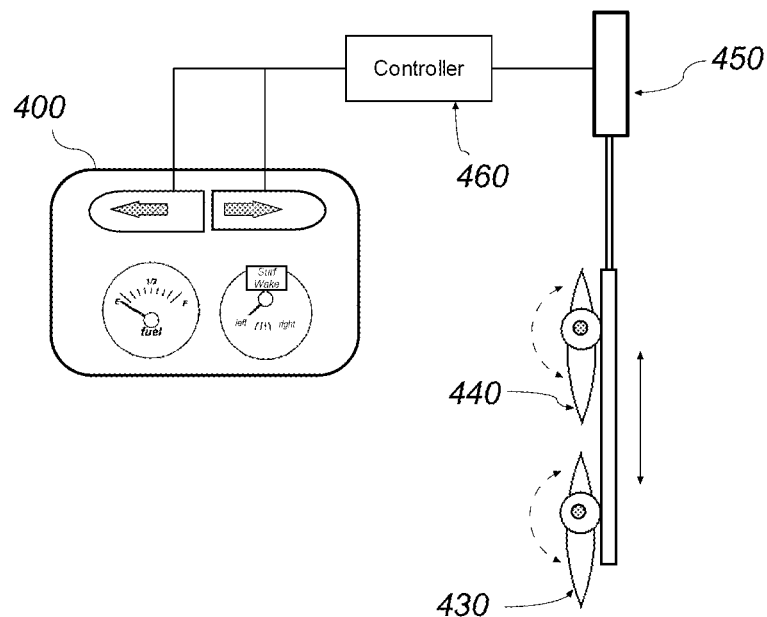
FIG. 50 is a schematic view illustrating two fins coupled to an actuator via a rack and pinion according to an exemplary embodiment of the present invention.

FIG. 50 is a schematic view illustrating two fins coupled to an actuator via a rack and pinion according to an exemplary embodiment of the present invention.

Here, one end of actuator 450 may be affixed to the watercraft and another end thereof is operably coupled to a rack 470 which is meshed to pinions 475 formed adjacent to the upright axis 436 and 446 of each fin 430 and 440 as shown in FIG. 50.

The wake modifying system, as an exemplary embodiment of the present invention, may further include a display device having touch screen 400. In this structure, the operator may provide a control signal to the controller 460 by touching the touch screen 400 to control the rotation angle of fins 430 and 440. One will also appreciate that otherwise conventional switches (e.g., mechanical, electronic, electro-mechanical, etc.) or other suitable means may be used to translate the drivers input to suitable controls.

Hereinafter, the operation of wake modifying system in an exemplary embodiment of the present invention will explained with reference to FIGS. 45(A) and 45(B).

As shown in FIG. 45(A), fins 430 and 440 extend in their neutral position substantially along center line 410. If a right side surf wake is desired, surf fins 430 and 440 may be turned to the left to a desired angle θd, as shown in solid lines in FIG. 45(B). Such leftward alignment of the fins will cause the watercraft to turn towards the left. In order to compensate, the driver must actively turn the watercraft to the right, for example, steer to the right to overcome the effects of fins 430 and 440 of pulling the boat to the left. In order for the watercraft to ultimately travel straight, rudder 405 angles to the left as the driver steers right, as shown in FIG. 45(B), which causes the watercraft to lean right such that the right aft corner sinks into the water (in much the same manner as the watercraft would if it were performing a conventional right turn.

One will appreciate that, if a left surf wake is desired, the fins and rudder would be turned in the opposing direction (e.g., as the fins are shown in phantom in FIG. 45(B). This would require steering left to compensate, thus causing the water craft to lean left and effecting a left surf wake.

As noted above, and with continued reference to FIG. 45(B), fins 430 and 440 (as shown in solid lines) cause the watercraft to turn to the left. To compensate for this tendency to turn left, the driver must steer the watercraft to the right in order to track a straight path (e.g., parallel to centerline 410). Steering to the right causes rudder 405 to angle left and extend in substantially the same direction as fins 430 and 440, and in some cases, extend substantially parallel to the fins. Such alignment of fins and rudder may direct or channel more water to the right side of the watercraft, which may serve to further enhance a right surf wake.

Such enhancement may result in creating a suitable wake for surfing with less overall lean of the watercraft. For example, using conventional ballast methods, a significant amount of weight would be positioned one side of the stern which would effect a 14° lean to the desired side. In contrast, using the fins of the present invention may effect a suitable wake with as little as 5° lean toward the desired side. Such reduced lean may facilitate control of the water craft, and provide passengers on the water craft a more enjoyable ride.

One will also appreciate that the configuration of the present invention allows the driver to switch from a right surf wake to a left surf wake "on-the-fly". In particular, the driver may simply switch the fins from the solid line position of FIG. 45(B) to the phantom line position of FIG. 45(B), even while the watercraft is in motion, even if the watercraft is at speed.

When a speed of the watercraft is above a predetermined speed, the controller 460 may be configured to control actuator 450 to rotate the long portion 434 and 444 of each or both of fins 430 and 440 to approximately 0° relative to centerline 410. Accordingly, the watercraft may travel with fewer wakes. The predetermined speed may be approximately 10 miles per hour.

However, when the operator of the watercraft may create a large wake, he may provide control signal to the controller 460 via the touch screen 400, and then the controller 460 regulates actuator 450 to pivot fins 430 and 440 to the desired angle θd.

Since fins 430 and 440 are aligned with a predetermined angle with respect to the movement direction of the watercraft, the water facing the bow 403 of the watercraft creates reaction force to fins 430 and 440. Accordingly, the bow 403 is yawed into the water.

In this structure, bow of the watercraft biased into the water is further submerged into the water such that larger wakes are effectively created by the body of the watercraft.

In an exemplary embodiment of the present invention, the maximum angle is approximately 22 degrees.

For convenience in explanation and accurate definition in the appended claims, the terms "upper" and "lower" are used to describe features of the exemplary embodiments with reference to the positions of such features as displayed in the figures.

For convenience in explanation and accurate definition in the appended claims, the terms "inward" and "outward", "inboard" and "outboard", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A water-sports boat configured to facilitate user-controlled selection of which side of a wake of the water-sports boat to enhance for wake surfing, the water-sports boat comprising:
    a hull having a transom and a longitudinal axis, the hull configured to at least contribute to production of a wake having a port-side wave and a starboard-side wave that diverge when the hull moves through water;
    a swim platform extending rearward from the transom;
    a propulsion system comprising a propeller;
    a starboard-side surf selector;
    a port-side surf selector;
    a port-side deflector that is port of the longitudinal axis and configured to move between a neutral position and a deployed position, wherein at least a majority of the port-side deflector is closer to the swim platform in the neutral position than in the deployed position, and wherein the port-side deflector in the deployed position comprises a generally horizontal portion and a down-turned portion, wherein the down-turned portion is positioned at an edge of the generally horizontal portion and is angled downward relative to the generally horizontal portion;
    a port-side actuator operably configured to move said port-side deflector between said neutral and said deployed positions;
    a starboard-side deflector that is starboard of the longitudinal axis and configured to move between a neutral position and a deployed position, wherein at least a majority of the starboard-side deflector is closer to the swim platform in the neutral position than in the deployed position, and wherein the starboard-side deflector in the deployed position comprises a generally horizontal portion and an down-turned portion, wherein the down-turned portion is positioned at an edge of the generally horizontal portion and is angled generally downward relative to the generally horizontal portion;
    a starboard-side actuator operably configured to move said starboard-side deflector between said neutral and said deployed positions;
    wherein the water-sports boat has:
        a port-side surf configuration where the port-side deflector is positioned at the neutral position and the starboard-side deflector is positioned at the deployed position, and wherein the water-sports boat in the port-side surf configuration is configured to enhance port-side wake surfing when the hull moves through water by at least causing the port-side wave to be smoother than the starboard-side wave;
        a starboard-side surf configuration where the starboard-side deflector is positioned at the neutral position and the port-side deflector is positioned at the deployed position, wherein the water-sports boat in the starboard-side surf configuration is configured to enhance starboard-side wake surfing when the hull moves through water by at least causing the starboard-side wave to be smoother than the port-side wave; and
    wherein the water-sports boat is configured to transition to the starboard-side surf configuration with the starboard-side deflector at the neutral position and the port-side deflector at the deployed position upon actuation of the starboard-side surf selector and configured to transition to the port-side surf configuration with the port-side deflector at the neutral position and the starboard-side deflector at the deployed position upon actuation of the port-side surf selector;
    wherein the water-sports boat is configured to transition even when the hull is traveling through water at predetermined speeds and the water-sports boat was in one of the starboard-side or port-side surf configurations upon appropriate actuation of an opposite one of the starboard-side and port-side surf selectors.

2. The water-sports boat of claim 1, further comprising a rudder, wherein, when the water-sports boat is configured in the port-side surf configuration, the rudder is operable to counteract effects of the starboard-side deflector on a direction of travel and, when the water-sports boat is configured in the starboard-side surf configuration, the rudder is operable to counteract effects of the port-side deflector on said direction of travel.

3. The water-sports boat of claim 1, wherein the water-sports boat in the port-side surf configuration is configured to enhance port-side wake surfing by at least causing the port-side wave to be higher than the starboard-side wave and wherein the water-sports boat in the starboard-side surf configuration is configured to enhance starboard-side wake surfing by at least causing the starboard-side wave to be higher than the port-side wave.

4. The water-sports boat of claim 1, further comprising a center wake modifying device movable to modify the wake, wherein the center wake modifying device interacts with water flowing below a bottom center portion of the transom when deployed.

5. The water-sports boat of claim 4, wherein the center wake modifying device is movable between positions to adjust a size of the wake.

6. The water-sports boat of claim 4, wherein the center wake modifying device pivots about a horizontal axis.

7. The water-sports boat of claim 4, wherein the center wake modifying device comprises a foil.

8. The water-sports boat of claim 1, wherein:
the port-side deflector in the neutral position is substantially entirely retracted behind the transom such that no substantial portion of the port-side deflector extends beyond the transom in a direction perpendicular to the longitudinal axis of the hull; and
the starboard-side deflector in the neutral position is substantially entirely retracted behind the transom such that no substantial portion of the starboard-side deflector extends beyond the transom in a direction perpendicular to the longitudinal axis of the hull.

9. A system that includes the water-sports boat of claim 1, the system further comprising a rider control device that houses the starboard-side surf selector and the port-side surf selector, the rider control device configured to receive a selection from a rider that is wake surfing behind the water-sports boat.

10. The water-sports boat of claim 1, further comprising one or more rider notification elements configured to provide an alert to a rider of a transition to the starboard-side surf configuration or to the port-side surf configuration.

11. The water-sports boat of claim 1, wherein the water-sports boat is configured to move through water at said predetermined speeds in the port-side surf configuration or the starboard-side surf configuration without significant leaning of the water-sports boat to the port side or to the starboard side.

12. The water-sports boat of claim 1, further comprising a user interface including a touchscreen, wherein the starboard-side surf selector and the port-side surf selector comprise one or more touchscreen buttons.

13. The water-sports boat of claim 1, further comprising a ballast system configured to add ballast.

14. A water-sports boat configured to facilitate user-controlled selection of which side of a wake of the water-sports boat to enhance for wake surfing, the water-sports boat comprising:
a hull having a transom and a longitudinal axis, the hull configured to at least contribute to production of a wake having a port-side wave and a starboard-side wave that diverge when the hull moves through water;
a swim platform extending rearward from the transom;
a propulsion system comprising a propeller;
a starboard-side surf selector;
a port-side surf selector;
a port-side deflector that is port of the longitudinal axis and configured to move between a neutral position and a deployed position, wherein at least a majority of the port-side deflector is closer to the swim platform in the neutral position than in the deployed position, and wherein the port-side deflector extends past a port-side edge of the transom when in the deployed position;
a port-side actuator operably configured to move said port-side deflector between said neutral and said deployed positions;
a starboard-side deflector that is starboard of the longitudinal axis and configured to move between a neutral position and a deployed position, wherein at least a majority of the starboard-side deflector is closer to the swim platform in the neutral position than in the deployed position, and wherein the starboard-side deflector extends past a starboard-side edge of the transom when in the deployed position;
a starboard-side actuator operably configured to move said starboard-side deflector between said neutral and said deployed positions;

wherein the water-sports boat has:
a port-side surf configuration where the port-side deflector is positioned at the neutral position and the starboard-side deflector is positioned at the deployed position, and wherein the water-sports boat in the port-side surf configuration is configured to enhance port-side wake surfing when the hull moves through water by at least causing the port-side wave to be smoother than the starboard-side wave;
a starboard-side surf configuration where the starboard-side deflector is positioned at the neutral position and the port-side deflector is positioned at the deployed position, wherein the water-sports boat in the starboard-side surf configuration is configured to enhance starboard-side wake surfing when the hull moves through water by at least causing the starboard-side wave to be smoother than the port-side wave; and
wherein the water-sports boat is configured to transition to the starboard-side surf configuration with the starboard-side deflector at the neutral position and the port-side deflector at the deployed position upon actuation of the starboard-side surf selector and configured to transition to the port-side surf configuration with the port-side deflector at the neutral position and the starboard-side deflector at the deployed position upon actuation of the port-side surf selector;
wherein the water-sports boat is configured to transition even when the hull is traveling through water at predetermined speeds and the water-sports boat was in one of the starboard-side or port-side surf configurations upon appropriate actuation of an opposite one of the starboard-side and port-side surf selectors.

15. A method of operating a water-sports boat to facilitate wake surfing, the method comprising:
moving the water-sports boat through water such that a hull of the water-sports boat creates a wake having a port-side wave and a starboard-side wave that diverge;
performing at least one of a starboard-to-port transition and a port-to-starboard transition;
wherein the starboard-to-port transition comprises:
positioning the water-sports boat in a starboard-side surf configuration where a starboard-side wake shaping flap is in a neutral position and a port-side wake shaping flap is in a deployed position, wherein the water-sports boat in the starboard-side surf configuration deflects water to enhance the starboard-side wave by causing it to be smoother than the port-side wave;
moving the water-sports boat through water in the starboard-side surf configuration to generate the starboard-side wave enhanced for wake surfing;
transitioning the water-sports boat from the starboard-side surf configuration to a port-side surf configuration by moving the port-side wake shaping flap from the deployed position to a neutral position and moving the starboard-side wake shaping flap from the neutral position to a deployed position as the water-sports boat continues to move through water, wherein the water-sports boat in the port-side surf configuration deflects water to enhance the port-side wave by causing it to be smoother than the starboard-side wave; and
moving the water-sports boat through water in the port-side surf configuration to generate the port-side wave enhanced for wake surfing;

wherein the port-to-starboard transition comprises:
positioning the water-sports boat in a port-side surf configuration where the port-side wake shaping flap is in the neutral position and the starboard-side wake shaping flap is in the deployed position, wherein the water-sports boat in the port-side surf configuration deflects water to enhance the port-side wave by causing it to be smoother than the starboard-side wave;
moving the water-sports boat through water in the port-side surf configuration to generate the port-side wave enhanced for wake surfing;
transitioning the water-sports boat from the port-side surf configuration to the starboard-side surf configuration by moving the starboard-side wake shaping flap from the deployed position to the neutral position and moving the port-side wake shaping flap from the neutral position to the deployed position as the water-sports boat continues to move through water, wherein the water-sports boat in the starboard-side surf configuration deflects water to enhance the starboard-side wave by causing it to be smoother than the port-side wave; and
moving the water-sports boat through water in the starboard-side surf configuration to generate the starboard-side wave enhanced for wake surfing;
wherein the port-side wake shaping flap in the deployed position comprises a generally horizontal portion and a down-turned portion, wherein the down-turned portion is positioned at an edge of the generally horizontal portion and is angled downward relative to the generally horizontal portion; and
wherein the starboard-side wake shaping flap in the deployed position comprises a generally horizontal portion and an down-turned portion, wherein the down-turned portion is positioned at an edge of the generally horizontal portion and is angled generally downward relative to the generally horizontal portion.

16. The method of claim 15, wherein the water-sports boat comprises a swim platform rearward of a transom, wherein moving the port-side wake shaping flap or the starboard-side wake shaping flap from the neutral position to the deployed position causes a majority of the port-side wake shaping flap or a majority of the starboard-side wake shaping flap to move away from the swim platform, and wherein moving the port-side wake shaping flap or the starboard-side wake shaping flap from the deployed position to the neutral position causes the majority of the port-side wake shaping flap or the majority of the starboard-side wake shaping flap to move toward from the swim platform.

17. The method of claim 15, further comprising moving a center wake modifying device that is positioned at a bottom portion of a transom at a center of the transom, wherein moving the center wake modifying device adjusts a size of the wake.

18. The method of claim 15, further comprising providing rider notification to automatically alert the wake surfer of the transition from the starboard-side surf configuration to the port-side surf configuration or of the transition from the port-side surf configuration to the starboard-side surf configuration.

19. The method of claim 15, wherein:
moving the port-side wake shaping flap to the neutral position substantially entirely retracts the port-side wake shaping flap behind a transom of the water-sports boat such that no substantial portion of the port-side wake shaping flap extends beyond the transom in a direction perpendicular to a longitudinal axis of the water-sports boat; and
moving the starboard-side wake shaping flap to the neutral position substantially entirely retracts the starboard-side wake shaping flap behind the transom such that no substantial portion of the starboard-side wake shaping flap extends beyond the transom in a direction perpendicular to the longitudinal axis of the water-sports boat.

20. The method of claim 15, wherein the water-sports boat comprises:
a movable structure coupled to a transom such that the movable structure can pivot relative to the transom;
a first actuator having a first end coupled to the transom and a second end coupled to the movable structure, wherein the first actuator is configured to pivot the movable structure relative to the transom; and
a second actuator having a first end coupled to the movable structure and a second end coupled to the starboard-side wake shaping flap or the port-side wake shaping flap, wherein the starboard-side wake shaping flap or the port-side wake shaping flap is coupled to the movable structure such that the starboard-side wake shaping flap or the port-side wake shaping flap can pivot relative to the movable structure.

21. The method of claim 15, wherein the down-turned portion of the starboard-side wake shaping flap is upright and the down-turned portion of the port-side wake shaping flap is upright.

22. The method of claim 15, further comprising steering the water-sports boat using a rudder.

23. The method of claim 15, further comprising adding ballast to a ballast system on the water-sports boat.

24. A wake surf system for use with a water-sports boat that is configured to produce a wake having a port-side wave and a starboard-side wave to facilitate user-controlled selection of which side of the wake to enhance for wake surfing, the wake surf system comprising:
a port-side deflector movable between a neutral position and a deployed position, wherein the port-side deflector in the deployed position comprises a generally horizontal portion and a down-turned portion, wherein the down-turned portion is positioned at an edge of the generally horizontal portion and is angled downward relative to the generally horizontal portion;
a port-side electronic actuator configured to move the port-side deflector between the neutral position and the deployed position;
a starboard-side deflector movable between a neutral position and a deployed position, wherein the starboard-side deflector in the deployed position comprises a generally horizontal portion and a down-turned portion; wherein the down-turned portion is positioned at an edge of the generally horizontal portion and is angled downward relative to the generally horizontal portion;
a starboard-side electronic actuator configured to move the starboard-side deflector between the neutral position and the deployed position;
a user interface configured to receive user input comprising a selection of a port-side surf mode and a selection of a starboard-side surf mode;
wherein, in response to the selection of the port-side surf mode the port-side actuator and the starboard-side actuator are configured to position the port-side deflector and the starboard-side deflector in a port-side surf configuration that is configured to enhance port-side wake surfing by at least causing the port-side wave to be smoother than the starboard-side wave;

wherein, in response to the selection of the starboard-side surf mode the port-side actuator and the starboard-side actuator are configured to position the port-side deflector and the starboard-side deflector in a starboard-side surf configuration that is configured to enhance starboard-side wake surfing by at least causing the starboard-side wave to be smoother than the port-side wave.

25. The wake surf system of claim 24, wherein the down-turned portion of the starboard-side deflector is upright, and wherein the down-turned portion of the port-side deflector is upright.

26. The wake surf system of claim 24, wherein the wake surf system is an aftermarket kit configured to be installed on an existing water-sports boat.

27. The wake surf system of claim 24, wherein:
in the port-side surf configuration, the port-side actuator positions the port-side deflector in the neutral position and the starboard-side actuator positions the starboard-side deflector in the deployed position to deflect water to enhance port-side wake surfing by at least causing the port-side wave to be smoother than the starboard-side wave;
in the starboard-side surf configuration, the starboard-side actuator positions the starboard-side deflector in the neutral position and the port-side actuator positions the port-side deflector in the deployed position to deflect water to enhance starboard-side wake surfing by at least causing the starboard-side wave to be smoother than the port-side wave.

28. A water-sports boat comprising:
the wake surf system of claim 24;
a hull having a transom; and
a ballast system configured to add ballast to the water-sports boat.

29. The water-sports boat of claim 28, wherein:
the port-side deflector in the neutral position is substantially entirely retracted behind the transom such that no substantial portion of the port-side deflector extends beyond the transom in a direction perpendicular to a longitudinal axis of the water-sports boat; and
the starboard-side deflector in the neutral position is substantially entirely retracted behind the transom such that no substantial portion of the starboard-side deflector extends beyond the transom in a direction perpendicular to the longitudinal axis of the water-sports boat.

30. The water-sports boat of claim 28, wherein the water-sports boat comprises a swim platform rearward of a transom, wherein moving the port-side deflector or the starboard-side deflector from the neutral position to the deployed position causes a majority of the port-side deflector or a majority of the starboard-side deflector to move away from the swim platform, and wherein moving the port-side deflector or the starboard-side deflector from the deployed position to the neutral position causes the majority of the port-side deflector or the majority of the starboard-side deflector to move toward from the swim platform.

* * * * *

UNITED STATES PATENT AND TRADEMARK OFFICE
CERTIFICATE OF CORRECTION

PATENT NO. : 10,683,061 B2  
APPLICATION NO. : 15/915431  
DATED : June 16, 2020  
INVENTOR(S) : Daniel Lee Gasper Page 1 of 1

It is certified that error appears in the above-identified patent and that said Letters Patent is hereby corrected as shown below:

On the Title Page

On page 2, in Column 1, item (56), Related U.S. Application Data, Line 4, delete "filed on Nov. 8, 2013, which is a continuation-in-part of application No. 14/026,983, filed on Sep. 13, 2013, now Pat. No. 9,315,236, which is a continuation of application No. 13/830,356, filed on Mar. 14, 2013, now Pat. No. 8,578,873, which is a continuation of application No. 13/830,274, filed on Mar. 14, 2013, now Pat. No. 8,534,214, which is a continuation-in-part of application No. PCT/US2012/055788, filed on Sep. 17, 2012, which is a continuation of application No. PCT/US2012/055788, filed on Sep. 17, 2012, which is a continuation-in-part of application No. 13/545,969, filed on Jul. 12, 2012, now Pat. No. 9,260,161." and insert --filed on Nov. 8, 2013, which is a continuation of application No. 13/830,356, filed on Mar. 14, 2013, now Pat. No. 8,578,873, which is a continuation-in-part of application No. 13/545,969, filed on Jul. 10, 2012, now Pat. No. 9,260,161, said application No. 13/830,356 is a continuation-in-part of application No. PCT/US2012/055788, filed on Sep. 17, 2012, said application No. 15/133,157, is a continuation-in-part of application No. 14/026,983, filed on Sep. 13, 2013, now Pat. No. 9,315,236, which is a continuation of application No. 13/830,274, filed on Mar. 14, 2013, now Pat. No. 8,534,214, which is a continuation of application No. PCT/US2012/055788, filed on Sep. 17, 2012.--.

Signed and Sealed this  
Twenty-second Day of December, 2020

Andrei Iancu  
*Director of the United States Patent and Trademark Office*